United States Patent
Yoshino et al.

(10) Patent No.: US 7,555,216 B2
(45) Date of Patent: Jun. 30, 2009

(54) OPTICAL COMMUNICATION SYSTEM USING OPTICAL FREQUENCY CODE, OPTICAL TRANSMISSION DEVICE AND OPTICAL RECEPTION DEVICE THEREOF, AND REFLECTION TYPE OPTICAL COMMUNICATION DEVICE

(75) Inventors: Manabu Yoshino, Funabashi (JP); Noriki Miki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 657 days.

(21) Appl. No.: 10/562,431

(22) PCT Filed: Jul. 16, 2004

(86) PCT No.: PCT/JP2004/010228

§ 371 (c)(1),
(2), (4) Date: Dec. 28, 2005

(87) PCT Pub. No.: WO2005/008923

PCT Pub. Date: Jan. 27, 2005

(65) Prior Publication Data

US 2006/0147219 A1 Jul. 6, 2006

(30) Foreign Application Priority Data

Jul. 16, 2003 (JP) ............................. 2003-275601
Aug. 27, 2003 (JP) ............................. 2003-303234
Dec. 1, 2003 (JP) ............................. 2003-401734

(51) Int. Cl.
*H04J 14/00* (2006.01)
*H04J 14/08* (2006.01)
*H04B 10/04* (2006.01)

(52) U.S. Cl. ....................... 398/77; 398/98; 398/193

(58) Field of Classification Search ................. 398/77, 398/78, 81, 98, 135, 136, 182, 183, 185, 398/186, 192, 193, 202
See application file for complete search history.

(56) References Cited

U.S. PATENT DOCUMENTS 6,560,209 B1 * 5/2003 Alamouti et al. ............ 370/330
(Continued)

FOREIGN PATENT DOCUMENTS

JP 11-32029 2/1999
JP 2001-086070 3/2004

OTHER PUBLICATIONS

Oshiba, Saeko et al., "Experimental study on bit rate enhancement using time-spread/wavelength-hop optical code division multiplexing", Annual General Conference of the Institute of Electronics, Information and Communication Engineers of Japan, B-10-80, 2002. (with English translation).

(Continued)

*Primary Examiner*—Dalzid Singh
(74) *Attorney, Agent, or Firm*—Oblon, Spivak, McClelland, Maier & Neustadt, P.C.

(57) ABSTRACT

The invention dispenses with calibration of the optical frequency of the light source and permits the use of many codes without increasing the transmission bandwidth used. Let the optical frequency width of the light source be represented by FSR and the code length of every code be represented by FSR, the codes are made to be orthogonal to each other. The optical intensity-frequency characteristic of an n-th optical code signal is set to $Cn(f)=(1+\cos(2\pi sf/FSR+r\pi/2))/2$ (where s is an integer in the range from 1 to maximum number of codes/2, and r=0 or 1) to provide orthogonality between the optical code signals. Alternatively, optical frequency chips are sequentially assigned to chip sequences forming the optical code signals, the optical frequency of each chip "1" is output, and a filter is provided with an optical filtering characteristic of a concatenated code which is a repeated continuation of, for example a second-order Hadamard code word (0101) or (0011), and light emitted from the light source is passed through the filter to form the optical code signal. An encoding optical frequency region 31 and a decoding optical frequency region 32 are so chosen as to cover a range of drift of the source frequency. In FIG. 13, $\Delta F_1$ and $\Delta F_2$ indicate drifts of the source frequency.

52 Claims, 59 Drawing Sheets

U.S. PATENT DOCUMENTS

| | | | |
|---|---|---|---|
| 6,592,274 B2 * | 7/2003 | Kahn et al. | 398/141 |
| 7,177,544 B1 * | 2/2007 | Wada et al. | 398/51 |
| 2002/0163696 A1 | 11/2002 | Huang et al. | |
| 2004/0047433 A1 * | 3/2004 | Mogre et al. | 375/308 |

OTHER PUBLICATIONS

Pfeiffer, T. et al., "High speed optical network for asynchronous multiuser access applying periodic spectral coding of broadband sources", vol. 33, No. 25, pp. 2141-2142, 1997.

Imai, Takeshi et al., "The Inter-operability of WDM-PON System ONU Using a Reflective SOA", Society Conference of the Communications Society of the Institute of Electronics, Information and Communication engineers of Japan, B-10-50, p. 369 2002.(with English translation).

Narikawa, Satoshi et al., "Transmission characteristics of wavelength channel data rewriter using semiconductor optical amplifier", Society Conference of Communication Society of the Institute of Electronics, Information and Communication Engineers of Japan, B-10-51, p. 370, 2003.(with English translation).

Elbers, J.P. et al., "Performance Evaluation of A CDMA System Using Broadband Sources",24$^{th}$ European Conference on Optical Communication ( ECOC'98), pp. 341-342, 1998.

Huang, Jen-Fa et al., "Fiber-Grating-Based Optical CDMA Spectral Coding with Nearly Orthogonal M-Sequence Codes", IEEE Photonics Technology Letters, vol. 12, No. 9, pp. 1252-1254, 2000.

Huang, Jen-Fa, Reductions of Multiple-Access Interference in Fiber-Grating-Based Optical CDMA Network, IEEE Transactions on Communications, vol. 50, No. 10. pp. 1680-1687, 2002.

Yoshino, Manabu, et al., "Enhancing Tolerance to Relection Noise with Optical Encoder", Communications Society Congress, Institute of Electronics, Information and communication engineers, B-10-54, 2003. (with English Translation).

Chau-Han Lee, et al., "Planar Lightwave Circuit Design for Programmable Complementary Spectral Keying Encoder and Decoder", Electronics Letters, XP 006012839, vol. 35, No. 21, Oct. 14, 1999, 2 Pages.

L. Moeller, et al., "An Optical CDMA Method Based on Periodic Spectrum Encoding", Proceedings of the Annual Conference on European Fibre Optic Communication and Networks, XP 000672568, Jun. 27, 1995, pp. 178-181.

Kim, Sangin; Cyclic Optical Encoders/Decoders for Compact Optical CDMA Networks; IEEE Photinics Technology Letters, vol. 12, No. pp. 428-430, Apr. 2000.

* cited by examiner

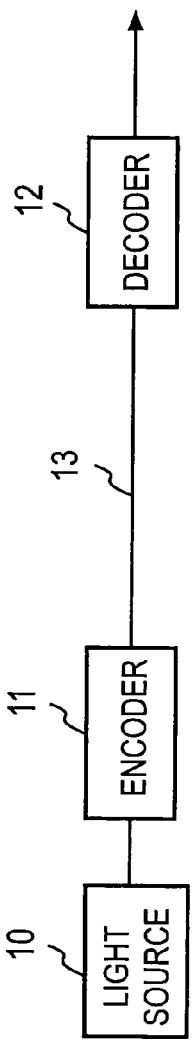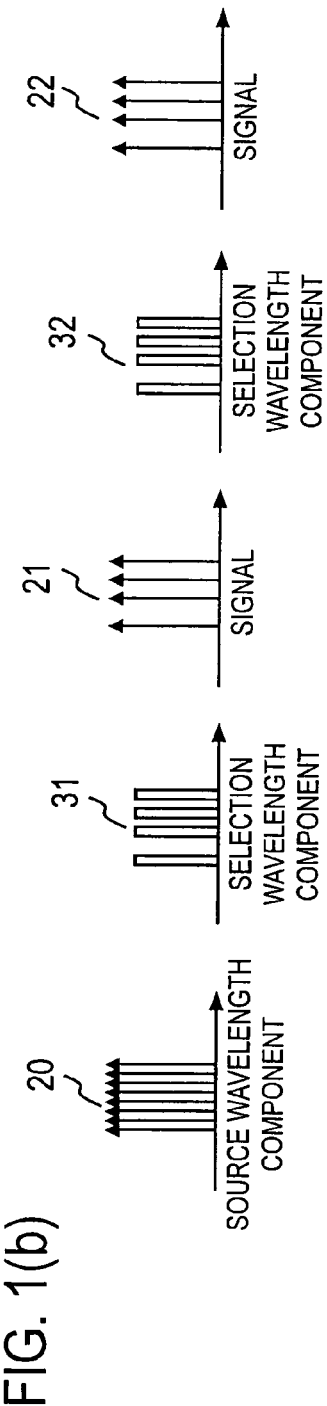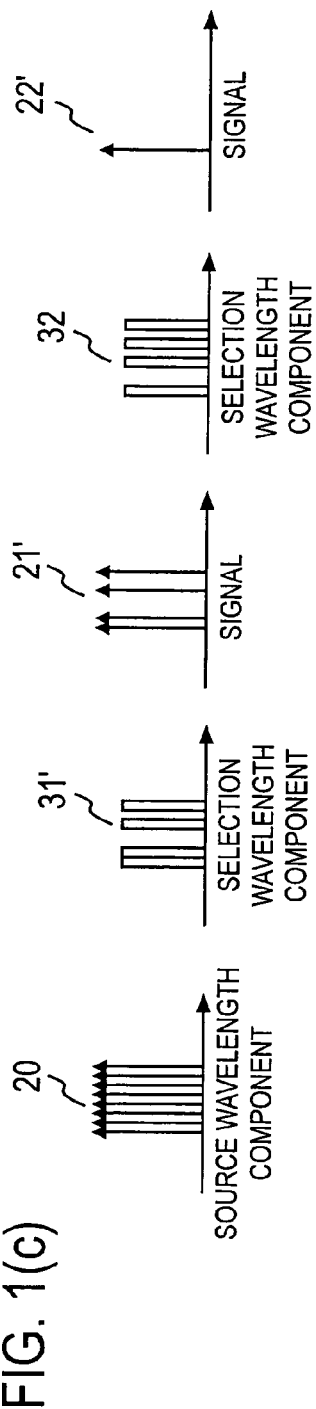

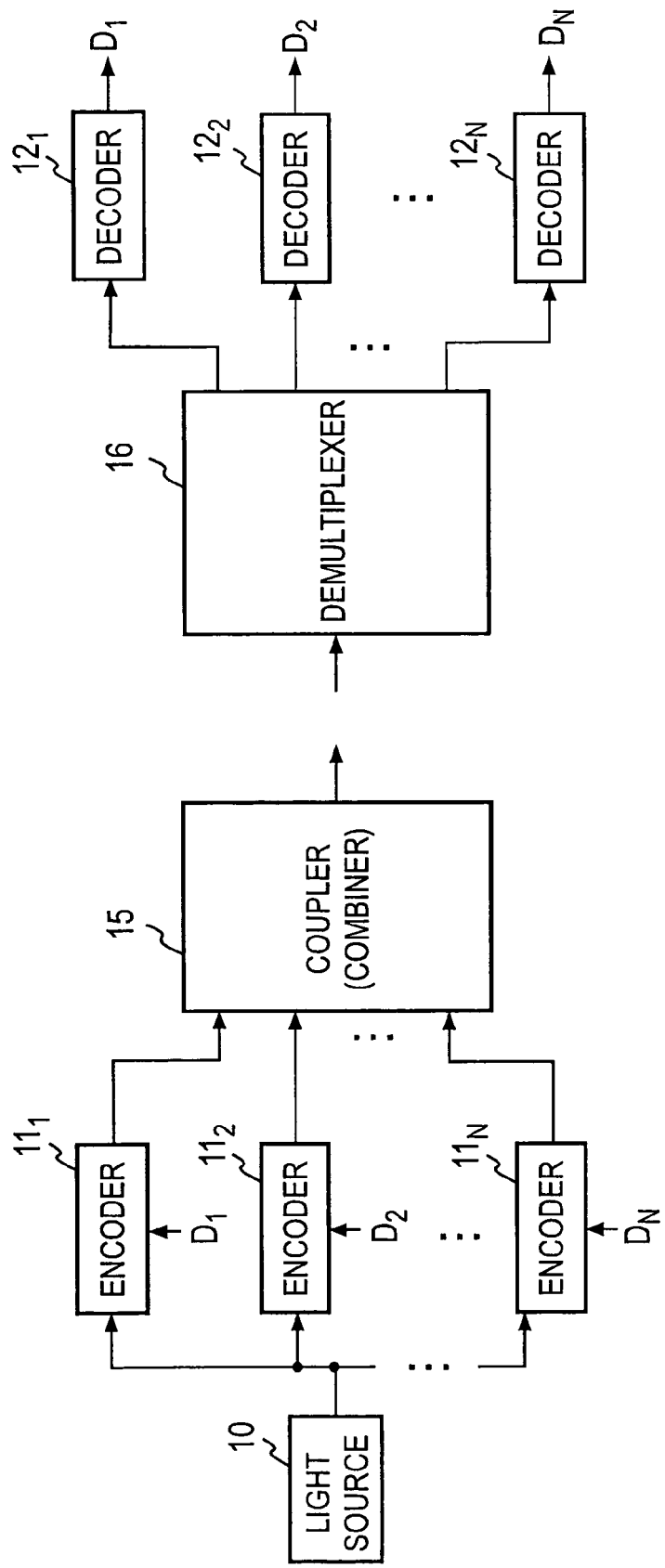

FIG. 4
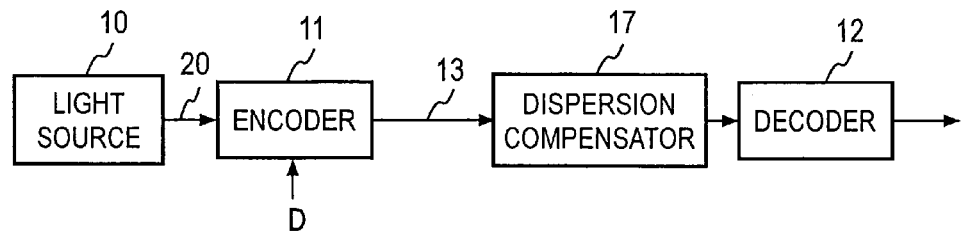
FIG. 5(a)
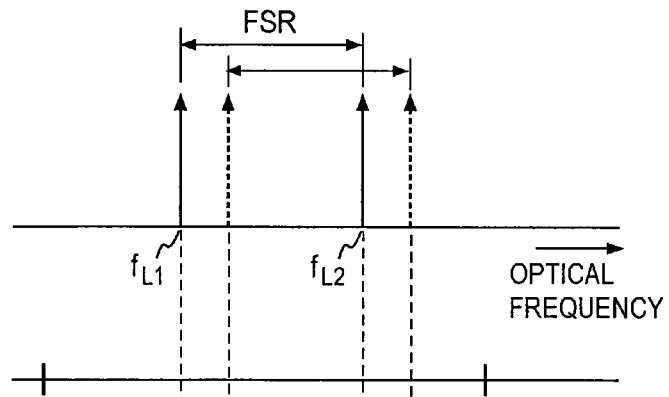
FIG. 5(b)
FIG. 5(c)
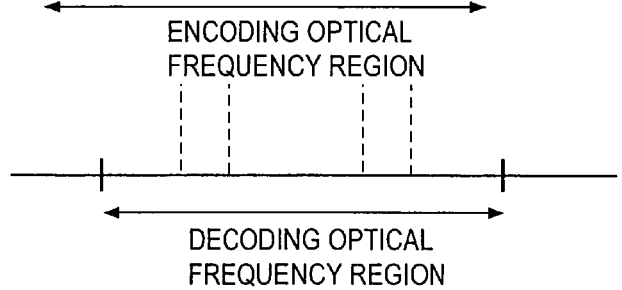

FIG. 10(a)  $H_1 = \begin{pmatrix} 0 & 0 \\ 0 & 1 \end{pmatrix}$

FIG. 10(b)  $H_2 = \begin{pmatrix} H_1 & H_1 \\ H_1 & \overline{H_1} \end{pmatrix} = \begin{pmatrix} 0 & 0 & 0 & 0 \\ 0 & 1 & 0 & 1 \\ 0 & 0 & 1 & 1 \\ 0 & 1 & 1 & 0 \end{pmatrix}$ FIG. 10(c)  $H_n = \begin{pmatrix} H_{n-1} & H_{n-1} \\ H_{n-1} & \overline{H_{n-1}} \end{pmatrix}$  ($n > 1$)

FIG. 31(a) PHASE 0
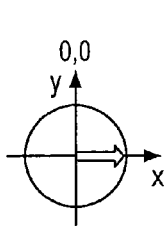 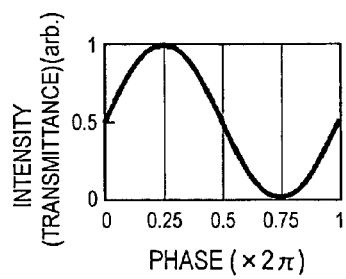 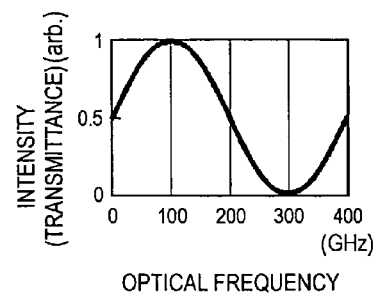
FIG. 31(b) PHASE π/2
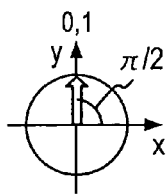 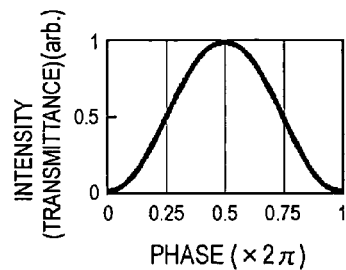 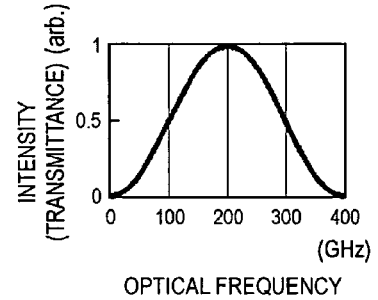
FIG. 31(c) PHASE π
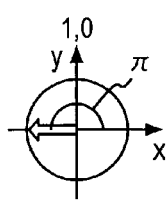 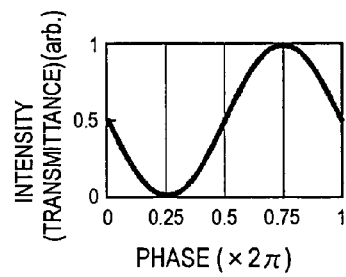 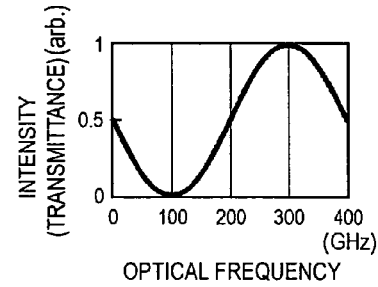
FIG. 31(d) PHASE 3π/2
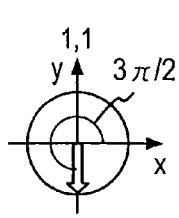 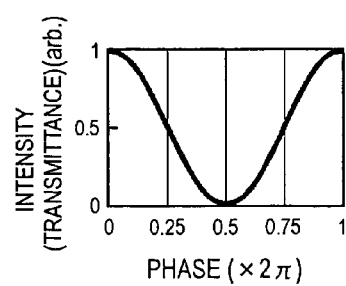 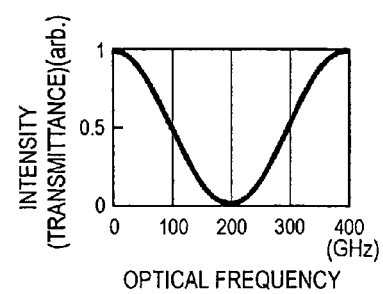

| DATA SET | COORDINATE POINTS | SELECTED FILTER PHASES |
|---|---|---|
| 0, 0 | 1, 1 | $0, \pi/2$ |
| 0, 1 | 1, -1 | $0, 3\pi/2$ |
| 1, 0 | -1, 1 | $\pi, \pi/2$ |
| 1, 1 | -1, -1 | $\pi, 3\pi/2$ |

| DATA SET | 0 | π/2 | π | 3π/2 | COMPARATOR 241 | COMPARATOR 242 |
|---|---|---|---|---|---|---|
| 0 0 0 0 | 3 | 3 | 0 | 0 | 3 | 3 |
| 0 0 0 1 | 3 | 1 | 0 | 0 | 3 | 1 |
| 0 0 1 0 | 1 | 3 | 0 | 0 | 1 | 3 |
| 0 0 1 1 | 1 | 1 | 0 | 0 | 1 | 1 |
| 0 1 0 0 | 3 | 0 | 0 | 3 | 3 | −3 |
| 0 1 0 1 | 3 | 0 | 0 | 1 | 3 | −1 |
| 0 1 1 0 | 1 | 0 | 0 | 3 | 1 | −3 |
| 0 1 1 1 | 1 | 0 | 0 | 1 | 1 | −1 |
| 1 0 0 0 | 0 | 3 | 3 | 0 | 3 | 3 |
| 1 0 0 1 | 0 | 1 | 3 | 0 | 3 | 3 |
| 1 0 1 0 | 0 | 3 | 1 | 0 | 1 | 1 |
| 1 0 1 1 | 0 | 1 | 1 | 0 | 1 | 1 |
| 1 1 0 0 | 0 | 0 | 3 | 3 | −3 | −3 |
| 1 1 0 1 | 0 | 0 | 3 | 1 | −3 | −1 |
| 1 1 1 0 | 0 | 0 | 1 | 3 | −1 | −3 |
| 1 1 1 1 | 0 | 0 | 1 | 1 | −1 | −1 |

PHASE 0 (L=4, S=1)

PHASE $\pi/2$ (L=4, S=1)

PHASE $\pi$ (L=4, S=1)

PHASE $3\pi/2$ (L=4, S=1)

FIG. 42-1

FIG. 44(a)
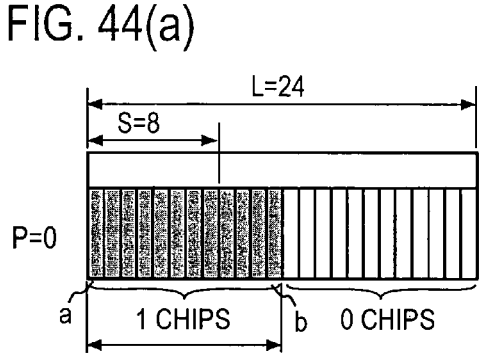
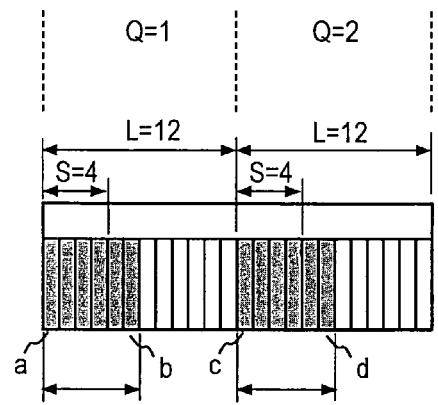
FIG. 44(b)
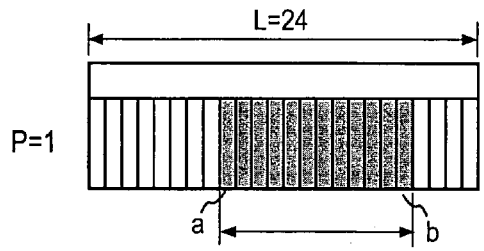
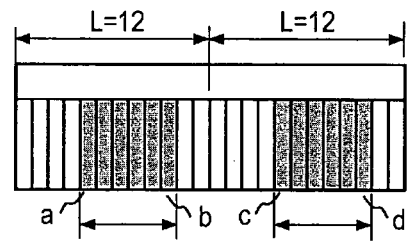
FIG. 44(c)
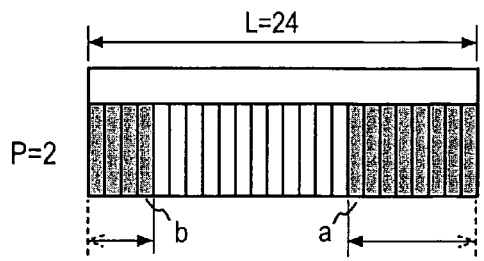
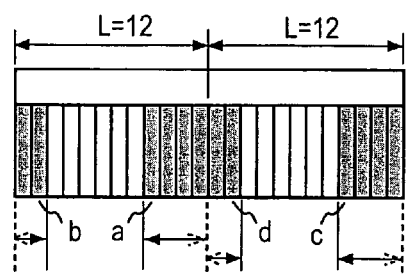

US 7,555,216 B2

OPTICAL COMMUNICATION SYSTEM USING OPTICAL FREQUENCY CODE, OPTICAL TRANSMISSION DEVICE AND OPTICAL RECEPTION DEVICE THEREOF, AND REFLECTION TYPE OPTICAL COMMUNICATION DEVICE

TECHNICAL FIELD

Of the present invention relates to an optical communications system that utilizes the OCDM (Optical Code Division Multiplex), QPSK (Quadrature Phase Shift Keying), or QAM (Quadrature Amplitude Modulation) technique which multiplexes plural data sequences into a single data sequence that can be demultiplexed by use of different optical codes; furthermore, the invention pertains to an optical transmitter, an optical receiver and reflective optical communication equipment for use in the optical communications system.

BACKGROUND ART

With respect to a point-to-multipoint transmission on the PON (Passive Optical Network) wherein two or more local offices are connected via optical fibers to a central office, there has been proposed a scheme according to which: each local office is assigned pseudo-random spreading codes orthogonal to each other, and modulates an optical signal in accordance with the spreading codes assigned thereto and transmits the modulated optical signal; and the central office multiplexes such optical signals from the respective local offices and transmits over a long distance. A description will be given below of a conventional technique for optical frequency coding in an optical frequency region by use of the spreading codes.

FIG. 1 schematically shows the configuration of one channel and optical frequency coding (wavelength coding) in the optical code division multiplex communications system. At the transmitting side, a broadband optical signal 20 is emitted from a light source 10 for incidence to an encoder 11, which performs wavelength coding of the incident optical signal by permitting the passage therethrough of only wavelength components corresponding to selection wavelength components 31 of the encoder 11, providing an coded optical signal 21. The thus coded optical signal 21 is transmitted over an optical fiber 13 to a decoder 12 at the receiving side. The decoder 12 similarly permits the passage therethrough of only those codes of the optical signal 21 from the corresponding encoder 11 which are selected according to selection wavelength components 32 of the decoder, providing a decoded optical signal 22.

On the other hand, as shown in FIG. 1(c), when an optical signal is input to the decoder 12 from an encoder which does not correspond to the decoder and the input optical signal contains wavelength components 21' based on the selection wavelength components 31' of the encoder, all chips (optical frequencies or wavelengths) of the input optical signal are not allowed to pass through the decoder 12 according to its selection wavelength components 32; even if allowed to pass, some chips of the input optical signal are allowed, and hence the optical signal is not decoded into an appropriate optical signal but instead becomes an optical noise 22'. The encoder 11 and the decoder 12 mentioned herein are disclosed in non-patent document 1, for instance.

The wavelengths for use by the conventional encoder and decoder are specific for them, and the wavelength of the input optical signal 20 to the encoder 11 and the selection wavelength 31 of the encoder 11 are not allowed, in almost all cases, to deviate from their predetermined absolute wavelengths. This raises a problem that the receiving side is required to notify the transmitting side of the wavelength of the optical signal to be sent and the selection wavelength 31 of the encoder 11, whereas the transmitting side is required to calibrate the wavelength 20 of the light source 10 and the selection wavelength 31 of the encoder 11 in response to the notification.

A solution to this problem is proposed, for example, in non-patent document 2 and patent document 1 (issued Feb. 2, 1999). With the proposed method, light emitted from a broadband light source which has a wavelength width of several dozen nanometers, such as LED (Light Emitting Diode), is input to a Mach-Zehnder or Fabry-Perot filter made of a material with less temperature dependence of its selection wavelength, wherein the input light is subjected to wavelength coding by the selection of its wavelength through use of sine functions; that is, data sequences are each assigned a wavelength with a different period.

In conventional optical communications, a binary data sequence is transmitted using an intensity modulation scheme that represents the presence or absence of an optical signal, depending on whether the value of each piece of data sequence is a space or mark.

A proposal has also been made to apply a four-phase modulation technique now in use in radio communications to optical communications as well. This technique is to convert the optical phase of an optical signal of one wavelength into one of four predetermined phases in accordance with two data sequences.

For optical transmission of two or more data sequences in multiplexed form there are available an "Optical FDM (Optical Frequency Division Multiplex) or WDM (Wavelength Division Multiplex) method. In WDM-PON employing the optical wavelength division multiplex method, it is necessary to adjust the wavelengths of optical signals to be sent from respective local offices to ensure accurate signal multiplexing and demultiplexing. To avoid such wavelength adjustment, there has been proposed an optical communications system in which each local office modulates, according to data sequence, an optical signal received from the central office and sends back thereto the modulated optical signal (see, for instance, non-patent documents 3 and 4).

[Patent Document 1] Japanese Patent Application Kokai Publication No. H11-32029

[Non-Patent Document 1] Saeko Oshiba et al., "Experimental Study on Bit Rate Enhancement Using Time-Spread/Wavelength-Hop Optical Code Division Multiplexing," 2002 Annual General Conference of the Institute of Electronics, Information and Communication Engineers of Japan, B-10-80

[Non-Patent Document 2] T. Pfeiffer et al., "High Speed Optical network for Asynchronous Multiuser Access Applying Periodic Spectral Coding of Broad Band Sources," vol. 33, No. 25, pp. 2141-2142, 1997, Electronics Letters

[Non-Patent Document 3] Takeshi Imai et al., "The Inter-Operability of WDN-PON System ONU Using a Reflective SOA," 2002 Society Conference of the Communications Society of the Institute of Electronics, Information and Communication Engineers of Japan, B-10-50

[Non-Patent Document 4] Satoshi Narukawa et al., "Transmission Characteristics of Wavelength Channel Data Rewriter Using Semiconductor Optical Amplifier," 2003 Society Conference of Communication Society of the Institute of Electronics, Information and Communication Engineers of Japan, B-10-51

DISCLOSURE OF THE INVENTION

Problem to be Solved by the Invention

The prior art disclosed in documents 2 and 3 refers to OCDM (Optical Code Division Multiplexing) in which data sequences are each assigned a wavelength selected with a different period equivalent to a code, but since these optical codes corresponding to each data sequence (channel) are not mutually orthogonal to each other, the code assignment in a narrow optical frequency width containing a small number of periods causes interference between the optical signals, resulting in a drop in their S/N (Signal/Noise). For example, letting the optical frequency difference to be assigned to the first data sequence and a reference optical frequency wavelength be represented by $\lambda 1$ and $\lambda 0$, respectively, a code is assigned over a wide optical frequency width including not only one period of optical frequencies $\lambda 0$ to $\lambda 0+\lambda 1$ but also multiple periods of optical frequencies $\lambda 0$ to $\lambda 0+2\lambda 1$, $\lambda 0$ to $\lambda 0+3\lambda 1 \ldots$; a code is assigned to the second data sequence over a wide optical frequency width including not only one period of optical frequencies $\lambda 0$ to $\lambda 0+\lambda 2$ but also multiple periods of optical frequencies $\lambda 0$ to $\lambda 0+2\lambda 2$, $\lambda 0$ to $\lambda 0+3\lambda 2 \ldots$; and a code is assigned to the third data sequence over a wide optical frequency width including not only one period of optical frequencies $\lambda 0$ to $\lambda 0+\lambda 3$ but also multiple periods of optical frequencies $\lambda 0$ to $\lambda 0+2\lambda 3$, $\lambda 0$ to $\lambda 0+3\lambda 3 \ldots$; and codes are similarly assigned thereafter. In this way, the prior art improves S/N.

With the above method, however, when the number of wavelengths to be selected with the period of a sine function is small, inter-channel interference between optical signals is not negligible, so that it is difficult to multiplex channel optical signals corresponding to many data sequences without degradation of the bit error rate. To suppress the inter-channel interference between optical signals, the wavelength width of the light to be emitted from the light source needs to be wide so as to multiplex wavelengths of a number sufficiently large to approximate the wavelength width to infinity. The use of a broadband light source gives rise to the problems of waveform degradation and limitation on the transmission bandwidth due to the influence of wavelength dispersion on the transmission line, leading to the impossibility of high-speed transmission. Since light of a wide frequency width is required, the wavelength dispersion degrades the signal-to-noise ratio in the case of long-distance transmission. Further, separation of channels only by the sine-function period makes it impossible to increase the number of channels in the condition that the frequency width of the light to be emitted from the light source and the optical frequency selectable by a filter are limited.

In the case of controlling the optical phase of an optical frequency signal according to a modulation signal (data) by the application to the optical communication of the four-phase modulation technique actually used in conventional radio communications, it is difficult at present to control the optical phase with accuracies on the order of tens of nanometers which is a few tenth of micrometer for the optical wavelength and hence is sufficiently accurate.

In the optical wavelength division multiplex PON disclosed in non-patent document 3, the optical signal that is used in the local office to send data to the central office is sent in non-modulated continuous light form from the central office to the local office. Since the transmission of this non-modulated continuous light from the central to local office is not utilized for information transmission, the information transmission efficiency is low accordingly. The equipment set forth in non-patent document 4 does not transmit such non-modulated continuous light from the central office, and hence it is better in information transmission efficiency than the equipment of non-patent document 3, but the central office sends a downstream optical signal of a low extinction ratio and the local office reuses the downstream optical signal of low extinction ratio for an upstream optical signal for information transmission. Hence, the downstream optical signal of low extinction ratio impairs the communication quality.

Means for Solving the Problem

The present invention has first through third aspects, each of which uses a function $Ci(f)$ of an i-th code and its complementary function $(1-Ci(f))$, which satisfy the following conditions:

Function $Ci(f)$ is a periodic function which satisfies $Ci(f)=Ci(f+FSRi)$, and the function $Ci(f)$ takes the value in the range of 0 to 1;

Optical frequency width FSR is an optical frequency width that is a common multiple of a repetition period of the function of each code in the range from a predetermined optical frequency Fst to a predetermined optical frequency Fla;

The complementary function of the function $Ci(f)$ is a function $(1-Ci(f))$ obtained by subtracting the function $Ci(f)$ from 1, and the functions $Ci(f)$ and $(1-Ci(f))$ bear the relationship $\int Ci(f) \cdot Ci(f)df > \int Ci(f) \cdot (1-Ci(f))df$, where $\int df$ is a definite integral with respect to f for an arbitrary interval FSR from Fst to Fla; and Function $Ci(f)$, a function $Cj(f)$ of an arbitrary j-th code except an i-th one, and the complementary function $(1-Cj(f))$ of the function $Cj(f)$ bear the relationship $\int Ci(f) \cdot Cj(f)df = \int Ci(f) \cdot (1-Cj(f))df$.

According to the first aspect of the present invention that is applied to optical code communication:

the transmitting side generates and transmits, for each piece of data of a binary data sequence, an optical code signal whose optical intensity-frequency characteristic is at least one of the function $Ci(f)$ and its complementary function $(1-Ci(f))$ both corresponding to the value of each piece of data of the i-th binary data sequence, at least over the enough wide period FSR that satisfies orthogonal relation between the functions; and the receiving side regenerates from received optical signal a first intensity difference signal corresponding to the difference between a first intensity signal, corresponding to the optical intensity of an optical signal whose optical intensity-frequency characteristic is $Ci(f)$ based on the function $Ci(f)$, and a second intensity signal corresponding to the optical intensity of an optical signal whose optical intensity-frequency characteristic is $(1-Ci(f))$ based on the complementary function $(1-Ci(f))$; and regenerate the data sequence from the first difference signal.

According to the second aspect of the present invention which performs, for example, pseudo-orthogonal phase modulation:

and let $\Delta f$ represent the remainder of the division of an arbitrary optical frequency width equal to or narrower than the optical frequency width FSR by the repetition period FSRi of the function $Ci(f)$, let a phase $2\pi(\Delta f/FSRi)$ represent a phase difference from the function $Ci(f)$, and let $Ci'(f)$ ($=Ci(f+\Delta f)$) represent a function with an optical frequency $(f+\Delta f)$ different by said remainder $\Delta f$ from the optical frequency of the function $Ci(f)$ of the i-th code, the function $Ci'(f)$, the function $Cj(f)$ and its complementary function $(1-Cj(f))$ bear the relationship:

$$\int Ci'(f) \cdot Cj(f)df = \int Ci'(f) \cdot (1-Cj(f))df;$$

the transmitting side separates a binary data sequence into multiple data sequences, then generates an optical signal whose optical intensity-frequency characteristic is at least one of the function and its complementary function both corresponding to the value of each piece of data of each data sequence corresponding to each code and combines and transmits such optical signals as an optical code signal;

the receiving side detects, based on the functions corresponding to the above-said separated data sequences and their complementary functions, optical intensity differences between the optical signals having their optical intensity-frequency characteristics based on the above-mentioned functions, respectively, and regenerates the separated data sequences.

According to the third aspect of the present invention which is applied to reflective optical communication:

an optical signal whose optical intensity-frequency characteristic is the function Ci(f) or its complementary function (1−Cj(f)) is input at least the optical frequency width FSR, the input optical signal is input to an encoder whose filtering optical frequency characteristic is based on the function Ci(f) and which outputs an optical signal, and the input optical signal is input as well to a complementary encoder whose filtering optical characteristic is based on the complementary function (1−Ci(f)) and which outputs a complementary optical signal; and optical signals and their complementary optical signals are selectively combined according to each piece of data of the input binary data sequence and transmitted as an optical code signal.

[Effect of the Invention]

According to the configuration of the first aspect of the present invention, the function Ci(f) is continuously repeated, and if it is within a frequency range from Fst to Fla, optical code signals of the optical frequency width FSR at an arbitrary position need only to be transmitted; therefore, even if a drift occurs in the optical frequency for the light source and the encoder of the optical transmitter and the decoder of the optical receiver, it is not necessary to notify the transmitting side of the transmission optical frequency from the receiving side and adjust the optical frequency at the transmitting side accordingly. Furthermore, since the optical code signals whose optical intensity-frequency characteristics Fi(f) are orthogonal to each other are used for a plurality of data sequences, it is possible to multiplex many optical code signals, in which case the optical frequency width of every optical code signal needs only to be equal to FSR and there is no particular need for increasing the optical frequency width.

According to the configuration of the second aspect of the present invention, since the function of the optical intensity-frequency characteristic is controlled for each piece of data of the separated data sequences, the control accuracy for modulation may be appreciably lower than in the case of modulating the optical phase of an optical frequency signal and the control can easily be implemented.

According to the third aspect of the present invention, there is no need for sending a non-modulated downstream optical signal that is sent back as an upstream optical signal, and the optical intensity-frequency characteristic functions of the downstream and upstream optical signals are orthogonal to each other; hence, irrespective of whether the downstream data is mark or space, it is possible to output the upstream optical signal of mark or space at the same optical intensity—this does not lower the extinction ratio of the downstream signal and hence precludes the possibility of the transmission quality deteriorated.

BRIEF DESCRIPTION OF THE DRAWINGS

FIG. 1(a) shows an example of the system configuration of a conventional optical code division multiplex method, FIG. 1(b) and FIG. 1(c) show examples of light-source optical wavelength components, selection wavelength components of an encoded amount, its passage wavelength components, selection wavelength components of a decoder and its passage wavelength components;

FIG. 5(a) shows an example of a source frequency drift, FIG. 5(b) an example of an optical frequency region for encoding, and FIG. 5(c) an example of an optical frequency region for decoding;

FIG. 10(a) is a diagram showing a first-order Hadamard matrix, FIG. 10(b) a diagram showing a second-order Hadamard matrix, and FIG. 10(c) a diagram showing a recurrence formula of the Hadamard matrix;

FIG. 31 shows, by way of example, the relationships between the phase corresponding to two values of piece of data and pseudo-carrier of a trigonometric function, FIGS. 31($a$), 31($b$), 31($c$) and 31($d$) showing such relationships in the cases where the phase is 0, $\pi/2$, $\pi$ and $3\pi/2$, respectively;

FIG. 32-2 is a diagram showing, by way of example, the FIG. 32-1 relationships in the case of a $\pi/2$-phase modulated output;

FIG. 32-3 is a diagram showing, by way of example, the FIG. 32-1 relationships in the case of a $\pi$-phase modulated output;

FIG. 32-4 is a diagram showing, by way of example, the FIG. 32-1 relationships in the case of a $3\pi/2$-phase modulated output;

FIG. 37-1 is a diagram illustrating an example of an optical transmitter in the communications system according to Embodiment 2-4;

FIG. 37-2 is a diagram showing an example of an optical receiver for use in Embodiment 2-4;

FIG. 42-1 is a diagram showing, by way of example, the relationships of the optical source output, a modulated output, a filtering characteristic, a filtered output at the receiving side and detected intensity to a 0-phase modulated output in Embodiment 2-5;

FIG. 42-2 is a diagram showing, by way of example, the FIG. 42-1 relationships in the case of the $\pi/2$-phase modulated output;

FIG. 42-3 is a diagram showing, by way of example, the FIG. 42-1 relationships in the case of the $\pi$-phase modulated output;

FIG. 42-4 is a diagram showing, by way of example, the FIG. 42-1 relationships in the case of the $3\pi/2$-phase modulated output;

FIG. 44 shows, by way of example, the relationships of the chip number L, the phase shift amount P, a divisor S and Q and n in Embodiment 2-5, FIGS. 44($a$), 44($b$) and 44($c$) showing the relationships in the cases where P=0, P=1 and P=2, respectively;

FIG. 48-1 is a diagram showing an example of an optical transmitter in a communications system according to Embodiment 2-11;

FIG. 48-2 is a diagram showing an example of an optical receiver in Embodiment 2-11;

BEST MODE FOR CARRYING OUT THE INVENTION

Figure 2A:
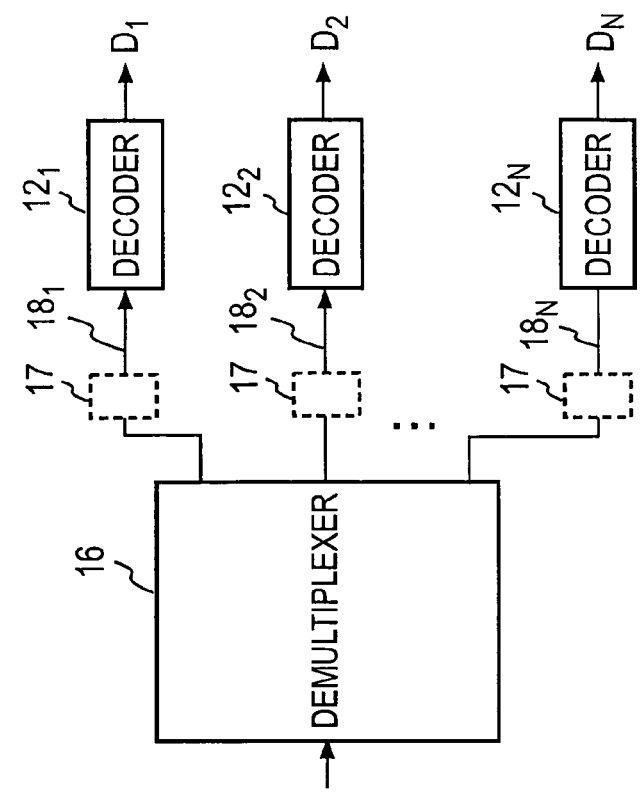
FIG. 2 illustrates an example of the system configuration of a multiplex communications system to which the first mode of working of the present invention is applied, FIGS. 2(a) and 2(b) showing its optical transmitter and optical receiver, respectively.

A description will be given, with reference to the accompanying drawings, of embodiments of the present invention, and in the following description, corresponding parts are identified by like reference numerals throughout the drawings and no description will be repeated.

First Mode of Working (Optical Code Division Multiplex)

The first mode of working of the present invention permits implementation of optical code division multiplex, but is applicable as well to a single-data-sequence optical communication that does not involve optical code division multiplexing; however, the title of this section includes the "Optical Code Division Multiplex" in parentheses for ease in distinguishing between this and other modes of working of the invention.

A description will be given first of examples of transmitting- and receiving-side apparatuses to which the present invention is applicable. FIG. 2(a) shows an example of the light transmitting-side apparatus to which the first mode of working is applied. Sets of light sources $10_n$ and encoders $11_n$ are each connected via an optical fiber $14_n$ to a coupler 15, where n=1, 2, . . . , N (N being an integer equal to or greater than 2). A data sequence $D_n$ is input to each encoder $11_n$, wherein it is encoded into an optical code signal, and the optical code signal is input via the optical fiber $14_n$ to the coupler 15, wherein it is combined with other optical code signals, and from which a combined optical code signal is output. Shown in FIG. 2(a) is an example in which the coupler 15 is disposed away from the encoders $11_1$, . . . , $11_N$ at different distances.

FIG. 3(a) shows an example in which the encoders $11_1$, . . . , $11_N$ and the coupler 15 are disposed at the same place and the light source 10 is provided in common to the encoders $11_1$, . . . , $11_N$. The arrangements of FIGS. 2(a) and 3(b) may be used in combination.

Figure 2B:
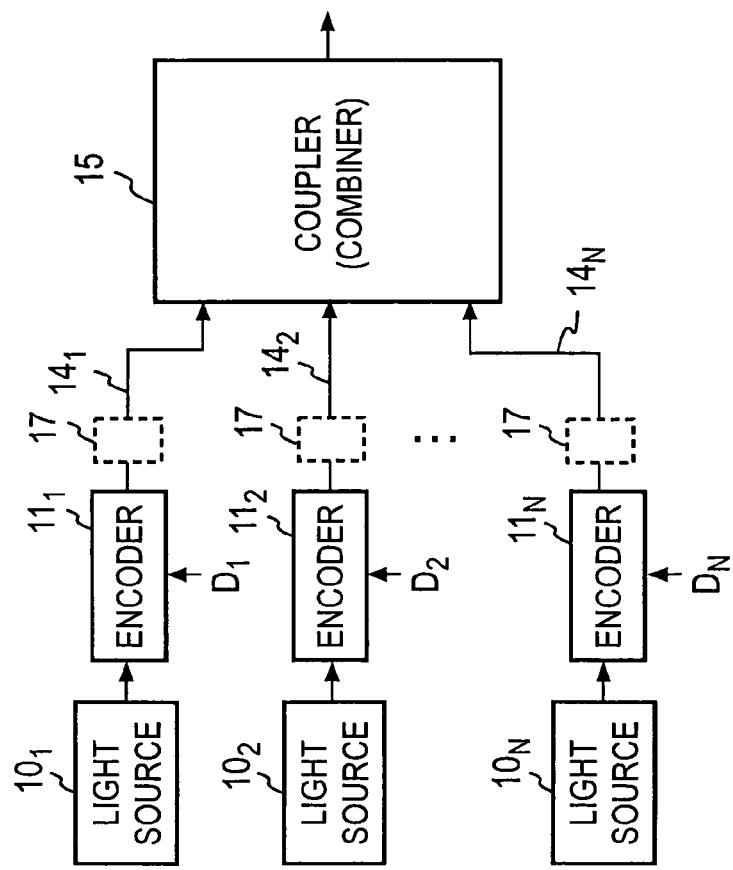

In the light receiving-side apparatus, as depicted in FIG. 2(b), the multiplexed optical code signal input to a splitter 16 is split into N optical signals, which are input via optical fibers $18_1$, . . . , $18_N$ to decoders $12_1$, . . . , $12_N$, respectively, by which the original data sequences $D_1$, . . . , $D_N$ are demultiplexed and decoded. The splitter 16 may be placed away from the decoders $12_1$, . . . , $12_N$ at different distances. The splitter 16 and the decoders $12_1$, . . . , $12_N$ may be disposed at the same place as shown in FIG. 3(b); it is also possible to employ a combination of the arrangements shown in FIGS. 2(b) and 3(b).

Embodiment 1-1

Figures 1, 32:
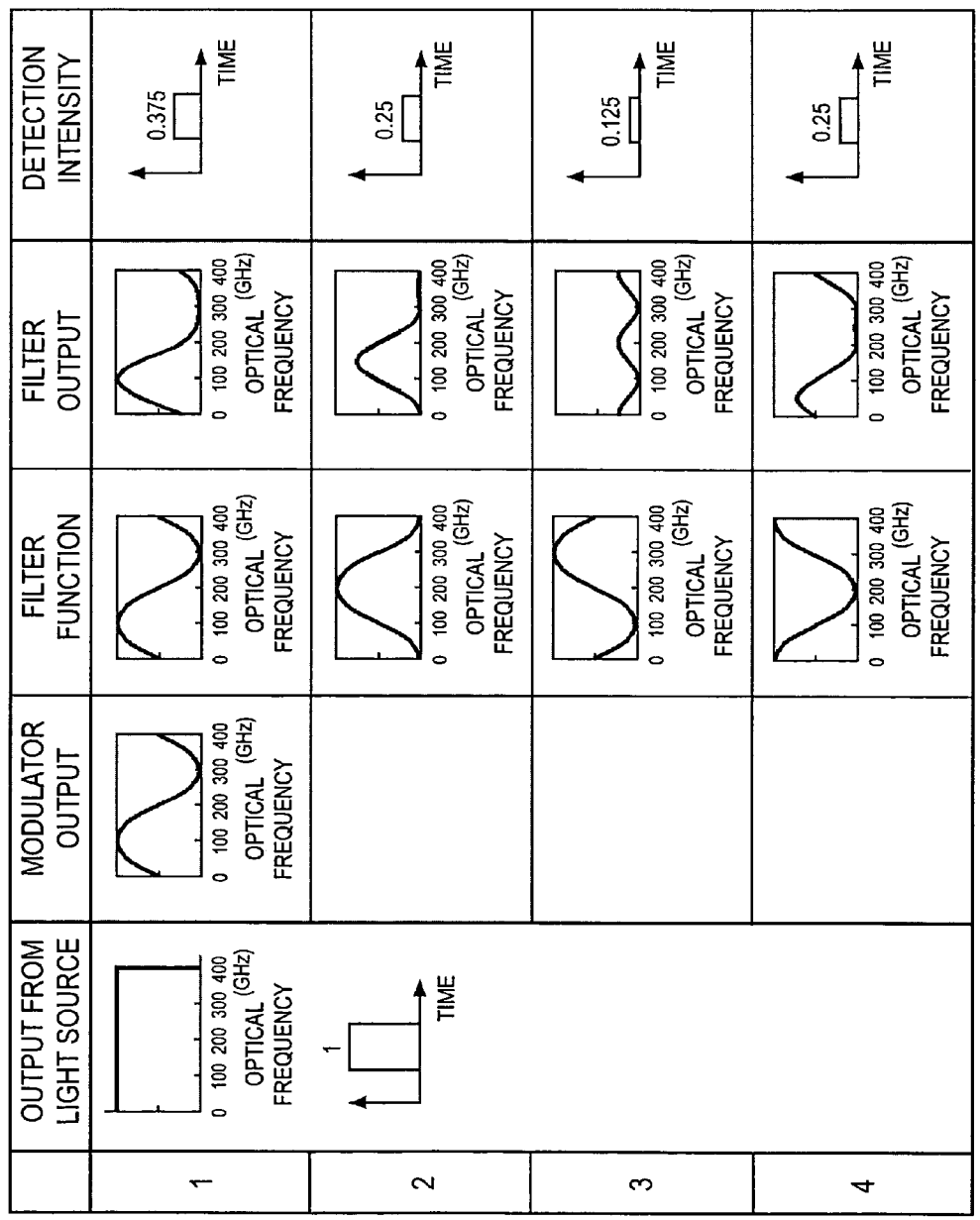
FIG. 32-1 is a diagram showing, by way of example, the relationships of light source output, modulated output, filtering characteristic, filtered output and detected intensity at the receiving side in the case of a 0-phase modulated output in Embodiment 2-1.
Figures 2, 32:
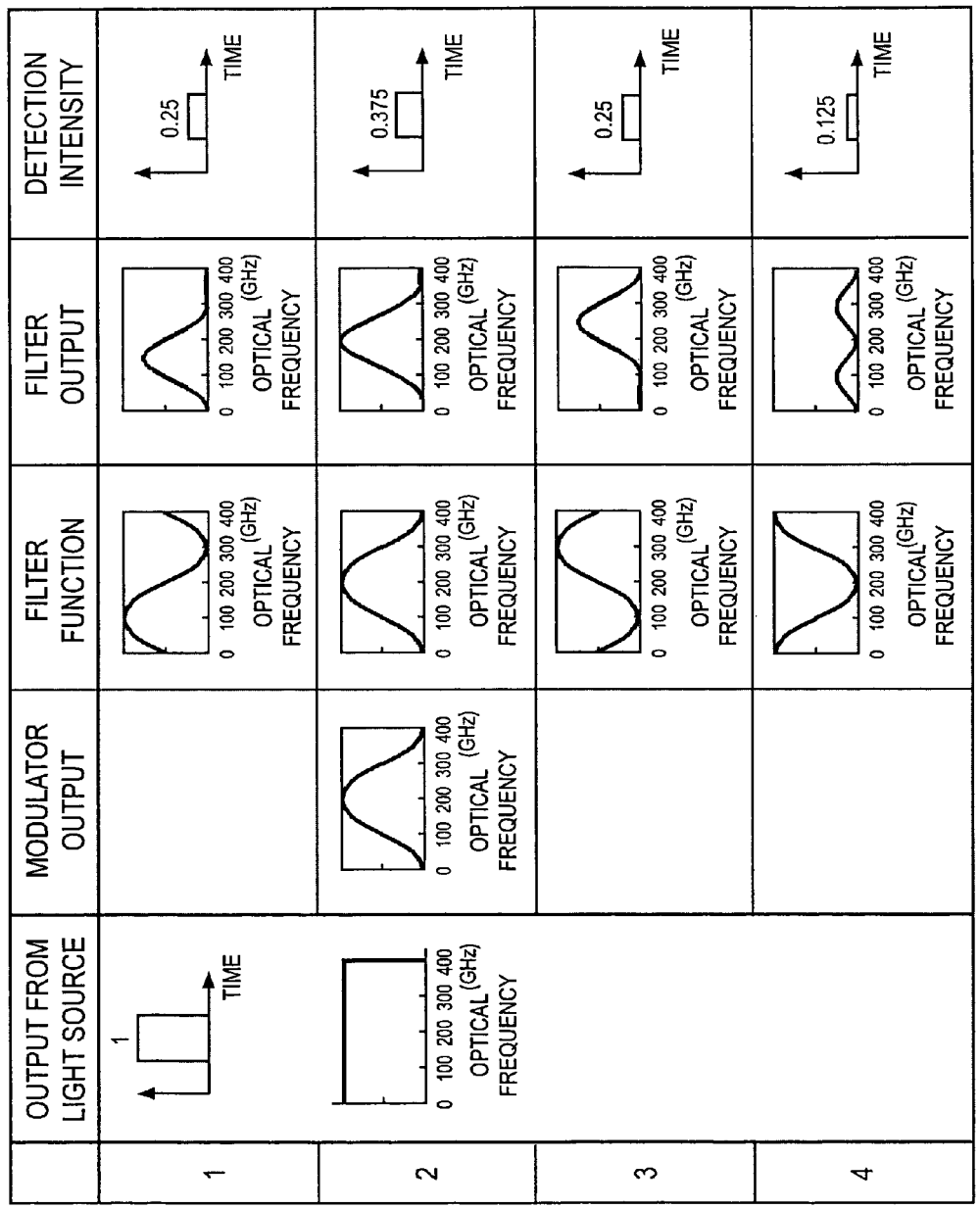
Figures 3, 32:
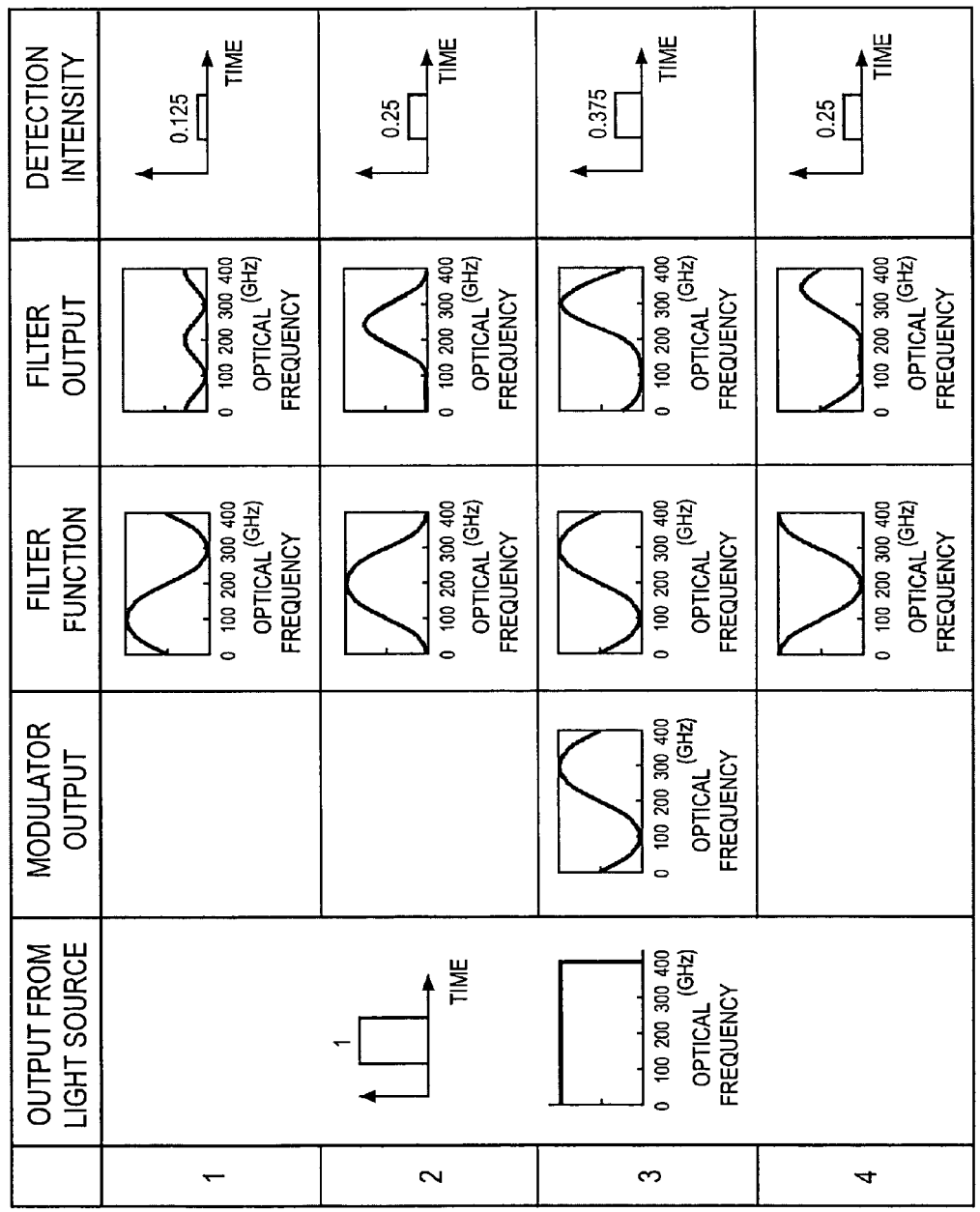
FIG. 3 illustrates another example of the multiplex communications system configuration to which the first mode of working of the invention is applied, FIGS. 3(a) and 3(b) showing its optical transmitter and optical receiver, respectively.
Figures 4, 32:
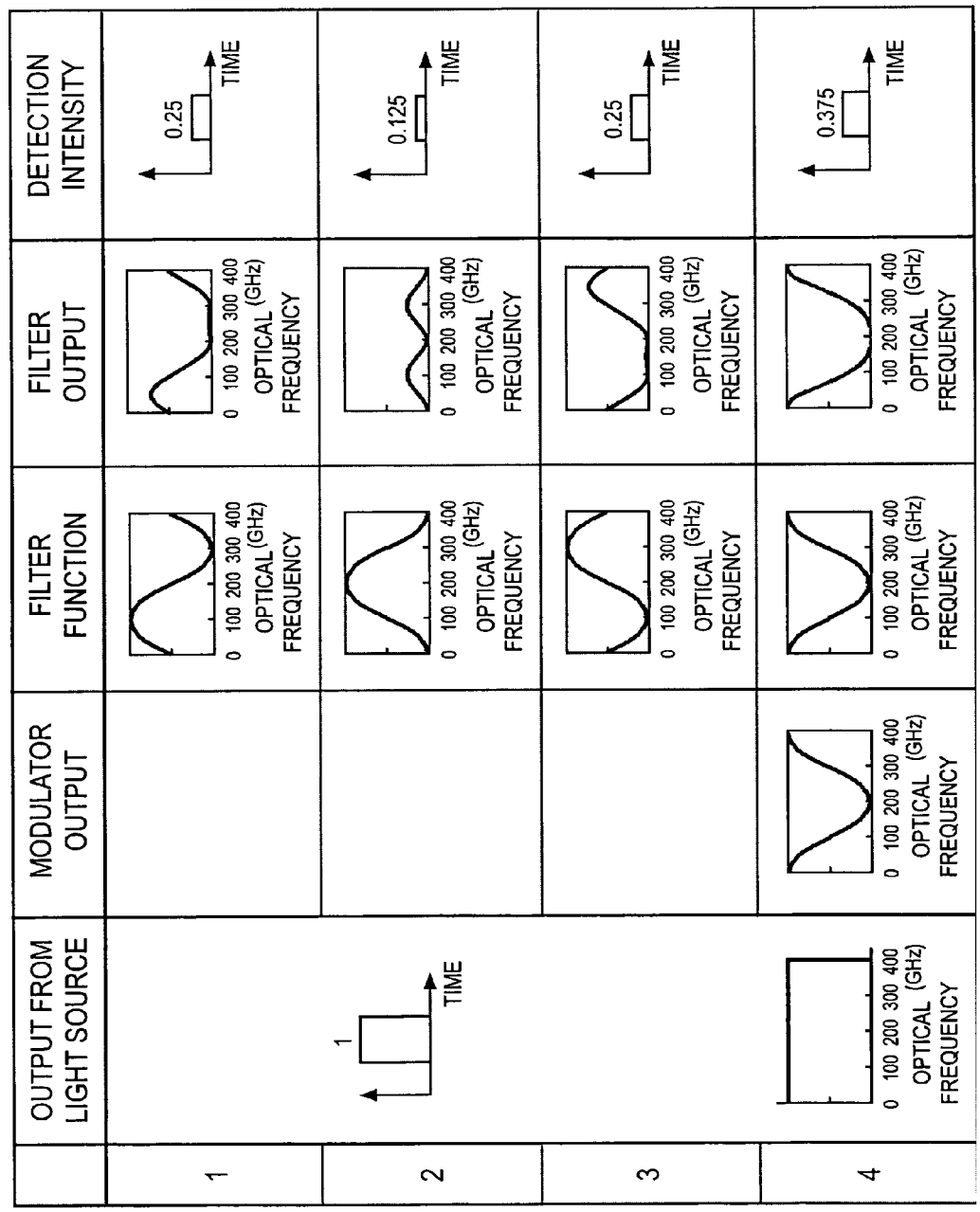
FIG. 4 is a configuration illustrating an example of the communications system to which the first mode of working of the invention is applied.

FIG. 4 illustrates a single-channel communications system to which Embodiment 1-1 of the first mode of working of is applicable. Embodiment 1-1 comprises, as is the case with the conventional optical communications system, a light source 10, an encoder 11, a decoder 12, and an optical transmission line (optical fiber) 13; furthermore, Embodiment 1-1 is provided with a dispersion compensator 17 that compensates for frequency-dependent propagation delay time differences due to frequency dispersion of the optical transmission line by leveling off delay times of respective frequency components of the optical code signal between its transmission and reception. The optical frequency bandwidth over which the dispersion compensator 17 implements compensation is broader than at least the optical frequency bandwidth of the optical code signal.

The light source 10 outputs an optical signal of an optical frequency width FSR corresponding to the code length FCL (a common multiple of FSRi described later on) at least in the optical frequency region (from optical frequencies Fst to Fla) for encoding by the encoder 11.

An optical signal 20 emitted from the light source 10 is encoded by the encoder 11 into an optical code signal in the optical frequency region. Unlike an encoder used in the conventional optical communications system the encoder 11 for use in Embodiment 1-1 generates in the optical frequency region an optical code signal of the code length FCL which is equivalent to that of all encoding codes (code words) used in the optical communications system. The optical code signal in the above-mentioned optical frequency region has such properties as mentioned below. The intensity of an n-th optical code signal is a function Cn(f) of an optical frequency f (hereinafter referred to also as an encoding code); the function Cn(f) takes a value from 0 to 1; the integration value of the function Cn(f) for an interval of an arbitrary code length FCL in the optical frequency region from Fst to Fla for encoding by the encoder 11 is a value obtained by dividing FCL by 2; and the optical frequency characteristic of the light transmittance through the encoder $11_n$ is, in general, a repetition of the same function Cn(f) at intervals of the code length FCL in the optical frequency region from Fst to Fla for encoding by the encoder. And the following equations hold.

$$Cn(f)=Cn(f+FCL) \quad n=1,\ldots,N \qquad (1)$$

$$\int Cn(f)=FCL/2 \qquad (2)$$

In the following description an optical code signal whose optical frequency characteristic function of optical intensity is Cn(f) will also be denoted by Cn(f); that is, Cn(f) represents an n-th encoding code, or n-th optical code signal. The term "n-th (optical code signal)" corresponds to the term "n-th (optical code signal) in other modes of working of the invention, and (function or encoding code) Cn(f)" corresponds to "(optical frequency characteristic function or code) Cn(f)" in other modes of working of the invention.

The decoder 12 for decoding the optical code signal generated by the encoder 11 in Embodiment 1-1 is such that for the n-th optical code signal Cn(f) the decoder $12_n$ continuously repeats generation of a function (hereinafter referred to also as a decoding code) Dn(f) whose one period is equal to the code length FCL in the optical frequency region for decoding: Dn(f) is expressed by the following equation.

$$Dn(f)=Cn(f)-Cn'(f) \qquad (3)$$

where Cn'(f) is a complementary value of the optical intensity value of the n-th encoded code Cn(f), and a value of the function Cn'(f) is the complementary value of the function Cn(f); they bear the following relationship.

$$Cn(f)+Cn'(f)=1 \qquad (4)$$

The scalar product of the value Cn(f) of the n-th optical code signal at the optical frequency f and the decoding code Dn(f) from the decoder decoding the n-th optical code signal is integrated with respect to the optical frequency f for a continuous optical frequency region corresponding to the code length FCL within each of the optical frequency region for encoding by the encoder and the optical frequency region for decoding by the decoder; the resulting value is a non-zero finite value FCL/4, which satisfies the following equation.

$$\int Cn(f) \cdot Dn(f) df = FCL/4 \qquad (5)$$

Incidentally, the integration of Eq. (5) is conducted over the optical frequency width FSR of the light source; in this example, FSR is just a natural-number multiple of the period FCL.

The scalar product of the n-th optical code signal Cn(f) and the decoding code Dm(f) from the decoder $12_n$ having decoded an m-th optical code signal Cm(f) other than the n-th optical code signal Cn(f), (where m=1, . . . , N and except for m=n), is integrated over the continuous frequency region corresponding to the code length FCL within each of the optical frequency region for encoding by the encoder and the optical frequency region for decoding by the decoder; the resulting value is zero, which satisfies the following equation.

$$\int Cn(f) \cdot Dm(f) df = 0 \quad m \neq n, \ m=1, \ldots, N \qquad (6)$$

As shown in FIGS. 2 and 3, assume that the number of data sequences is a plural number N, that the first, . . . , N-th data sequences are assigned first, . . . , N-th encoding codes, respectively, and that the first, . . . , N-th encoding codes are equal in their code length FCL. The optical frequency region for encoding by the encoder $11_n$ is set to be broader than the code length FCL of the optical code signal; the encoder $11_n$ generates and outputs the optical code signal Cn(f) in accordance with the data of the n-th data sequence by encoding, in the optical frequency region, the optical signal input from the light source and having the optical frequency width which is at least the code length FCL. The length of the optical code signal Cn(f) to be output is set at one code length FCL for each piece of data. For example, when the data is "1" (mark), the optical code signal Cn(f) is output with one code length, and when the data is "0" (space), the optical code signal Cn(f) is not output. Incidentally, the mark and the space correspond to the one and the other of two kinds of modulation unit signals.

As will be seen from Eqs. (3) and (5), the decoder $12_n$, which decodes the n-th data sequence from the optical signal having multiplexed thereinto optical code signals of the N data sequences, integrates the scalar products of the input optical code multiplexed signal and the n-th code signal Cn(f) and its complementary optical code signal Cn'(f), then detects the difference between the integrated values, and outputs "1" or "0" as decoded data, depending on whether the difference is equal to or greater than a predetermined value or smaller than the predetermined value.

As described above, in Embodiment 1-1, unlike in the prior art example which uses a different wavelength period for each data sequence, the code length FCL that is equal to the optical frequency width over which all optical code signals are orthogonal to each other is identical, and the optical frequency characteristic of the transmittance of the encoder $11_n$ is such that Cn(f) continuously repeats in the optical frequency region FSR for encoding by the encoder, and the optical frequency characteristic of the transmittance of the decoder $12_n$ is also such that Dn(f) continuously repeats in the optical frequency region Fst to Fla for decoding by the decoder; therefore, each optical code signal keeps the properties shown by Eqs. (1) and (2), and even if the interval of integration is changed, the integrated value of the scalar product of each optical code signal in the decoder remains unchanged. Accordingly, in Embodiment 1-1 if the optical frequency width of the light source to be encoded is constant and the optical frequency width is included in each of the optical frequency region for encoding by the encoder and the optical frequency region for decoding by the decoder, the optical code signal emitted from the encoder corresponding to the light source having its optical frequency changed is received by the decoder as an optical signal of the same intensity as that of the emitted optical signal, and no increase will be caused in the interference between the other optical code signals which do not correspond to this decoder. For example, as shown in FIG. 5(a), the optical frequency width of the output optical signal from the light source 10 is $f_{L1}$ to $f_{L2}$=FSR, and this optical frequency width is a natural-number multiple of the optical code length FCL over which almost codes are repeatedly generated (1 being chosen as the natural number in this embodiment); this optical frequency width $f_{L1}$ to $f_{L2}$ is included in each of the optical frequency region for encoding by the encoder $11_n$ and the optical frequency region for decoding by the decoder $12_n$ as shown in FIGS. 5(b) and (c). Accordingly, even if the optical frequency of the output light from the light source 10 drifts as indicated, for example, by the broken lines, as long as it stays within the optical frequency region for encoding and the optical frequency region for decoding, the optical code signal of the drifted optical frequency is decoded by integrating the input multiplexed optical code signal and the decoding code Dn(f) over FSR (equal to the code length FCL in this example) corresponding to the optical frequency width of the light source; this integration and the relationships given by Eqs. (1) and (2) ensure generation of the same decoded signal as is obtainable without the optical frequency drift, and suppression of an increase in interference. Similarly, even if the optical frequency region for encoding and the optical frequency region for decoding drifts, decoding can be achieved with high accuracy. The optical transmission bandwidth of the optical fiber for transmitting the combined optical code signal from the combiner 15 (see FIGS. 2 and 3) needs only to be wider than the optical frequency width FSR of the light source to such an extent as to fully accommodate optical frequency fluctuations of the light source. The optical frequency region for encoding and the optical frequency region for decoding may also be the same as the above-mentioned optical transmission bandwidth. In other words, since codes are orthogonal to each other in the first mode of working of the invention, the optical frequency width FSR of the light source may be equal to the code length FCL of every code, in which case the optical frequency width necessary for transmission over the optical fiber may be an optical frequency width that is the sum of the code length FCL and an optical frequency fluctuation of the light source.

The prior art disclosed in document 2 uses periodic codes of different code lengths of spreading codes, and requires, for canceling inter-code interference, an optical-band light source that is used to obtain optical signal with a sine function over a sufficiently large number of periods. In Embodiment 1-1, however, such a broadband light source is not required, and the emitted light from the light source 10 needs only to have an optical frequency width (period width) corresponding to the code length FCL—this permits reduction of the transmission frequency (wavelength) width accordingly, solving the problems of waveform deterioration by the influence of wavelength dispersion on the optical transmission line and limitations on the transmission bandwidth.

Furthermore, the provision of the dispersion compensators 17 also extenuates or minimizes the collapse of orthogonality between codes due to differences in their transmission distance.

As described above, in Embodiment 1-1 the optical frequency region for encoding by the encoder has an optical frequency width greater than the code length FCL of the optical code signal, the optical code has the characteristics expressed by Eqs. (1) to (6), and the dispersion compensator 17 is disposed immediately before each decoder or behind each encoder as indicated by the broken line in FIG. 2(*b*) or 2(*a*); accordingly, even if the optical frequency of the output signal from the light source fluctuates within the optical frequency range for encoding by the encoder irrespective of the distance between the encoder and the decoder and the optical frequency width of the output optical signal from the light source does not change, the output optical code signal from the encoder corresponding to the decoder is received by the latter as an optical code signal of the unchanged optical intensity and no increase is caused in the interference by other optical code signals that do not correspond to this decoder—this allows the optical frequency of the output signal from the light source to deviate from a predetermined absolute frequency, making it possible to avoid the necessity for calibration of the optical frequency of the output signal from the light source.

Embodiment 1-2

Embodiment 1-2 of the first mode of working of the invention is a specific operative example of Embodiment 1-1 and uses a trigonometric function as the encoding function C(f). In Embodiment 1-2, in the case of using the smallest possible and invariable value a (which is a positive integer) to generate r' codes, if the value a is taken as an integer value in the range of 1 to a value N/r' obtained by dividing the maximum number N of codes (the maximum number of local-office encoders) by r' and if r is taken as 0, 1, . . . , r'−1 that is the remainder of r', the n-th optical code Cn(f) is used which is expressed by the following equation.

$$Cn(f)=(1+\cos(2\cdot\pi\cdot a\cdot f/FCL+r\cdot\pi/2))/2 \quad (7)$$

This optical code signal function Cn(f) takes a value from 0 to 1, and the value of integration of the code signal function for an interval of an arbitrary code length FCL in the optical frequency region for encoding by the encoder $11_n$ is FSR/2; the optical frequency characteristic of the transmittance of the encoder $11_n$ is a repetition of the function Cn(f) with a cycle of the code length FCL in the optical frequency region for encoding by the encoder and satisfies the relations of equations (1) and (2).

A description will be given below, by way of example, of the case where r'−2, that is, the remainder of division of r by r' is 0 or 1 and a takes a value in the range of 1, . . . , N/2.

Figure 6A:
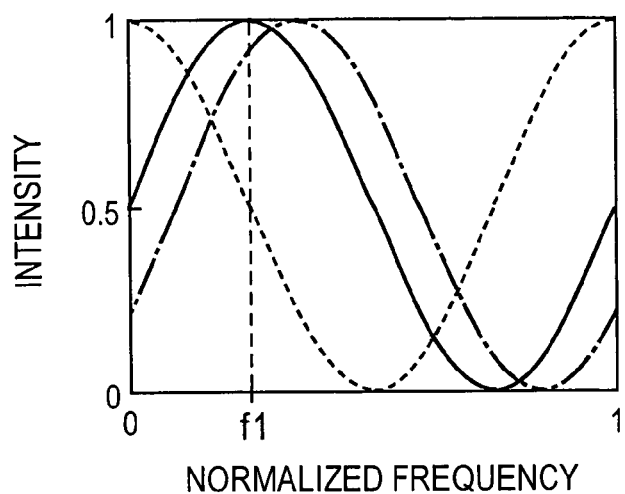
FIGS. 6(a), 6(b) and 6(c) are graphs showing examples of spreading codes in Embodiment 1, respectively.
Figure 6B:
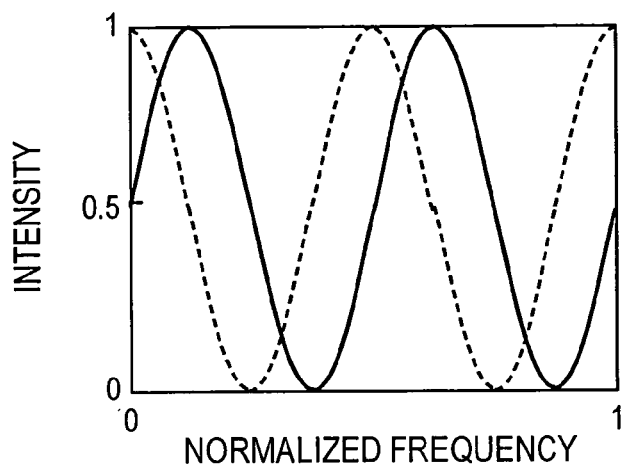
Figure 6C:
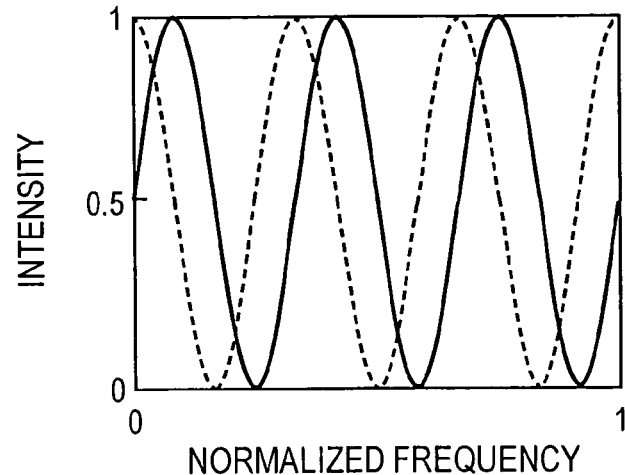

In FIG. 6 there are shown examples of the optical code signal Cn(f) in Embodiment 1-2. The abscissa represents the optical frequency normalized with the code length FCL and the ordinate represents optical intensity; FIGS. 6(*a*), 6(*b*) and 6(*c*) correspond to values a=1, 2 and 3, respectively, and the broken and solid lines indicate optical code signals corresponding to r=0 and r=1, respectively. The optical code signal is one that single frequency optical signals corresponding to respective chips, except for Cn(f)=0, vary in intensity in analog fashion in order of their arrangement unlike the spreading code consisting of single-frequency optical signals of which values are each "1" or "0" corresponding to one of chips as shown in the FIG. 1 prior-art example.

Used as the decoding code Dn(f) of the decoder $12_n$ for decoding the n-th optical code signal Cn(f) is expressed by the following equation.

$$Dn(f)=(1+\cos(2\cdot\pi\cdot a\cdot f/FCL+r\cdot\pi/2))-1 \quad (8)$$

The scalar product of the n-th optical code signal Cn(f) and the n-th decoding code Dn(f) for decoding the n-th optical code signal is integrated over a continuous optical frequency region corresponding to the code length FCL included in each of the optical frequency region for encoding by the encoder and the optical frequency region for decoding by the decoder, the resulting value being a non-zero finite value FCL/4, and the scalar product of the n-th optical code signal Cn(f) and a decoding code Dm(f) of a decoder for decoding an m-th optical code signal other than the n-th one over a continuous frequency region corresponding to the code length FCL included in each of the optical frequency region for encoding by the encoder and the optical frequency region for decoding by the decoder, the resulting value being zero; these values satisfy Eqs. (5) and (6) in Embodiment 1-1.

Figure 7:
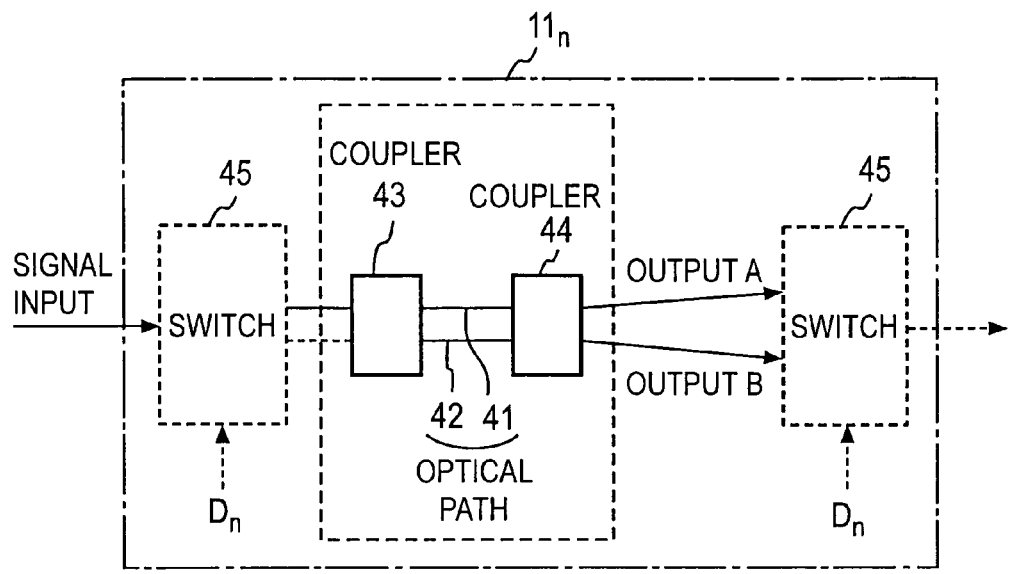
FIG. 7 is a diagram illustrating an example of an encoder for use in Embodiment 2.

FIG. 7 shows an example of the configuration of the encoder $11_n$ for use in Embodiment 1-2. A Mach-Zehnder interferometer is used, as the encoder $11_n$, which is made up of a pair of optical paths 41 and 42 of different optical path lengths and a pair of couplers 43 and 44 optically coupled thereto for coupling and splitting their optical inputs into two which are fed to the optical paths. The light input to the one input port of the coupler 43 is output via two output ports to the optical paths 41 and 42. At the one output port of the coupler 43 is mainly provided light of an optical frequency component which is an integral multiple of the optical frequency dependent on the optical path difference between the optical paths 41 and 42, whereas at the other output port is provided mainly the other optical frequency component. This optical frequency selecting characteristic is a gentle one, not ON-OFF-wise; therefore, for example, in FIG. 6(*a*) the selected (normalized) optical frequency is f1 and an optical output of a cosine function is provided whose intensity is 1 at the selected optical frequency f1.

Accordingly, the n-th optical code signal Cn(f) given by Eq. (7) is provided as an output A from the one output port of the coupler 44. From the other output port is provided an complementary optical code signal Cn'(f) as an output B.

Figure 8:
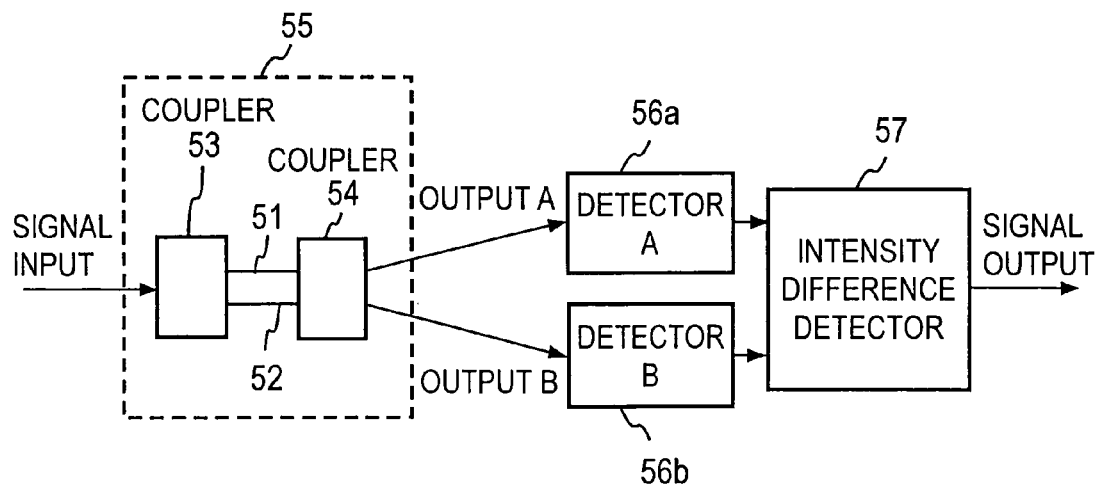
FIG. 8 is a diagram illustrating an example of a decoder for use in Embodiment 2.

FIG. 8 shows an example of the configuration of the decoder $12_n$ for use in Embodiment 1-2. A Mach-Zehnder interferometer 55 is used which is made up of a pair of optical paths 51 of different optical path lengths and a pair of couplers 53 and 54 optically coupled thereto; a combined optical code signal is input to the Mach-Zehnder interferometer 55, which provides, as an output A at the one output port, the n-th optical code signal Cn(f) given by Eq. (7), and the optical intensity of the output is detected as an electrical signal by a detector 56a. As the other output B from the Mach-Zehnder interferometer 55 is provided an optical code signal Cn'(f) that is an complementary version of the n-th optical code signal Cn(f) given by Eq. (7), and the optical intensity of the output Cn'(f) is detected by a detector 56b as an electrical signal. The output A corresponds to the scalar product of the input combined optical code signal and the encoding code Cn(f), whereas the output B corresponds to the scalar product of the input combined optical signal and an complementary code (1−Cn(f)) of the encoding code Cn(f) subtracted from 1. The output from the detector 56a is obtained by integrating the output A with respect to the optical frequency f of the light-source optical frequency width included in the optical frequency region Fst to Fla for decoding, and the output from the detector 56b is obtained by integrating the output B with respect to f over the light-source optical frequency width FSR included in the optical frequency region Fst to Fla for decoding. An intensity difference detector 57 subtracts the optical intensity detected by the detector 56b from the optical intensity detected by the detector 56a, providing the decoded output from the decoder $12_n$. For example, data "1" or "0" is output, depending on whether or not the output from the intensity difference detector 57 is equal to or greater than a threshold value.

As described above, since Embodiment 1-2 uses mutually orthogonal optical code signals as in the case of Embodiment 1-1 unlike in the prior art example of document 2 using periodic codes of different code lengths for optical codes, the summation of scalar products of the different optical code signals over their code lengths is zero—this reduces inter-code interference as compared with the prior art example using the non-orthogonal periodic codes.

In Embodiment 1-2, if the optical frequency width of the optical output from the light source, which is encoded by the encoding code, is constant and if the optical frequency of the output light from the light source is allocated within each of the optical frequency region for encoding by the encoder and the optical frequency region for decoding by the decoder, there is no influence of optical frequency fluctuations of the light source as is the case with Embodiment 1-1. Unlike the prior art using non-orthogonal periodic codes, this embodiment does not call for the use of a light source capable of emitting light over a period large enough to ignore inter-code interference, that is, the optical frequency bandwidth of the output light from the light source need not be wide, in particular, and the transmission bandwidth needs only to be wider than the optical frequency width FSR of the light source to such an extent as to accommodate optical frequency fluctuations of the light source; therefore, this embodiment permits suppression of waveform deterioration and limitations on the transmission bandwidth both attributable to wavelength dispersion on the transmission line.

Furthermore, in Embodiment 1-2, a π/2 phase shift of the optical code signal at the start position on the optical frequency axis, that is, changing r in Eq. (7) to 0 or 1, as well as changing the frequency f, that is, a in Eq. (7) makes it possible to increase the number of encoding codes twice as large as in the case of changing only the period (a) for encoding.

[Modification of Embodiment 1-2]

Although in Embodiment 1-2 the optical code signal is output only when the data in the data sequence is "1" (mark), the optical code signal may also be output when the data is "0" (space). That is, the n-th optical code signal Cn(f) is output for the data "1" (mark) in the n-th data sequence and an complementary optical code signal Cn'(f) of the n-th optical code signal Cn(f) is output for the data "0" (space). To perform this, the encoder $11_n$ is provided with a switch 45 which is disposed subsequent to the output-side coupler 44 as indicated by the broken lines in FIG. 7; the switch 45 is supplied with the outputs A and B and is controlled by the value of each piece of data of the data sequence Dn to provide the output A for the data "1" (mark) and the output B for the data "0" (space), generating a non-return-to-zero optical modulation signal.

In this embodiment, Eqs. (9) and (10) hold for the mark.

$$\int Cn(f)Dn(f) = FCL/4 \qquad (9)$$

$$\int Cn(f)Dm(f) = 0 \qquad (10)$$

For the space, Equations (11) and (12) holds.

$$\int Cn'(f)Dn(f) = -FCL/4 \qquad (11)$$

$$\int Cn'(f)Dm(f) = 0 \quad (12)$$

In this embodiment, too, integration is conducted over the optical frequency width FSR of the light source, but the width FSR is equal to the code repetition optical frequency width FCL.

Accordingly, the optical intensity difference detector 57 outputs a signal composed of mark and space codes and hence twice (3 dB) larger than in the above-described embodiment in which the intensity difference detector 57 is supplied with only the "mark" optical signal and provides an output that goes to PCL/4 for the mark and to 0 for the space. This increases the signal-to-noise ratio by 3 dB and hence permits reduction of the code length FCL accordingly, thereby lessening the influence of wavelength dispersion of the transmission line. Incidentally, the switch 45 may also be disposed at the stage preceding the input-side coupler 43, as indicated by the broken line in FIG. 7, in which case the input light is input to either one of two input ports of the coupler 42, depending on the data Dn is mark or space, and the output light is derived from only one of the output ports of the output-side coupler 41. Also the signs of the mark ("1") and the space ("0") may be exchanged. In other words, the correspondence between the mark ("1") and the space ("0") and between the optical code signals Cn(f) and Cn'(f) may be arbitrary.

Figure 9:
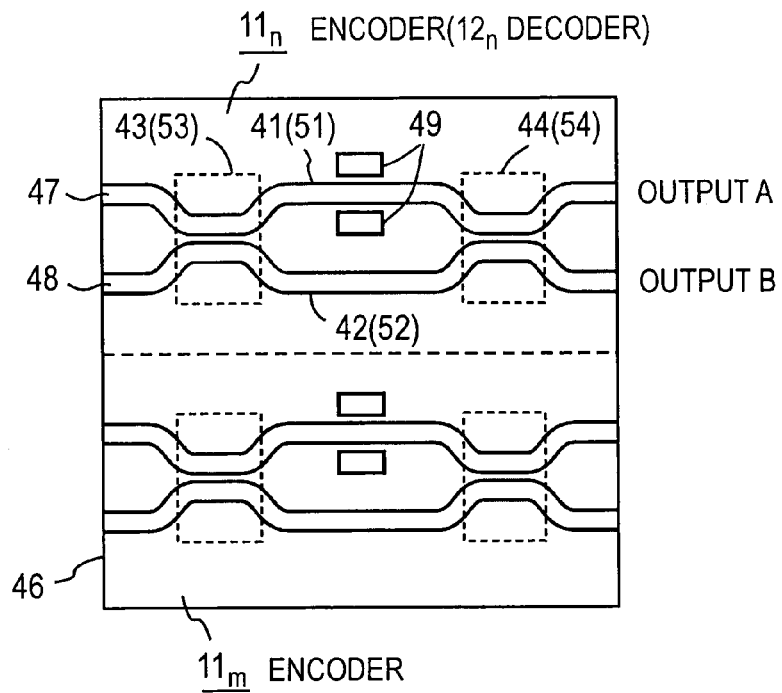
FIG. 9 is a diagram illustrating an example of filters forming an encoder/decoder for use in Embodiment 2.

The encoder $11_n$ may also be configured as depicted in FIG. 9. As is the case with an LN modulator, there are formed on a planar lightwave circuit substrate 46 formed of a material which has an electrooptic effect, such as $LiNbO_3$ crystal: two waveguides 47 and 48; couplers 43 and 44 formed by bringing the waveguides close to each other at locations adjacent their opposite end portions; and a pair of electrodes 49 for applying an electric field to at least either one of two optical paths 41 and 42 formed by the waveguides between the couplers 43 and 44 so as to provide a propagation delay difference between the two optical paths 42 and 41 by birefringence shift that is caused under the electric field by the electrooptic effect. The voltage that is applied to the optical path (waveguide) by the pair of electrodes 49 is adjusted such that the encoder $11_n$ selects and outputs the optical frequency (wavelength) signal which satisfies Eq. (7) corresponding to each optical code signal Cn(f).

The decoder $12_n$ can similarly be formed as a Mach-Zehnder interferometer or filter by forming optical paths 51, 52 and the couplers 53, 54 on the planar lightwave circuit substrate as parenthesized in FIG. 9. In this instance, the voltage to be applied to the electrodes 49 is so adjusted as to satisfy Eq. (8).

With the FIG. 9 configuration, it is possible to change the encoding code Cn(f) or decoding code Dn(f) by changing the voltage which is applied to the electrodes 49—this eliminates the need for forming a different encoder-decoder pair for each encoding code, and hence permits reduction of the device manufacturing costs.

Further, as depicted in FIG. 9, a pair of encoders $11_n$ and $11_m$ ($n \neq m$) are integrated on the same planar lightwave circuit substrate 46 whose temperature varies uniformly throughout it, and these encoders $11_n$ and $11_m$ generate n- and m-th optical code signals Cn(f) Cm(f) which are common in the value a but different in the value r in Eq. (7), respectively. Since the two optical code signals Cn(f) and Cm(f) are identical in their optical frequency characteristic and have a phase number difference of $\pi/2$, unsimultaneous occurrence of temperature variations in the encoders $11_n$ and $11_m$ for encoding the optical code signals, respectively, changes their refractive indexes and optical path lengths and hence causes their optical frequency for filtering to drift, resulting in deterioration of the value of cross-correlation between the optical code signals Cn(f) and Cm(f). With the FIG. 9 configuration, however, it is possible to suppress the deterioration of the correlation between the optical code signals by temperature variations since the encoders $11_n$ and $11_m$ are mounted on the common planar lightwave circuit substrate which undergoes uniform temperature variations.

Embodiment 1-3

In Embodiment 1-3 of the first mode of working of the invention, the intensity of the chip, which is each optical frequency component of the optical code signal, goes to a 1 or 0. The configuration of the communications system to which Embodiment 1-3 is applicable may be the same as the FIG. 4 configuration.

The optical code signals, i.e. first to N-th optical code signals, generated by the encoder $11_n$ in Embodiment 1-3 have the same code length FCL and are orthogonal to each other as in Embodiments 1-1 and 1-2; and they have such properties as mentioned below. The numbers of chips "1" and chips "−1" in a string of chips of the code length FCL arbitrarily taken out of a continuously repeated concatenation of the encoding code Cn(f) of the code length FCL are equal (the same number), and the numbers of chips which simultaneously go to "1s" and "−1s", respectively, at the same positions in strings of chips of the code length FCL arbitrarily taken out of different concatenations of different encoding codes are equal to each other. In the case of a code composed of such chips, the code length is a mere abstract number with no unit. Accordingly, it can be said in the above-described embodiments, too, that the code length is the optical frequency width FCL over which all codes repeat.

Such a code can be generated by use of the Hadamard code. FIG. 10(a) shows a first-order Hadamard matrix $H_1$, FIG. 10(b) a second-order Hadamard matrix $H_2$, and FIG. 10(c) a recurrence formula $H_n$ of the Hadamard matrix. A Hadamard code word is a selected row from the Hadamard matrix, except the first row, and its 0 and 1 are substituted with 1 and −1, respectively. In the second-order Hadamard matrix, the Hadamard code is composed of a code 2 [0101] in the second row of the matrix, a code 3 [0011] in the third row, and a code 4 [0110] in the fourth row. Continuously repeated concatenations of these codes 2 to 4 are [ . . . 0101010101 . . . ], [ . . . 001100110011 . . . ], and [ . . . 011001100110 . . . ], respectively. In this case, since the concatenation of code 3 and the concatenation of code 4 have their 1-chip codes shifted from each other, they constitute identical encoding codes, and Embodiment 1-3 uses only one of them.

Figure 11A:
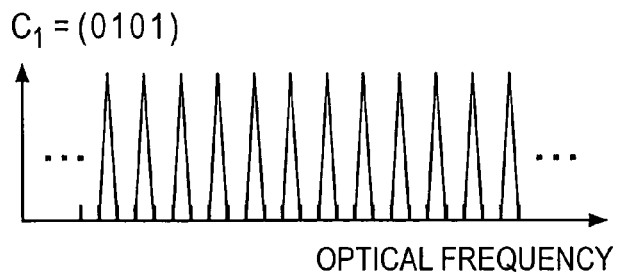
FIGS. 11(a) and 11(b) are graphs showing examples of encoding codes (concatenated codes) corresponding to the second-order Hadamard matrix for use in Embodiment 3.
Figure 11B:
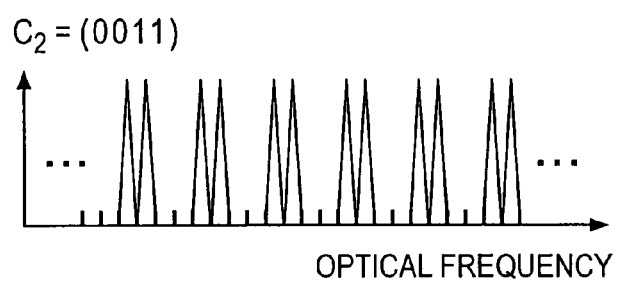

In the encoder $11_n$, consecutive optical frequencies are sequentially assigned to respective chips of such a concatenated code in the order of their arrangement, and those optical frequency components of the input light corresponding to the chips "1" are selected, that is, encoded. The selection optical frequency components of the encoder corresponding to the concatenation of the code $C_1$=(0101) are such as depicted in FIG. 11(a), and the selection optical frequency components of the encoder corresponding to the concatenation of the code $C_2$=(0011) are such as depicted in FIG. 11(b).

The encoder $11_n$ is configured to receive from the light source a light input of an optical frequency width $F_w$ equal to or a little larger than a natural-number multiple of the code length FCL and hence filter the optical frequency signal (component) corresponding to each chip of the concatenation of the encoding coder Cn(f) and output the filtered optical frequency signals as the optical code signal Cn(f) corresponding to the N-th data sequence, or output the optical code signal Cn(f) of the N-th data sequence in which the optical frequency signal (component) corresponding to each chip is ON for the data "1" of the N-th data sequence and OFF for the data "0". The thus encoded optical code signals each possess the above-mentioned properties of the chip string arbitrarily taken out from the concatenation of codes, maintaining orthogonality between different optical code signals.

Figure 12:
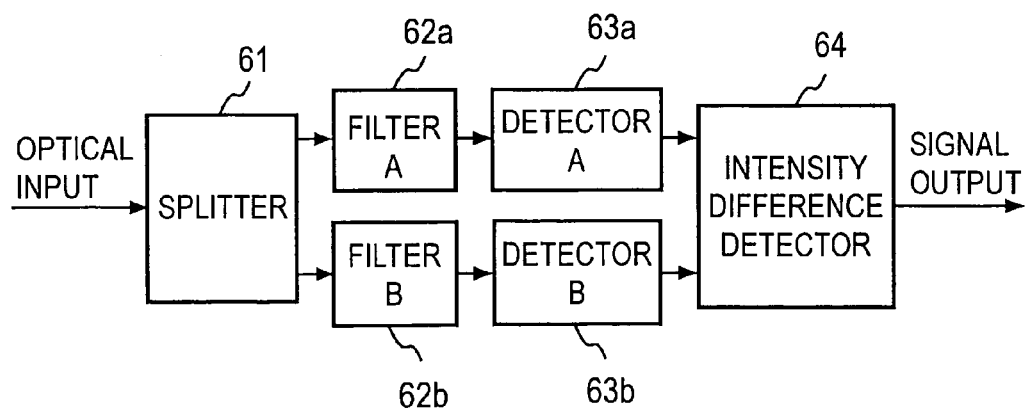
FIG. 12 is a diagram illustrating an example of a decoder for use in Embodiment 3.

The decoder $12_n$ also filters the optical frequency component (signal) of the input light corresponding to the concatenated code as is the case with the encoder $11_n$, and performs decoding over the frequency width corresponding to at least the code length FCL. FIG. 12 shows an example of the configuration of the decoder $12_n$. The multiplexed optical code signal is split by a splitter 61 into two for application to filters 62a and 62b; the filter 62a filters the optical frequency signals of the same order of output from the corresponding encoder $11_n$, that is, the optical frequency signals corresponding to the same chips as in the output from the corresponding encoder, and the filter 62b filters the optical frequency signals corresponding to complementary versions of the encoded codes of the corresponding encoders $11_n$, that is, the optical frequency signals corresponding to chips not selected by the encoder $11_n$. The optical intensity of the optical frequency signal filtered or selected by the filter 62a and the optical intensity of the optical frequency signal filtered or selected by the filter 62b are detected by detectors 63a and 63b, respectively, and the output from the detector 63b is subtracted by an intensity difference detector 64 from the output from the detector 63a. In this way, optical code signals corresponding to consecutive chips forming at least the encoded code are decoded from the output light of the encoder $11_n$.

Figure 13:
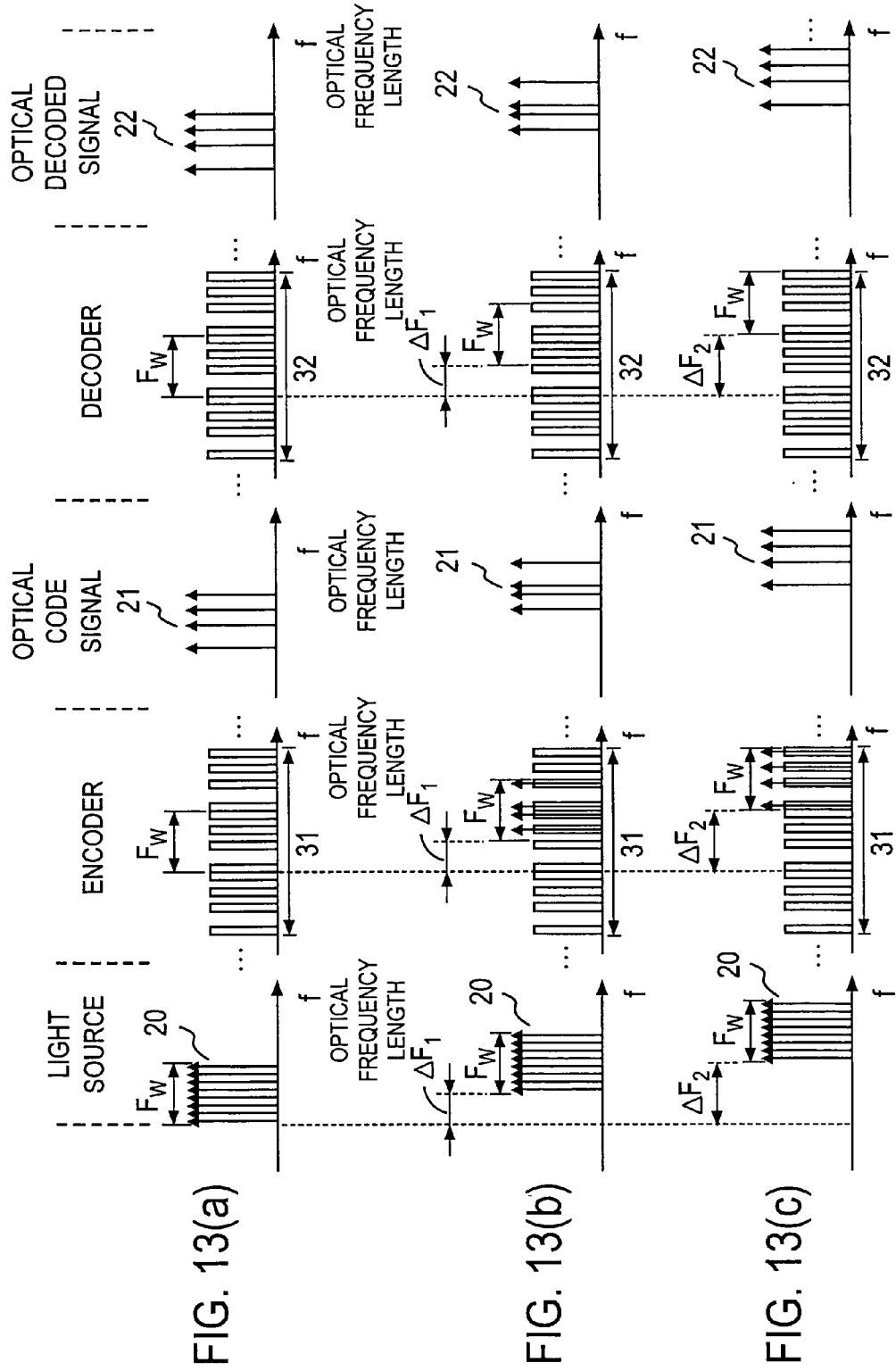
FIGS. 13(a), and 13(b) and 13(c) are diagrams showing, by way of example, source optical frequency component, optical frequency regions for encoding, encoded optical signals, optical frequency regions for decoding, and decoded optical signals in the cases where no source frequency drift occurs, and where the source frequency drift occurs, respectively, in Embodiment 3.

Referring next to FIG. 13, a description will be given of how Embodiment 1-3 excludes the influence of the source frequency drift. FIG. 13(a) shows the state in which there is no source frequency drift. The optical signal 20 of the source frequency width $F_w$ corresponding to or a little larger than the code length FCL is output from the light source, and those optical frequency components of the optical frequency signal 20 corresponding to the chips "1" are filtered (encoded) by the encoder $11_n$ in its encoding optical frequency region 31, by which an optical code signal 21 is generated. The decoder $12_n$ filters the input optical code signal 21 in its decoding optical frequency region 32 to provide a decoded optical signal 22.

When the source frequency drifts by $\Delta F_1$ as shown in FIG. 13(b), the optical signal 20 input to the encoder $11_n$ is shifted by $\Delta F_1$ in the same direction as that of the source frequency drift in the encoding frequency region 31, in which the input optical signal is encoded into the optical code signal 21, whereas in the decoder $12_n$ the input multiplexed optical signal 21 is also shifted by $\Delta F_1$ in the same direction as that of the source frequency drift in the decoding frequency region, in which the input signal is decoded into an output optical signal 22.

Similarly, even when the source frequency drift is $\Delta F_2$ larger than in the above as shown in FIG. 13(c), if the drifted optical signal 20 remains within the encoding frequency region 31 and within the decoding frequency region 32, the optical signal is shifted by $\Delta F_2$ in both regions and encoded and decoded, respectively; in either case, the optical code signal 21 held orthogonal to a different optical code signal as described previously.

Incidentally, since it is absolutely impossible for the optical signal to be negative in intensity, it can easily be understood that replacing the chip value "−1" by "0", the value of definite integrals of scalar products of the code Cn(f) and the decoding code Cn(f) and its complementary code (1−Cn(f)) with respect to the optical frequency f over the source frequency $F_W$, respectively, bear the relationship expressed by the following Equation (13).

$$\int Cn(f) \cdot Cn(f) df > \int Cn(f) \cdot (1-Cn(f)) df \qquad (13)$$

[Examples of Filters of Encoder/Decoder in Embodiment 1-3]

Figure 14:
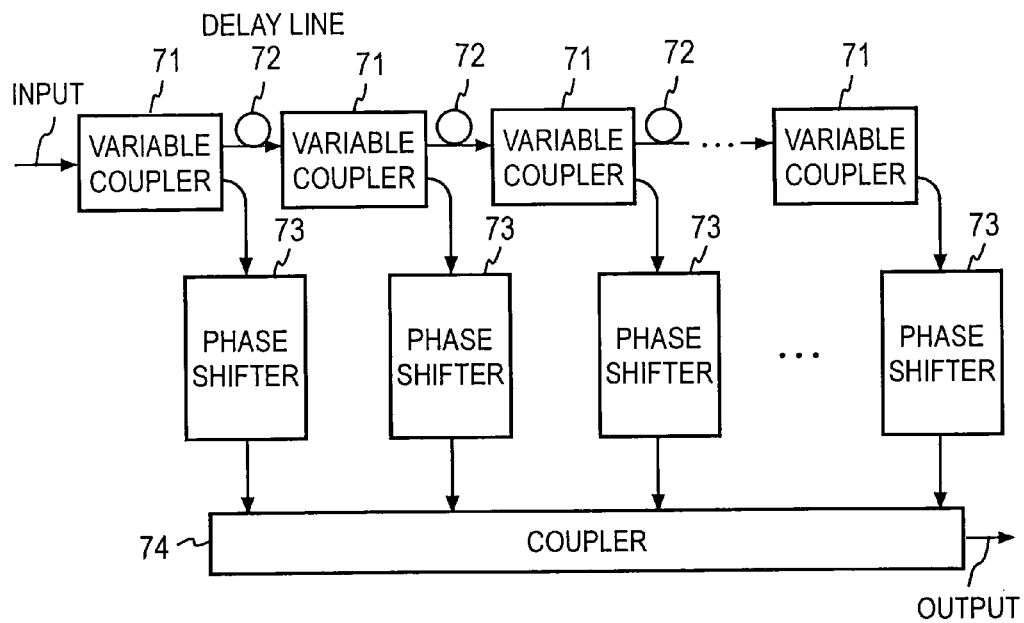
FIG. 14 is a diagram illustrating an example of a filter forming an encoder/decoder for use in Embodiment 2.

A description will be given below of examples of the filter for use in the encoder/decoder for continuously encoding/decoding optical signals in Embodiment 1-3. FIG. 14 depicts an example of the filter. Multiple variable couplers 71, whose coupling factors can be set arbitrarily, are connected in cascade via delay lines 72, and optical outputs from those output ports of the couplers 71 to which the delay lines 72 are not connected are provided via phase shifters 73 to a combining coupler 74, from which a filtered optical output signal is derived. The optical frequency for filtering by this filter may a continuous repetition of an arbitrary sequence of optical frequencies with a predetermined period (FCL) as disclosed, for example, in Sasayama et al., "Photonic FDM Multichannel Selector Using Coherent Optical Transversal Filter," Journal of Lightwave Technology, Vol. 12, No. 4, 1994, pp. 664-669. That is, it is possible to use the encoding light filtering frequency characteristic function Cn(f) that optical frequencies corresponding to respective chips "1" of the encoding code are continuously repeated with a period of the code length FCL.

In Embodiment 1-3, since the optical code signal can be sent over the optical frequency width corresponding to the encoding code length FCL without concatenation, the required source optical frequency width can be made smaller than in the case of the conventional method using the sine function for encoding—this lessens the influence of wavelength dispersion on the transmission line. Moreover, as is the case with Embodiment 1-1, the provision of the dispersion compensator 17 also extenuates the collapse of orthogonality between optical code signals due to differences in their transmission distance.

As described above, in Embodiment 1-3, even if the source frequency shifts, as long as it remains within the optical frequency range for encoding by the encoder, and the optical input has at least the frequency width corresponding to the code length FCL of the encoding code, the optical code signal from the encoder is received by the corresponding decoder at the same input intensity as the source frequency does not shift and is held orthogonal to optical inputs from other encoders noncorresponding to the decoder to thereby cancel the inter-code interference. This permits implementation of an optical communications system free from the necessity for calibrating the source frequency.

[Modified Decoder in Embodiment 1-3]

Figure 15:
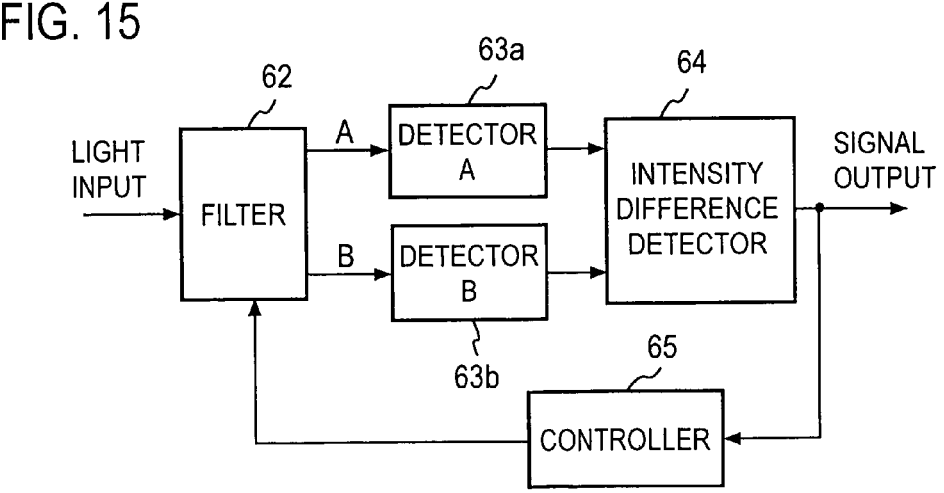
FIG. 15 is a diagram illustrating another example of the decoder for use in Embodiment 3.

FIG. 15 shows a modified form of the decoder $12_n$ in Embodiment 1-3. A filter 62 provides the output A by filtering the optical frequency signals corresponding to the optical frequency selective characteristics of the encoder $11_n$, that is, the optical frequency signals corresponding to the chips "1", and it provides the output B by filtering the optical frequency signals corresponding to complementary characteristics of the optical frequency selective characteristics of the encoder $11_n$, that is, the optical frequency signals corresponding to the chips unfiltered by the encoder $11_n$. The outputs A and B from the filter 62 are input to detectors 63a and 63b, respectively, for detecting their optical intensity, and the detected are applied to an intensity difference detector 64, which subtracts the output of the detector 63b from the output of the detector 63a and provides the subtracted output. The output from the intensity difference detector 64 is branched for input as well to a controller 65, and in accordance with the input thereto the controller 65 shifts the filtering optical frequency of the filter 62 to maximize the output from the intensity.

Figure 16:
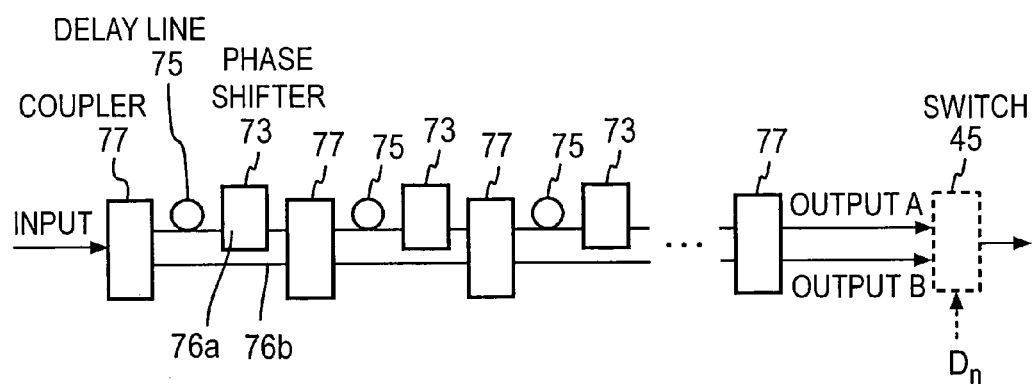
FIG. 16 is a diagram illustrating another example of the filter forming an encoder/decoder for use in Embodiment 3.

FIG. 16 illustrates a specific operative example of the filter 62 in FIG. 15. The filter 62 can be used also as an encoder. The illustrated filter 62 is formed by a multistage Mach-Zehnder interferometer comprised of: two optical paths 76a and 76b having their optical path lengths made different by the insertion of delay lines 75 in one of the two optical paths; couplers 77 interconnected via the two optical paths 76a and 76b, for combining and splitting light from the optical paths; and phase shifters 73 inserted in one of the two optical paths 76a and 76b. The filter periodically selects optical frequencies. The optical frequency for filtering (filtering optical frequency characteristic function) by the filter 62 may be a continuous repetition of an arbitrary sequence of optical frequencies with the predetermined period (FCL) as disclosed, for example, in Jinguji et al., "Synthesis of Coherent Two-Port Lattice Form Optical Delay-Line Circuit," Journal of Lightwave Technology, Vol. 13, No. 1, 1995, pp. 73-82. The filter 62 provides the output A and the output B from the one and the other of two output ports of the last-stage coupler 77, respectively. When the filter is used as the encoder, for example, only the output A is provided as the filtered optical code signal from one of the two output ports.

In the filter of FIG. 16 both port outputs of the coupler of each stage are fed to the next stage and the output A from the last-stage coupler 77 is one-half the input, whereas in the filter of FIG. 14 the output decreases by 1/number of couplers 71; accordingly, when used as an encoder, the filter shown in FIG. 16 is lower in the splitting loss by couplers.

As described above, the filter 62 in FIG. 15 may be configured as shown in FIG. 16 or 14, and its filtering optical frequency can be shifted simply by adjusting one or more of the delay of the delay line, the shift amount of the phase shifter and the splitting ratio of the variable coupler. The maximum value of adjustment in this case needs only to be equal to the code length FCL since the optical frequency width required for orthogonality of codes is FCL in this example.

Figure 17:
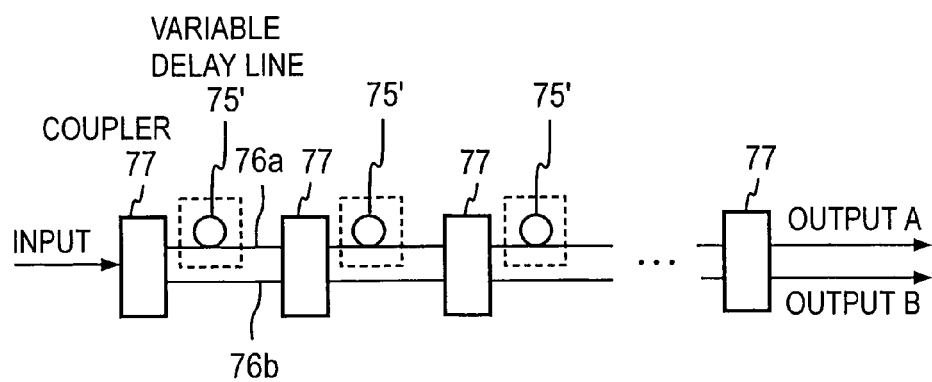
FIG. 17 is a diagram illustrating still another example of the filter forming an encoder/decoder for use in Embodiment 3.

FIG. 17 shows an example of the filter 62 whose filtering optical frequency is adjustable. This example uses delay lines 75' whose delay amounts can be varied by an electrode or heater for causing a refractive index change through utilization of a change in the birefringent index by the application of an electric field as described previously with reference to FIG. 9 or through utilization of the thermooptic effect by temperature—this permits adjustment of the optical path length difference between the optical paths 76a and 76b. The filter is formed by a multistage Mach-Zehnder interferometer comprised of the optical paths 76a and 76b, two couplers 77 for coupling and splitting light from the two optical paths, and the variable delay lines 75' inserted in the one optical path. This filter varies the delay amount of the variable delay line 75' to shift the optical frequency to be selected by each Mach-Zehnder interferometer forming the filter, thereby changing the encoding code of the encoder $11_n$ and the decoding code of the decoder and shifting the optical frequencies of the encoded and decoded codes.

Figure 18:
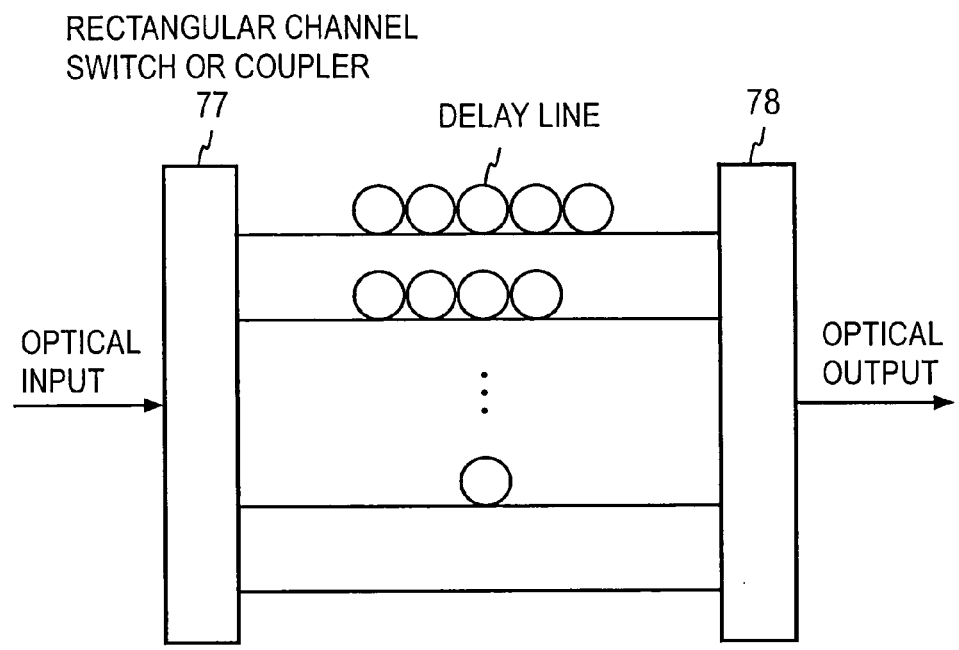
FIG. 18 is a diagram showing an example of a variable delay line for use in the filter forming the encoder/decoder in Embodiment 3.

The delay line of the filter for use in the encoder $11_n$ or decoder $12_n$, whose delay amount is variable and adjustable, that is, a variable delay line is such as shown in FIG. 18, in which multiple delay lines $75_1$ to $75_p$ of different delay amounts (the delay amount of the delay line $75_p$ being zero) are connected in parallel between two switches or couplers 77 and 78 for selectively connecting multiple optical paths to a single optical path. An optical signal is output via one delay line $75_p$ (where p=1, . . . , P) having selected the optical input. The use of switches in this case excludes the possibility of incurring an optical loss by the splitting loss of the couplers. Since a desired delay is provided by selectively switching multiple delay lines of different delay times, instead of utilizing the thermooptic effect or a birefringent index change by the application of an electric field, it is possible to cause a larger change in the delay.

Figure 19:
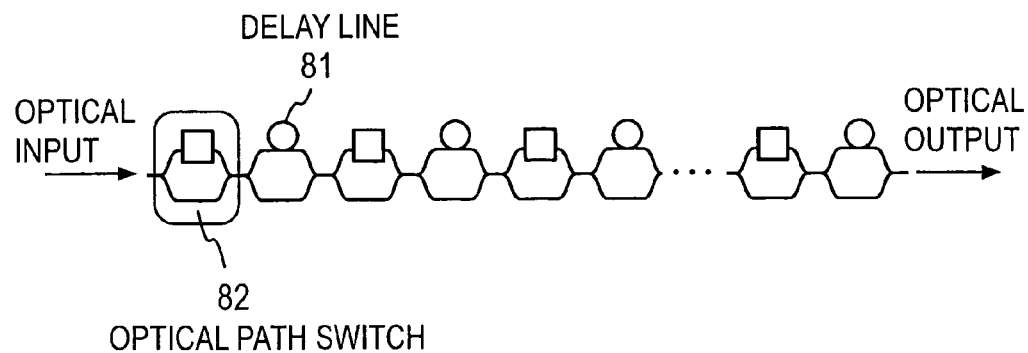
FIG. 19 is a diagram showing another example of the variable delay line for use in the filter forming the encoder/decoder in Embodiment 3.

FIG. 19 shows another example of such a delay line configuration, which is formed by a multistage connection of an optical path provided with a delay line 81, an optical path with no delay line and a switch 82 for switching between these delay lines, and in which the amount of delay on the optical input is changed by selectively switching the switches 82 between the two kinds of delay lines.

The delay lines 81 may preferably be different in delay amount. The delay of the optical input is adjusted by selectively changing the combination of delay lines 81 for the passage therethrough of the optical input. Though smaller in the number of delay lines used, the illustrated delay structure produces the same effect as is obtainable with the FIG. 18 example.

Figure 20:
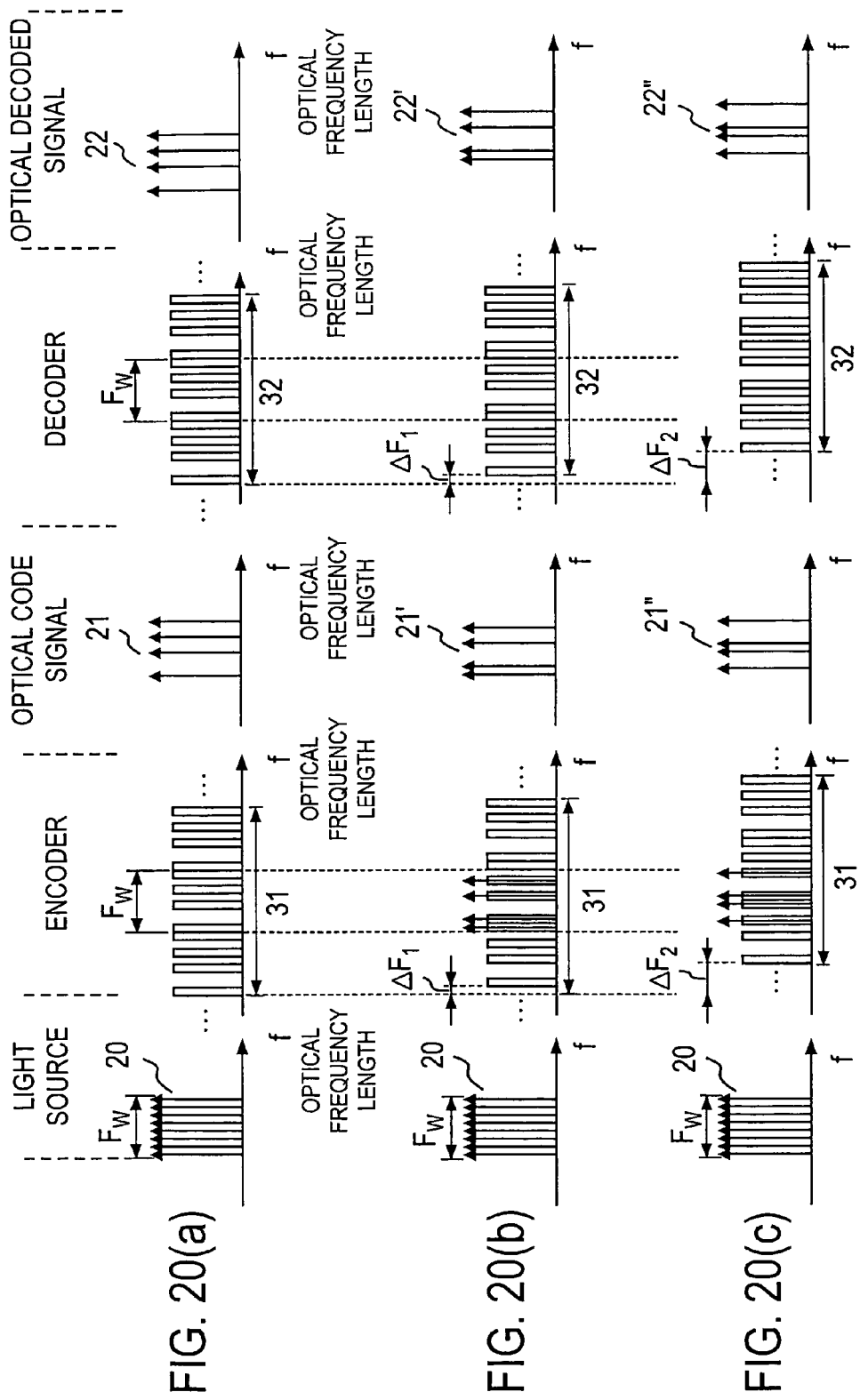
FIGS. 20(a), and 20(b) and 20(c) are diagrams showing, by way of example, the relationships between source optical frequency component, optical frequency regions for encoding, encoded optical signals, optical frequency regions for decoding, and decoded optical signals in the cases where no optical frequency regions for encoding drift occur, and where the source frequency and optical frequency regions for encoding drift occur, respectively, in Embodiment 3.

Referring next to FIG. 20, it will be described below that Embodiment 1-3 permits excellent decoding irrespective of a drift in the optical frequency for encoding by the encoder $11_n$. In FIG. 20 the parts corresponding to those in FIG. 13 are identified by the same reference numerals as in the latter. FIG. 20(a) shows the state in which there is no drift in the optical frequency for encoding by the encoder (optical filtering frequency characteristics), and the encoder and decoder operate in the same manner as in the case of FIG. 13(a). When the optical frequency for encoding by the encoder drifts $\Delta F_1$ as depicted in FIG. 20(b), the optical input is encoded by filtering into an optical code signal 21'. When the optical frequency for encoding undergoes a relatively large drift $\Delta F_1$ as shown in FIG. 20(c), the optical input is encoded by filtering into an optical code signal 21''.

Either of the optical code signals 21' and 21'' has the code length FCL; accordingly, the optical code signals 21' and 21'' have the same properties as does the string of consecutive chips extracted from the concatenated code over the source frequency FSR (denoted by $F_W$ in FIG. 20) as described previously. Therefore, the decoder $12_n$ selects respective optical frequency components of the optical code signals 21' and 22'', and outputs decoded signals 22' and 22'' as shown in FIGS. 20(b) and (c), respectively; thus, this embodiment ensures satisfactory decoding. When the optical frequency for decoding drifts, the decoder $12_n$ described above with reference to FIG. 15 is used to shift the optical frequency for decoding, by which satisfactory decoding can be achieved.

As described above, according to Embodiment 1-3, even if one or both of the source frequency, the optical frequency region for encoding 31 and the frequency region for decoding 32 drift, as long as the optical frequency width of the optical signal from the light source lies within the regions 31 and 32 (the region 32 including the shift-controlled region), no degradation is caused in the optical intensity of the input to the decoder and the orthogonality to other optical code signals is also retained—this enables the decoder to perform satisfactory decoding.

[Modifications of Encoder and Decoder of Embodiment 1-3]

Figure 21:
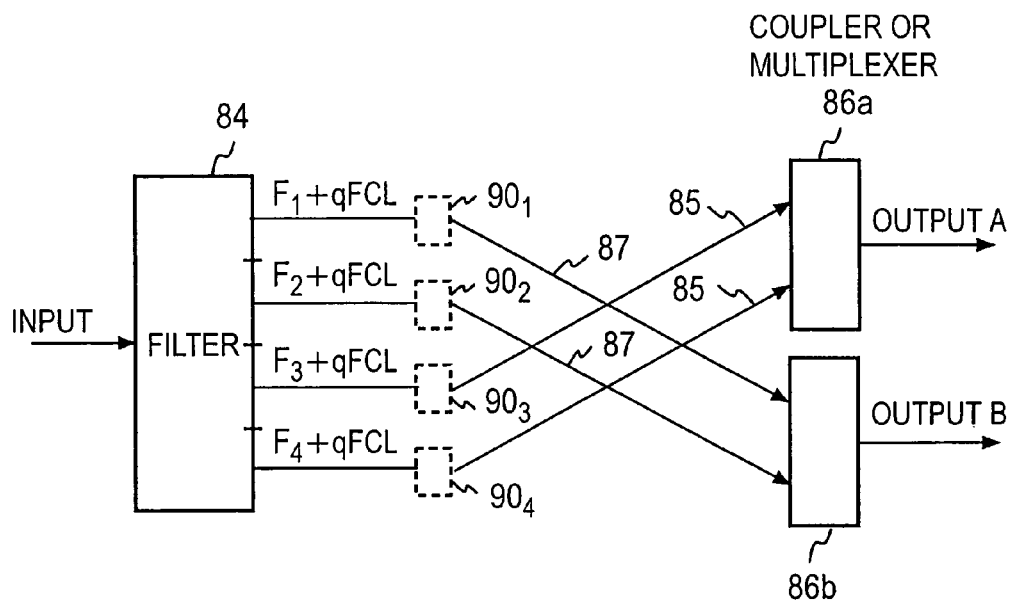
FIG. 21 is a diagram illustrating still another example of the filter forming the encoder/decoder for use in Embodiment 3.

FIG. 21 illustrates another example of the filter for use in the encoder $11_n$ and decoder $12_n$ of Embodiment 1-3. The optical input is fed to a filter 84; the filter 84 outputs optical frequency signals of respective chips forming the encoding code to different ports, and outputs to the same port those optical frequency signals which are spaced apart the optical frequency corresponding to the code length. For example, assuming that the encoded code is composed of four chips and that optical frequencies $F_1$, $F_2$, $F_3$ and $F_4$ are sequentially assigned to the chips in the order of arrangement, an optical signal of an optical frequency $F_1+qFCL$ (where q=0, 1, 2, . . . ) is output to a port 1, and optical signals of optical frequencies $F_2+qFCL$, $F_3+qFCL$ and $F_4+qFCL$ are output to ports 2, 3 and 4, respectively. As the filter that repeatedly outputs optical signals of consecutive frequencies to different ports as mentioned above, an AWG (Arrayed Waveguide Graiting) can be used which is of the type that the product of the number of optical signals to be split and their frequency interval and the free space range of the optical signals to be output to the same port are equal to the code length FCL. Incidentally, while the Free Space Range defined for AWG is abbreviated as FSR, it is not the optical frequency width FSR used herein but, by the definition of FSR in this specification, it is represented as C/FCL (C: light speed).

The ports, at which the optical frequency signals corresponding to the selection frequency components, that is, chips "1" of the encoding code, of the filter 84 are provided, are connected via optical paths 85 to a coupler or combiner 86a, and the output from the coupler or combiner 86a is provided as the output A. The ports, at which the optical frequency signals corresponding to the chips "−1" of the encoding code, that is, unselected optical frequency signals, are provided, are connected via optical paths 87 to a coupler or combiner 86b, and the output from the coupler or combiner 86b is provided as the output B. The FIG. 21 example shows the path connection for the encoding code $C_2$=(0011) depicted in FIG. 11(b). The ports 1 and 2 for $F_1+qFCL$ and $F_2+qFCL$ are connected via the optical paths 87 to the combiner 86b, whereas the ports 3 and 4 for $F_3+qFCL$ and $F_4+qFCL$ are connected via the optical paths 85 to the combiner 86a.

It will easily be understood that the filter of the FIG. 21 configuration can be used as a filter for either of the encoder $11_n$ and the decoder $12_n$.

In the encoder $11_n$ either one of the couplers or combiners 86a and 86b and the optical paths 85 or 87 corresponding thereto can be omitted. Rather than the couplers or combiners 86a and 86b which split or couple light irrespective of its optical frequency and hence causes a splitting loss, it is preferable to use arrayed waveguide grating as combiners not as filters in the above example since the optical loss by the splitting loss can be reduced. This filter is smaller in the number of parts than the filter of FIG. 14, and hence has the advantage of low optical loss.

Figure 22:
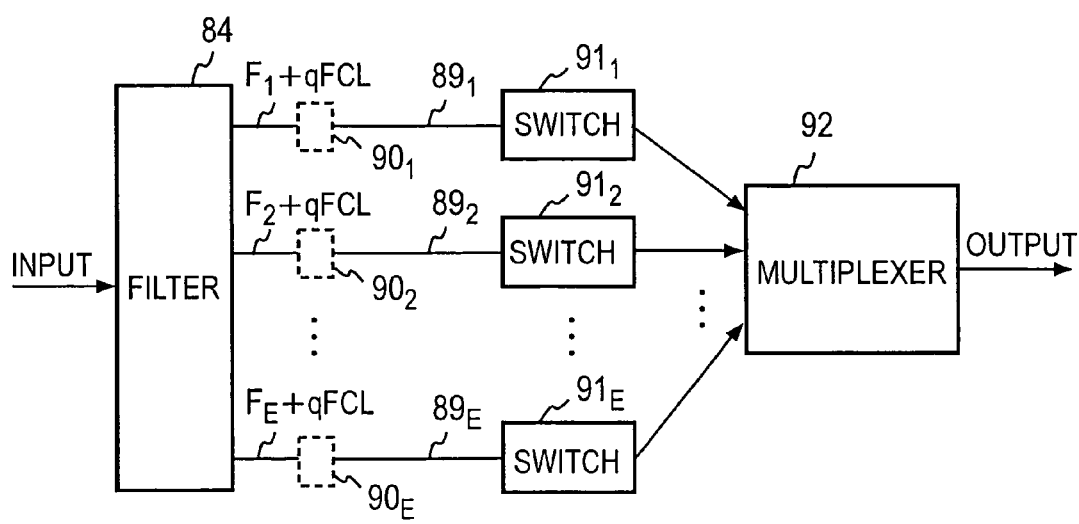
FIG. 22 is a diagram illustrating another example of the encoder for use in Embodiment 3.

The encoder $11_n$ may be configured as shown in FIG. 22. The same filter as that 84 in FIG. 21 is used, and its ports are connected to a combiner 92 via switches $91_1, \ldots, 91_E$ (where E is the number of chips forming the encoding code) which selectively permit or inhibit the passage therethrough of light to optical paths $89_1, \ldots, 89_E$. Those of the switches $91_1, \ldots, 91_E$ which correspond to the chips "1" of the encoding code are turned ON and those corresponding to the chips "−1" are turned OFF.

Figure 23:
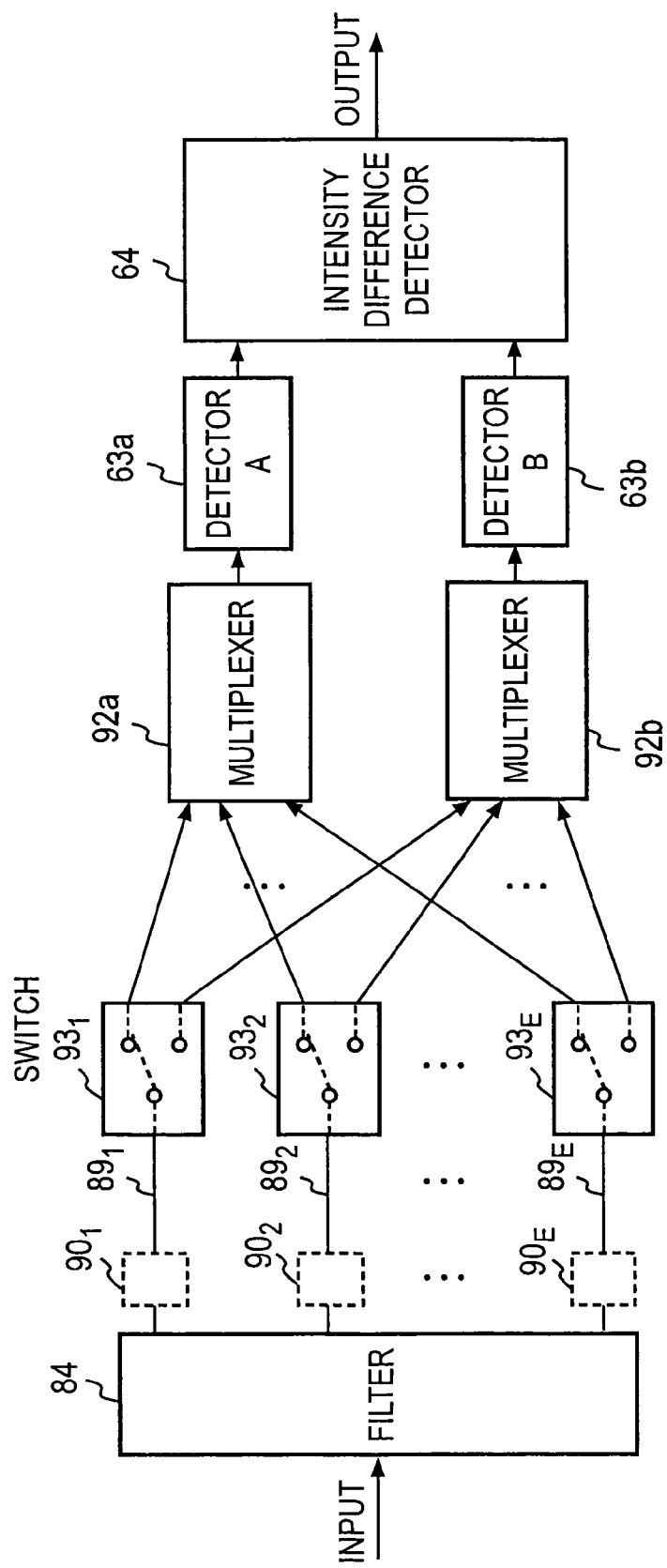
FIG. 23 is a diagram illustrating another example of the decoder for use in Embodiment 3.

FIG. 23 shows an example of the decoder formed using the filter 84. The decoder is provided with switches $93_1, \ldots, 93_E$ through which the optical paths $89_1, \ldots, 89_E$ connected to respective ports of the filter 84 are selectively connected to either one of combiners 92a and 92b, and those of the switches $93_1, \ldots, 93_E$ which corresponds to chips "1" are connected the combiner 92a, whereas those corresponding to the chips "−1" are connected to the combiner 92b. The outputs from the combiners 92a and 92b are applied to detectors 63a and 63b, respectively; the subsequent stage is the same as shown in FIGS. 12 and 15.

The configurations of FIGS. 22 and 23 can be adapted to generate/decode an arbitrary optical coded/decoded signal with one encoder/decoder.

Figure 24:
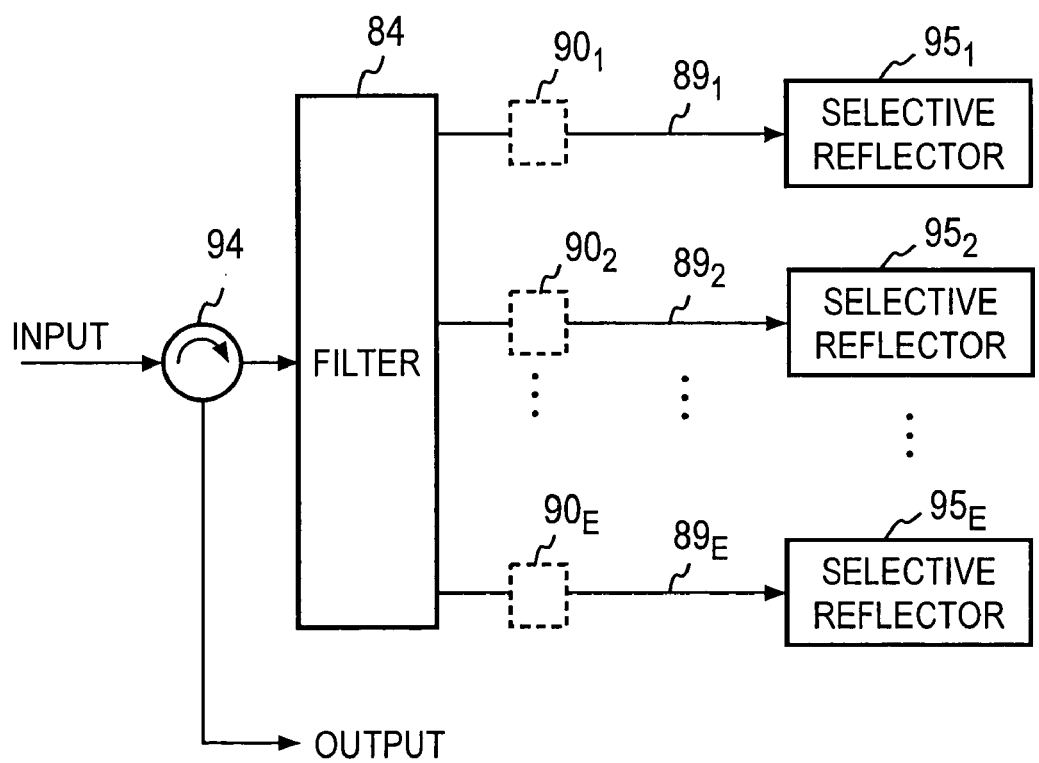
FIG. 24 is a diagram illustrating another example of the encoder for use in Embodiment 3.

FIG. 24 illustrates an other example of the encoder using the filter 84. The optical input is fed via an optical circulator 94 to the filter 84; the optical paths $89_1, \ldots, 89_E$ connected at one end to the respective ports of the filter 84 are connected at the other end to selective reflectors $95_1, \ldots, 95_E$ capable of selectively reflecting light, and the light reflected by the reflectors $95_1, \ldots, 95_E$ back to and combined by the filter 84, from which the combined light is output via the optical circulator 94 separately of the optical input. Those of the selective reflectors $95_1, \ldots, 95_E$ which correspond to the chips "1" of the encoding code of the encoder are set for reflection, whereas those reflectors corresponding to the chips "−1" are set for no-reflection.

Figure 25:
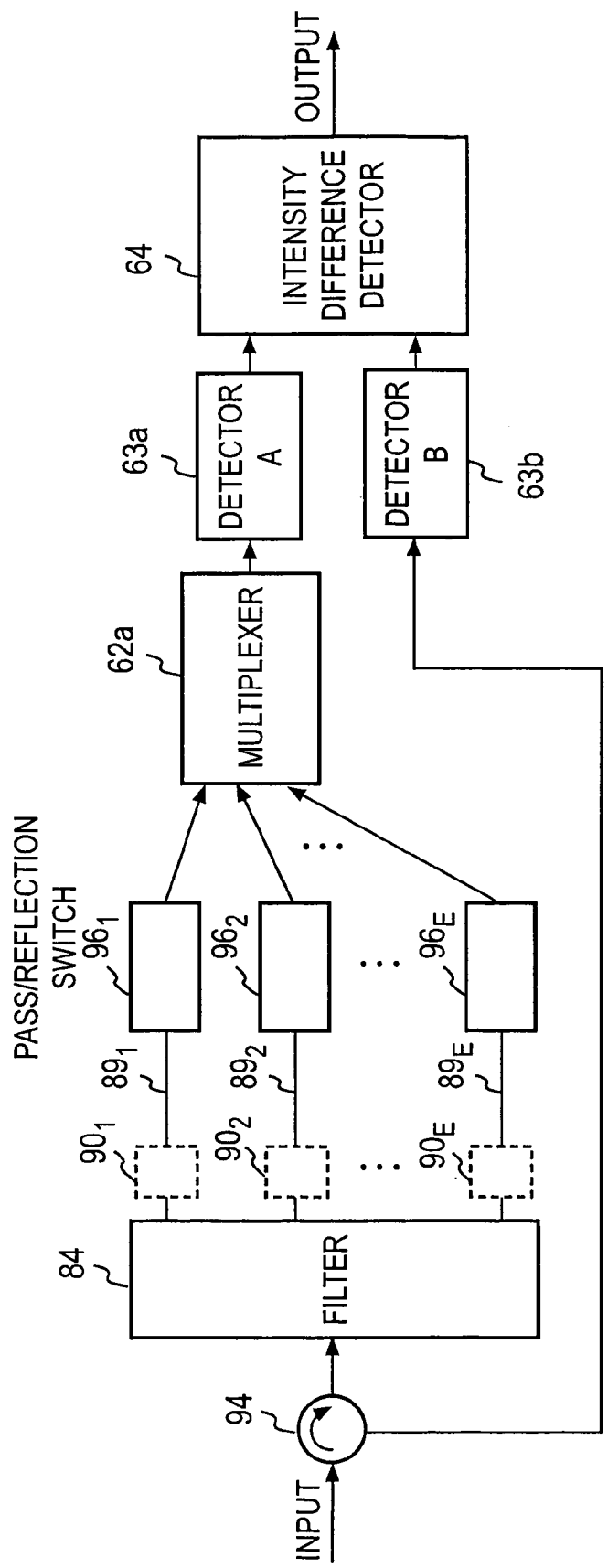
FIG. 25 is a diagram illustrating another example of the decoder for use in Embodiment 3.

Another example of the decoder using the filter 84 is depicted in FIG. 25, in which the parts corresponding to those in FIGS. 23 and 24 are identified by the same reference numerals as those in the latter. Connected to the optical paths $89_1, \ldots, 89_E$ at one end thereof are pass/reflect switches $96_1, \ldots, 96_E$ that can be set to transmit therethrough light or reflect it off. The light allowed to pass through the pass/reflect switches $96_1, \ldots, 96_E$ is combined by the combiner 92a and then fed to the detector 63a. The light reflected off the pass/reflect switches $96_1, \ldots, 96_E$ is combined by the filter 84, from which the combined output is provided via the circulator 94 to the detector 63b. Those of the pass/reflect switches 961, . . . , 96E which correspond to the chips "1" of the encoding code are set for transmission, whereas those corresponding to the chips "−1" are set for reflection. With the illustrated configuration, it is possible to decrease the number of combiners used in the decoder of FIG. 23 by one.

It is desirable to insert attenuators $90_1, \ldots, 90_E$ each in one of the optical paths $89_1, \ldots, 89_E$ as indicated by the broken lines in FIGS. 21 to 25 to provide an optical loss corresponding to the optical intensity ratio of the output from the filter 48 for each optical path, thereby leveling off an intensity difference of several dBs for each optical path which is likely to be caused by the arrayed waveguide grating AWG. This permits reduction of noise resulting from an intensity variation for each optical frequency.

Figure 26:
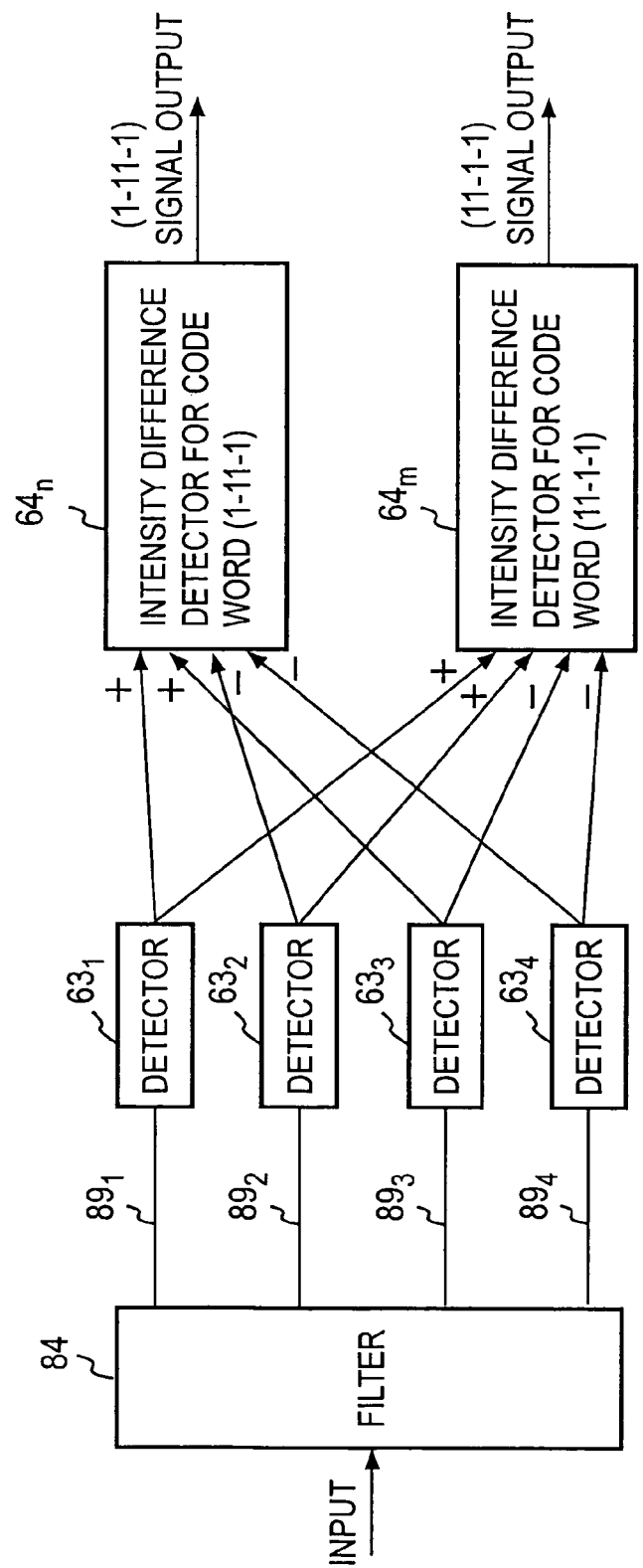
FIG. 26 is a diagram illustrating still another example of the decoder for use in Embodiment 3.

FIG. 26 illustrates still another example of the decoder using the filter 84. This example is shown as being applied to the decoding of optical code signals of the code words $C_1=$ (0101) and $C_2=$(1100) shown in FIGS. 11(a) and (b). The intensity outputs of optical frequency signals corresponding to the chips "1" of the optical code signal in the detectors $63_1, \ldots, 63_4$ are applied as positive outputs to intensity difference detectors, and the intensity outputs of the optical frequency signals corresponding to the chips "−1" are applied as negative outputs to the intensity difference detectors. The outputs from detectors $63_1$ and $63_3$ are applied to positive input terminals of the intensity difference detector $64_n$ for the code word $C_1$, and the outputs from the detectors $63_2$ and $63_4$ are applied to negative input terminals of the difference detector $64_n$, which conducts an addition and a subtraction using the inputs to the positive and negative input terminals as additive and subtractive inputs, respectively, and provides the result of addition and as a decoded signal output. The outputs from detectors $63_1$ and $63_2$ are applied to positive input terminals of the intensity difference detector $64_m$ for the code word $C_2$, and the outputs from the detectors $63_3$ and $63_4$ are applied to negative input terminals of the difference detector $64_m$, which adds and subtracts them, providing a decoded signal output. Alternatively, the intensity difference detector 64 may also be adapted to calculate the sum of the outputs from the detectors corresponding to the chips "1" of the encoded code and the sum of the detector outputs corresponding to the chips "−1" and subtract the latter from the former to provide the decoded signal output.

This configuration eliminates the need for splitting light for each encoding code (code word) for decoding, and hence permits reduction of optical loss accordingly. As described previously with reference to FIG. 15, it is preferable in this instance, too, to control the filtering optical frequency of the filter 84 in such a manner as to maximize one decoded signal output.

Figure 27:
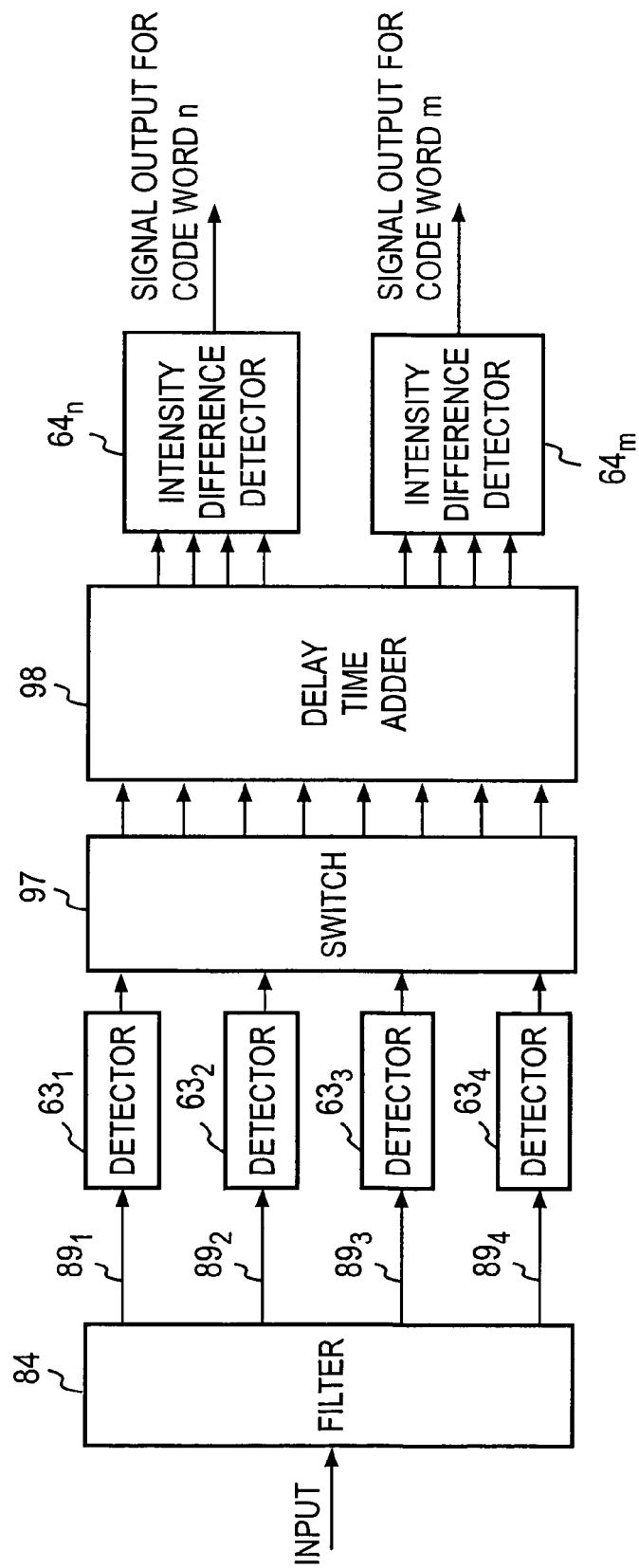
FIG. 27 is a diagram illustrating a still further example of the decoder for use in Embodiment 3.

FIG. 27 illustrates another example of the decoder using the filter 84. This example uses electrical delay means as the dispersion compensator. The outputs from the detectors $63_1, \ldots, 63_4$ connected to the output paths of the filter 84 are applied to a switch 97, which outputs code words added with positive and negative signs, and the detected outputs corresponding to respective chips of the encoded code are each electrically delayed by delay means 98 to equalize different arrival times of chips due to different delay times of respective optical frequencies during transmission, and the delay-equalized detector outputs are added by the intensity difference detectors $64_n$ and $64_m$, respectively. This example implements a dispersion compensation of electrical signals, and hence lessens the burden of dispersion compensation of optical signal. By changing the setting for the switching operation of the switch 97, arbitrary encoded codes can be decoded. The delay means 98 can be dispensed with.

[Other Modifications]

In the encoder $11_n$, a filter of the type providing an output A and an complementary output B is used, and the switch 45 is connected to the output side of the filter as indicated by the broken line in FIG. 16, and the switch 45 is controlled by a data sequence $D_n$ to provide the output A or B, depending upon whether the data is the mark ("1") or space ("−1"); thus, the output is provided as a non-return-to-zero signal. In this instance, too, the switch 45 may be connected to the input side of the filter as described previously in respect of FIG. 9. Further, as in the case of adding the broken-line part in FIG. 7, a gain of 3 dB can be obtained.

Figure 28:
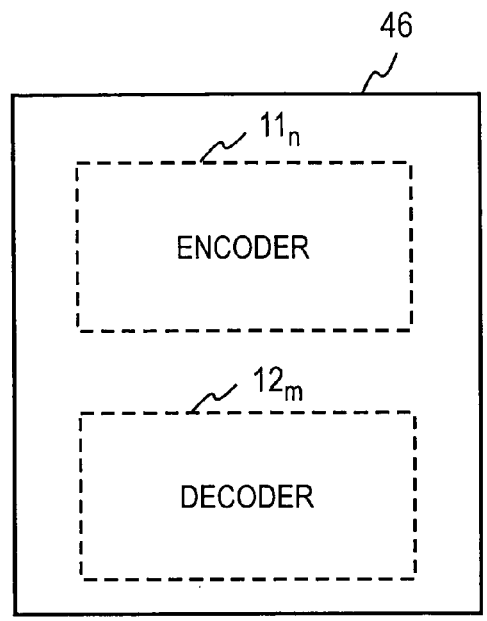
FIG. 28 is a diagram showing an example of an encoder/decoder combination according to Embodiment 2.

As depicted in FIG. 28, a pair of encoder $11_n$ and decoder $12_m$ is integrated on a planar lightwave circuit substrate 46 common to them. The n-th encoding code of the encoder $11_n$ and the m-th decoding code of the decoder $12_m$ are common in the value a but different in the value r in Eq. (7). The pair of encoder $11_n$ and decoder $12_m$ is placed at one end of a communications system and a pair of encoder $11_m$ and decoder $12_n$ is placed at the other end of the communications system. In accordance with the optical frequency of the optical code signal that is received by the decoder $12_m$ of the one communications system, the temperature of the planar lightwave circuit substrate carrying the decoder is adjusted as described previously with reference to FIG. 15. Since the encoder $11_n$ and the decoder $12_m$ are integrated on the same planar lightwave circuit substrate which undergoes a uniform temperature change throughout it, the optical frequencies for filtering by the filters of the encoder $11_n$ and the decoder $12_m$ can be controlled synchronously by the above temperature adjustment. Accordingly, this temperature adjustment makes it possible to lower the cross-correlation between the optical frequency of the n-th optical code signal from the encoder $11_n$ on the temperature-adjusted side, in this example, and the optical frequency of the m-th decoding code of the decoder on the non-temperature-adjusted side. As in the case of FIG. 9 wherein the two encoders $11_n$ and $11_m$ are formed on the same circuit substrate 46, the encoders, which encode optical code signals the cross-correlation between which degrades upon occurrence of individual temperature changes of the encoders, are integrated on the same planar lightwave circuit substrate which undergoes a uniform temperature change throughout it—this suppresses deterioration of the cross-correlation. The temperature of the planar lightwave circuit substrate may be controlled through utilization of the intensity of the light transmitted through the encoder. In the case of using two encoders each of which outputs an optical signal of an optical intensity-frequency characteristic function Cm(f) for the one value of binary data and an optical signal of an optical intensity-frequency characteristic function (1−Cm(f)) for the other value, the above-mentioned temperature adjustment may preferably be made in accordance with the intensity difference between the transmitted light outputs from the both encoders. Furthermore, in the case of using the FIG. 9 structure, the maximum number of system users decreases by half since each user is assigned two encoding codes. With the FIG. 28 structure, however, because of the combined use of the decoder and the encoder, the maximum number of system users does not decrease by half despite the use of the encoding scheme free from interference by reflected light. Though described above as using the same encoded code as that used in Embodiment 1-2, this embodiment can similarly be applied to the Hadamard optical code signals shifted one chip apart in Embodiment 1-3 since the one-chip shift can be suppressed.

Figure 29:
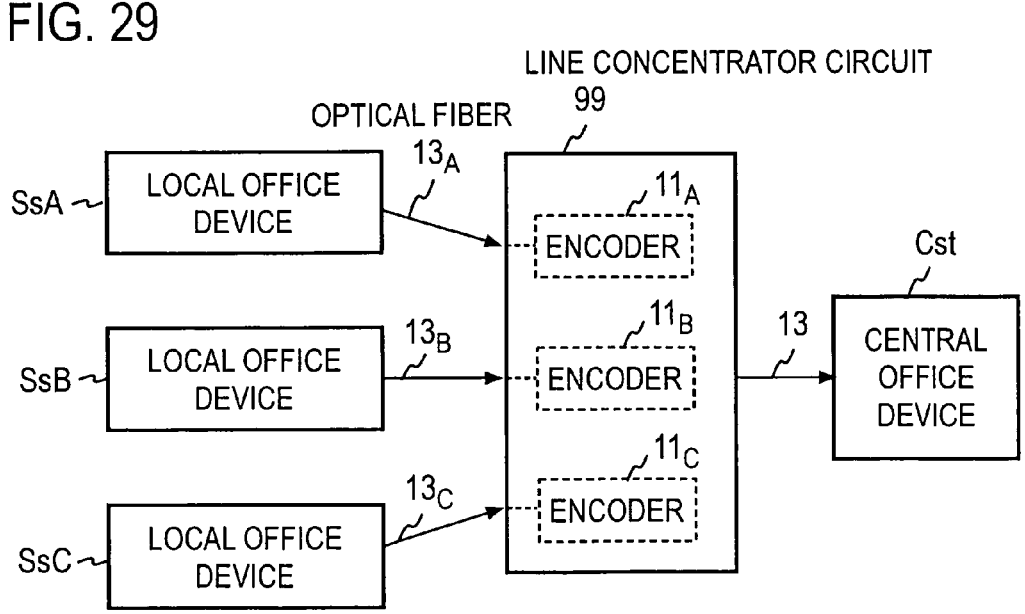
FIG. 29 is a system configuration illustrating an example of the communications system to which the first mode of working is applicable.

Now consider such an optical communications system as shown in FIG. 29, which comprises: a plurality of local office devices; a plurality of optical fibers $13_A$, $13_B$ and $13_C$ for transmitting therethrough signals from the local office devices; a line concentrating circuit 99 for concentrating the signals from the optical fibers $13_A$, $13_B$ and $13_C$ into a single optical fiber 13; and a central office device Cst that receives the concentrated optical signal from the concentrating circuit 99 via the single optical fiber 13. In such a system configuration encoders of the respective local offices are disposed in the concentrating circuit 99 for concentrating the optical signals from the multiple optical fibers into the single fiber 13. That is, this is the same configuration as that depicted in FIG. 3(a). Since the optical signals from all the local office devices can thus be subjected to the same wavelength dispersion irrespective of the distances between the local office devices and the central office device, the same dispersion compensation can be implemented for the optical code signals from the encoders of the respective local office devices. Accordingly, dispersion compensation can be provided for the optical code signals from all the encoders by a single dispersion compensator which makes compensation to level off the optical frequency-dependent delay of the optical fiber 13 connecting the concentrating circuit 99 to the central office device. Because of the centralized disposition of the encoders, the encoding optical frequencies of all the encoders can easily be adjusted at one location.

In the above description, the optical signal from the light source 10 is input to the encoder 11 and is added with the optical frequency characteristic Cn(f) according to the optical filtering frequency characteristic corresponding to the encoding code Cn(f) of the encoder 11, and then the optical signal is turned ON and OFF according to the mark and the space to generate the n-th optical code signal; however, as will be described later on with reference to Embodiment 2-8 of the second mode of working of the present invention, it is also possible to use chip light sources each of which corresponds to one chip forming the encoding code, for example, outputs an optical signal of a single optical frequency. In this instance, those of the chip light sources corresponding to the chips "1" forming the encoded code Cn(f) output optical signals but those chip light sources corresponding to the chips "0" do not output optical signals; that is, the chip light sources responds to the encoding code Cn(f) to provide the optical signals for the mark but not to provide the optical signals for the space.

The encoded code in Embodiment 1-3 has such characteristics as described below. When two arbitrary encoding codes are selected from among different encoding codes of the same code length FCL, they satisfy at least one of the following conditions:

Number of chip positions in chip strings of the first and second encoding codes where their corresponding chips simultaneously go to "1s" is equal to the numbers of chip positions where the first encoding code goes to a "1" and the second encoding code goes to a "−1"; or Number of chip positions where the first and second encoding codes simultaneously go to "−1s" is equal to the numbers of chip positions where the first encoding code goes to a "−1" and the second encoding code goes to a "1"; and they also satisfy the following condition:

Numbers of chips "1" and chips "−1" in a continuous string of chips of the afore-mentioned code length FCL arbitrarily extracted from the concatenated code of a continuous repetition of the encoding codes are equal to each other irrespective of any particular strings of chips; and they also satisfy at least one of the following conditions:

Number of chip positions where first and second continuous strings of chips of the code length FCL, arbitrarily extracted from different concatenated codes of continuous repetitions of two different encoding codes, simultaneously go to "1s" and the chip positions where first chip string goes to a "1" and the second ship string goes to a "−1" are equal to each other; or Number of chip positions where the first and second chip strings simultaneously go to "−1s" and the number of chip positions where the first chip string goes to a "−1" and the second chip string goes to a "1" are equal to each other. And the chips forming the encoding code are sequentially assigned consecutive optical frequencies corresponding to the chip strings.

The source optical frequency width FSR is a natural-number multiple of the code length FCL of each encoding code Cn(f), and the optical frequency region 31 for encoding by each encoder $11_n$, the optical frequency region 32 for decoding by each decoder $12_n$ are both within the optical frequency range from Fst to Fla, where Fla−Fst>FSR. And it is evident that Cn(f)=Cn(f+FCL) holds in FSR in the range from Fla to Fst and that Eq. (13) holds between the code Cn(f) and its complementary code (1−Cn(f)) as follows:

$$\int Cn(f) \cdot Cn(f) df > \int Cn(f) \cdot (1-Cn(f)) df \qquad (14)$$

where $\int df$ represents a definite integral with respect to f in an arbitrary interval FSR in the optical frequency range from Fst to Fla.

It is also clear that Cn(f) bears the relationship of the following equation (15) to the encoding code Cm(f).

$$\int Cn(f) \cdot Cm(f) df = \int Cn(f) \cdot (1-Cm(f)) df \qquad (15)$$

In Embodiment 1-2, as is evident from Eq. (7), it is possible to use, for each Cn(f), r' (typically, r'=2) encoded codes with a=n.

[Second Mode of Working] (Optical Phase·Amplitude Modulation)

The second mode of working of the present invention is intended as a solution to the problems of the prior art through phase modulation and phase or amplitude modulation of a carrier on the optical frequency axis.

Embodiment 2-1

Figure 30:
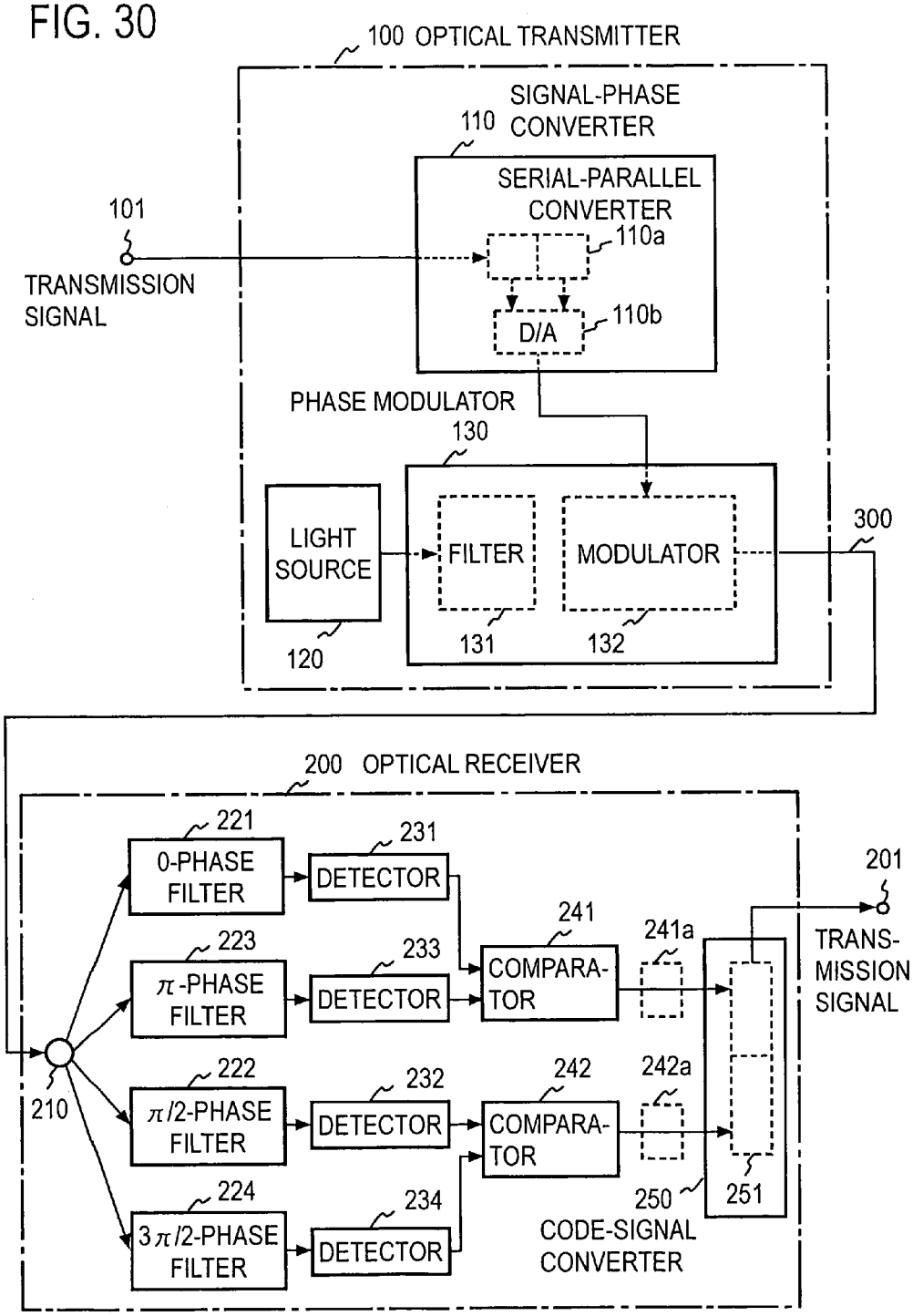
FIG. 30 is a system configuration illustrating an example of the communications system according to Embodiment 2-1 of the second mode of working of the present invention.

FIG. 30 illustrates an optical communications system according to Embodiment 2-1 of the second mode of working of the invention. In an optical transmitter 100 a transmission signal from an input terminal 101, usually a binary data sequence signal, is converted by a signal-phase converter 110 into a phase shift (phase shift value) sequence or modulation phase sequence (hereinafter referred to also as a modulation unit sequence), where the value of phase shift corresponding to every V pieces of data (where V is an integer equal to or greater than 1) is less than one period. An optical signal from a light source 120 is fed to a phase modulation part 130, wherein the phase of a pseudo-carrier on the optical frequency (wavelength) axis starting at a predetermined optical frequency (wavelength) as a reference is shifted to each phase amount from the signal-phase converter 110. The pseudo-carrier will sometimes be referred to simply as a carrier.

The term "pseudo-carrier" corresponds to the term "optical frequency characteristic (function)," "encoded code or decoded code," or "optical filtering frequency characteristic (function)" in other modes of working." Since in the second mode of working of the invention the pseudo-carrier on the optical frequency axis is subjected to a modulation similar to QPSK or QAM modulation for the carrier on the time axis used in radio communications, the term "pseudo-carrier" will be used primarily in the interests of better understanding of the invention.

For example, as shown in FIG. 31, the data sequence is divided into data sets each consisting of V=2 pieces of data, and the data sets are each assigned a different phase shift amount, that is, a phase amount shifted from a reference phase 0 (which will hereinafter refer to the phase shift amount). For example, data sets (0, 0), (0, 1), (1, 0) and (1, 1) are converted to phase amounts 0, π/2, π, 3π/2, respectively, which are less than one period.

Assume that an optical frequency difference from the reference optical frequency fs is a phase f, 400 GHz is one period Λ, and an optical signal that is coded by a function which is obtained, by adding 1 to and dividing by 2, a trigonometric function that means the optical intensity of each optical frequency signal, is the pseudo-carrier. When the phase f is 0, π/2, π, and 3π/2, the optical frequency characteristics become as shown in FIGS. 31(a) to 31(d), respectively; that is, for each π/2 shift of the phase f, the optical frequency shifts by 100 GHz. In FIGS. 31(a) to 31(d) the leftmost diagrams each show the pseudo-carrier in terms of vector on a complex plane, the second from the left the instantaneous phase-intensity characteristic of the pseudo-carrier and the leftmost its optical intensity-frequency characteristic.

Letting an n-multiple of the period Λ of the pseudo-carrier be represented by FSR, that is, FSR=nΛ (where n=1, 2, . . . ), the light source 120 outputs an optical signal of at least the optical frequency width FSR. The output optical signal from the phase modulation part 130 is ((1+cos(2πfn/FSR+Θ)))/2 whose phase shift amount is any one of Θ=0, π/2, π and 3π/2.

In an optical receiver 200 the received light is split by a splitter 210 for input to four filters 221, 222, 223 and 224 corresponding to the phase shift amounts 0, π/2, π and 3π/2, respectively, the intensity of light transmitted through the filters 221, . . . , 224 is detected by detectors 231, . . . , 234. The outputs from the detectors 231, 233 and the outputs from the detectors 232, 234 having detected output light intensities of the filters corresponding to the phase shift amounts displaced one-half period apart, respectively, are subtracted from each other by comparators 241 and 242, respectively. The outputs from the comparators 241 and 242 are converted by a code-signal converter 250 to a data set corresponding to the phase shift amount of the pseudo-carrier, which is output as a decoded data sequence.

FIGS. 32-1 to 32-4 show examples of: the wavelength characteristic of the light source 120 and the intensity-time characteristic of the light source in the case of using a pulse light source; the optical output from the modulation part 130 corresponding to each shift amount Θ (the optical output from the optical transmitter 100); the filtering characteristic of each filter of the receiver 200; the transmission-intensity characteristic of each filter for each phase shift amount; and temporal variations of the detected intensity of each detector. The leftmost column of each diagram shows the output light from the light source 120; it is assumed, in this case, that the optical frequency width of the output light is 400 GHz and that the output optical intensity is flat over its entire wavelength range. The columns second from the left in FIGS. 32-1 to 32-4 show optical frequency characteristics of the output light from the phase modulation part 130 corresponding to the phase shift amounts 0, π/2, π and 3π/2, respectively. The columns third from the left show filtering characteristics of the filters 221, 223, 222 and 224 of the optical receiver, respectively. The columns fourth from the left in FIGS. 32-1 to 32-4 show frequency characteristics of transmitted light through the filters 221, 223, 222 and 224 in the cases where they receive the optical outputs from the modulator depicted in FIGS. 32-1 to 32-4, respectively. The rightmost columns in FIGS. 32-1 to 32-4 show temporal variations of the intensity detected by the detectors 231, . . . , 234, respectively. As shown in FIGS. 32-1 to 32-4, letting the power of the source output light be represented by 1, the detected intensity of the output from the filter, which has a filtering characteristic identical with the optical frequency characteristic of the modulator output light corresponding to the amount of phase shift from the reference in the modulation part 130, is 0.375 (first row in FIG. 32-1 and second row in FIG. 32-2), and the detected intensity of the output from the filter whose filtering characteristic is displaced π apart from the filtering characteristic of the above-mentioned filter is 0.125 (third row in FIG. 32-1 and fourth row in FIG. 32-4), and the output from the comparator that compares the detected intensities is 0.25. On the other hand, the detected intensities of the outputs from the filters, whose filtering characteristics are displaced π/2 and 2π/3 apart from the frequency characteristic of the modulator output light corresponding to the phase shift amount relative to the reference in the modulation part 130, are 0.25 (second and fourth rows in FIG. 32-1 and third and first rows in FIG. 32-2); consequently, the comparator which compares the intensity-detected outputs provides an output 0.

A description will be given below of the output intensity of the comparator in the case of comparing intensities of optical pulses of the transmitted light through the filters, not in the case where the detectors detect transmitted light intensities for each optical frequency component and the comparators compare the detected intensities.

The output light from the phase modulation part 130 is given by the following equation.

$$(1/2\pi) \int ((1+\cos(2\pi f/FSR+\Theta))/2) df \quad (16)$$

where f represents an optical frequency difference from a reference optical frequency, and n=1.

(1) In the case of the comparator output corresponding to the filters which have a filtering characteristic identical with the optical frequency characteristic of the phase modulator output light corresponding to the phase shift amount of the input to the phase modulation part 130:

$$(1/2\pi)\int((1+\cos(2\pi f/FSR+\Theta))/2)((1+\cos(2\pi f/FSR+\Theta))/2)df - (1/2\pi)\int((1+\cos(2\pi f/FSR+\Theta))/2)((1+\cos(2\pi f/FSR+\Theta+\pi))/2)df = 1/8\pi)\int(1+\cos 2(2\pi f/FSR+\Theta))+2\cos(2\pi f/FSR+\Theta))df = 0.25 \quad (17)$$

The first and second terms on the left side correspond, for example, to the output from the detector 231 and the output from the detector 233, respectively.

(2) In the case of the comparator output corresponding to the filters which have a filtering characteristic phase π/2 apart from the optical frequency characteristic of the phase modulator output light corresponding to the phase shift amount of the input to the phase modulation part 130:

$$(1/2\pi)\int((1+\cos(2\pi f/FSR+\Theta))/2)((1+\cos(2\pi f/FSR+\Theta+\pi/2))/2)df \quad (18)$$

$$-(1/2\pi)\int((1+\cos(2\pi f/FSR+\Theta))/2)((1+\cos(2\pi f/FSR+\Theta-\pi/2))/2)df = (1/8\pi)\int(-2\sin(2\pi f/FSR+\Theta)+\sin 2(2\pi f/FSR+\Theta))df=0 \quad (19)$$

In this embodiment the number M of the phase shift amounts (phase shift values) possible for the pseudo-carrier is an even number 4, and since these phase shift amounts (phase shift values) are sequentially displaced π/2 apart, the receiving side uses filters of the same number as M, but in the case where the phase shift amounts (values) that the pseudo-carrier is allowed to take are not displaced π apart, the receiving side uses filters of the same characteristics as those of the output light of the phase shift amounts (values) that the pseudo-carrier is allowed to take and filters of characteristics phased the half period (π) apart from the output light of the phase shift amounts (values) that the pseudo-carrier is allowed to take. Accordingly, the optical receiver 200 requires 2M filters and comparators of the same number as M. In this instance, the value M is arbitrary, but the phase shift amounts (phase shift values) of the carrier by the phase modulation part 130 needs to be phase shift amounts (phase shift values) which differ in the remainder Δ of the trigonometric function over one period for each of them.

This embodiment has been described on the assumption that the optical frequency characteristic of the output light from the light source 120 is flat, but when it is not flat, for example, Gaussian, the transmitting-side phase modulation part or the receiving-side filters, comparators or detectors need only to assign weights to their outputs so as to level off intensity at each optical frequency.

While in this embodiment the invention has been described above as using a combination of the single optical transmitter 100 and the optical receiver 200, the invention is applicable as well to the case where other optical transmitter and optical receiver share the same optical transmission line 300, in which case the following settings are made.

1) Where the reference optical frequency fs in the optical transmitter is displaced FSR or more: FSR and the phase shift amounts (phase shift values) are both arbitrary.

2) Where the reference optical frequency fs in the optical transmitter is displaced less than FSR: The optical frequency of the light source 120 that is used in the same FSR is the same, and the filters ought to continuously filter not only the optical frequency of the optical transmitter own FSR but also the optical frequencies used by the other optical transmitters which share the same optical transmission line. The value, FSR/n, of the carrier period is different for each optical transmitter. When the period FSR/n is common to all the optical transmitters, letting the number of phase shift amounts (shift values) for modulation by the phase modulation part 130 be represented by M inclusive of the 0-phase, the value of addition of FSR/n/M to the reference optical frequency fs ought to be unique to every optical transmitter. However, when different sets of optical transmitters and receivers use the same value n, only those optical frequency signals displaced a quarter period apart are orthogonal to each other, and consequently, M is 4, whereas those optical frequency signals displaced a half period apart are used by the optical transmitter and receiver of the same set.

In the case of 1), when the reference optical frequencies fs for use in multiple optical transmitters are displaced FSR or more apart, different optical frequencies are used, so no interference occurs between carriers, irrespective of the pseudo-carrier.

In the case of 2), when the multiple optical transmitters use the same reference optical frequency fs, they use the same optical frequency. However, since the frequency of the pseudo-carrier used by each optical transmitter is a natural-number fraction of FSR, the integration value of their scalar product over an interval FSR is zero and they are orthogonal to each other, incurring no interference between the carriers.

When the multiple optical transmitters use different reference optical frequencies fs displaced less than FSR apart, since the functions of the carriers are periodic functions within FSR, use is made of filters which modulate optical frequencies outside FSR with the same function as that for the pseudo-carrier, and if the optical frequencies of light sources are substantially equal, the integration value of their scalar product is zero and they are orthogonal to each other, incurring no interference between the carriers.

The phase modulation part 130 for use in this embodiment comprises, as shown in FIG. 30, a filter 131 and a modulator 132 for changing its filtering characteristic.

Figure 33:
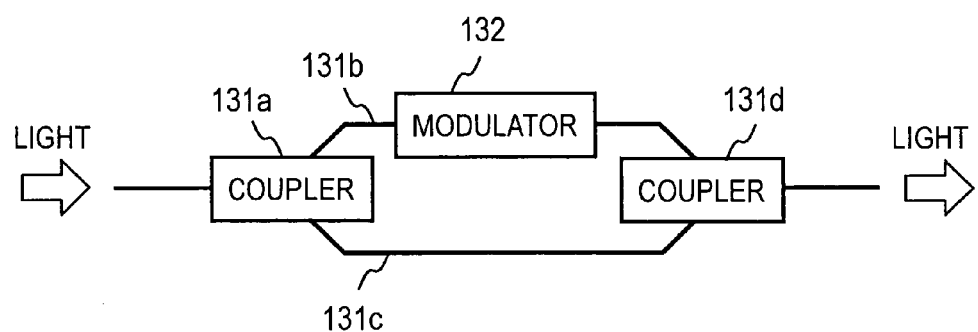
FIG. 33 is a diagram illustrating an example of a phase modulation part 130 in FIG. 30.

FIG. 33 illustrates an example of the configuration of the filter 131. A Mach-Zehnder interferometer is used which divides the input light by a coupler 131a into two optical signals for input to two optical paths 131b and 131c having a predetermined path length difference and combines the optical signals again by a coupler 131d, and the modulator 132 is one that is inserted in the one optical path 131b of the Mach-Zehnder interferometer to change the path length difference between the two optical paths. The optical signals having passed through the optical paths 131b and 131c interfere with each other in the coupler 131d, which outputs components spaced apart the optical frequency corresponding to the path difference. The optical frequency characteristic of the output light is periodic; therefore, assuming that the frequency difference between the optical outputs is 100 GHz, for instance, there will be obtained the filtering characteristic shown in the rightmost column of FIG. 31(a). With the use of the filter 131 which periodically filters optical frequencies like Mach-Zehnder interferometer, it is possible to eliminate interference even if multiple optical transmitters use different reference optical frequencies fs displaced each other less than FSR apart.

To change the path length, the optical paths are integrated on a planar lightwave circuit substrate as shown in FIG. 9, and a phase shift amount signal from the signal-phase converter 110 is applied to the electrode 49 to change the delay amount of the optical path associated with the electrode. In this instance, the filter 131 and the modulator 132 are not series-connected but instead they are integrally formed with each other. That is, the modulator 132 is incorporated into the filter 131.

The signal-phase converter 110 in the optical transmitter 100 is configured, for example, as shown in FIG. 30, in which the data sequence from the input terminal 101 is converted by a serial-parallel converter 110a to two sequences, the two pieces of data of the two data sequences from the serial-parallel converter 110a are converted by a D/A converter 110b to digital values 0, 1, 2 and 3 corresponding to combinations of the input data (0, 0), (0, 1), (1, 0) and (1, 1), respectively, and voltages corresponding to these values are applied to the electrode 49 in FIG. 9. In accordance with the applied voltage values the phase of the pseudo-carrier of the output light from the phase modulation part 130 varies as shown in FIGS. 31(a) to 31(d).

The filter 131 in the optical transmitter 100 filters light from the light source 120 at least over the optical frequency width FSR, and the filtering characteristic, that is, the transmittance (optical intensity)-optical frequency characteristic is such that when the optical frequency difference from the reference optical frequency fs is used as phase, the transmittance (optical intensity) in each phase conforms to a function obtained, by adding 1 to and dividing by 2, a trigonometric function indicating the period obtained by dividing FSR by a natural number n.

A code signal converter 250 in the optical receiver 200 is configured, for example, as depicted in FIG. 1, in which outputs 0 or 1 from the comparators 241 and 242 are input in parallel to a parallel-serial converter 251, from which they are output as a single sequence of data signals to an output terminal 201. Thus, the transmission signal input to the input terminal 101 of the optical transmitter 100 is regenerated and output to the output terminal 201.

As described above, according to Embodiment 2-1, in order to emulate positive- or negative-polarized uncorrelated carriers by non-polarized intensity modulation which is a part of a repetition of a desired frequency period on the optical frequency axis, use is made of broadband light of an optical frequency width which is a natural-number of multiple of the pseudo-carrier period and a differential detection is conducted on the receiving side to inhibit the input thereto of pseudo-carriers other than those to be received; thus, even if light of the same optical frequency is used, the correlation between pseudo-carriers is eliminated which is attributable to trigonometric functions that are not orthogonal to each other in a finite optical frequency width, the uncorrelated pseudo-carriers are emulated, and the emulated pseudo-carriers are phase-modulated—this permits implementation of MPSK with control accuracy lower than that on the order of the wavelength of light. It will be described later on that the second mode of working of the invention is basically common in technical idea to the first mode of working.

Embodiment 2-2

Figure 34:
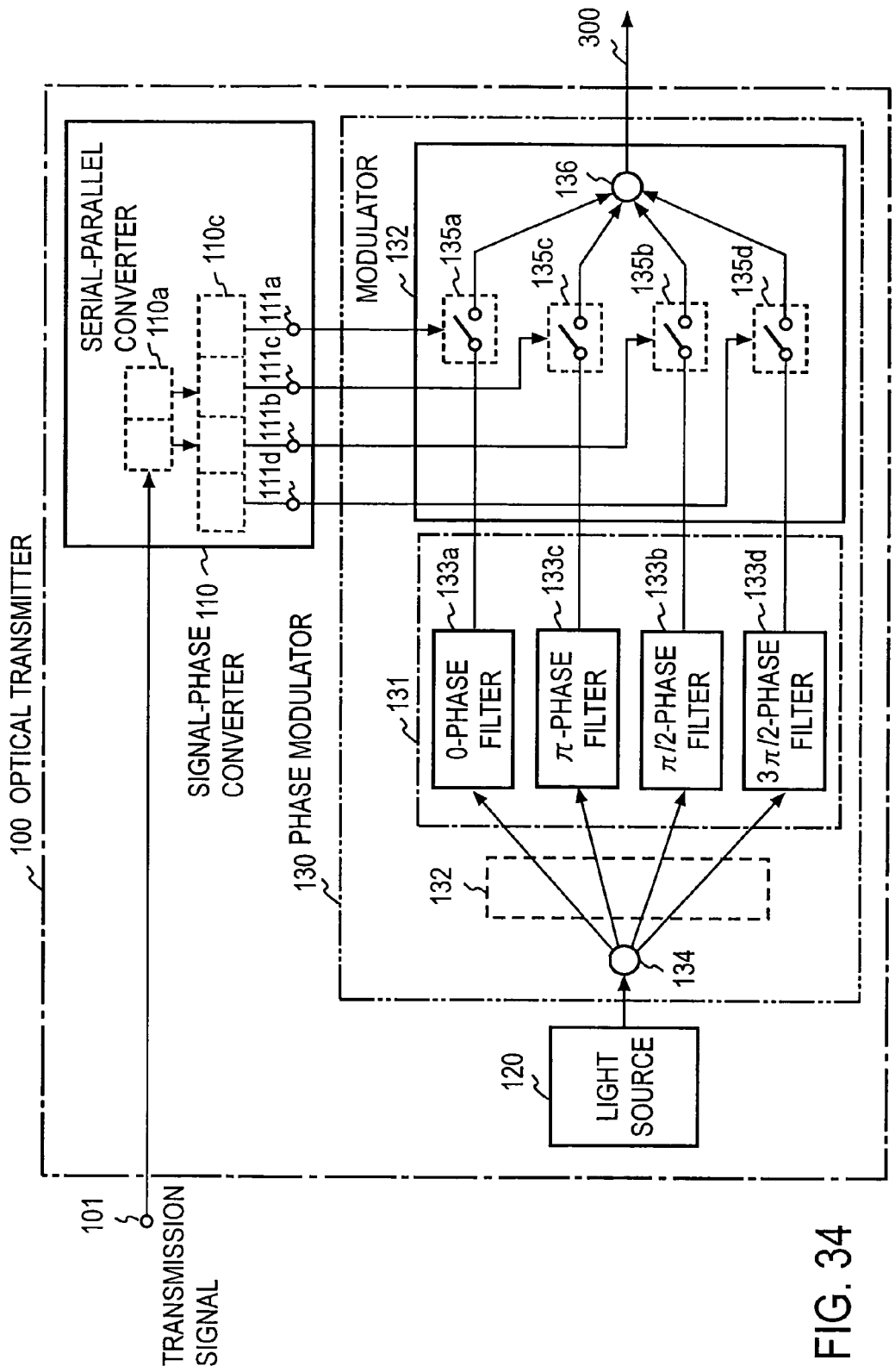
FIG. 34 is a diagram illustrating an example of an optical transmitter in Embodiment 2-2.

In Embodiment 2-1, the modulator 132 of the phase modulation part 130 controls the phase of the pseudo-carrier of light filtered or to be filtered by the filter 131. According to Embodiment 2-2, for example, as shown in FIG. 34, the phase modulator is provided with a plurality of filters 133a, 133b, 133c and 133d each of which filters the optical frequency corresponding to the phase shift amount (value) that is the amount of modulation, and the light from the light source 120 is input via a splitter 134 to the filters 133a to 133d. The optical outputs from the filters 133a to 133d are selected and output by the modulator 132 in accordance with the modulation phase amount (value). For example, the filters 133a to 133d have the filtering characteristics that the carrier phases are 0, π/2, π, and 3 π/2 as shown in FIGS. 31(a) to 31(d), respectively, and the optical outputs from the filters 133a to 133d are input to optical switches 135a to 135d which form the modulator 132. In the signal-phase converter 110, the two pieces of data output from the serial-parallel converter 110a are decoded by a decoder 110c, which provides outputs at its output terminals 111a, 111b, 111c and 111d corresponding to the data sets (0, 0), (0, 1), (1, 0) and (1, 1), respectively, and by the output at each of the output terminals 111a to 111d the corresponding one of the switches 135a to 135d is turned ON. The optical outputs from the switches 135a to 135d are provided via a combiner 136 to the transmission line 300.

As indicated by the broken line in FIG. 34, the switches 135a to 135d of the modulator 132 may be disposed between the splitter 134 and the filters 133a to 133d to combine the transmitted outputs from the filters 133a to 133d by the combiner 136. Both the splitting stage and the combining stage may be incorporated into the modulator 132 which inputs the light from the light source only to a selected one of the filters and transmits the light from the selected filter.

Unlike Embodiment 2-1, Embodiment 2-2 eliminates the need for selecting the material which allows switching of the optical path length difference in a time to modulate. Incidentally, the optical receiver 200 may be one that is shown in FIG. 30. While in the above this embodiment has been described in connection with the case where the number M of phase shift amounts (values) possible for the pseudo-carrier is 4, the number M may be arbitrary.

Embodiment 2-3

Figure 35A:
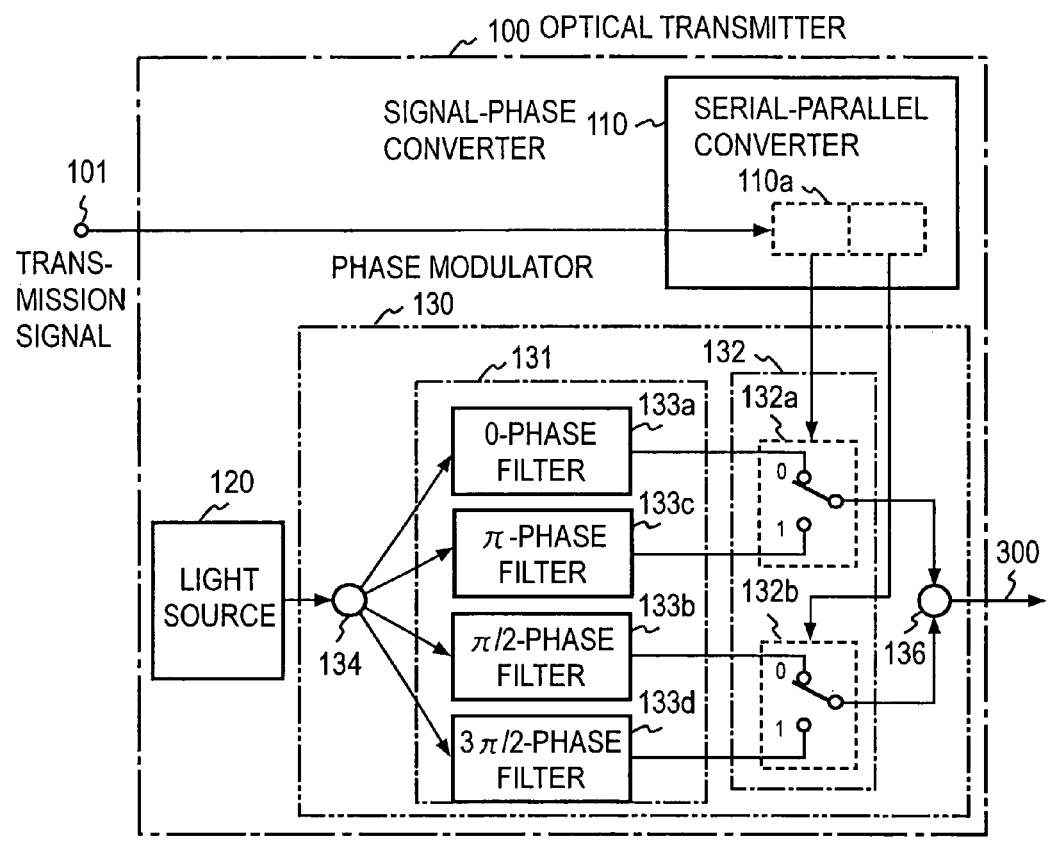
FIG. 35($a$) is a diagram showing an example of an optical transmitter in Embodiment 2-3, and FIG. 35($b$) a diagram showing an example of a modified form of a modulator 132 in FIG. 35($a$)

In Embodiment 2-3 a set of two pseudo-carriers displaced π apart in phase and a different set of pseudo-carriers displaced π/2 apart in phase are made to correspond to two sets of data of the transmission signal. FIG. 35(a) shows an example of the optical transmitter according to Embodiment 2-3. The conditions for the light source 120 and the filters are the same as those in Embodiments 2-1 and 2-2. The filtering characteristics of two filters of each set are displaced π apart in phase, that is, their transmitted optical frequencies are displaced FSR/2/n apart. Letting the pseudo-carrier for use in this embodiment be identified as an i-th carrier and setting $2\pi f = \Theta$, characteristic functions of the respective sets are $Ci(\Theta)$ or $Ci(\Theta+\pi)$ and $Ci(\Theta+\pi/2)$ or $Ci(\Theta+3\pi/2)$, and assuming that $\int d\Theta$ is a definite integral over the interval FSR, the following equations hold.

$$\int Ci(\Theta)(Ci(\Theta+\pi/2)-Ci'(\Theta+\pi/2))d\Theta = \int Ci(\Theta)(Ci(\Theta+3\pi/2)-Ci'(\Theta+\pi/2))d\Theta = 0 \qquad (20)$$

$$\int Ci(\Theta)(Ci(\Theta)-Ci(\Theta))d\Theta = \int Ci(\Theta+\pi(Ci(\Theta+\pi)-Ci'(\Theta+\pi))d\Theta \qquad (21)$$

Figures 36A, 36B:
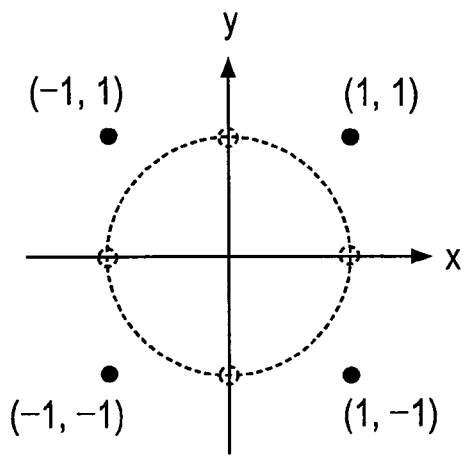
FIG. 36($a$) is a diagram showing signal points on the coordinates in QPSK, and FIG. 36($b$) is a table showing the relationships of a data set, a coordinate point and a filter-selecting phase.

FIG. 36(a) shows QPSK signal points (coordinate points) on a complex coordinates, and FIG. 36(b) shows, by way of example, signal data sets, coordinate points and sets of select filtering phases in the case of emulating QPSK. In this instance, the number of sets M/2=2, the phase shifts of the one data set are 0 and π, and the phase shifts of the other data set are π2 and 3π/2, and their coordinate points are shown on a unit circle in FIG. 36(a). 0 and π in the data set of phase shifts 0 and π correspond to 1 and −1 on the x-axis, respectively, whereas π/2 and 3π/2 in the data set of phase shifts π/2 and 3π/2 correspond to 1 and −1 on the y-axis, respectively. The coordinate points are indicated in the parentheses with the x-axis values at the left-hand side and the y-axis values at the right-hand side.

The phase modulation part 130 outputs light of the pseudo-carrier of the 0-phase shift or π-phase shift corresponding to one bit of the two-bit data set, in the example of FIG. 36(b), the high-order bit (data) a 0 or 1 and outputs light of the pseudo-carrier of the π/2-phase shift or 3π/2-phase shift corresponding to the low-order bit (data) a 0 or 1. That is, it can be said that the output from the phase modulation part is an optical code signal indicating the combination codes of the two pieces of data in the data sequence for each modulation unit of the pseudo-carrier light output from the phase modulation part.

In the example of FIG. 35(a), as is the case with FIG. 34, filters 133a to 133d are provided each corresponding to one of the pseudo-carriers; the 0-phase filter 133a and the π-phase filter 133c are combined, and the π/2-phase filter 133b and the 3π/2-phase filter 133d are combined. Switches are provided as modulators 132a and 132b, and the switch as the modulator 132a is controlled by the high-order bit of the serial-parallel converter 110a of the signal-phase converter 110; the switch as the modulator 132a is connected to the 0-phase filter 133a or π-phase filter 133c, depending on whether the high-order bit (data) is a "0" or "1." The switch as the modulator 132b is controlled by the low-order bit (data) of the serial-parallel converter 110a in such a manner that the switch is connected to the π/2-phase filter 133b or 3π/2-phase filter 133d, depending on whether the low-order bit is a "0" or "1." The transmitted light through the filters selectively switched by the switches as the modulators 132a and 132b is output via the combiner 136 to the optical transmission line 300.

That is, the input data sequence from the terminal 101 is applied to the serial-parallel conversion part (hereinafter referred to as a sequence converting part) 110a, wherein it is sequentially separated into first data sequence (a low-order bit sequence) and a second data sequence (a high-order bit sequence); a modulation part 132b and a modulation part 132a are controlled according to values of respective pieces of data of the first and second separate data sequences to outputs optical code signals of pseudo-carriers (optical intensity-frequency characteristics) corresponding to the data values, respectively, and these optical code signals are combined into an output optical code signal.

Figure 35B:
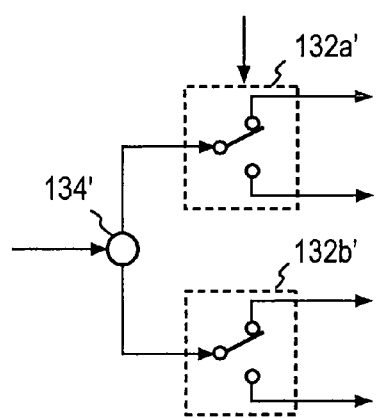

The modulators 132a and 132b may be adapted to select the filter to which light is input. For example, as shown in FIG. 35(b), the light emitted from the light source 120 is split by a splitter 134 into two, the one splitter of which is selectively fed into the 0-phase filter 133a or π-phase filter 133c via a switch serving as a modulator 132a, and the other of which is selectively fed into to the π/2-phase modulator 132b or 3π/2-phase modulator 132d via a switch serving as a modulator 132b, and the optical outputs from the filters 133a to 133d are provided via the combiner 136 to the optical transmission line 300. On both of the input and output sides of the filters 133a to 133c modulators may be disposed as switches, permitting the passage of light from the light source through only a selected one of the modulators.

The optical receiver corresponding to this embodiment may be of the same configuration as shown in FIG. 30. In such an instance, however, since the comparators 241 and 242 output +1s or −1s, converting parts 241a and 242a are used in the optical transmitter 200, as indicated by the broken lines in FIG. 30, to convert −1s to 0s, which are provided to the code converter 250. It will be easily understood that the code converter 250 thus provides the same signal sequence as the input transmission signal sequence to the optical transmitter 100.

In this way, QPSK can be implemented with a lower degree of control accuracy on the order of optical wavelength.

Embodiment 2-4

Embodiment 2-4 emulates 16-QAM by use of pseudo-carriers. In this embodiment, two sets of pseudo-carriers, each consisting of two pseudo-carriers displaced half a period (π) apart in phase, are used to emulate light from the light source according to 16 kinds of data sets in this example, the pseudo-carriers of the one and the other set are phased a quarter period (π/2) apart and orthogonal to each other, and optical signals with these four pseudo-carriers of light intensities (amplitudes) having either one of two values are combined and transmitted.

Figures 1, 37:
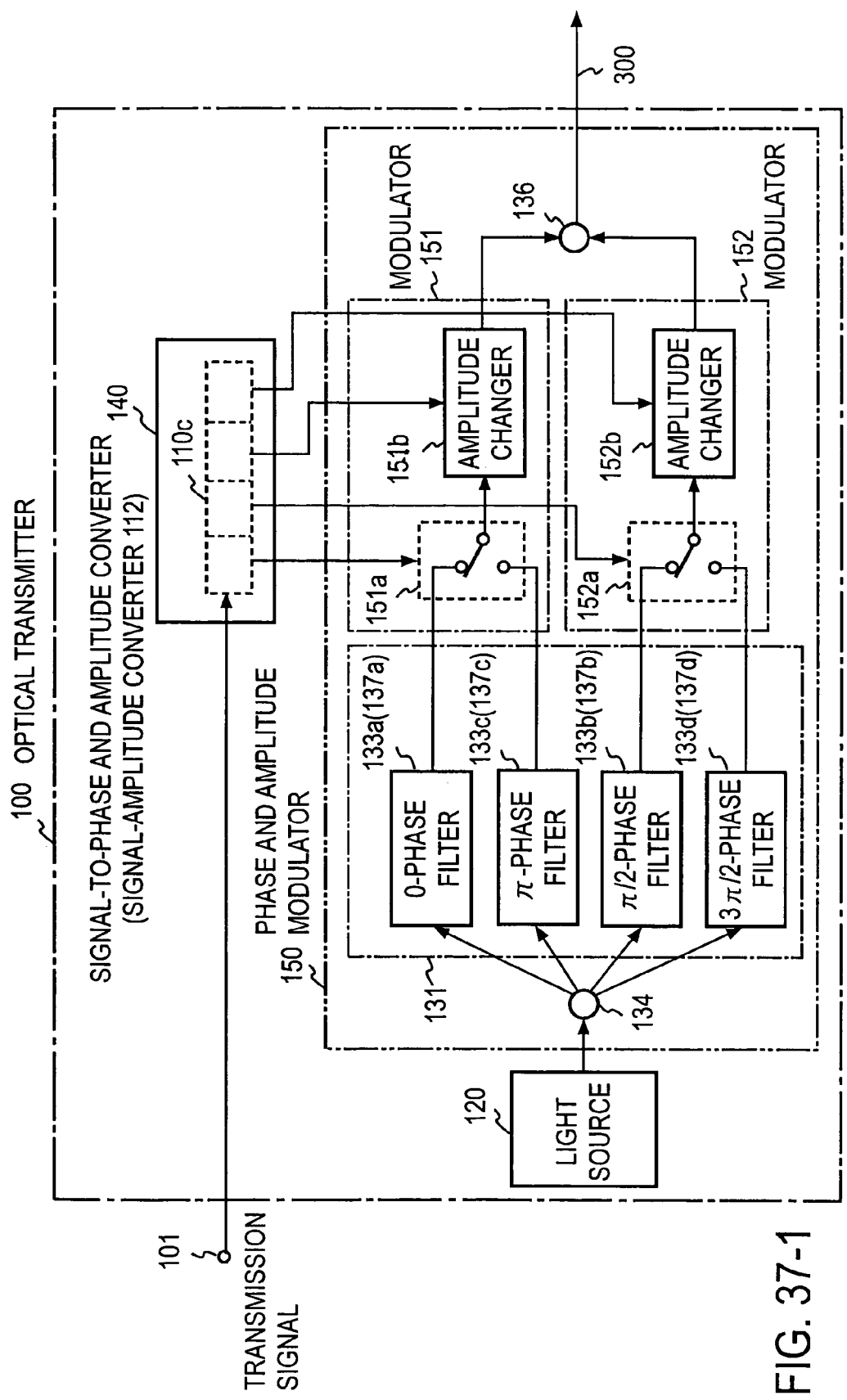
Figures 2, 37:
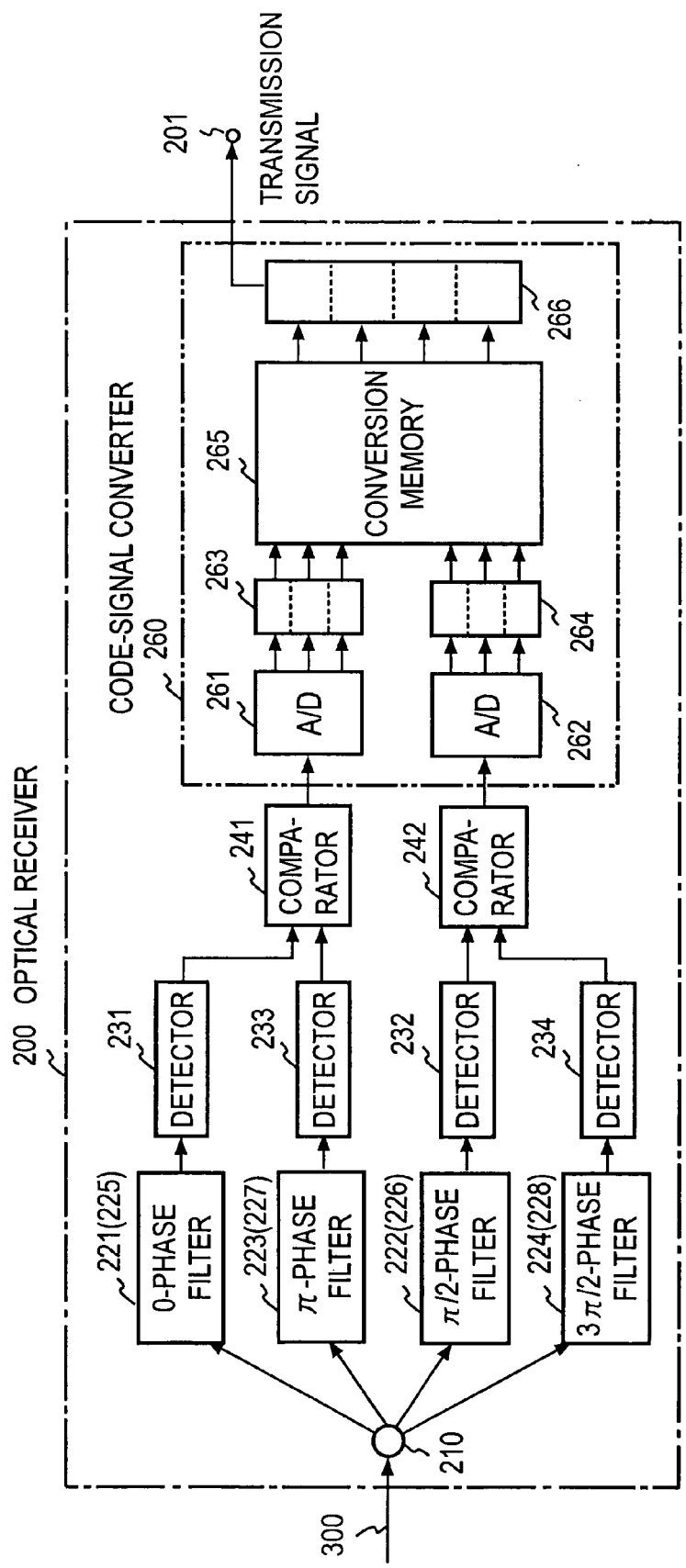

FIGS. 37-1 and 37-2 illustrate examples of embodiment 2-4. The optical transmitter 100 shown in FIG. 37-1 uses four filters 133a to 133d for generating 0-, π/2-, π- and 3π/2-phase pseudo-carriers. The conditions for the light source 120 and the filters 133a to 133d are the same as in the case of Embodiment 2-3.

Figures 38A, 38B:
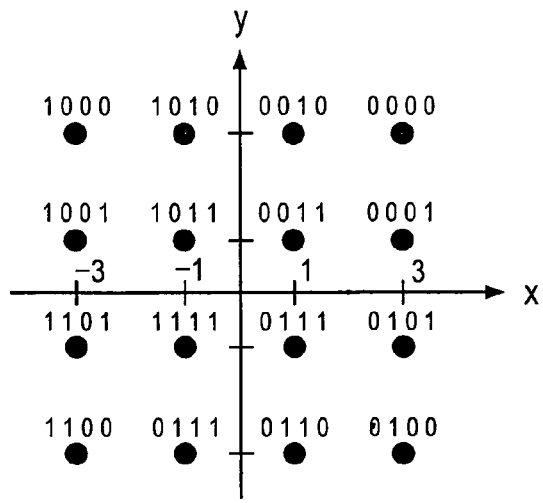
FIG. 38($a$) is a diagram showing signal points on the coordinates in QPSK, and FIG. 38($b$) is a table showing the relationships of a data set, the filter-selecting phase and intensity to outputs from comparators 241 and 242.

FIG. 38(a) shows signal points (coordinate points) and data sets on the coordinates (the x-axis representing the real part and the y-axis the imaginary part) in th case of 16QAM, and FIG. 38(b) shows the relationships of phase shifts and light intensities (amplitudes) of the pseudo-carriers to the respective data sets. For example, in the case where the data set is (0000), light of a pseudo-carrier of 0-phase shift and optical intensity 3 and light of π/2-phase shift and intensity 3 are output to the transmission line 300, and in the case of the data set (0101), light of a pseudo-carrier of 0-phase shift and optical intensity 3 and light of 3π/2-phase shift and intensity 1 are output to the transmission line 300. The transmission signal sequence from the terminal 101 is converted every four data sets by a signal-to-phase and amplitude converter 140 to the phase and amplitude information indicating the phase shift and the amplitude in FIG. 38(b), and the light from the light source 120 is modulated by a phase and amplitude modulating part 150 to two optical signals of the pseudo-carrier phases and intensities corresponding to the above-mentioned phase and amplitude information, which optical signals are output to the optical transmission line 300.

In the signal-to-phase and amplitude converter 140, the input transmission signal sequence is divided, for example, by a serial-parallel converter 110c, into four signal sequences. The phase-amplitude modulating part 150 is, in this embodiment, formed by filters 133a, 133b, 133c and 133d for the pseudo-carriers of phase shifts 0, π/2, π, 3π/2, respectively, two modulators 151, 152, and a combiner 136. Upon each output of a 4-bit (data) set consisting of four bits (data) extracted one by one from the four signal sequences output from the serial-parallel converter 110b, the switch 151a in the modulator 151 is controlled by the high-order (leftmost in FIG. 38(b)) data of the 4-data set; the switch 151a is connected to the 0-phase filter 133a or π-phase filter 133c, depending on whether the data is 0 or 1; and the output light from the switch 151a is provided to the combiner 136 via an amplitude changing part 151b wherein the intensity of the output light is controlled by the third high-order data of the data set to go to a 3 or 1, depending on whether the data is a 0 or 1. In the modulator 152 the switch 152a is connected to the π/2-phase filter 133b or 3π/2-phase filter 133d, depending on whether the second high-order data of the 4-data set is a 0 or 1, and the output light from the switch 152a is provided to the combiner 136 via an amplitude changing part 152b wherein the intensity of the output light is controlled by the low-order data of the 4-bit data set to go to a 3 or 1, depending on whether the data is a 0 or 3.

That is, the input data sequence from the terminal 101 is sequentially separated by the serial-parallel converting part (hereinafter referred to as a sequence converting part) 110c into first to fourth separate data sequences: the phase modulation part 152a is controlled according to the value of each piece of data of the third separate data sequence, the phase modulation part 151a is controlled according to the value of each piece of data of the fourth separate data sequence, the amplitude changing part 152b is controlled according to the value of each piece of data of the first separate data sequence, and the amplitude changing part 151b is controlled according to the value of each piece of data of the second separate data sequence.

Figure 39:
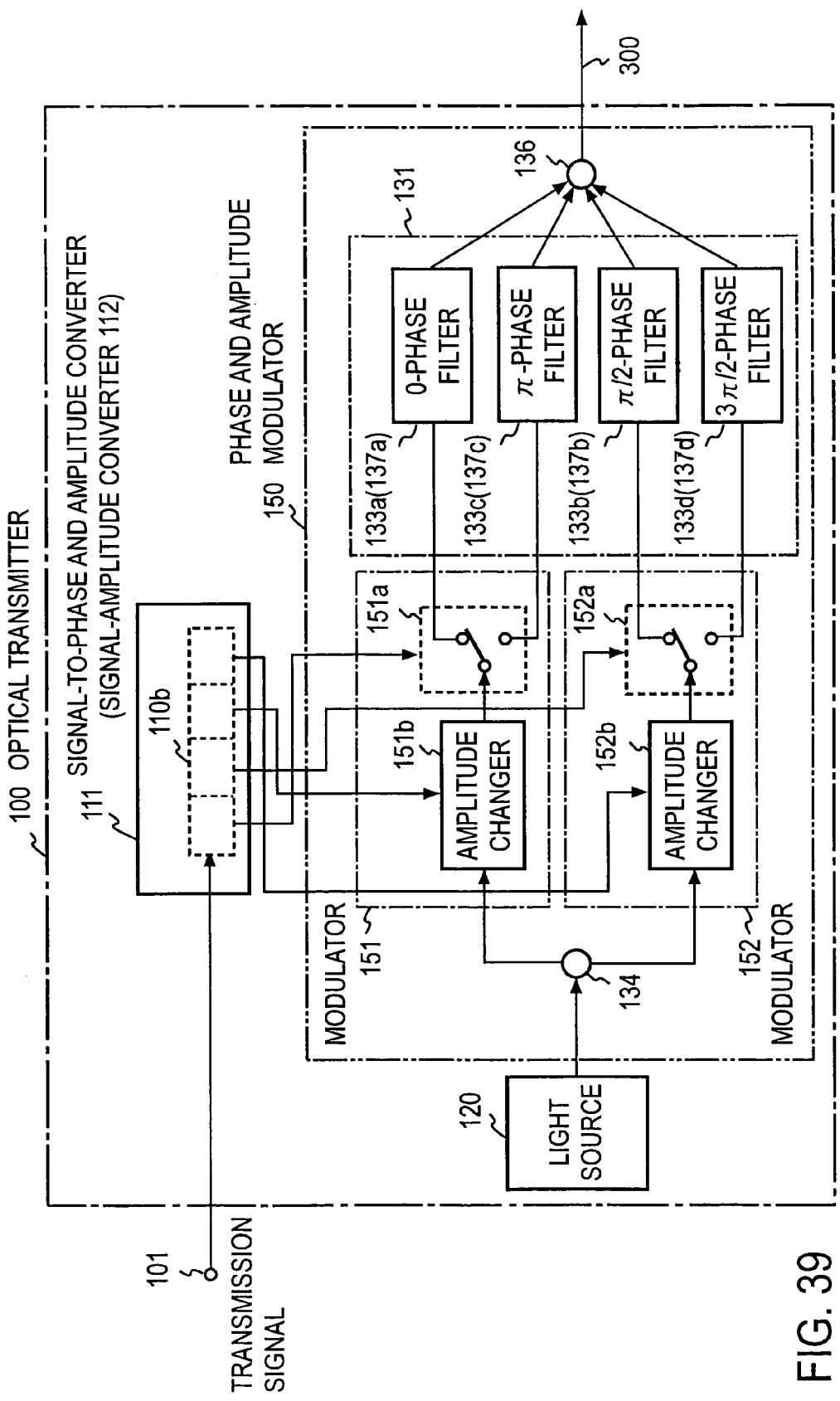
FIG. 39 is a diagram illustrating another example of the optical transmitter for use in Embodiment 2-4.

The modulators 151 and 152 may also be inserted between the light source 120 and the filters 133a to 133d as depicted in FIG. 39. In this instance, the light from the light source 120 is split by the splitter 134 into two, one of which is input first to the modulator 151, wherein its intensity is controlled by the amplitude changing part 151b to go to a 3 or 1 according to the third high-order data, and the thus intensity-controlled light is output via the switch 151a to the 0-phase filter 133a or π-phase filter 133b according to the highest-order data. The other split light from the splitter 134 is input first to the modulator 152, wherein its intensity is controlled by the amplitude changing part 152b to go to a 3 or 1 according to the lowest-order data, and the thus intensity-controlled light is output via the switch 152a to π/2-phase filter 133b or 3π/2-phase filter according to the second high-order data.

It is also possible to intensity-control the optical inputs to the two sets of filters by the amplitude changing parts 151b and 152b according to the third high-order data and the lowest-order data, respectively, and select the filters of the two sets of filters by the switches 151a and 152a according to the highest-order data and the second high-order data, respectively. Alternatively, it is possible to input the light from the light source to either one of the two filters of each set and intensity-control the optical outputs from the filters of the two sets by the amplitude changing parts 151b and 152b, respectively.

The optical receiver 200 uses, as shown in FIG. 37-2, the same filters 221-224, detectors 231 to 234 and comparators 241, 242 as those shown in FIG. 30, but uses, as a substitute for the code signal converter 250, a code signal converter (data generating means) 260 of the type that converts the outputs from the comparators 241 and 242 to a set of four pieces of data corresponding to two levels (intensities) including polarities (positive and negative), that is, four levels, and outputs these data in serial form. In other words, the comparators 241 and 242 each outputs any one of 3, 1, −1 and −3 shown in FIG. 38(b); and a data set shown in FIG. 38(b) is provided corresponding to such a combination of the outputs.

In such a code signal converter 260, for instance, as depicted in the optical transmitter of FIG. 37-2, the outputs from the comparators 241 and 242 are converted by A/D converters 262 and 262 to 3-bit digital values each containing a sign (code); these 3-bit (a total of 6 bits) digital values are used as addresses to read a conversion memory 265 to obtain therefrom a data set of such four corresponding bits as depicted in FIG. 38(b), and the output data set is converted by a parallel-serial converter (data generating means) 266 to serial data, which is provided to an output terminal 201. Incidentally, let it be assumed that the relationships between the addresses thereto and the data to be read out thereof are prestored in the conversion memory 265 in such a manner as to obtain the relationships between the comparator outputs and the data sets shown in FIG. 38(b).

As described above, according to Embodiment 2-4, as is the case with Embodiment 2-1, in order to emulate positive- or negative-polarized uncorrelated carriers by non-polarized intensity modulation which is a part of a repetition of a desired frequency period on the optical frequency axis, use is made of broadband light of an optical frequency width which is a natural-number multiple of the pseudo-carrier period and a differential detection is conducted on the receiving side to inhibit the input thereto of pseudo-carriers other than those to be received; thus, even if light of the same optical frequency is used, the correlation between pseudo-carriers is eliminated which is attributable to trigonometric functions that are not orthogonal to each other in a finite optical frequency width, the uncorrelated pseudo-carriers are emulated, then the simulated pseudo-carriers are phase-modulated, then multiple pseudo-carriers which are orthogonal to each other are intensity-modulated with the half period and transmitted at the same time—this permits implementation of QAM with control accuracy lower than that on the order of the wavelength of light.

Embodiment 2-5

Figure 40:
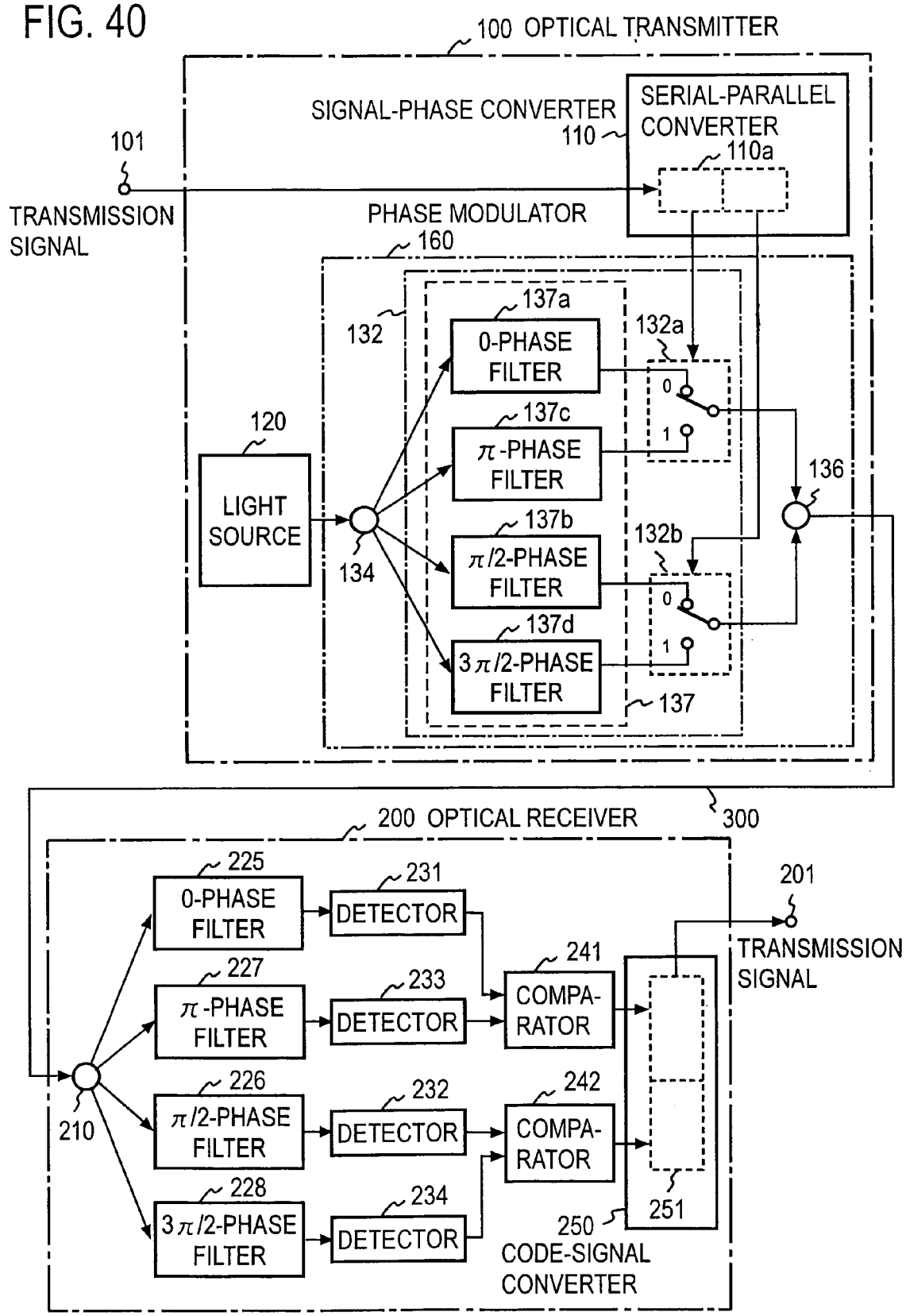
FIG. 40 is a system configuration illustrating an example of a communications system according to Embodiment 2-5.
Figure 41A:
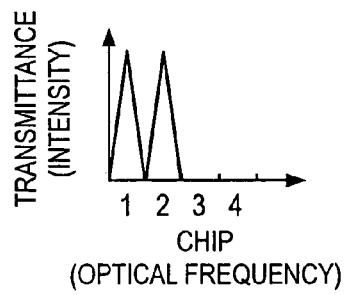
FIG. 41 shows examples of filtering characteristics in Embodiment 2-5, FIGS. 41($a$), 41($b$), 41($c$) and 41($d$) showing the characteristics in the cases of where the phase is 0, $\pi/2$, $\pi$ and $3\pi/2$, respectively.
Figure 41B:
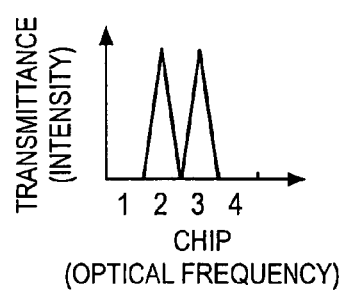
Figure 41C:
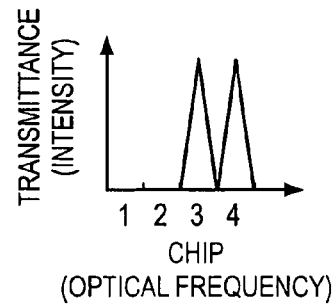
Figure 41D:
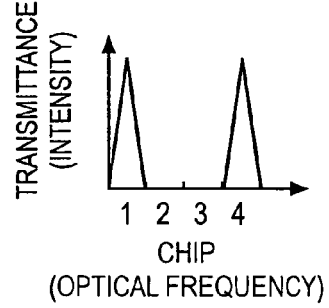

While the above-described embodiment uses the pseudo-carriers that vary in an analog fashion on the optical frequency axis, but Embodiment 2-5 uses pseudo-carriers that are turned on and off in a digital fashion on the optical frequency axis. The optical transmitter 100 includes, as shown in FIG. 40, the signal phase-amplitude converter 110 and the phase modulation part 160 made up of the filter 137 which divides the light from the light source 120 into multiple chips on the optical frequency (wavelength) axis and selectively transmits them, and the modulator 132.

Let FSR represent the optical frequency width of the light from the light source 120.

The filter 137 receives the light from the light source 120, filters the light from the light source 120 which has the optical frequency width FSR, then divides on the optical frequency axis the light of the frequency width FSR from the light source into L (a multiple of 4) chips, and selectively transmits them. The selection of chips that are allowed to pass through the filter is mapped into phase values as described below. Now, let the divider of L/4 be represented by S. FIG. 41 shows examples of filtering characteristics.

0-phase filter 137a: Filter by repeatedly turning ON (pass) consecutive 2S chips and OFF (interrupt) the next 2S chips until L is reached.

π/2-phase filter 137b: Filter by repeatedly turning OFF (interrupt) consecutive S chips, then ON (pass) the next 2S chips, and OFF (interrupt) the next S chip until L is reached.

π-phase filter 137c: Filter by repeatedly turning OFF (interrupt) consecutive 2S chips and ON (pass) the next 2S chips until L is reached.

3π/2-phase filter 137d: Filter by repeatedly turning ON (pass) consecutive 2S chips, then OFF (interrupt) the next 2S chips, and OFF (interrupt) the next S chip until L is reached.

In FIG. 41 there are shown filtering frequency characteristics of the filers 137a, 137b, 137c and 137d, for example, in the case where L=4 and S=1. In FIGS. 41(a), 41(b), 41(c) and 41(d) where FSR/n corresponding to 4S chips is one period on the optical frequency axis and one-half the period corresponds to 2S chip, i.e., one period is $2\pi$, there are shown filtering characteristics of the filters 137a, 137b, 137c and 137d which permits the passage therethrough of light of 2S chips of $\pi$-width shifted to 0-, $\pi/2$-, $\pi$- and $3\pi/2$-phase positions, respectively. Accordingly, the light having passed through these filters 137a, 137b, 137c and 137d becomes such that a pseudo-carrier of the period FSR/n on the optical frequency (wavelength) axis, which is a rectangular pattern of the $\pi$-width, that is, of a 50% duty ratio, is phase-modulated to 0, $\pi/2$, $\pi$ and $3\pi/2$, respectively.

Embodiment 2-5 enables implementation of the QPSK modulation by associating two pseudo-carriers of such phases and two data sets. In Embodiment 2-5, since the filters 137a, . . . , 137d are associated with 0, . . . , $3\pi/2$, respectively, the two pieces of data from the signal-to-phase converter 110 are used, as is the case with the optical transmitter of FIG. 35(a), to control the modulators 132a and 132b to select the output light from the 0-phase filter 127a or the output light from the $\pi$-phase filter 137c and the output light from the $\pi/2$-phase filter 137b or the output light from the $3\pi/2$-phase filter 137d, and the optical outputs thus selected are output via the combiner 136 to the optical transmission line 300.

As depicted in FIG. 35(b), the modulators 132a and 132b may be connected to the input sides of the filters 137a to 137d. Also, modulators may be connected to input and output sides of the filters 137a to 137d.

The optical receiver 200 in Embodiment 2-5 is identical in construction with the optical receiver shown in FIG. 30 except that 0-, $\pi/2$-, $\pi$- and $3\pi/2$-phase filters 225, 226, 227 and 228 of the same filtering characteristics as those of the filters 137a to 137d, respectively, are used in place of the filters 221 to 224 in the optical receiver 200 depicted in FIG. 30. Accordingly, the parts corresponding to those in FIG. 30 are identified by the same reference numerals and the filters are denoted by parenthesized reference numerals in FIG. 37-1.

Figures 2, 42:
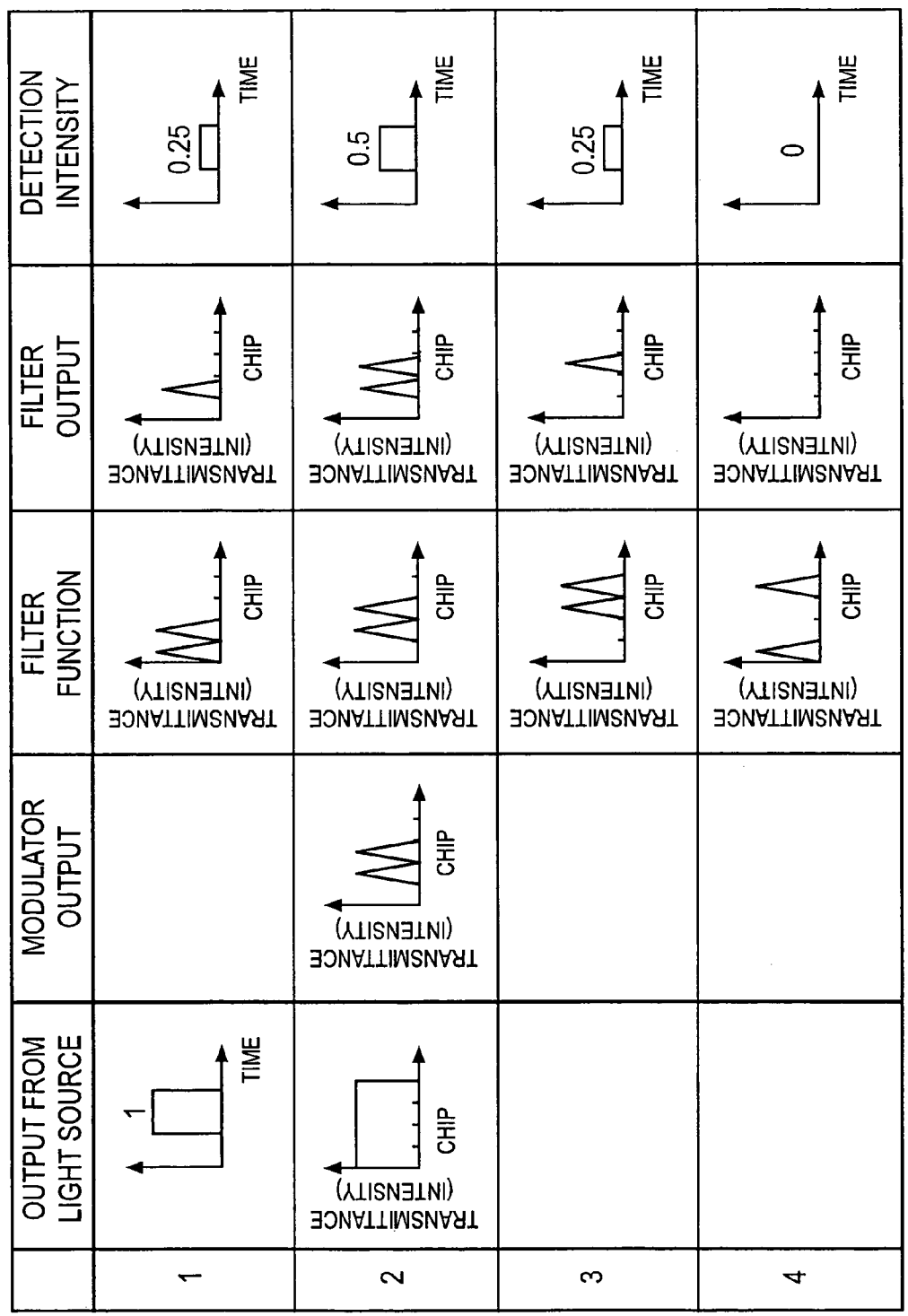
Figures 3, 42:
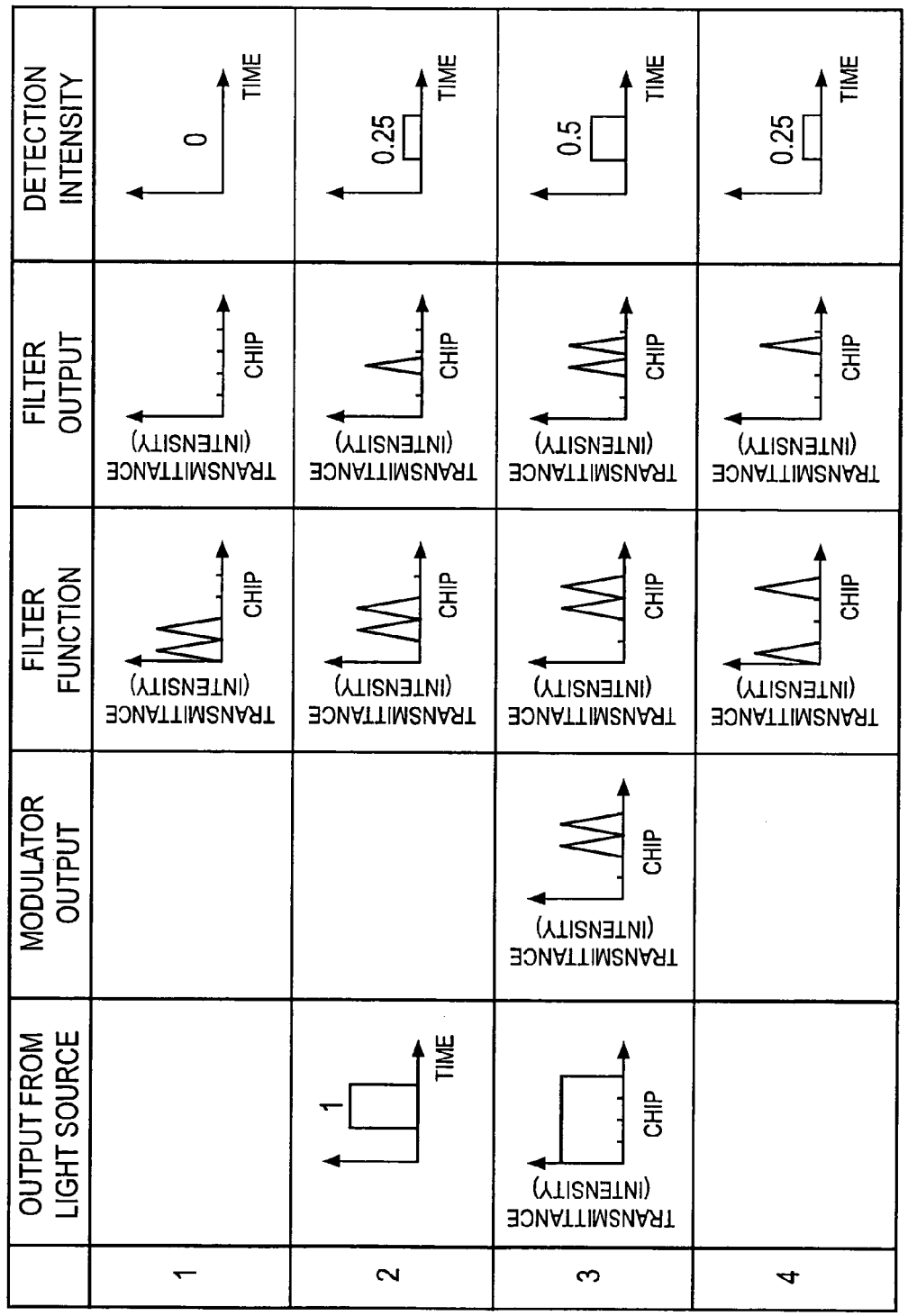
Figures 4, 42:
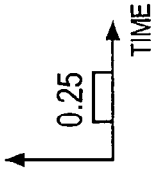

FIGS. 42-1 to 42-2 show examples of the optical frequency characteristic of the light source 120 and the optical intensity-time characteristic of a pulse light source used as the light source, modulation part outputs (transmitter outputs) corresponding to respective phases, filtering characteristics of respective filters in the receiver, light having passed through the filters of the receiver for transmitted outputs in respective pseudo-carrier phases; and temporal changes of the intensity detected by the respective detectors in Embodiment 2-5. In each figure, the leftmost column shows the optical source output. The source output is shown in terms of an optical frequency difference from the reference optical frequency fs, with the optical frequency width of the light source 120 assumed as 400 GHz and the intensity of the source output assumed as being flat over the entire optical frequency range. In FIGS. 42-1 to 42-4 the columns second from the left-hand side show modulation part outputs corresponding to the phase shifts 0, $\pi/2$, $\pi$, $3\pi/2$, respectively. In the columns third from the left-hand side, the filtering characteristics (functions) of the filters 225 to 228 in the optical receiver 200 are shown in first to fourth rows of the columns, respectively. In each of FIGS. 42-1 to 42-4 the column fourth from the left-hand side shows in its first to fourth rows the optical frequency characteristics of light passing through the filters 225 to 228 in the case where the modulation part outputs shown there are input to the filters, respectively. The rightmost columns show in their first to fourth rows temporal changes of the intensities to be detected by the detectors 231 to 234, respectively.

As shown in FIGS. 42-1 to 42-4, assuming that the power at the detector at the time of all the chips passing through the filters is 1, the detected intensity corresponding to the filter of the same filtering characteristic as the optical frequency characteristic of the modulation part output is 0.5, and the detected intensity corresponding to the filter of a filtering characteristic displaced $\pi$ apart from the optical frequency characteristic of the modulation part output is 0; the comparator that compares these detector intensities provides an output of 0.5. For example, in FIG. 42-1, when the modulation part output in the first row is input, the detected intensity of the output light from the filter 231 is 0.5 as shown in the first row, and the detected intensity of the output from the filter 233 is 0 as shown in the third row. Since the detected intensities corresponding to the filters whose filtering characteristics are displaced $\pi/2$ and $3\pi/2$ apart from the optical frequency characteristic of the modulation part output are both 0.25, the comparator that compares the both detected intensities provides an output 0. For example, in FIG. 42-1, the detected intensities of the optical outputs from the filters 232 and 234 are both 0.25 as shown in the second and third rows, respectively.

It is desirable that the transmission characteristic of each chip on the optical frequency axis be rectangular, but it is shown in a triangular form for easy distinction of individual chips. In this case, however, since the power at the detector at the time of all the chips passing through the filters is normalized to 1, Embodiment 2-5 operates as described previously without losing generality, irrespective of whether the transmission characteristic is triangular or Gaussian distribution on the optical frequency axis.

In FIG. 40 there is shown only a single combination of the optical transmitter 100 and the optical receiver 200, but when other optical transmitter and optical receiver share the same optical transmission line 330 at the same optical frequency, a different value of L is chosen. L is a multiple of 4 corresponding to the phase shift number M and is a value obtained by dividing the chip number of the optical frequency width FSR by an arbitrary integer n. The value S is a value obtained by dividing L by the phase shift number M, that is, by 4. Letting the number of the phase shift amount be represented by P, P=0, 1, 2, 3, and P=0, P=1, P=2 and P=3 correspond to the phase shifts, 0', $\pi/2$', $\pi$', and $3\pi/2$, respectively. That is, $2\pi P/M$ (M=4). Every L chips it is repeated at least n times to provide the transmittance 1 for chips corresponding to the remainders concerning the value L obtained by adding 1 to L/2 to PS which is obtained by multiplying the number P of the phase shift amount by S and the transmittance 0 for the other chips. That is, letting MOD(A, L) represent the remainder of the division of A by L, the transmittance 1 is provided for chips of the chip numbers corresponding to Q changing from 1 through the above-mentioned n in (Q−1)L+MOD(PS+1, L) to (Q−1)L+MOD(PS+L/2, L), and the transmittance 0 is provided for the other remaining chips. Since the product of the value L chosen here and the corresponding value n is constant, an integral of the scalar product of the pseudo-carriers for the interval FSR becomes zero by the differential detection at the receiving side, making it possible to inhibit the input of pseudo-carriers other than those to be received.

Figure 43A:
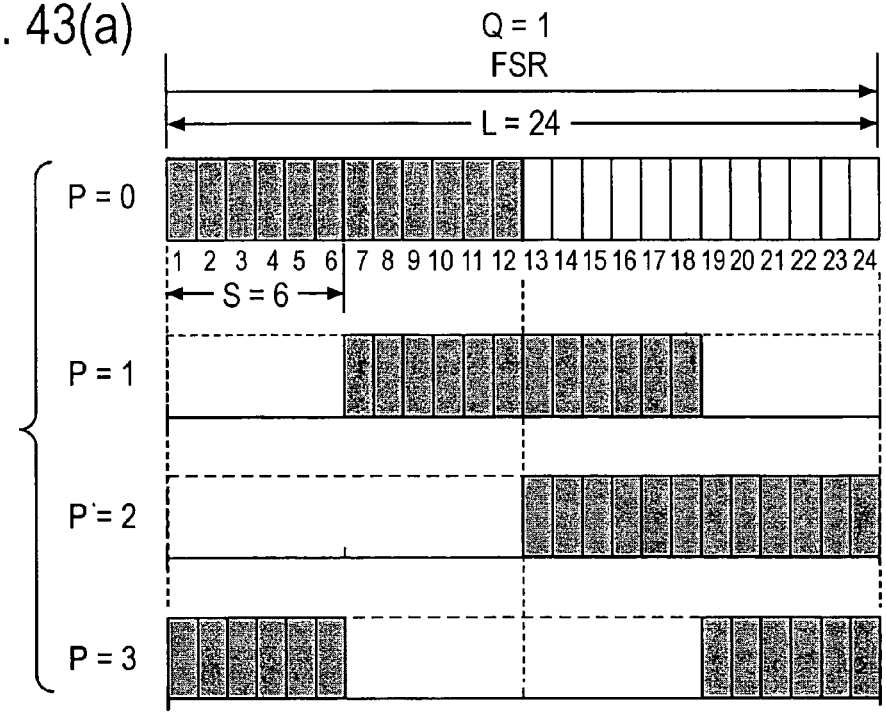
FIG. 43($a$) shows an example of an optical frequency characteristic function in the case where the chip number L=24, P=4, n=1 and S=6 in Embodiment 2-5, and FIG. 43($b$) shows an example of the function in the case where S=3 in the FIG. 43($a$)
Figure 43B:
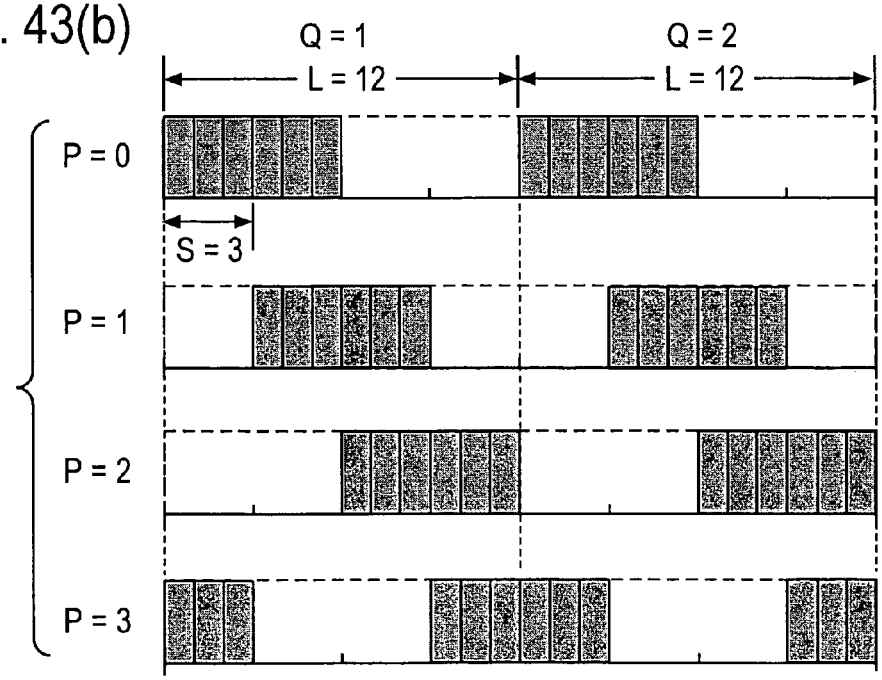

As examples of the relations of the above-said values L, M, n, S, P and Q, the chips of the transmittance 1 in the case where n=1, M=4, S=6 and L=24 are shown in gray in FIG. 43(a), and the chips of the transmittance 1 in the case where n=2, M=4, S=3 and L=12 are shown in FIG. 43(b).

In the case where the filters used in Embodiment 2-5 are filters that filter pseudo-carriers of optical frequencies outside FSR according to the same functions as those inside FSR and are based on the periodic function of which period is FSR, an integration value of the scalar product of the carriers for the interval FSR becomes zero, and the carriers are orthogonal to each other and hence they do not interfere with each other. The filters for use in Embodiment 2-5 are such as shown in FIG. 16.

As described above, according to Embodiment 2-5, since positive- or negative-polarized uncorrelated carriers are emulated by non-polarized intensity modulation which is a part of a repetition of a desired frequency period of broadband light on the optical frequency axis, and since the emulated carriers are phase-modulated, it is possible to implement QPSK with control accuracy lower than that on the order of the wavelength of light.

Embodiment 2-6

As described above with reference to Embodiment 2-5, the QPSK modulation can be emulated by the same scheme as shown in FIG. 35 in which the pseudo-carrier is phase-modulated, in π-width-chip blocks, to any one of the phase shift positions 0, π/2, π, and 3π/2 on the optical frequency (wavelength) axis. Assuming that the pseudo-carrier for use in this embodiment is an i-th carrier and that $2\pi f = \Theta$, the filtering characteristic functions of each set are $Ci(\Theta)$ or $Ci(\Theta+\pi)$ and $Ci(\Theta+\pi/2)$ or $Ci(\Theta+3\pi/2)$; letting $\Sigma$ represent the sum of addition from h=0 to FSR/δΘ−1 over the period FSR where $\Theta = h\delta\Theta$, the following equations hold:

$$\Sigma Ci(\Theta)(Ci(\Theta+\pi/2)-Ci'(\Theta+\pi/2))=\Sigma Ci(\Theta)(Ci(\Theta+3\pi/2)-Ci'(\Theta+3\pi/2))=0 \quad (22)$$

$$\Sigma Ci(\Theta)(Ci(\Theta)-Ci(\Theta))=\Sigma Ci(\Theta+\pi)(Ci(\Theta+\pi)-Ci'(\Theta+\pi)) \quad (23)$$

Eqs. (22) and (23) are formulae for digital processing of integrations of Eqs. (20) and (21), respectively.

It will easily be understood that the QAM modulation can be emulated using the pseudo-carriers shown in Embodiment 2-4 and by the same method as described previously with reference to FIGS. 37-1 and 37-2. For this QAM modulation, as parenthesized in FIGS. 37-1 and 37-2, the optical transmitter 100 uses filters 137a to 137d as substitutes for the filters 133a to 133d, in which case according to two bits of the data set from the signal-to-phase and amplitude converter 111 the modulator 151 selects one of the filters 137a and 137c to control the optical intensity to be either 1 or 3, whereas according to the other two bits in the data set the modulator 152 selects one of the filters 137b and 137d to control the optical intensity to be either 1 or 3. In this instance, the optical receiver 200 needs only to use filters 225 to 228 as substitutes for the filters 221 to 224, and no further modifications are needed. The positions where to dispose modulators 151 and 152 are the same as in the case of Embodiment 2-4. Embodiment 2-6 also produces the same effects as are obtainable with Embodiment 2-6 for the same reasons as in the latter.

Further, the MPSK modulation can be emulated by using the pseudo-carrier used in Embodiment 2-5 and phase-modulating it to any one of M arbitrary phase shifts by a π-width rectangular pattern.

In other words, when the number of phase shifts is M, L which is the number of chips for one period is a multiple of M and a multiple of 2 and takes a value obtained by dividing the total number of chips forming the optical frequency width FSR by n. With L=MS, it is repeated at least n times every L chips to make those chips 1 (which corresponds to the remainders concerning the value L) of the value obtained by adding 1 to L/2 to PS which is obtained by multiplying S and the number P(P=0, ..., M−1; letting one period be represented by 2π, the phase shift amount is expressed as 2πP/M) of the phase shift amount and to make the other chips 0. That is, setting that the remainder of the division of A by L is Mod(A, L), the chips of the numbers corresponding to Q changing from 1 through the above-mentioned n in (Q−1)L+Mod(PS+1, L) to (Q−1)L+Mod(PS+L/2, L) are made a 1 and the other chips are made a 0.

Accordingly, letting $Ci(\Theta)$ and $Ck(\Theta)$ represent the functions of pseudo-carriers corresponding to i-th and k-th carriers having different values of n (k being a carrier number other than i), respectively, $\Sigma$ represent the summation of addition from h=0 to FSR/δΘ−1 over the period FSR where $\Theta = h\delta\Theta$ and P represent a finite value other than zero, the following equation holds:

$$\Sigma(Ci(\Theta)(Ci(\Theta)-Ci'(\Theta))=P, \Sigma Ck(\Theta)(Ci(\Theta)-Ci'(\Theta))=0 \quad (24)$$

A description will be given below of an example in which the total number of chips forming the optical frequency width FSR is nL=24 and M=3 in this embodiment. Since L is a multiple of M and also a multiple of 2 and a measure of 24, L becomes 24 or 12 or 6, n becomes 1, 2, or 4, and S becomes 8, 4, or 2. FIG. 44 shows the case in which (n, L, M, S)=(1, 24, 3, 8) and (2, 12, 3, 4). The gray color means chips of the transmittance 1. In the case of (n, L, M, S)=(1, 24, 3, 8), since n=1, there is only Q=1: for a phase shift 0 (P=0), the first ((1−1)24+Mod(0·8+1, 24)=1) chip a to the 12th ((1−1)24+Mod(0·8+24/2, 24)=12) chip b have the transmittance 1 as shown in the left-hand diagram of FIG. 44(a); for a phase shift 2π·(⅓) (P=1), the ninth ((1−1)24+Mod(1·8+1, 24)=9) chip a to 20th ((1−1)24+Mod(1·8+24/2, 24)=20) chip b have the transmittance 1 as shown in the left-hand diagram of FIG. 44(c); and, for a phase shift 2π·(⅔) (P=2), the 17th ((1−1)24+Mod(2·8+1, 24)=17) chip a to the fourth ((1−1)24+Mod(2·8+24/2, 24)=4) chip b have the transmittance 1 as shown in the left-hand diagram of FIG. 44(c). That is, since the maximum chip number is 24, the first to fourth chips and the 17th to 24th chips go to 1s.

In the case of (n, L, M, S)=(2, 12, 3, 4), since n=2, there are Q=1 and Q=2. As shown in the right-hand diagrams of FIGS. 44(a) to 44(d): in the case of the phase shift P=0, for Q=1, the first ((1−1)12+Mod(0·4+1, 12)=1) chip a to the sixth ((1−1)12+Mod(0·4+12/2, 12)=6) chip b are made 1's, and for Q=2, the 13th ((2−1)12+Mod(0·4+1, 12)=13) chip c to the 18th ((2−1)12+Mod(0·4+12/2, 12)=18) chip d are made 1's; in the case of the phase shift 2π·(⅓) (P=1), for Q=1, the fifth ((1−1)12+Mod(1·4+1, 12)=5) chip a to the 10th ((1−1)12+Mod(1·4+12/2, 12)=10) chip b are made 1's, and for Q=2, the 17th ((2−1)12+Mod(1·4+1, 12)=17) chip c to the 22nd ((2−1)12+Mod(1·4+12/2, 12)=22) chip d are made 1's; and in the case of the phase shift 2π·(⅔) (P=2), for Q=1, the first to second chips and the ninth to 12th chips are made 1's, and for Q=2, the 13th to 14th chips are made 1's and the 21st to 24th chips are made 1's. That is, for Q=1, the ninth ((1−1)12+Mod(2·4+1, 12)=9) chip a to the second ((1−1)12+Mod(2·4+12/2, 12)=2) chip b are made 1's, and for Q=2, the 21st ((2−1)12+Mod(2·4+1, 12)=21) chip c to the 14th ((2−1)12+Mod(2·4+12/2, 12)=14) chip d are made 1's. In this instance, for Q=1, the range over which the chip 1 can be shifted is from the first to 12th chip position, whereas for Q=2 it is the range from the 13th to 24th chip positions. In this embodiment, too, as will be evident from FIG. 44, even if other signals having different values of n are received, the interference between pseudo-carriers is cancelled at the receiving side, and hence they can be received independently of each other.

The filter of the optical transmitter according to this embodiment is provided with three 0-, $2\pi/3$- and $4\pi/3$-phase filters in place of the four 0-, $\pi$-, $\pi/2$- and $3\pi/2$-phase filters forming the filter 131 in FIG. 2-5. Instead of using the four 0-, $\pi$-, $\pi/2$- and $3\pi/2$-phase filters and two sets of comparators for comparing the outputs from detectors connected to the four filters whose phase shift amounts differ in steps of $\pi$, the optical transmitter of this embodiment is provided with the three 0-, $2\pi/3$- and $4\pi/3$-phase filters, three $\pi$-, $5\pi/3$- and $\pi/3$-phase filters, three $\pi$-, $5\pi/3$- and $\pi/3$-phase filters whose phase shift amounts differ by $\pi$ from them, respectively, and three sets of comparators for comparing outputs from detectors connected to the filters whose phase shift amounts differ in steps of $\pi$.

As described above, positive- or negative-polarized uncorrelated carriers are emulated by non-polarized intensity modulation which is a part of a repetition of a desired frequency period of broadband light on the optical frequency axis, and the emulated carriers are phase-modulated; by this, it is possible to implement MPSK with control accuracy lower than that on the order of the wavelength of light.

Embodiment 2-7

The $\pi$-phase filter 133c (137c) and $3\pi/2$-phase filter 133d (137d) in the optical transmitter 100 shown in FIG. 37-1 are omitted, the switches 151a and 152a in the modulators 151 and 152 are omitted accordingly, the 0-phase filter 133a (137a) and the $\pi/2$-phase filter 133b (137b) are connected to the amplitude changing parts 151b and 152b in the modulators 151 and 152, respectively, and the signal-to-phase and amplitude converter 111 is replaced with a signal-to-amplitude converter 112, that is, with the serial-parallel converter 110a in the signal-to-phase converter 110a shown in FIG. 30, by which the one bit (data) and the other bit (data) of a two-piece data set are made to correspond to the modulators 151 and 152 to effect control such that the optical intensity is a 3 or 1 depending on the bit 0 or 1. In the optical receiver 200, the code converter 260 provides data 0 or 1, depending on whether the output intensities of the comparators 241 and 242 are 3s or 1s, and outputs the pieces of data in serial form.

With such an arrangement, QAM modulation, which has four signal points in the first quadrant as depicted in FIG. 38(a), can be performed not only for the pseudo-carriers based on the trigonometric function on the optical frequency (wavelength) axis described previously with reference to Embodiment 2-4 but also for the rectangular pattern pseudo carriers on the optical frequency (wavelength) axis described above with reference to Embodiment 2-6.

Such QAM modulation with four signal points can be achieved as QAM modulation which has four signal points in any one of the second, third and fourth quadrants in FIG. 38(a), by use of two filters selected from among combinations of 133b (137b) and 133c (137c), 133c (137c) and 133d (137d) and 133a (137a) and 133d (137d). In these cases, when the outputs from the comparators 241 and 242 are negative, they are converted to data 0 or 1, depending on whether their absolute values are 3s or 1s.

Embodiment 2-8

Figure 45:
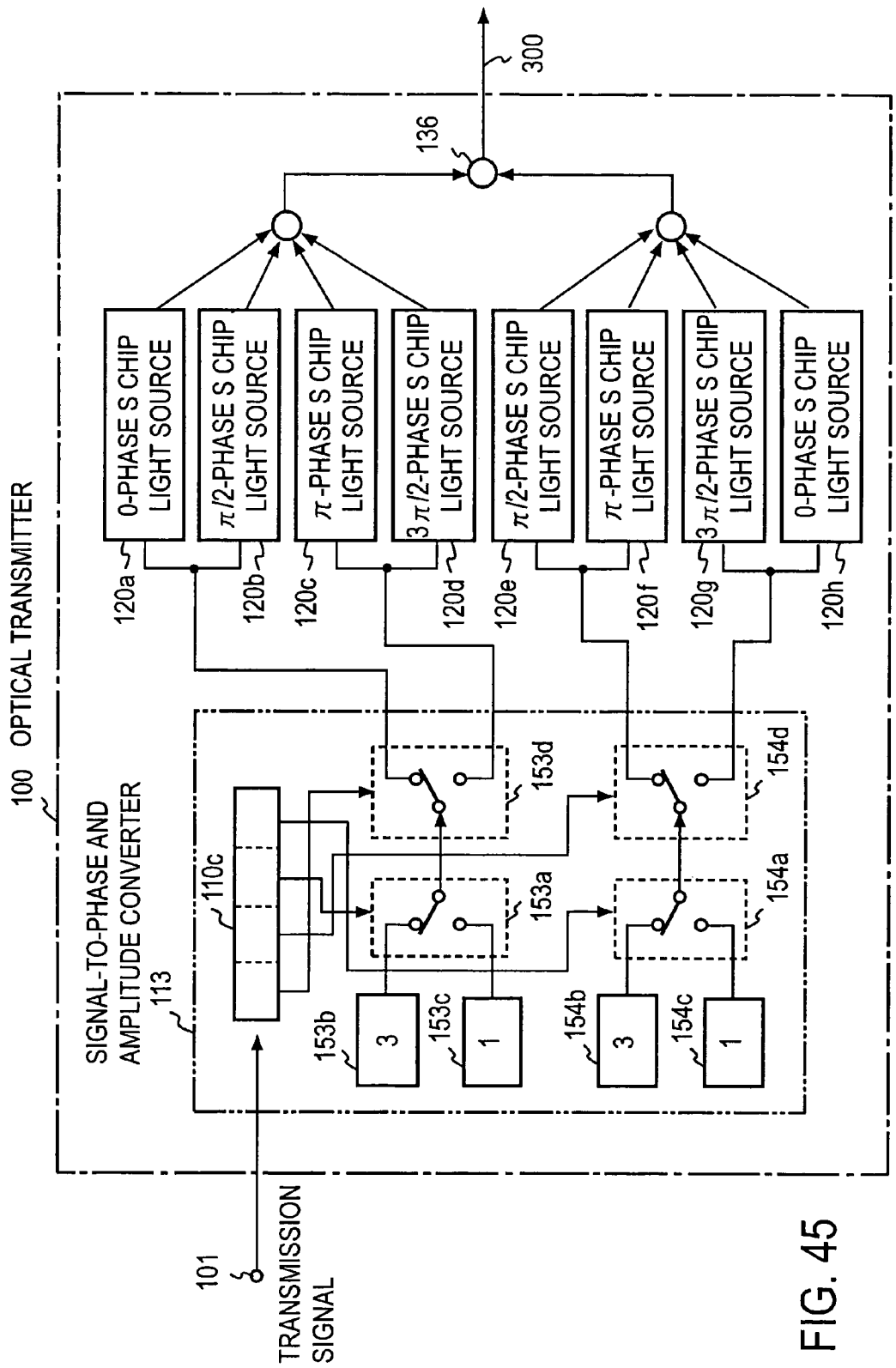
FIG. 45 is a diagram illustrating an example of an optical transmitter according to Embodiment 2-8.

Embodiment 2-8 according to the second mode of working of the invention uses a plurality of light sources each of which emits light of an optical frequency characteristic function of a different phase. Referring now to FIG. 45, the optical transmitter of Embodiment 2-8 will be described below in connection with the case where L=4S. In Embodiment 2-8, FSR/n on the optical frequency axis, where n=1, that is, FSR is one period, and multiple light sources which provide, in each period, 2S-chip optical outputs at the 0-, $\pi/2$-, $\pi$- and $3\pi/2$-phase shift positions on the optical frequency axis, respectively, are used to permit implementation of the QPSK or QAM modulation according to Embodiment 2-5 or Embodiment 2-6.

The FIG. 45 example uses two sets of light sources each of which emits light of an S-chip optical frequency and the optical output intensity of each light source can be controlled; the illustrated example is provided with a total of L/S sets of light sources (each set of which is formed by a single broadband light source of a 2S optical frequency width, or 2S light sources) which is twice larger than L/2S.

Figure 46:
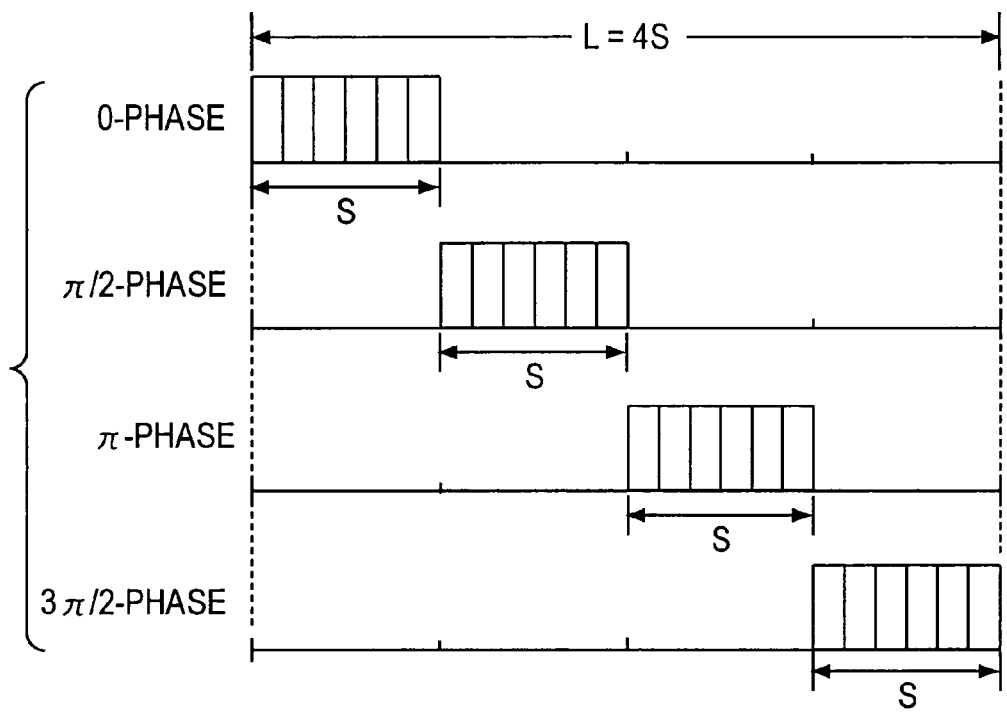
FIG. 46 is a diagram showing, by way of example, optical chips of each of S-chip light source in FIG. 45.

Of the L/S sets of light sources, L/2S sets of light sources, each emitting light of the S-chip optical frequency, are used to simulate a 0-phase or $\pi$-phase carrier. That is, as FIG. 46 shows S-chip output light of each of the phases 0, $\pi/2$, $\pi$ and $3\pi/2$, the output light from a light source 120a which outputs S chips of the first continuous optical frequency in each period, that is, 0-phase S chips, and the output light from a light source 120b which outputs the next S chips, that is, $\pi/2$-phase S chips, are used to emulate the 0-phase carrier; and the output light from a light source 120c which outputs the next S chips, that is, $\pi$-phase S chips, and the output light from a light source 120d which outputs the next S chips, that is, $3\pi/2$-phase S chips, are used to emulate the $\pi$-phase carrier. The remaining L/2S light sources are used to emulate the $\pi/2$-phase carrier or $3\pi/2$-phase carrier. That is, the output light from a light source 120e which outputs the S chips succeeding the first S chips in each period on the optical frequency axis, that is, $\pi/2$-phase S chips, and the output light from a light source 120f which outputs the next S chips, that is, $\pi$-phase S chips, are used to emulate the $\pi/2$-phase carrier; and the output light from a light source 120g which outputs the next S chips, that is, $3\pi/2$-phase S chips, and the output light from a light source 120h which outputs the next S chips, that is, 0-phase S chips, are used to emulate the $3\pi/2$-phase carrier. These 0-phase, $\pi/2$-phase, $\pi$-phase and $3\pi/2$-phase carriers correspond to the transmitted light of P=0, P=1, P=2 and P=3 in FIG. 43(a), respectively.

The above description has been given of the example in which n=1, but when n is an integer equal to or greater than 2, the value of S corresponding to n in the order of optical frequency needs only to be allocated in S-chip blocks to the 0-phase light source, the $\pi/2$-phase light source, the $\pi$-phase light source and the $3\pi/2$-phase light source. The value n that can be used is determined by the relation to the chip number L that corresponds to one period obtained by dividing the optical frequency width FSR by n. In the cases where FSR=24, n=2, L=24/2=12 and S=12/4=3, light of the 0-phase, $\pi/2$-phase, $\pi$-phase ad $3\pi/2$-phase pseudo-carriers becomes the same as the transmitted light for P=0, P=1, P=2 and P=3 in FIG. 43(b). The value L is a multiple of 4 corresponding to the number M of phase shifts, and the value S is a value obtained by dividing the value L by the number M of phase shifts that is, by 4 (L=4S). Every L chips it is repeated at least n times to turn ON (1) the light sources for chips corresponding to the remainders concerning the value L of the value obtained by adding 1 to L/2 to PS which is obtained by multiplying the number P of the phase shift amount (P=0, 1, 2, 3) by S and turn OFF (0) the light sources for the other chips. That is, letting MOD(A, L) represent the remainder of the division of A by L, the light sources (two sets in this example) for the chips of the chip numbers corresponding to Q changing from 1 through the above-mentioned n in (Q−1)

L+MOD(PS+1, L) to (Q−1)L+MOD(PS+L/2, L) are turned ON (1) and the light sources for the other remaining chips are turned OFF (0).

FIG. 45 illustrates the optical transmitter intended to emulate the QAM modulation shown in FIG. 38(*a*), in which the transmission signal (data) sequence from the terminal 101 is converted to four sequences by the serial-parallel converter 110C in a signal-to-phase and amplitude converter 113. The third significant data (bit) in each 4-bit data set (the data array in the serial-parallel converter 110*c* being the same as the order of bits for each data set shown in FIG. 38(*a*)) is used to control the switch 153*a*; when the data value is 0, a register (drive signal generating part) 153*b* having stored therein the value 3 is connected to a switch 153*d*; when the data value is 1 and a register (drive signal generating part) 153*c* having stored therein the value 1 is connected to the switch 153*d*; the switch 153*d* is controlled by the most significant data (bit); when the data value is 0, the switch 153*a* is connected to the 0-phase light source 120*a* and the π/2-phase light source 120*b*, and light of the intensity 3 is output from the both light sources 120*a* and 120*b*, that is, light of the 0-phase pseudo-carrier is output with the intensity 3; and when the most significant data (bit) value is 1, the switch 153*a* is connected to the π-phase light source 120*c* and the 3π/2-phase light source 120*d*, and light of the intensity 1 is output from the both light sources 120*c* and 120*d*, that is, light of the π-phase pseudo-carrier is output with the intensity 1.

A switch 154*a* is controlled by the least significant data (bit) in the data set; when the data value is 0, a register 154*b* having stored therein the value 3 is connected to a switch 154*d*; when the data value is 1, a register 154*c* having stored therein the value 1 is connected to the switch 154*d*; the switch 154*d* is controlled by the second significant data (bit) of the data set; when the data value is 0, the switch 154*a* is connected to the π/2-phase light source 120*e* and the π-phase light source 120*f*, and light of the intensity 3 is output from the both light sources 120*e* and 120*f*, that is, light of the π/2-phase pseudo-carrier is output with the intensity 3; and when the data value is 1, the witch 154*a* is connected to the 3π/2-phase light source 120*g* and the 0-phase light source 120*h*, and light of the intensity 1 is output from the both light sources 120*g* and 120*h*, that is, light of the 3π/2-phase pseudo-carrier is output with the intensity 1.

It will easily be understood that thus the optical transmitter according to this embodiment can also output an optical QAM modulated signal similar to that obtainable with the optical transmitter 100 of Embodiment 2-6 described previously with reference to FIG. 37. Accordingly, the optical receiver 200 for use in this case may be the same as shown in FIG. 36. In the optical receiver depicted in FIG. 45 the light sources need only direct modulation; for example, in the case of using laser light sources, their direct modulation is performed by controlling the magnitude of their drive current—this dispenses with the expensive phase and amplitude modulation part 150 composed of filters and modulations such as employed in Embodiment 2-6.

With this embodiment, too, the QPSK modulation can similarly be done as described previously with reference to Embodiment 2-3 by omitting the switches 153*d* and 154*d* in FIG. 45, and connecting the registers 153*b* and 154*b* directly to the switches 153*d* and 154*d*, respectively, to control the switches 153*d* and 154*d* by each piece of data of the two-data set of the signal-to-amplitude modulator 112 in FIG. 6. Further, the QAM modulation described previously with reference to Embodiment 2-7 can also be achieved by: omitting the switches 153*d* and 154*d* are omitted; connecting the switches 153*a* and 154*a* to two sets of light sources (a total of four light sources) that output light of mutually orthogonal pseudo-carriers; and controlling the switches 153*a* and 154*a* as referred to previously in connection with Embodiment 2-7. Incidentally, in the example in which the switches 153*a* and 154*a* are omitted and in the example in which the switches 153*d* and 154*d* are omitted, the serial-parallel converter 110C is substituted with the serial-parallel converter 110*a* of the signal-to-phase converter 110 in FIG. 30.

The QAM modulation can also be implemented by use of two light sources whose phase shift amounts differ by π/2, for example, the 0-phase shift light source and the π/2-phase chip light source. In this instance, since the phase is one-half that in the QAM modulation by the embodiment described above with respect to FIG. 45, doubling the number of steps for intensity modulation control in the FIG. 45 embodiment enables signal transmission to be achieved at the same level as that by the embodiment. Additionally, the number of light sources used can be reduced by half.

It is also possible to perform, by use of multiple light sources, the same modulation as the MPSK modulation in which the number of phase shift positions is an arbitrary value M as described previously with respect to Embodiment 2-6. Referring to FIG. 45, this example will be described in connection with the case where M=4. In this instance, the signal-to-phase and amplitude converter 113 in FIG. 45 is replaced with the signal-to-phase converter 110 in FIG. 30. And multiple light sources are used which provide, in each period FSR/n, 2S-chip optical outputs at the 0-, π/2-, π- and 3π/2-phase shift positions on the optical frequency axis, respectively. Since M=4, the pseudo-carrier corresponding to each phase shift is the same as in the embodiment described above with reference to FIG. 45, and in accordance with the output from the signal-to-phase converter 110: light of the intensity 1 is output from the 0-phase chip light source corresponding to the 0-shift amount and the π/2-phase chip light source; light of the intensity 1 is output from the π/2-phase chip light source corresponding to the π/2-shift amount and the π-phase chip light source; light of the intensity 1 is output from the π-phase chip light source corresponding to the π-shift amount and the 3π/2-phase chip light source; or light of the intensity 1 is output from the 0-phase chip light source corresponding to 3π/2-shift amount and the 3π/2-phase chip light source.

In this way, the MPSK modulation can be achieved without using an expensive phase modulation part composed of filters and modulators.

The FIG. 45 embodiment uses two S-chip light sources so as to output light of one pseudo-carrier. The two light sources can be replaced with one 2S-chip light source. In this instance, however, four kinds of relatively broadband 2S-chip light sources are used as is evident from FIG. 45. With such an arrangement as depicted in FIG. 45, however, it is true that the number of kinds of light sources is four, but the optical frequency width of each light source is S-chip, permitting appreciable reduction in the manufacturing cost as compared with that in the case of using 2S-chip light sources. The QPSK modulation can also be performed by use of the four kinds of S-chip light sources. In the FIG. 45 embodiment, 4n carriers are required for each of the emulation of the 0-phase or π-phase carrier and the emulation of the π/2-phase or 3π/2-phase carrier, and for the carrier of each phase, two S-chip light sources are used, that is, the number of light sources used is a total of 2×4n. The two light sources for outputting carriers at the same optical frequency is substituted with one light source which emits light with an intensity of the combined output of the carriers 1 or 0. That is, in the case of FIG. 45, letting "1" represent those of the 0-phase chip light source, the π/2-phase chip light source, π-phase chip light source and the 3π/2-phase chip light source (Each light source is an S-chip light source, but for the sake of brevity, it is referred to as a chip light source, omitting "S.") which emit light of the intensity 1 for the carrier of each phase and letting "0" represent the light sources which do not emit light, the output from each chip light source is as listed below.

0-phase carrier:
(0-phase chip light source, π/2-phase chip light source, π-phase chip light source, 3π/2-phase chip light source)= (1100)

π/2-phase carrier:
(0-phase chip light source, π/2-phase chip light source, π-phase chip light source, 3π/2-phase chip light source)= (0110)

π-phase carrier:
(0-phase chip light source, π/2-phase chip light source, π-phase chip light source, 3π/2-phase chip light source)= (0011)

3π/2-phase carrier:
(0-phase chip light source, π/2-phase chip light source, π-phase chip light source, 3π/2-phase chip light source)= (1001)

Since light of two carriers in orthogonal relationship is output, those of these optical outputs which are emitted from the chip light sources of the same phase are combined, and hence the intensity of the combined light goes to a 2. Accordingly, by pre-doubling the intensity of the output light from light source whose optical outputs are combined, it is possible to output light of four carriers through use of one light source for each of four kinds of S-chip light sources. The output from each chip light source is as follows:

0-phase carrier+π/2-phase carrier:
(0-phase chip light source, π/2-phase chip light source, π-phase chip light source, 3π/2-phase chip light source)= (1210)

0-phase carrier+π/2-phase carrier:
(0-phase chip light source, π/2-phase chip light source, π-phase chip light source, 3π/2-phase chip light source)= (2101)

π-phase carrier+π/2-phase carrier:
(0-phase chip light source, π/2-phase chip light source, π-phase chip light source, 3π/2-phase chip light source)= (0121)

π-phase carrier+3π/2-phase carrier:
(0-phase chip light source, π/2-phase chip light source, π-phase chip light source, 3π/2-phase chip light source)= (1012)

Such a reduction of the number of light sources is applicable as well to the MPSK modulation using multiple light sources as referred to previously.

In the manner described above, the number of light sources can be reduced by half as compared with that needed in the FIG. 45 embodiment and the step intervals for intensity modulation control can be made larger than in the aforementioned QAM modulation in which the number of light sources is smaller than in the case of FIG. 45—this produces the effect of robustness against the influence of noise.

Embodiment 2-9

Figure 47:
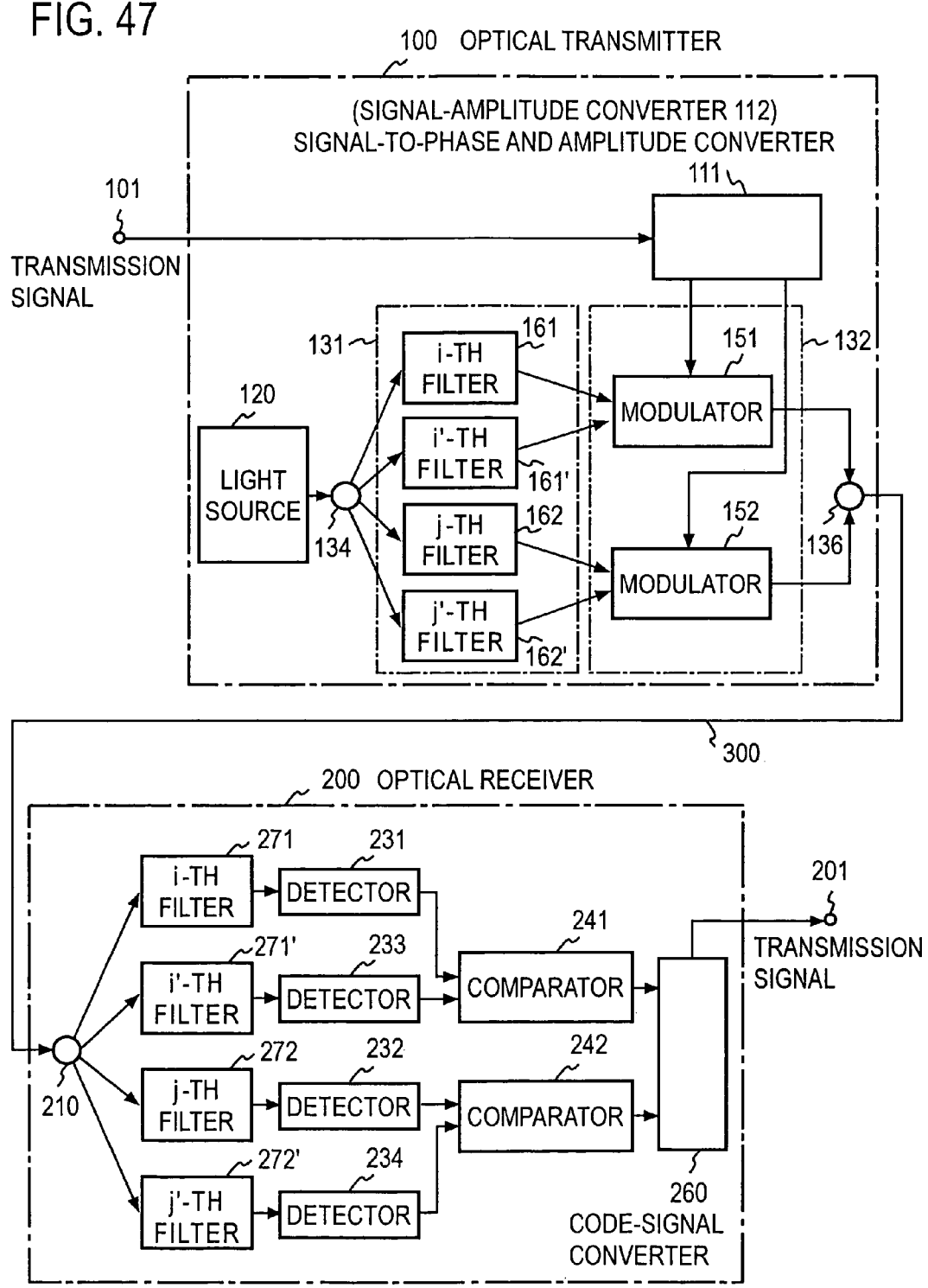
FIG. 47 is a system configuration illustrating an example of a communications system according to Embodiment 2-9.

Embodiment 2-9 includes the above-described embodiments and makes the pseudo-carrier more generalized, and this example is an application to the QAM modulation. Referring to FIG. 47, an example of the communications system according o this embodiment will be described below.

The optical transmitter 100 is provided with a set of i- and i'-th filters 161 and 161' and a set of j- and j'-th filters 162 and 162'. These filters 161, 161' and 162, 162' perform filtering of at least the optical frequency width FSR at the optical frequency (wavelength) of light that the light source 120 emits. Assuming that the optical frequency is an optical frequency spaced from the reference optical frequency fs (=C/λs, where C is light velocity), that is, normalized by the reference optical frequency (It can be said that the filter function is a parameter representing phase.), the value Ci(f) of the filtering characteristic function of the i-th filter 161 in the phase f, which is one of the two filters of the first-mentioned set, and the value Ci'(f) of the filtering characteristic function of the i'-th filter 161' in the phase f, which pairs with the i-th filter 161, are complementary to each other; hence, they bear the same relation as that of Eq. (4).

$$Ci(f)+Ci'(f)=1 \qquad (4)$$

The j-th filter 162 and the j'-th filter 162' of the other set also bear a similar relation. The characteristic functions of the filters 161, 161', 162 and 162' constitute the afore-mentioned pseudo-carriers.

The optical receiver 200 according to Embodiment 2-9 is identical in construction to the optical receiver 200 in FIG. 37 except that the filters used differ from those used in the latter. The optical receiver of this embodiment uses filters of the same filtering characteristics of the filters used in the optical transmitter, that is, an i-th filter 271 identical in filtering characteristic to the i-th filter 161, an i'-th filter 271' identical in filtering characteristic to the i'-th filter 161', and j-th and j'-th filters 272 and 272' identical in filtering characteristic to the j-th and j'-th filters 162 and 162', respectively.

With such an arrangement, the comparator 241 compares the detected optical intensity corresponding to the transmitted light through the i-th filter 271 and the detected optical intensity of the transmitted light through the i'-th filter 271', and, assuming the value Di(f) at the normalized optical frequency f, the output from the comparator 241 is given by Eq. (3) in the first mode of working of the invention.

$$Di(f)=Ci(f)-Ci'(f) \qquad (3)$$

By the detector 231 respective optical frequency components of the transmitted light through the i-th filter are detected as the optical intensity of the transmitted light as a whole. The same goes for the other detectors. Accordingly, the integration value of the scalar product of the filtering characteristic function Ci(f) of the i-th filter 161 of the transmitting side at the normalized optical frequency f and the filtering characteristic function Di(f) of the i-th filter 271 of the receiving side at the normalized optical frequency f over the continuous optical frequency range FSR in which to perform filtering by the i-th filter 271 is a non-zero finite value, and the relation of the following equation (5)' holds.

$$\int Ci(f)Di(f)df=P \qquad (5)$$

Eq. (5) corresponds to a generalized version of Eq. (5) shown in the first mode of working of the invention.

The integration value of the scalar product of the filtering characteristic function Ci(f) of the i-th filter in the phase f and the filtering characteristic function Dj(f) of an j-th filter other than the i-th one at the normalized optical frequency f over the continuous optical frequency range FSR contained in the optical frequency range which is filtered by the filter is zero, and Eq. (6) mentioned in the first mode of working of the invention holds.

$$\int Ci(f)Dj(f)df=0 \qquad (6)$$

Accordingly, optical components having passed through the j-th filter are not contained in the comparator output which is provided by subtracting the output of a detector 231' for detecting the intensity of transmitted light through the i'-th filter 271' from the output of the detector 231 for detecting the intensity of transmitted light through the i-th filter 271. Thus, Embodiment 2-9 enables the receiving side to cancel the input from the other pseudo-carriers except the target pseudo-carrier for receiving by differential detection.

Furthermore, the filtering characteristic function of the i-th filter 161 is a periodic function with the optical frequency as a variable, and it is preferable that the transmittance (value) $Ci(f)$ at the normalized optical frequency f repeat in the period at intervals of FSRi (=FSR/n)=Λ) so that Eq. (1) mentioned in the first mode of working of the invention holds.

$$Ci(f)=Ci(f+FSRi) \tag{1}$$

With such an arrangement, the receiving side is allowed to cancel, by differential detection, the input from the other pseudo-carriers except the target pseudo-carrier for receiving not depending on the differences in optical frequency and in the reference optical frequency fs for each light source. In this way, Embodiment 2-9 implements QAM with control accuracy lower than that on the order of optical wavelength. It will be understood that Eqs. (1), (3) to (5)' hold for both of the pseudo-carriers based on the trigonometric function used in Embodiments 2-1 to 2-4 and 2-7 and the chip-structured pseudo-carriers used in Embodiments 2-5 to 2-8. Incidentally, in the case of the chip-structured pseudo-carriers, $\int d\Theta$ is replaced with Σ in the equations. Further, it will be seen that the integral over an interval from an arbitrary value f to f+FSR in the optical frequency region for filtering by the filter is a value obtained by dividing FSR by 2, allowing that Eq. (2) in the first mode of working of the invention also holds.

$$\int Ci(f)df = FSR/2 \tag{2}$$

The 0-phase and π-phase pseudo-carriers in Embodiments 2-1 to 2-8 correspond to the i-th and i'-th pseudo-carriers in Embodiment 2-9, respectively, and the π/2-phase and 3π/2-phase pseudo-carriers correspond to the j-th and j'-th pseudo-carriers in Embodiment 2-9, respectively. That is, Embodiment 2-9 indicates general characteristics of the pseudo-carriers in the present invention, and it can be said that the other embodiments are specialized versions of Embodiment 2-9.

Embodiment 12-10

A description will be given below of another example that employs the chip-structured pseudo-carriers. In FIG. 47, the filters 161' and 162' are omitted and the signal-to-phase and amplitude converter 111 is substituted with a signal-to-amplitude converter 112 as parenthesized. The other parts remain unchanged but the filtering characteristics of the filters 161 and 162 are adjusted as mentioned below.

The number of chips which, upon receiving light from the light source, the i-th filter 161 of the optical transmitter and the j-th filter 162 of the optical transmitter other than the i-th filter or of a different optical transmitter sharing the same transmission line turn ON (pass) at the same time in the optical frequency region FSR/n (n=integer equal to or greater than 1) for filtering by the i-th filter 161 and in the optical frequency region FSR for filtering by the filter 162 and the numbers of chips which the i-th filter 161 of the optical transmitter turns ON (pass) in its filtering optical frequency region FSR and the j-th filter 162 of the optical transmitter other than the i-th filter or of a different optical transmitter sharing the same transmission line turns OFF (not pass) in its filtering optical frequency region FSR are equal to each other. In other words, the number of chips which the i-th filter 161 and the j-th filter 162 turn On at the same time (at the same chip positions) and the number of chips which at the same chip positions, the i-th filter 161 turns ON and the j-th filter 162 turns OFF are equal to each other.

Accordingly, letting $Ci(\Theta)$, where $\Theta=2\pi f$, represent the value of an i-th carrier for a chip of a phase Θ corresponding to the wavelength difference (frequency difference) from the reference wavelength (the reference frequency), $Ci(\Theta)=Ci(\Theta+FSR/n)$; letting $Ci'(\Theta)=1-Ci(\Theta)$, $\Sigma Ci(\Theta)(Ci(\Theta)-Ci'(\Theta))$ (where Σ is the summation of addition from h=0 to FSR/δΘ−1 over the period FSR where $\Theta=h\delta\Theta$) is a finite value; letting $Ck(\Theta)$ represent the in-phase-Θ intensity of the function indicating a k-th carrier other than the i-th carrier (where k is the pseudo-carrier number of other than i), the relation $\Sigma Ck(\Theta)(Ci(\Theta)-Ci'(\Theta))=0$ (where Σ is the summation of addition from h=0 to FSR/δΘ−1 over the period FSR where $\Theta=h\delta\Theta$) holds; letting $Cj(\Theta)$ represent the in-phase-Θ intensity of the function indicating a j-th carrier, $Cj(\Theta)=Cj(\Theta+FSR/n)$; letting $Cj'(\Theta)=1-Cj(\Theta)$, $\Sigma Cj(\Theta))(Cj(\Theta)-Cj'(\Theta))$ (where Σ is the summation of addition from h=0 to FSR/δΘ−1 over the period FSR where $\Theta=h\delta\Theta$) is a finite value; and letting $Cm(\Theta)$ the in-phase-Θ intensity of the function indicating an m-th carrier other than the j-th carrier (where m is the pseudo-carrier number other than i), $\Sigma Cm(\Theta)(Cj(\Theta)-Cj'(\Theta))$ (where Σ is the summation of addition from h=0 to FSR/δΘ−1 over the period FSR where $\Theta=h\delta\Theta$) holds.

The optical receiver 200 used in this embodiment is the same as that described previously with reference to Embodiment 2-7. In this way, QAM can be implemented. In Embodiment 2-10, too, equations that have $\int d\Theta$ replaced with Σ in Eqs. (1) to (4) hold. As the filter for use in this embodiment, it is possible to use a filter which provides transmittance 1/transmittance 0, in accordance with the value of one bit forming the Hadamard code, for chips of the number derived from the division of the chip number corresponding to FSR/n, for instance, by the code length of the Hadamard code. Moreover, in the case of using a filter which filters optical frequencies in the region equal to or wider than FSR in correspondence to a code that is a continuous concatenation of Hadamard codes, equations that have $\int d\Theta$ replaced with Σ in Eqs. (1) to (5) hold in an arbitrary optical frequency region FSR.

A description will be given below of a concrete example which uses another code in Embodiment 2-10. A sequence in which filter ON and OFF chips are 1s and 0s, respectively, corresponds to the longest sequence in which L is the code length (period length). For example, in the case of L=3, the sequence through which the first filter 161 can be made (101). In this instance, the sequences through the other filters (second and third filters) can be made (011) and (110), respectively, shifted from the sequence through the first filter 161.

The optical receiver 200 is provided with: an i-th filter 271 which transmits therethrough light of ON-chips contained in the optical frequency filtered by the i-th filter 161 at the transmitting side; an i'-th filter 271' which transmits therethrough light of OFF-chips contained in the optical frequency filtered by the i-th filter 161; a first detector group (231, 132) for detecting the optical intensity of light transmitted through each of first filters (271, 272); a second detector group (233, 234) for detecting the optical intensity of light transmitted through each of second filters (271', 272'); a comparator group (241, 242) for comparing the optical intensities by subtracting the intensity detected by the second detector from the intensity detected by the first detector; and an amplitude-signal converter (260) by which a combination of amplitudes modulated by modulators of the corresponding transmitting station, output from the comparator group, is converted to the transmission signal.

Consider, as an example of operation, the comparator output intensity in the case of receiving the signal (101) from the transmitter provided with the i-th filter 161 by th receiver corresponding thereto and the comparator output intensity in the case of receiving the signal (011) corresponding to the j-th filter 162. The output from the detector 231, which detects the optical intensity of the output light from the i-th filter 271 of the receiver, corresponding to the i-th filter 161, which permits the passage therethrough of the ON-chip light, is a two-chip component in the signal (101); the chip of the signal (101) which passes through the i'-th filter 171' of (010) filtering characteristics is 0; the output from the detector 233, which detects the optical intensity of the output light from the j'-th filter 272', is 0; and the output from the comparator 241 for comparing optical intensities by subtracting the intensity detected by the detector 233 from the intensity detected by the detector 231 is a two-chip output.

It is only one chip that received light (1019 passes through a j-th filter 272 for selecting signal light (011) which corresponds to the j-th filter 162 at the transmitting side, the output from the detector 232 for detecting the optical intensity of light transmitted through the j-th filter 272 is a one-chip output, the output from the detector 234 for detecting the intensity of light transmitted through a j'-th filter for selecting the light of an OFF-chip of the signal light (011) is a one-chip output, and the output from the comparator 242 for comparing the intensity detected by the detector 232 and the intensity detected by the detector 234 by subtracting the latter from the former is a 0-chip output.

As described above, this embodiment also enables the receiving side to cancel the input from the other pseudo-carriers except the target pseudo-carrier for receiving by differential detection as in Embodiment 2-7, permitting implementation of QAM with control accuracy lower than that on the order of optical wavelength. In the conventional optical communication method of the type that controls the phase of the optical signal, it is necessary to control the phase of a single-wavelength (frequency) optical signal with accuracies on the order of tens of nanometers which is a few tenth of micrometer for the optical wavelength and hence is sufficiently accurate; at present such phase control is feasible experimentally, but from the economical point of view its realization is difficult, and the optical communications system that involve QPSK, QAM or similar phase modulation has not been put to practical use yet.

According to the second mode of working of the invention, however, it is relatively easy to perform MPSK or QAM for optical carriers in the frequency domain.

It will be seen that in Embodiment 2-10, too, equations with $\int d\Theta$ replaced by $\Sigma$ in Eqs. (1) to (4) holds in a predetermined period FSR. Accordingly, assuming that the pseudo-carrier has a rectangular pattern periodic function composed of the chip of intensity 1 and the chip of intensity 0 in the region FSR, the number of chips of the i-th and j-th carriers corresponding to the filtering characteristics of the i-th filters 161, 271 and the j-th filters 162, 272 that have the intensity 1 (or intensity 0) at the same optical frequency positions and the number of chips of the i-th carrier that have the intensity 1 (or intensity 0) and the intensity 0 (or intensity 1) at the same optical frequency positions, respectively, are equal to each other. The rectangular pattern periodic function can also be applied to the case of using the light sources each corresponding to one chip as shown in Embodiment 2-8.

In the QAM modulation in each of the embodiments described above, either the intensity 1 or 3 is chosen by third and fourth parameters, respectively, to express any one of combinations of four pieces of data 1 and 0, that is, any one of 16 data combinations, but provision may be made to provide any one of 17 or more combinations. That is, the optical transmitter needs only to effect selective control, in accordance with the number of combinations of pieces of data 1 and 0 desired to express, so that the light corresponding to the i-th (or i'-th) and j-th (or j'-th) carriers may have the optical intensity of any one of predetermined multiple values. The optical receiver needs only to control the code-signal converter 260 to output that one of possible combinations of four or more pieces of data 0 or data 1 which corresponds to each possible combination for any one of predetermined multiple digital values including pieces of polarized information from the A/D converters 261 and 262 in FIG. 37-2.

Any one of the predetermined multiple digital values from the A/D converters 262 and 264 may sometimes include the polarized information and sometimes may not. The latter case corresponds to the case in which signal points only in one quadrant in FIG. 38(a), for example, in the first quadrant as referred to previously in connection with Embodiment 2-7, for instance, and the output from the code-signal converter 260 is converted to one of possible combinations of two pieces of data; accordingly, when the polarized information is contained as a digital value in the outputs from the A/D converters 263 and 264, the code-signal converter output is a combination of two or more pieces of data. Accordingly, it can be said that any one of multiple values corresponds, in general, to a combination of two or more pieces of data.

Embodiment 2-11

Figures 1, 48:
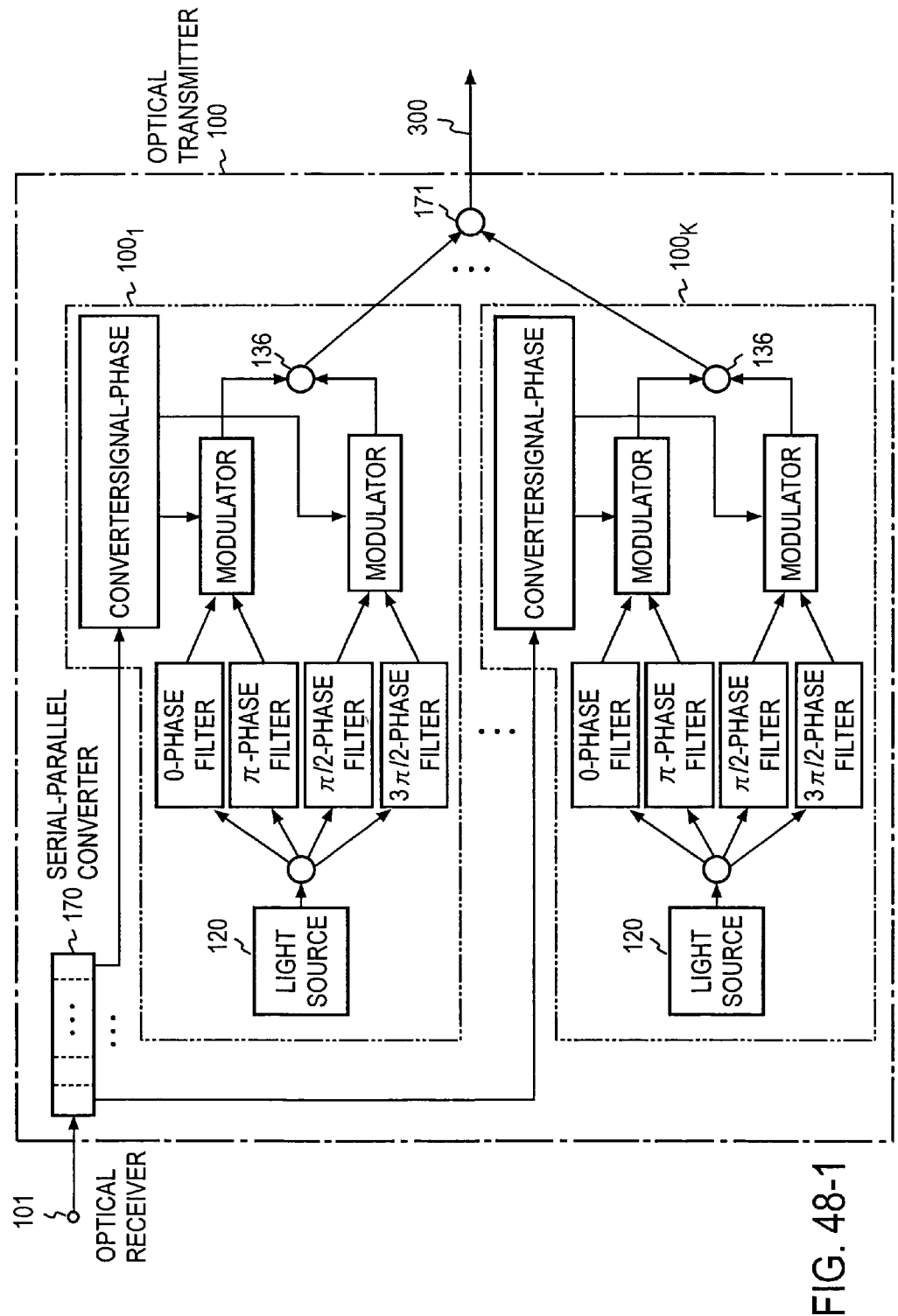
Figures 2, 48:
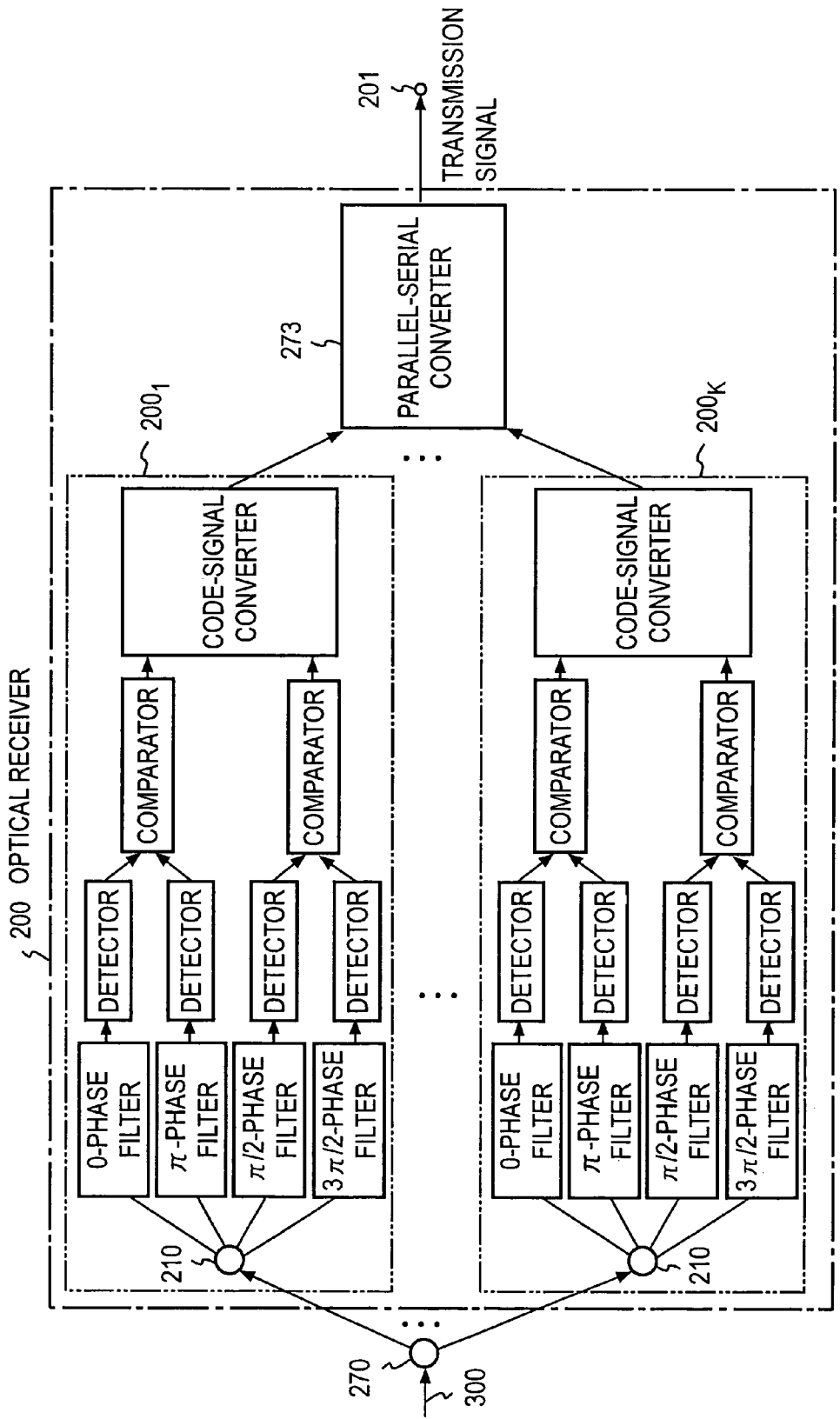

FIGS. 48-1 and 48-2 illustrate a communications system according to Embodiment 2-11 of the present invention. In the optical transmitter 100, K (K being an integer equal to or greater than 2) optical transmitters 100, described previously with respect to Embodiment 2-3 depicted in FIG. 35, are accommodated in parallel as indicated by $100_1, \ldots, 100_K$ in FIG. 48-1; the transmission signal (data sequence) from the input terminal 101 is converted by a serial-parallel converter 170 to K parallel sequences, which are input to the signal-phase converters 110 of the optical transmitters $100_1, \ldots, 100_K$, respectively. The outputs from the optical transmitters $100_1, \ldots, 100_K$ are combined by a combiner 171, from which the multiplexed output is provided to the optical transmission line 300.

In the optical receiver 200, K optical transmitters 100, described for use in Embodiment 2-3, that is, depicted in FIG. 30, are disposed in parallel as indicated by $200_1, \ldots, 200_K$ in FIG. 48-2; the optical signal from the optical transmission line 300 is split by a splitter 270 into K optical signals, which are input to the splitter 210 of the optical receivers $200_1, \ldots, 200_K$, respectively. The output signals from the optical receivers $200_1, \ldots, 200_K$ are converted by a parallel-serial converter 273 to the original transmission signal.

The optical transmitters $100_1, \ldots, 100_K$ and the optical receivers $200_1 \ldots, 200_K$ performs transmission and reception without interference with each other as described previously with reference to Embodiment 2-3.

The optical transmitters $100_1, \ldots, 100_K$ and the optical receivers $200_1, \ldots, 200_K$ in this embodiment employ filters of the type that when a predetermined period is used as a reference period, the period of a trigonometric function contained in the filtering characteristic of each filter is a period obtained by dividing the reference period by a natural number. That is, the above-mentioned reference period and the period of each filter of the optical transmitters $100_1, \ldots, 100_K$ correspond to a pair of fundamental and multiple periods generated by Fourier transform. For example, assuming that the value of the number N for dividing FSR is in the range of 1 to K, these FSR, FSR/2, ..., FSR/K are in the optical transmitters $100_1$, $100_2, \ldots, 100_K$, respectively, and their optical signals are combined by the combiner 171 into a combined optical signal, which is equivalent to a signal subjected to inverse discrete Fourier transform processing.

Let the periods of filtering characteristic functions of the filters for use in the optical receiver 200 be represented. Such relationships provide an operation equivalent to that by which the received optical signal is split into optical signals and they are discrete-Fourier-transformed by the optical receivers $200_1, \ldots, 200_K$ into the original transmission signal.

In this way, according to Embodiment 2-11, it is possible to implement pseudo OFDM (Orthogonal Frequency Division Multiplex) by use of multiple pseudo-carriers compatible with inverse discrete Fourier transform through utilization of the orthogonality between the pseudo-carriers. In the case where the optical transmitter 100 uses the optical transmitters $100_1, \ldots, 100_K$ each of which is provided with filters of filtering characteristics phased $\pi/2$ apart for each period from the fundamental period to a period K/2 times the former, if the one of the $\pi/2$-phased-apart filtering characteristics in the optical transmitters $100_1, \ldots, 100_K$ is a cosine function, the other is a sine function; the output from the optical transmitter 100 can be expressed by $\Sigma(an \cos((n/FSR)\Theta)+bn \sin((n/FSR)\Theta))$, where n is a value of a multiple of the filter period for the fundamental period, and an and bn are transmission signals that are carried by respective pseudo-carriers.

Even if the optical transmitter 100n and the optical receiver 200n are not provided which correspond to an arbitrary period n including the fundamental period, since the value of an or bn concerned is a 0, the equation of the output from the optical transmitter 100 holds, and consequently the generality of this embodiment is not impaired.

Unlike ordinary WDM (Wavelength Division Multiplex) this embodiment enables wavelengths to be superimposed on each other, and hence does not calls for the guard band needed in ordinary WDM, providing increased wavelength utilization efficiency.

Incidentally, the light sources 120 of the optical transmitters $100_1, \ldots, 100_K$ may be replaced with a single light source. While the Embodiment 2-11 uses multiple optical transmitters $100_1, \ldots, 100_K$ utilizing pseudo-QPSK, it is also possible to use multiple optical transmitters utilizing the afore-mentioned pseudo-MPSK or pseudo-QAM. Further, the filtering characteristic function is not limited specifically to the trigonometric function but may also be a function that has the properties referred to previously with reference to Embodiment 2-9. Accordingly, it is also possible to use pluralities of optical transmitters 100 and optical receivers 200 that use the chip-structured pseudo-carriers described previously with respect to Embodiments 2-5 to 2-8. In this instance, assuming that S, which is a predetermined measure of L/4, is a reference S, optical transmitters $100_1, \ldots, 100_K$ and optical receivers $200_1, \ldots, 200_K$ are used which are provided with filters each having a filtering characteristic based on S corresponding to the reference S. That is, the reference S and the filtering characteristic S of each filter of the optical transmitters $100_1, \ldots, 100_K$ correspond to the set of the fundamental and multiple periods generated by Fourier transform. In this way, the optical transmitter 100 of Embodiment 2-11 also sends the inverse-discrete-Fourier-transformed signal, and the optical receiver 200 discrete-Fourier-transforms the received signal into the original transmission signal.

The filter for use in the optical transmitter of any embodiments described above may be a filter adapted to control its filtering characteristic by the modulator output as described previously in reference to FIG. 33; alternatively, the filter may be configured to select a plurality of filters of fixedly set filtering characteristics. Accordingly, to control the filter by the modulator means control of the filtering characteristic and control of selection of filters.

Since the signal-phase converter 110, the signal-to-phase and amplitude converter 111 and the signal-amplitude converter 112 are to convert, in accordance with signal data, the input thereto to parameters for controlling filtering characteristics, selective control of filters and intensity control of light from the optical transmitter, they can generically be called signal-to-modulation value converters, and the phase amount and amplitude amount output therefrom can be called modulated values, and their respective components can be referred to as parameters.

While the second mode of working of the invention, which performs MPSK or QAM by use of periodic functions on the optical frequency axis as mentioned above, has been described previously in relation to its general configuration, but it can also be explained as follows. Letting the optical frequency width FSRi represent a value obtained by dividing the optical frequency width FSR, which is the least common multiple, by an integer Ni corresponding to the repetition period of the i-th optical frequency characteristic function Ci(f) in the optical frequency width FSR in the optical frequency range from the optical frequency Fst to Fla, $Ci(f)=Ci(f+FSRi)$, $\int Ci(f) \cdot Cj(f) df > \int Ci(f) \cdot (1-Ci(f)) df$, and for the j-th optical frequency characteristic function Ci(f) other than the i-th one, $\int Ci(f) \cdot Cj(f) df = \int Ci(f) \cdot (1-Cj(f)) df$;

and letting $\Delta f$ represent the remainder of the division of the period FSRi of the function Ci(f) by an arbitrary optical frequency width equal to or narrower than Ci(f)FSR and a phase $2\pi (\Delta f/FSRi)$ represent the phase difference from Ci(f), $Ci'(f)=Ci(f+\Delta f)$, that is, Ci'(f) is phased $2\pi(\Delta f/FSRi)$ apart from Ci(f), and $\int Ci'(f) \cdot Cj(f) df = \int Ci'(f) \cdot (1-Cj(f)) df$;

an input binary data sequence is sequentially separated into multiple separate data sequences, and for each data of each separate data sequence in a repeating cyclic order, the phases or/and amplitudes of an i-th optical signal of the i-th optical frequency characteristic function and a j-th optical signal of the j-th optical frequency characteristic function are controlled in accordance with the value of said each piece of data, and the first and second optical signals thus obtained are combined by one or more light sources and transmitted therefrom as an optical code signal.

An example of the optical frequency characteristic function is a trigonometric function which has different FSRi and the same FSR but whose $\Delta f$ is FSRi/4 or −FSRi/4.

Another example of the function Ci(f) is a function which divides FSR into a continuous optical frequency portion which is a value L, into which FSR is divided by 2SNi which is twice larger than the product of arbitrary integer S and Ni, and which repeats Ni times making S consecutive optical frequencies of each L-long optical frequency portion have the intensity 1 and the succeeding S optical frequencies have the intensity 0, or which sequentially shifts the positions of the S consecutive optical frequencies of the intensity 1 by a predetermined amount.

The third mode of working of the invention is also applicable to the point-to-N point optical communication network PON shown in FIGS. 2(*a*), 2(*b*), 3(*a*) and 3(*b*). It is also possible to apply to the third mode of working of the invention the technique of the first mode of working by which the i-th encoder on the monolithic planar lightwave circuit substrate controls the temperature of the planar lightwave circuit substrate which uses transmitted light through any one of the j-th decoders as described previously with reference to FIGS. 15 and 28. Moreover, the optical encoding method of the first mode of working, which employs the arrayed waveguide AWG, described previously with reference to FIGS. 21 and 22, is also applicable to the optical transmitter of the third mode of working.

[Third Mode of Working] [Reflective Optical Communication].

The third mode of working of the present invention is an application of the invention to a point-multipoint PON (Passive Optical Network) in which multiple subscriber terminals are connected to a central office via an optical fiber transmission lines, such an optical communications system as shown in FIG. 2 or 3.

Embodiment 3-1

A description will be given, with reference to FIG. 49, of the functional configuration of the basic concept of this third mode of working. Downstream signal light modulated (encoded) in accordance with binary data is input to a port 420*a* of an optical input/output unit 420 via an optical fiber 410 and then via an optical input/output port 412, thereafter being input to a switch 430 via a port 420*b* of the optical input/output unit 420. The switch 430 is controlled by an upstream data sequence from a terminal 431 to input the downstream signal light to a mark encoder 440M or space encoder 440S. The output light from the mark encoder 440 and th space encoder 440S is input via an optical combiner 450 to a port 420C of the optical input/output unit 420, and the input light is output as upstream signal light from the port 420*a* of the optical input/output unit 420 to the optical fiber 410 via the optical input/output unit 412. As the optical input/output unit 420 an optical circulator is used as indicated by the broken line in FIG. 49, but an optical directional coupler, an optical coupler/splitter, or the like may also be used. However, in order to avoid intensity modulation of the upstream signal light by a coherent crosstalk with reflected light and to reduce optical loss, the optical input/output unit 420 may preferably be an optical circulator. The optical combiner 450 may be formed by an optical coupler/splitter or switch that is controlled in interconnected control of the switch 430 as indicated by the broken line; in short, the optical combiner needs only to input the output light from the mark encoder 440M and the output light from the space encoder 440S to the port 420 of the optical input/output unit 420. The switch 430 provides the input light to the mark encoder 440M or space encoder 440S, depending on whether the data from the terminal 431 is the mark or space. In the case of using as the optical combiner 450 a switch which is controlled by the data from the input terminal 431, the switch 430 may also be an optical splitter.

The mark encoder 440M and the space encoder 440S are formed, for instance, as filters which output, over the entire period of the optical frequency (wavelength) of the downstream signal light, optical signals that are expressed by different functions each having the optical frequency (wavelength) as a variable. The optical frequency characteristics (optical codes) of the input downstream signal light and the output upstream signal light are functions that bear such relationship as described below.

Let a function of the optical intensity for the optical frequency f when the downstream signal light is mark, a function of the optical intensity when the downstream signal light is space, a function of the optical intensity for the optical frequency f when the upstream signal light is mark, and a function of the optical intensity when the upstream signal light is space be represented by IM(f), IS(f), OM(f) and OS(f), respectively. The integration value of the product of the functions IM(f) and the function OM(f) with respect to f or summation of them and the integration value of the product of the functions IM(f) and the function OS(f) with respect to f or the summation of them are equal, and the integration value of the functions IS(f) and the function OM(f) with respect to f or the summation of them and the integration value of the product of the functions IS(f) and the function OS(f) with respect to f or the summation of them are equal. That is, the functions bear the relationships that satisfy either one of the following equations (22) and (23) and either one of the following equations (24) and (25).

$$\int IM(f)OM(f)df = \int IM(f)OS(f)df \qquad (22)$$

$$\Sigma IM(f)OM(f) = \Sigma IM(f)OS(f) \qquad (23)$$

$$\int IS(f)OM(f)df = \int IS(f)OS(f)df \qquad (24)$$

$$\Sigma IS(f)OM(f) = \Sigma IS(f)OS(f) \qquad (25)$$

In the above, $\int df$ means the above-mentioned integral for an interval of the optical frequency period of the downstream signal, and $\Sigma$ means the above-mentioned summation for an interval of the optical frequency period of the downstream signal. The digital operations for Eqs. (22) and (24) are similar to the operations for Eqs. (23) and (25).

These relationships indicate that the optical intensity of the mark function and the optical intensity of the space function are equal to each other and that components corresponding to a half of the frequency components forming the mark or space downstream signal light can be formed as mark or space upstream signal light. Accordingly, this optical transmitter is capable of outputting the upstream signal light modulated by the same optical power without lowering the modulation degree whether the downstream signal light be mark or space.

The above-mentioned functions may be such as shown in FIG. 6. FIGS. 6(*a*) to (*c*) show examples of trigonometric functions, which are identical in amplitude, and overnormalized optical frequency period from 0 to 1 which is obtained through the optical frequency period from f0 to fL is normalized by the reference optical frequency f0=fs, the numbers of intensity fluctuations contained in this optical frequency period are 1, 2 and 3, respectively; and one of the solid lines or broken lines phased π/2 apart, or the one-dot-chain line displaced about π/4 from the solid line as shown in FIG. 6(*a*) is used as the mark function and the function displaced π apart therefrom is used as the space function; and for different directions or different optical communication equipment, another function bearing the relation shown in FIG. 6 is used as the mark function and a function phased π apart therefrom is used as the space function. Alternatively, as shown in FIG.

Figure 50A:
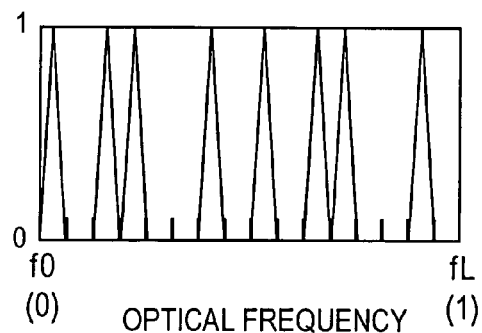
FIGS. 50($a$) and 50($b$) are diagrams showing examples in which chip functions are used as the optical frequency characteristics in the third mode of working of the invention, respectively.
Figure 50B:
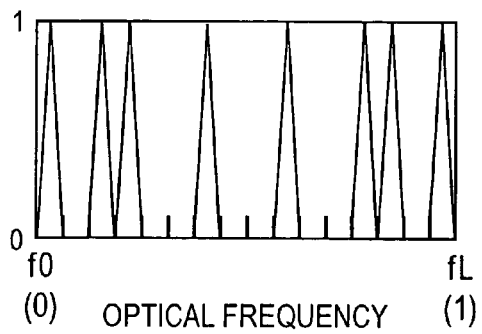

50, the frequency period from f0 to fL (normalized frequencies 0 to 1) is divided into L chips (optical frequencies), and when the function shown in FIG. 50(*a*) is, for instance, the mark function, the space function has the same number of chips of intensity 1 as that of the mark function as shown in FIG. 50(*b*), and a half of the intensity-1 chips of mark or space function of the downstream signal light can be used for the upstream signal light. The first half of FIG. 50(*b*) is the same as the first half of FIG. 50(*a*), and the second half is an complementary version of the second half of FIG. 50(*a*). As an example of each chip the optical intensity is shown in triangular form, but it is desirable that the optical frequency characteristic of each chip be in flat rectangular form.

Figure 51:
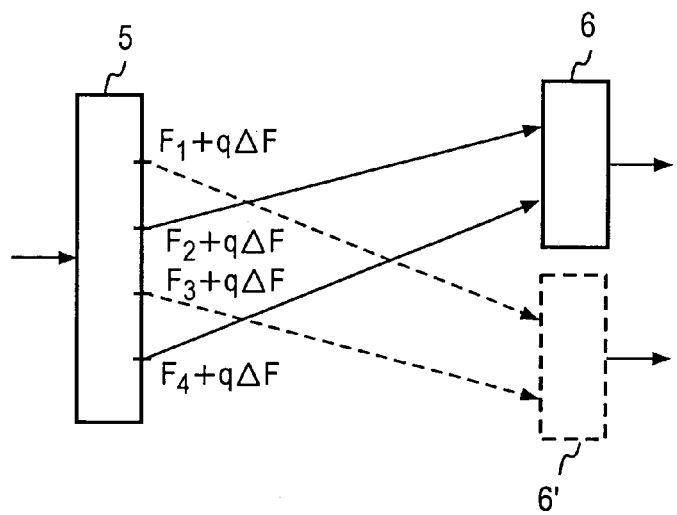
FIG. 51 is a diagram showing an example in which encoders 440M and 440S in FIG. 49 have chip functions.

As an encoder in the case of using a trigonometric function as the filtering function of the mark or space encoder 440M or 440S, it is possible to use such a Mach-Zehnder interferometer as depicted in FIG. 7 which is composed of a pair of optical paths 41 and 42 of different path lengths and couplers 43 and 44 coupled to both ends of the optical paths. FIG. 51 shows an example of the configuration of an encoder for forming, as the filtering function of the mark or space function 440M or 440S, such a chip string as shown in FIG. 50. The input light is fed to an optical filter 5, and the optical filter 5 outputs optical frequency signals of respective chips to different ports and outputs optical components displaced an integral multiple of the optical frequency $\Delta F$ apart. For example, when the output light from the encoder 440M or 440S repeats the same pattern every four chips, components of optical frequencies $F_1+q\Delta F$, $F_2+q\Delta F$, $F_3+q\Delta F$ and $F_4+q\Delta F$ (where q=1, 2, . . . ) are output from ports 1, 2, 3 and 4 of the optical filter 5, respectively. Of these outputs, the outputs from the ports corresponding to the chips of the intensity 1 are coupled by a coupler 6 and output therefrom. As such an optical filter 5, AWG (Arrayed Waveguide Graiting) can be used as is the case with the filter 84 in FIG. 21.

The switch 430 provides the input light to the mark encoder 440M or space encoder 440S, depending on whether the data from the terminal 431 is mark or space. When the optical combiner 450 is formed by a switch that is controlled by the data from the input terminal 431, the switch 430 may be an optical splitter. The upstream signal light and the downstream signal light may be transmitted over different optical fibers. For example, as indicated by the broken line in FIG. 49, provision may be made to input the upstream signal light from the optical combiner 450 to an optical fiber 411, omitting the optical input/output unit 420. Alternatively, as depicted in FIG. 52, total reflectors 451M and 451S are provided for total reflection of the optical outputs from the mark encoder 440M and the space encoder 440S so that the optical outputs from the mark encoder 440M and the space encoder 440S pass through the mark encoder 440M and the space encoder 440S, respectively, and input via the switch 430 to the optical fiber 410.

Figure 49:
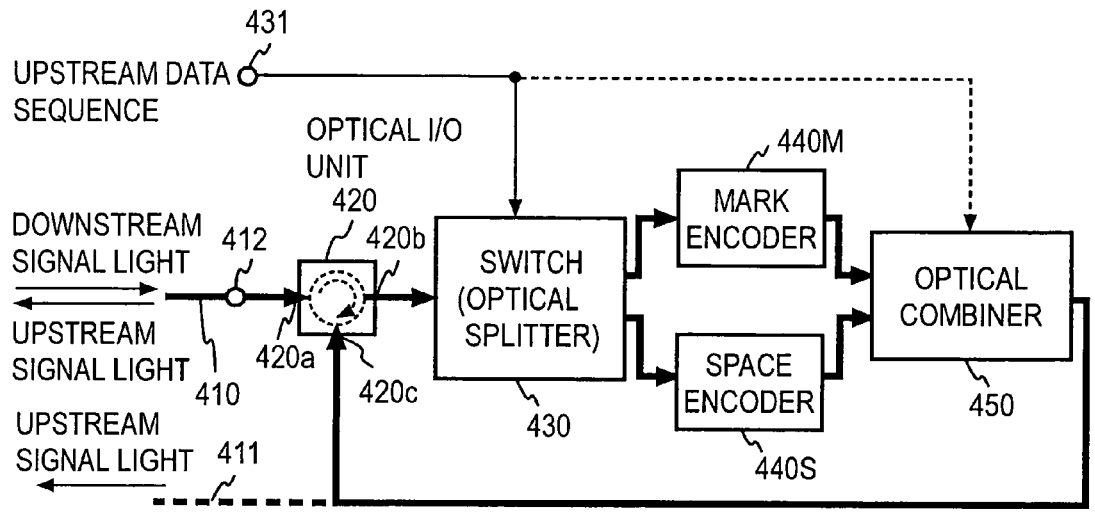
FIG. 49 is diagram illustrating the functional configuration of an embodiment of reflective optical communication equipment according to the third mode of working of the present invention.
Figure 52:
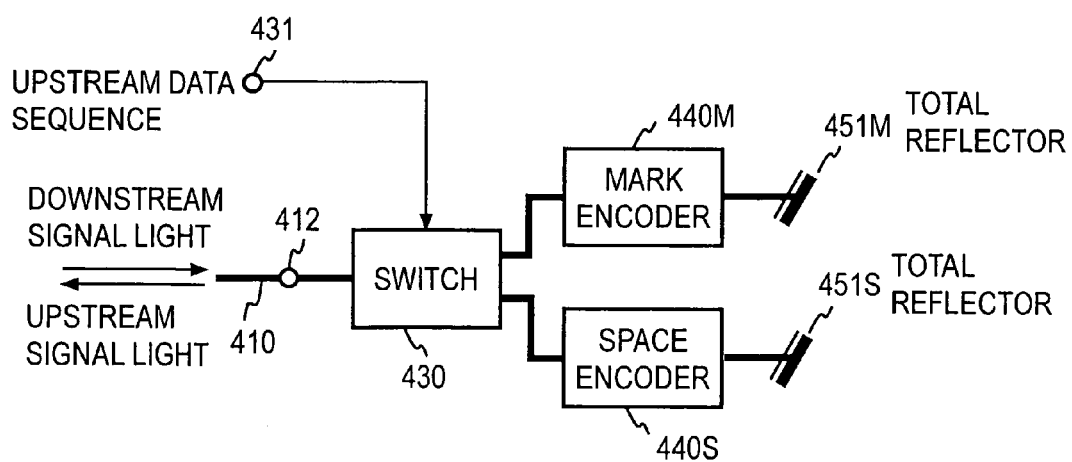
FIG. 52 is a diagram showing a functional configuration of another embodiment of the reflective optical communication equipment according to the third mode of working of the invention.

The device configuration of FIG. 52 dispenses with the optical input/output unit 420 in FIG. 49 and the optical combiner 450, and hence permits further reduction of the number of parts used; the number of parts for modulation is smaller than in the FIG. 49 configuration using a combination of switches, and as compared with the case of using a combination of a switch and an optical combiner instead of using two switches in FIG. 49, the illustrated device configuration produces the effect of avoiding the optical loss by the optical combiner.

In FIGS. 49 and 52 there is not shown a downstream signal light receiving circuit, but it is also possible that at a stage preceding the switch 430 a portion of the downstream signal light is branched to a downstream signal light receiving circuit to decode the downstream data sequence. Reception and decoding similar to this will be described later on with reference to FIG. 53, for instance. In the third mode of working of the invention, the light source is an optical transmitter of the communication partner which generates the downstream signal light (optical code signal).

As described above, according to this embodiment, light encoded by one of the mark and the space equal in optical intensity to each other is received and a half of the optical frequencies forming the received mark or space downstream signal light is sent back as mark or space upstream signal light. Hence, light to be modulated as the upstream signal light can be supplied without the need for sending non-modulated CW light to be modulated as the upstream signal light separately of the downstream signal light and without impairing the extinction ratio of the downstream signal.

With the equipment disclosed in document 3, the central office separately sends the downstream signal light for sending its information (data) and non-modulated CW (Continuous Wave) light in the downstream direction so that the local office sends it back as an upstream signal modulated by information (data) of the local office itself. As a result, the downstream signal to be sent back to the central office is not actually used for information transmission therefrom. With the equipment set forth in document 4, the central office purposely worsens the extinction ratio of the downstream signal light for sending the information (data) of the central office itself, and the local office modulates the received optical signal by the information (data) of the local office itself and sends the modulated signal as the upstream signal light to the central office; hence inefficient continuous wave light is used. However, this degrades the extinction ratio of either of the downstream signal light from the central office and the upstream signal light from the local office, giving rise to the problem of deteriorated communication quality.

But the third mode of working of the invention permits modulation of the upstream signal light without the need for transmitting non-modulated light and without worsening the extinction ratio of the downstream signal light. In the third mode of working of the invention, the encoder is encoding means which modulates, based on its encoding function, the optical signal so that the optical intensity-frequency characteristic of the modulated optical signal becomes an optical intensity-frequency characteristic obtained by multiplying the optical intensity-frequency characteristic of the downstream signal light by the optical intensity-frequency characteristic of the encoding function, and the decoder is decoding means which decodes and outputs, based on its decoding function, from the optical signal a component whose optical intensity-frequency characteristic is the decoding function.

Embodiment 3-2

Figure 53:
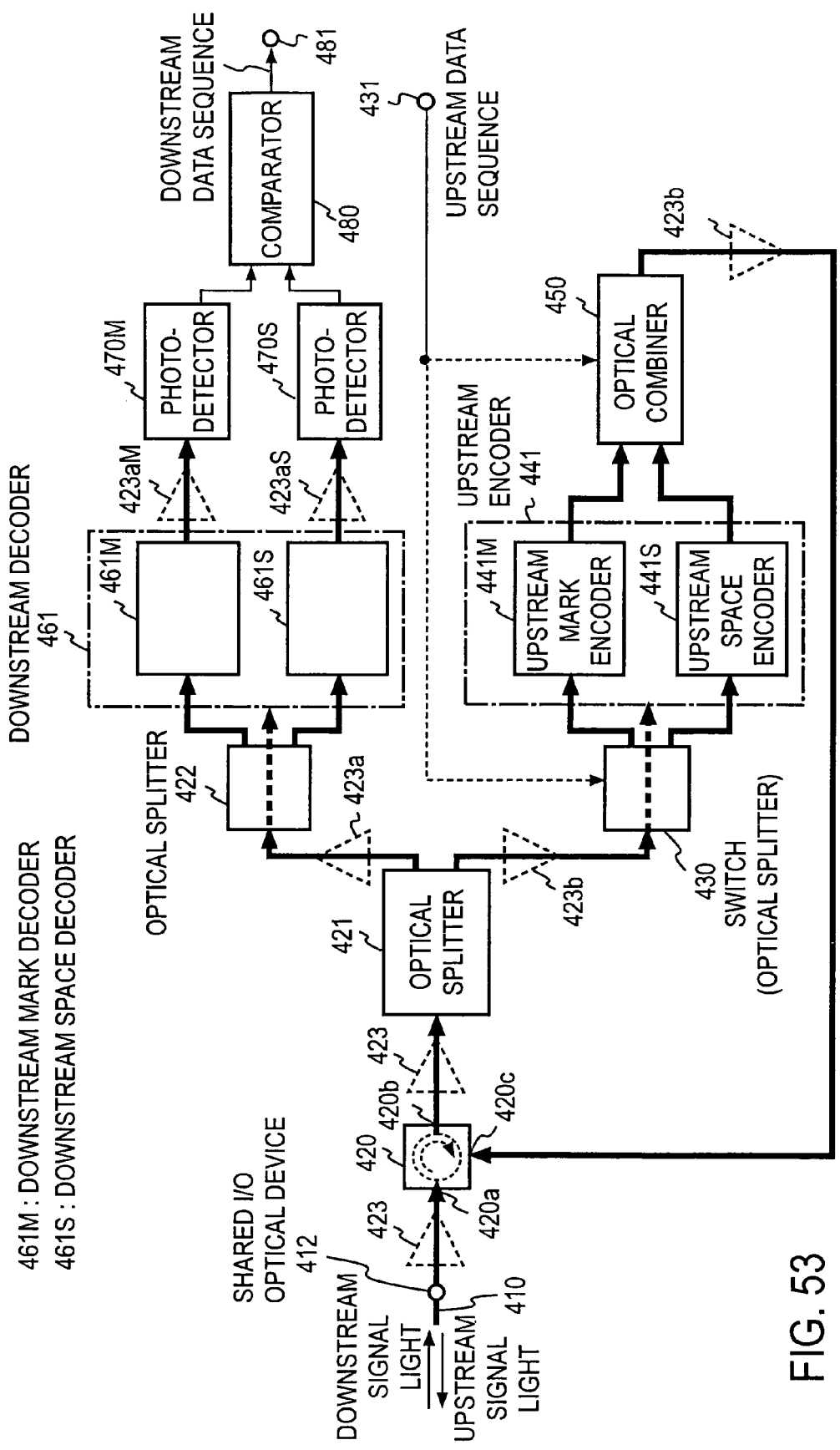
FIG. 53 is a diagram illustrating the functional configuration of an example of this invention equipment in which transmitter and receiver circuits are provided in parallel.

Embodiment 3-2 is an example in which respective optical frequency characteristic functions made to be orthogonal to each other and to be chip codes. Referring to FIG. 53, Embodiment 3-2 will be described below. The downstream signal light from the optical fiber 410 is input to a downstream mark decoder 464M and a downstream space decoder 461S via the optical input/output port 412, then the optical input/output unit 420 and then optical splitters 421 and 422, and light having passed through these decoders 461M and 461S is converted by optical detectors 470M and 470S into electrical signals; these electrical signals are compared by a comparator 480 to detect, for example, the difference between them, and if the magnitude of the difference exceeds a predetermined value, it is provided as a downstream data sequence to an output terminal 481.

The other downstream signal light split by the first optical splitter 421 is input to the switch 430, and as shown in FIG. 49, it is modulated by the upstream data sequence from the input terminal 431 into the upstream signal light, which is fed to the optical input/output unit 420, from which it is output via the optical input/output port 412 to the optical fiber 410. When the optical combiner 450 is formed by a switch which is controlled by the data from the terminal 431, the switch 430 may be substituted with an optical splitter.

In Embodiment 3-1 an integration value of the difference obtained by subtracting the space upstream signal light from the mark upstream signal light and the mark or space downstream signal light, with respect to an optical frequency, or the summation of them is zero; that is, the optical characteristic functions of them are made to apparently be orthogonal to each other. More specifically, the downstream signal light is a natural-number NI set of input light which has an optical frequency characteristic identical with the optical frequency function of either one of the mark and space; letting the optical intensity functions of the i-th mark and space be represented by IMi(f) and ISi(f), respectively, the relationship between the i-th downstream signal light and a j-th downstream signal light other than the i-th one both contained in the NI sets satisfies the following equation (26) or (27).

$$\int IMi(f)(IMj(f)-ISj(f))df = \int ISi(f)(IMj(f)-ISj(f))df = \int IMj(f)(IMj(f)-ISi(f))df = \int ISj(f)(IMi(f)-ISj(f))df = 0 \quad (26)$$

$$\Sigma IMi(f)(IMj(f)-ISj(f)) = \Sigma ISi(f)(IMj(f)-ISj(f)) = \Sigma IMj(f)(IMi(f)-ISi(f)) = \Sigma ISj(f)(IMi(F)-ISi(f)) = 0 \quad (27)$$

And, the relationship between the i-th downstream signal light and the i-th upstream signal light contained in the NI set satisfies the following equation (28) or (29).

$$\int IMi(f)(OMi(f)-OSi(f))df = \int ISi(f)(OMi(f)-OSi(f))df = \int OMi(f)(IMi(f)-ISi(f))df = \int OSi(f)(IMi(f)-ISi(f))df = 0 \quad (28)$$

$$\Sigma IMi(f)(OMi(f)-OSi(f)) = \Sigma ISi(f)(OMi(f)-OSi(f)) = \Sigma OMj(f)(IMi(f)-ISi(f)) = \Sigma OSi(f)(IMi(F)-ISi(f)) = 0 \quad (29)$$

In the above, ∫ means the above-mentioned integral for an interval of the optical frequency period of the downstream signal, and Σ means the above-mentioned summation over the optical frequency period of the downstream signal. Incidentally, the downstream signal light to be detected in the same optical communication equipment and the upstream signal light to be output therefrom have different functions. The digital operations for Eqs. (26) and (28) are similar to the operations for Eqs. (27) and (29).

As the function having such properties as mentioned above, it is possible to use the Hadamard codes such as shown in FIG. 10. The optical frequency characteristic function of the signal light, if used as the filtering function, is such that, for example, for the mark signal light, the optical frequency chip 1 is allowed to pass but the optical frequency chip 0 is not allowed, whereas for the space signal light the optical frequency chip 1 is not allowed to pass but the optical frequency chip 0 is allowed. That is, in the case of the same code, the optical intensities 1 and 0 are reversed between the mark signal light and the space signal light. The code 2[0101], the code 3 [0011] and the code 4[0110] satisfy Eqs. (22) to (29). For example, in order to generate the signal light of the code 2[0101], the ports of the optical filter 5 from which to output optical wavelengths (optical frequencies) $\lambda_2$ and $\lambda_4$ are connected to the coupler 6 as shown in FIG. 51, the ports from which to output optical wavelengths (optical frequencies) $\lambda_1$ and $\lambda_3$ are connected to the port 6' as indicated by the broken lines, and the outputs from the couplers 6 and 6' are selectively output from the switch 450 serving as an optical combiner, depending on whether the data is mark or space.

Because of such codes, for example, when an i-th signal light is to be received but a different signal light, for instance, a j-th one is actually input, the filtering characteristic functions of the downstream mark decoder 461M and the downstream space decoder 461S are IMi(f) and ISi(f), respectively, and the optical frequency functions of the input light is IMj(f) or ISj(f), and Eqs. (26) or (27) holds; consequently, the difference between the detected optical intensities of the outputs from the decoders 461M and 461S is cancelled in the comparator, so that signal light other than the i-th one to be received is not provided to the output terminal 481. Further, the filtering characteristic functions of the upstream mark encoder 441M and the upstream space encoder 441S are OMi(f) and OSi(f), respectively, and even if the upstream signal is reflected on the optical transmission line and the reflected light is input to the downstream mark decoder 461M and 461S, Eq. (28) or (29) holds; accordingly, the detected optical intensities by the optical detectors 470M and 470S are cancelled by the comparator 480 and no output therefrom is provided to the output terminal 481. In other words, even if reflected light exists, it does not constitute any obstacle to the reception of signal light of the desired code.

Figure 54A:
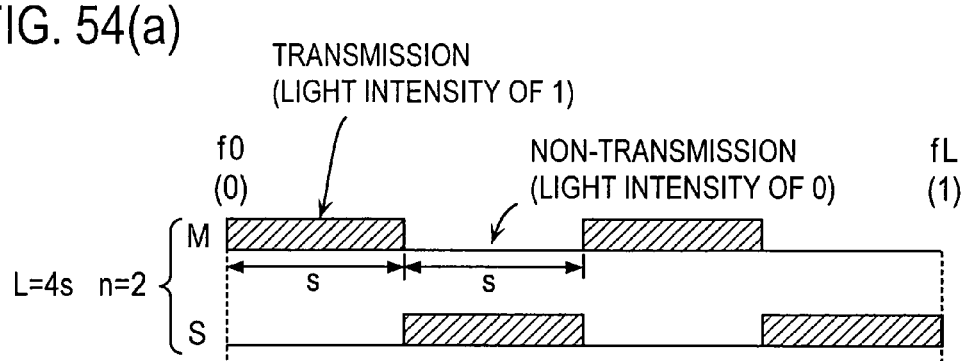
FIG. 54 is a diagram showing an example of the chip function in the third mode of working of the invention.
Figure 54B:
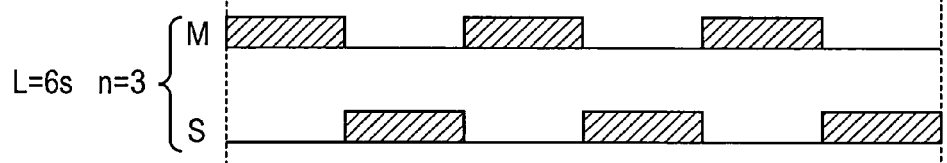
Figure 54C:
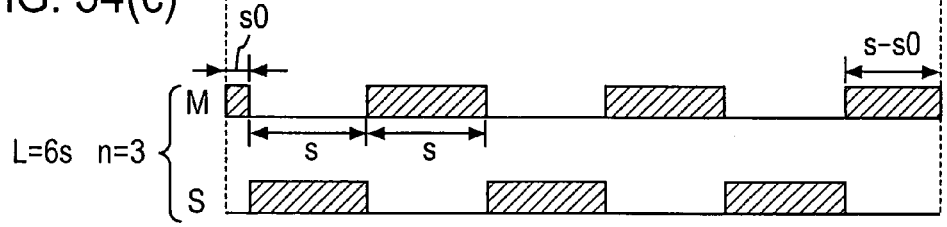

Other examples of functions having such characteristics will be described below. The optical frequency period from f0 to fL (normalized optical frequencies) of the downstream signal light is divided into L=4s as shown in FIG. 54(*a*), for instance; the i-th mark function Mi(f) repeats n=2 times transmission (optical intensity 1) of the first s chips and no-transmission (optical intensity 0) of the succeeding s chips, and the i-th space function Si(f) repeats n=2 times transmission (optical intensity 1) of the first s chips and non-transmission (optical intensity 0) of the succeeding s chips. When the period f0 to fL is divided into L=6s as shown in FIG. 54(*b*), the i-th mark function Mi(f) repeats n=3 times transmission of the first s chips and non-transmission of the next s chips, and the i-th space function Si(f) repeats n=3 times transmission of the first s chips and no-transmission of the next s chips. In general, the function mentioned herein is the filtering characteristic function (optical intensity-frequency characteristic function) represented by the optical frequency of L chips into which the optical frequency period from f0 to fL is divided, the number obtained by dividing L by 2 being a multiple of s; letting IMi(f) represent the filtering characteristic function for the i-th mark and ISi(f) represent the filtering characteristic function for the i-th space, the i-th filtering characteristic function IMi(f) is a function that repeats transmission of s chips and non-transmission of the succeeding s chips at least the number of times (n times) obtained by dividing L by 2s, and the i-th filtering characteristic function ISi(f) is a function that repeats non-transmission of s chips and transmission of the succeeding s chips at least the number of times (n times) obtained by dividing L by s. Incidentally, the illustrated functions start transmission or non-transmission of consecutive s chips at f0, but in such a case as shown in FIG. 54(*c*) where L=6s and n=3, the function may also be one that starts transmission or non-transmission of chips of an arbitrary integer s smaller than s, then repeats non-transmission or transmission of s chips and transmission or non-transmission of the succeeding s chips the number of times obtained by subtracting 1 from a number obtained by dividing L by 2s, followed by transmission or non-transmission of (s−s0) chips. That is, despite of the above-mentioned relationship, the function may be such a function as shown in FIG. 54(c) which is phased apart from the function of FIG. 54(b), for instance. The code 2 of the afore-mentioned second-order Hadamard matrix is L=4, s=1 and n=2, the code 3 is L=4, s=2 and n=1, and the code 4 is a cyclically left shifted version of the code 3 by the phase π/4. These relationships are the same as the characteristic functions shown in Embodiment 2-6 of the second mode of working of the invention; for example, IMj (f), ISi(f), OMj(f), and DSj(f) correspond to Ci(f), (1−Ci(f)), Cj(f) and (1−Cj(f)), respectively.

It will easily be seen that these filtering characteristics, the encoders 441M and 441S and the decoders 461M and 461S which have such functions can be similarly implemented by use of such optical filter 5 and couplers 6 and 6' as shown in FIG. 51. In the case of using the encoder of such a configuration as mentioned above, the upstream mark encoder 441M and the upstream space encoder 441S are formed integral as an upstream encoder as indicated by the one-dot-chain line in FIG. 53, the switch 430 is omitted, the optical combiner 450 is formed by a switch, the downstream mark decoder 461M and the downstream space decoder 461S are also formed integral as a downstream decoder 461, and the optical splitter 422 is omitted.

In Embodiment 3-2 depicted in FIG. 53, too, as is the case with the FIG. 52 embodiment, the provision of total reflectors 451M and 451S at the output sides of the upstream mark encoder 441M and the upstream space encoder 441S permits removal of the optical input/output unit 420 and the optical combiner 450, allowing reduction of the number of parts used. Moreover, it is also possible to form the switch 430 by an optical splitter and the optical combiner 450 by a switch.

Figure 55:
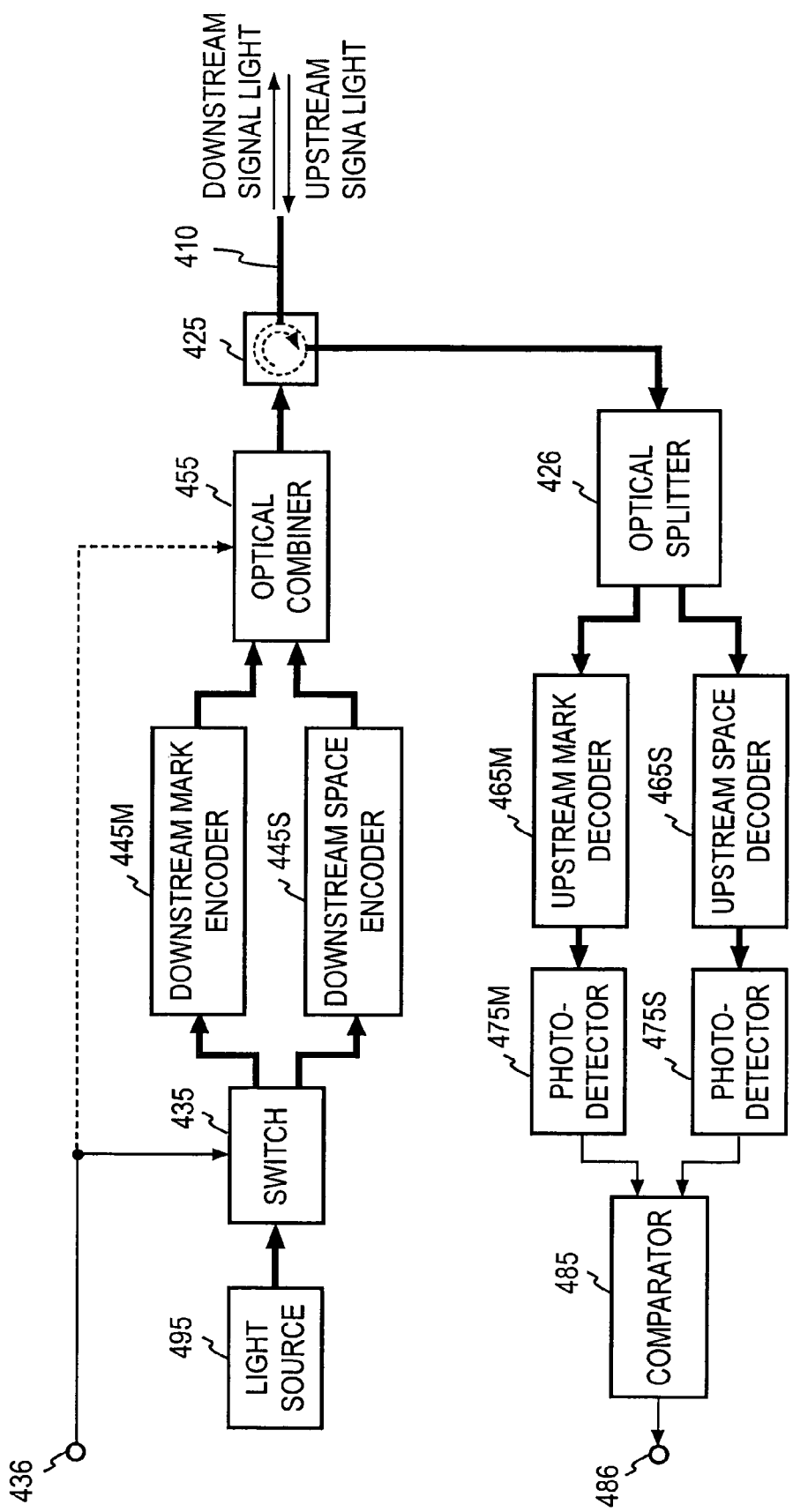
FIG. 55 is a diagram illustrating the functional configuration of an example of optical communication equipment which is the communicating partner of the reflective optical communication equipment according to third mode of working of the invention.

FIG. 55 illustrates an example of the configuration of optical communication equipment that is the communication partner of the optical communication equipment shown in FIG. 53. The optical signals of the optical frequencies f0 to fL from a light source 495 are switched by a switch 435 between a downstream mark encoder 445M and a downstream space encoder 445S, depending on whether each piece of data of a downstream data from an input terminal 436 is mark or space. The filtering characteristic functions of the downstream mark encoder 445M and the downstream space encoder 445S are chosen to be the same as the filtering characteristic functions IMi(f) and ISi(f) of the downstream mark decoder 461M and the downstream space decoder 461S of the partner optical communication equipment. The downstream signal light from the downstream mark encoder 445M and the downstream space encoder 445S is input via an optical combiner 455 and an optical input/output unit 425 to the optical fiber 410.

The upstream signal light input from the optical fiber 410 is input via the optical input/output unit 425 and an optical splitter 426 to an upstream mark decoder 465M and an upstream space decoder 465S. The filtering characteristic functions of the decoders 465M and 465S are chosen to be the same as the filtering characteristic functions OMi(f) and OSi (f) of the upstream mark encoder 441M and the upstream space encoder 441S of the partner optical communication equipment. The output signal light from the upstream mark decoder 465M and the upstream space decoder 465S is input to optical detectors 475M and 475S, and output electrical signals from the optical detectors 475M and 475S are compared by a comparator 485, which provides its compared output as an upstream data sequence to an output terminal 486.

According to Embodiment 3-2, even if multiple pairs of optical communication equipment that outputs the downstream signal light and the optical communication equipment that outputs the upstream signal light shares the optical fibers 410, since each pair uses different codes (filtering functions), that is, the optical frequency characteristic functions bearing the afore-mentioned relationship, optical signals from optical communication equipment other than the pair of equipment also are orthogonal to each other and hence they do not become noise, and since the downstream signal light and the upstream signal light are also different in code, at least one-half of the optical frequency components of the downstream signal lights can be modulated as upstream signal light. This effect is particularly effective in a PON (passive Optical Network) configuration that is a point-to-N point network such as defined in ITU-T Recommendation G. 983 and G. 984 series. In a wavelength division multiplex-passive optical network (WDM-PON) of the type heretofore proposed, downstream signal lights that are sent to optical network units (ONU) which are other customer premises equipment is usually mere noise, that is, noise that is merely discarded by an optical filter or the like. In Embodiment 3-2, however, it can be effectively used as lights for modulation as the upstream signal light. In the case of making an optical intensity design on the presumption of making use of the downstream communication lights to other optical network unit, if the number of optical network units to be connected is too small to secure downstream signal light of sufficient optical intensity, it is necessary for the partner optical communication equipment to output downstream light corresponding to the number of unconnected optical network units.

Embodiment 3-3

Embodiment 3-3 uses trigonometric functions as the functions which have the relationship of Eq. (22) or Eq. (23), Eq. (24) or Eq. (25), Eq. (26) or Eq. (27), and Eq. (28) or Eq. (29). That is, the functions for use in Embodiment 3-3 are trigonometric functions that bear integral-multiple relations between their period of optical intensity variation in the optical frequency region or are phased π/2 apart when the periods of optical intensity variation in the optical frequency region when the periods are the same. That is, the optical frequency characteristic function Mi(f) of the mark signal light, for instance, is given by Eq. (30)

$$Mi(f)=(1+\cos 2\pi sf/(fL-f0)+r\pi/2))/2 \tag{30}$$

And the optical frequency characteristic function Si(f) of the space signal light is 1−Mi(f), that is, given by Eq. (31).

$$Si(f)=1-(1+\cos(2\pi sf/(fL-f0)+r\pi/2)) \tag{31}$$

where s is an integer in the range from 1 to a value NI/2 obtained by dividing the maximum NI (required number of codes) by 2, r is 0 or 1, and fL−f0=FSR. In FIG. 6, (a), (b) and (c) are trigonometric functions which corresponds to s=1, 2 and 3 of Mi(f), respectively, the dotted lines corresponding to r=0 and the solid lines corresponding to r=1.

Figure 56:
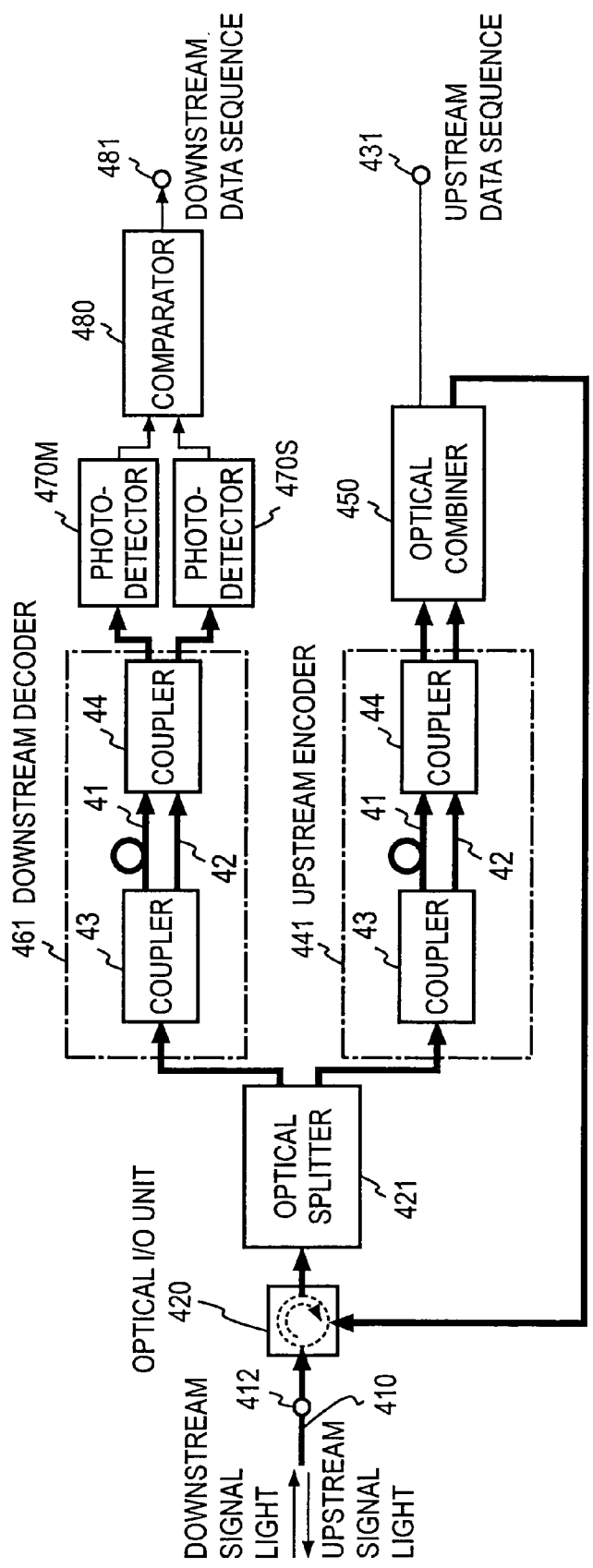
FIG. 56 is a diagram illustrating the functional configuration of an example in which transmitter and receiver circuits each having a trigonometric function filtering characteristics are both provided.

The filter of such an optical frequency characteristic function can easily be formed by the Mach-Zehnder interferometer shown in FIG. 7, for instance. FIG. 56 illustrates an example of the optical communication equipment in such a case. The downstream signal light from the optical fiber 410 is input via the optical input/output unit 420 to the downstream decoder 461 and the upstream encoder 441 after being split by the optical splitter 421. The downstream decoder 461 and the upstream encoder 441 are each formed by the Mach-Zehnder interferometer. The optical path length differences between the optical paths 41 and 42 of the Mach-Zehnder interferometers forming the decoder 461 and the encoder 441 are determined corresponding to the functions IMi(f) and OMi(f), respectively. Assuming that mark signal light is output from the one output port of the coupler 44 of the decoder 461, space signal light is output from the other output port, and the optical outputs are input to the optical detectors 470M and 470S, respectively. On the other hand, mark signal light from the one output port and space signal light from the other output port of the coupler 44 of the encoder 441 are provided to the switch 450. The illustrated optical communication equipment is identical in construction and operation to the FIG. 53 equipment except the above.

The use of such trigonometric functions also provides orthogonality between respective codes, eliminates interference by other codes and excludes the influence of reflected light, and in the point-to-N point access network or the like the downstream signal lights from optical communication equipment other than the partner one can also be used as light for modulation as the upstream signal light; thus, this embodiment produces the same effects as are obtainable with Embodiment 3-2.

Embodiment 3-4

Embodiment 3-4 is provided with an optical amplifier with a view to implementing any one or all of: a solution to insufficient optical intensity of the downstream signal light; reception of the downstream signal light with the optical intensity within the dynamic range of the optical detector; and outputting of the upstream signal light with a sufficient optical intensity.

As indicated by the broken line in FIG. 53, an optical amplifier 423 is inserted between the optical input/output unit 420 and the optical splitter 421 to amplify the downstream signal light. The optical amplifier 423 amplifies input light from both directions; for example, SOA (Semiconductor Optical Amplifier) can be used. In this instance, the optical amplifier 423 may be inserted in the optical fiber 410 as indicated by the broken line to amplify both of the downstream signal light and the upstream signal light. Alternatively, optical amplifiers 423a and 423b may be connected to the two split output sides of the optical splitter 421, respectively, and the amplification factor of the optical amplifier 423a is chosen so that the downstream signal light for reception use has an optical intensity in the dynamic range of each of the optical detectors 470M and 470S, whereas the amplification factor of the optical amplifier 423b for amplifying the downstream signal light for transmission use so that the upstream signal light has a sufficient level of optical intensity. The optical amplifier 423b may be connected to the output side of the optical combiner 450. In this instance, the amplifier amplifies only light encoded by the encoder 441M and 441S, and hence effectively amplifies them. Similarly, when optical amplifiers 423aM and 423bS are connected to the output sides of the downstream mark decoder 461M and the downstream space decoder 461S in place of the optical amplifier 423a, only decoded signal light can be amplified efficiently, and the optical amplifier 423aM for mark and the optical amplifier 423aS for space can also be used as independent hard limiters.

Figure 57:
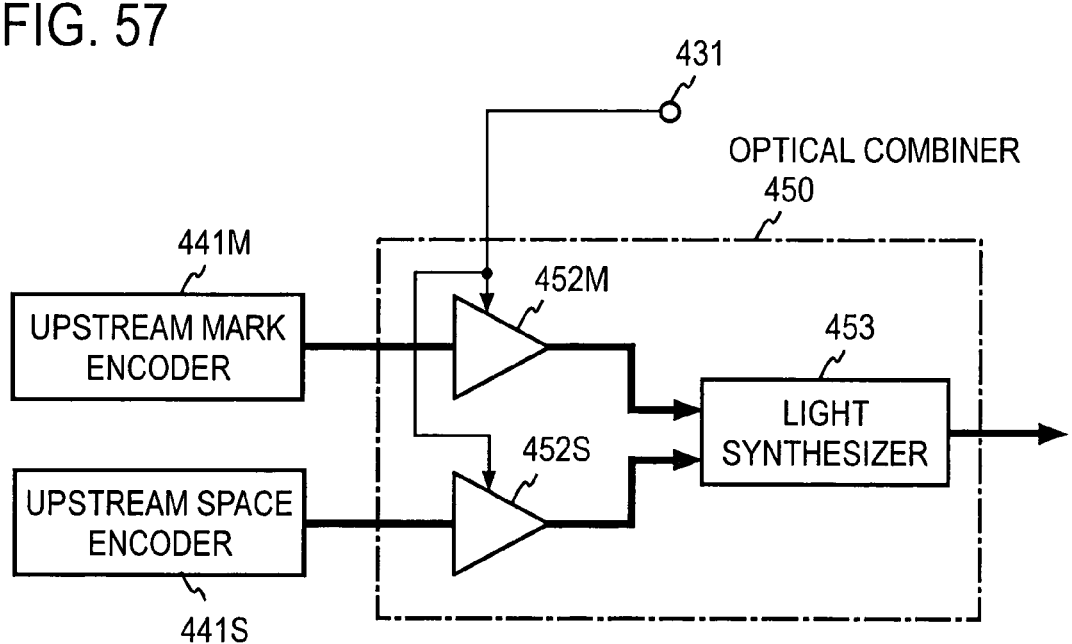
FIG. 57 is a diagram showing the functional configuration of another example of an optical combiner in FIG. 53.
Figure 58:
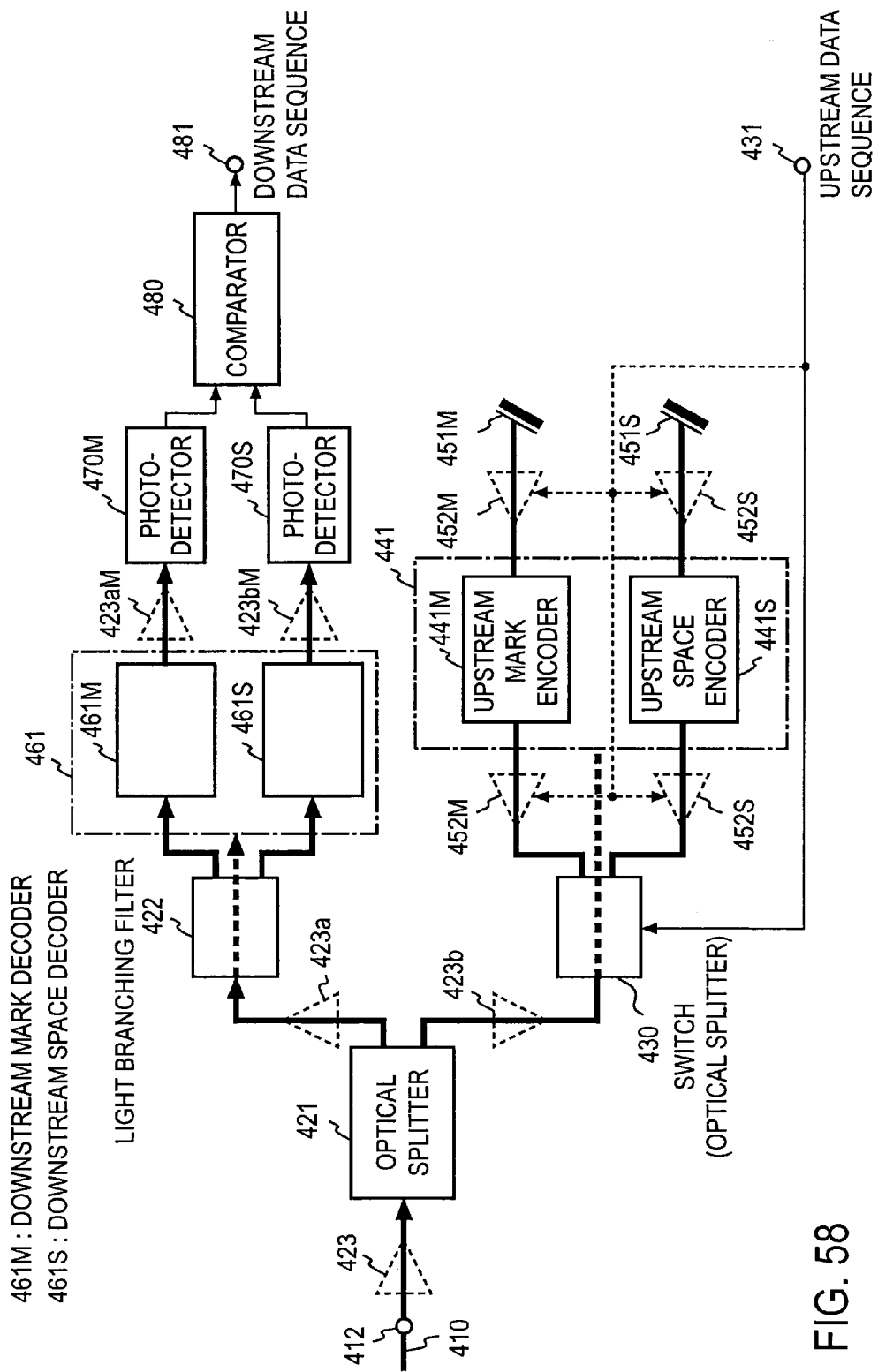
FIG. 58 is a diagram illustrating the functional configuration of another example in which the transmitter and receiver circuits are both provided in the third mode of working of the invention.

The optical combiner 450 may be configured as shown in FIG. 57, in which the optical signal outputs from the upstream mark encoder 441M and the upstream space encoder 441S are combined by an optical combiner 453 after being amplified by optical amplifiers 452M and 452S, respectively, and the amplification factors of the optical amplifiers 452M and 452S are controlled according to the data from the terminal 431 to selectively output coded light corresponding to mark and space, by increasing the amplification factor of the optical amplifier 452M but decreasing the amplification factor of the optical amplifier 452S when the data from the input terminal 431 is mark and by decreasing the amplification factor of the optical amplifier 452M but increasing the amplification factor of the optical amplifier 452S when the data is space. In this way, the optical intensity of the upstream signal light can be increased sufficiently. In this case, an optical splitter can be used instead of the switch 430. This produces the effect of eliminating the need for using switches in the optical communication equipment. While in the above an embodiment of the optical communication equipment of FIG. 53 has been described as using the optical amplifier, the filtering characteristic functions of the encoder and the decoder for use in the optical communication equipment may be not only the optical frequency chip sequence functions but also the trigonometric functions described previously with reference Embodiment 3-3. Furthermore, optical amplifiers can similarly be used to effectively work even if they are inserted at respective places in the optical communication equipment in which total reflectors are provided at the output sides of the encoders, the optical input/output unit 420 is omitted and the downstream signal light is decoded as shown in FIG. 52. FIG. 58 illustrates an example of such optical communication equipment, in which insertable optical amplifiers are indicated by the broken lines and identified by the same reference numerals as those in FIGS. 52, 53 and 57, and no description will be given of them. In this instance, the optical splitter connected directly to the optical input/output port 412 is formed by an optical combiner/splitter 421, and in the case of selecting the mark signal light and the space signal light by controlling, according to data, the amplification factors of the optical amplifiers 451M and 451S connected to the sides opposite to the total reflectors 451M and 451S with respect to the mark encoder 441M and the space encoder 441S, the switch 430 is formed by an optical combiner/splitter. In the case where the mark encoder 441M and the space encoder 441S are formed by a single-structured encoder 441, the optical amplifiers 451M and 451S are inserted between the mark signal light output port and the space signal light output port of the encoder 441 and the total reflectors 451M and 451S, respectively, and in the case of controlling these optical amplifiers 451M and 451S according to the upstream data sequence, the input port of the encoder 441 is connected directly to the optical combiner/splitter 421, and consequently the optical combiner/splitter 430 can be omitted. In this case, the optical amplifiers 451M and 451S may be substituted with switches which are ON/OFF-controlled inversely to each other according to the upstream data; to sum up, they need only to select either one of the mark signal light and the space signal light in accordance with the upstream data.

Embodiment 3-5

Figure 59:
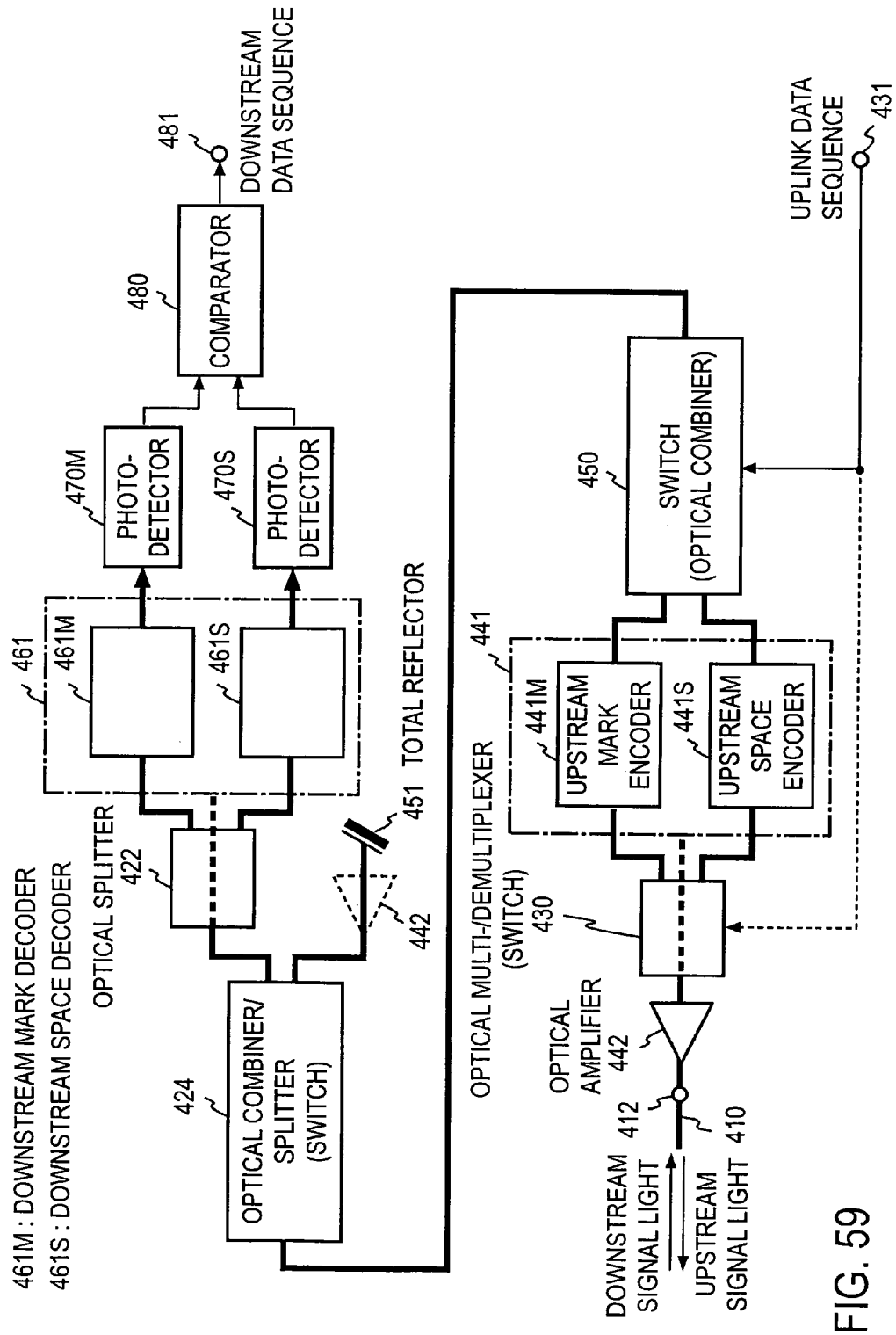
FIG. 59 is a diagram illustrating the functional configuration of an example in which the receiver circuit is connected in cascade to the output of the transmitter circuit in Embodiment 3-5.

While in the above the receiving decoder circuit for the downstream signal light and the transmitting encoder circuit for the upstream signal light are provided in parallel, they may be provided in tandem. Referring now to FIG. 59, Embodiment 3-5 will be described below in which the transmitting encoder circuit is disposed near the optical input/output port 412, that is, on the side of the optical fiber 410, and the receiving decoder circuit is connected in cascade to the transmitting encoder circuit.

To the optical input/output port 412 is connected the optical combiner/splitter 430 via an optical amplifier 442 as required. Accordingly, the downstream signal light from the optical fiber 410 is input via the optical combiner/splitter 430 to the encoders 441M and 441S. As referred to previously, the mark signal light and the space signal light are complementary to each other in the optical intensity of each optical frequency and equal in the mean optical intensities in the optical frequency range from f0 to FL, and the optical frequencies corresponding to one-half the optical frequency components forming the mark signal or space signal light in the downstream signal light are utilized to form the mark signal light or space signal light as the upstream signal light.

Accordingly, the half of the effective optical frequency components in the downstream signal light passes through the encoders 441M and 441S, and these transmitted optical outputs are combined by the switch 450 and input to an optical combiner/splitter 424, wherein it is split for input to the total reflector 451 and the optical splitter 422. The downstream signal light input to the optical splitter 422 is split into two for input to the decoders 461M and 461S. If the optical frequency characteristic of this downstream signal light is matched to the filtering characteristic function of the decoder 461M or 46aS, the optical frequency components, which is at least one-half those in the downstream signal light in the optical fiber 210 as described previously correctly pass through the decoder, providing decoded data from the comparator 480.

On the other hand, the light reflected off the total reflector 451 is input via the optical combiner/splitter 424 to the optical combiner 450. Since the switch 450 is controlled by the upstream data sequence from the terminal 431, the signal light encoded when the downstream signal light having passed through the encoder 441M or 441S previously is reflected off the total reflector 451, then subjected to the same encoding, and input to the optical combiner/splitter 430, from which it is input as the upstream signal light to the optical fiber 410. This upstream signal light is encoded twice by the encoder 441M or 441S and this encoding is based on the same characteristic, but there is a fear of the final encoding of the upstream signal light being affected by the preceding light encoded at the time of passage through the switch 450 from the optical fiber 410 and reflected by the total reflector 451—this incurs the possibility of the optical frequency characteristic of the upstream signal light being disturbed. This can be avoided by amplifying the upstream signal light for input to the optical fiber 410 by the optical amplifier 442 until it is saturated. However, this is limited specifically to the case of using a chip sequence as the function of the signal light. It is also possible to exchange the optical combiner/splitter 430 for a switch and the switch 450 for an optical combiner/splitter. Furthermore, the afore-mentioned various modifications may similarly be effected. The switch 450 may be configured as shown in FIG. 57, in which the upstream signal light for input to the optical fiber 410 is saturation-amplified by the optical amplifiers 452M and 452S as a substitute for the optical amplifier 442. Furthermore, the optical amplifier 442 may be disposed at the stage preceding the total reflector 451 as indicated by the broken line in FIG. 59. In this instance, the optical amplifier and the total reflector can be formed as a unitary part by giving total reflection coating to one end of SOA.

Embodiment 3-6

Figure 60:
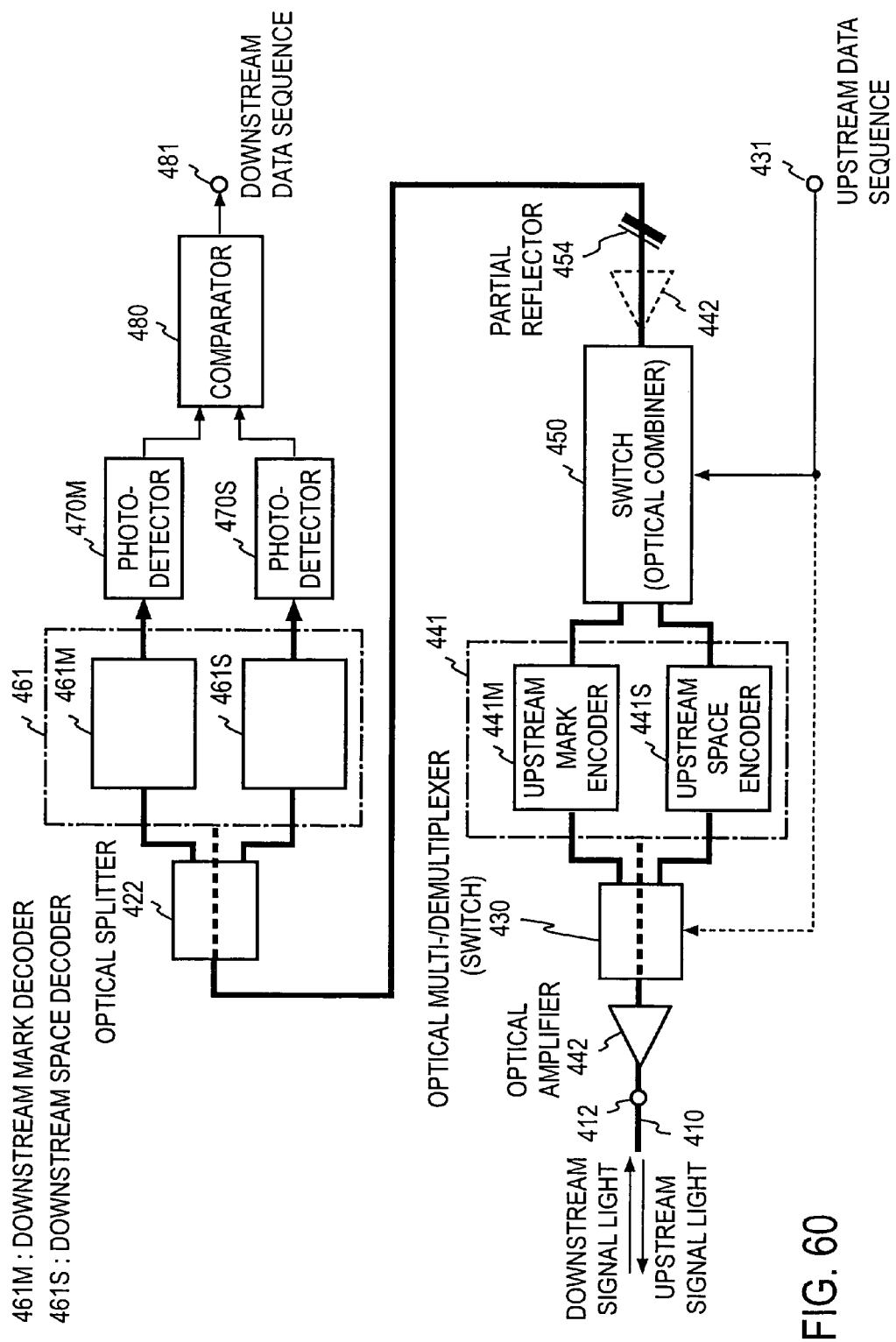
FIG. 60 is a diagram illustrating the function configuration of another example in which the receiver circuit is connected in cascade to the output of the transmitter circuit in Embodiment 3-5.

Embodiment 3-6 omits the optical combiner/splitter 424 and the total reflector 451 in Embodiment 3-5 as shown in FIG. 60, for instance. The downstream signal light having passed through the encoders 441M and 441S is input via the switch 450 to a partial reflector 454, and one portion of the downstream signal light is reflected by the partial reflector 454 and the remaining portion of the signal light passes through the partial reflector and enters the optical splitter 422. In this instance, too, it will easily be understood that the downstream signal light can be correctly decoded and that one portion of the downstream signal light can be used to generate the upstream signal light. As compared with the case of FIG. 59, this embodiment dispenses with the optical combiner/splitter 424, producing the effect of eliminating the loss in the optical combiner/splitter 424. As indicated by the broken line, the optical amplifier 442 may be disposed between the partial reflector 454 and the switch 450. In this case, by depositing, for example, one end of SOA with a partial reflection coating, the optical amplifier and the partial reflector can be formed in a one-piece structure. The switch 450 may be configured as shown in FIG. 57, in which the optical amplifiers 451M and 451S are used also as the optical amplifier 442. Moreover, the afore-mentioned various modifications can similarly be effected.

Embodiment 3-7

Figure 61:
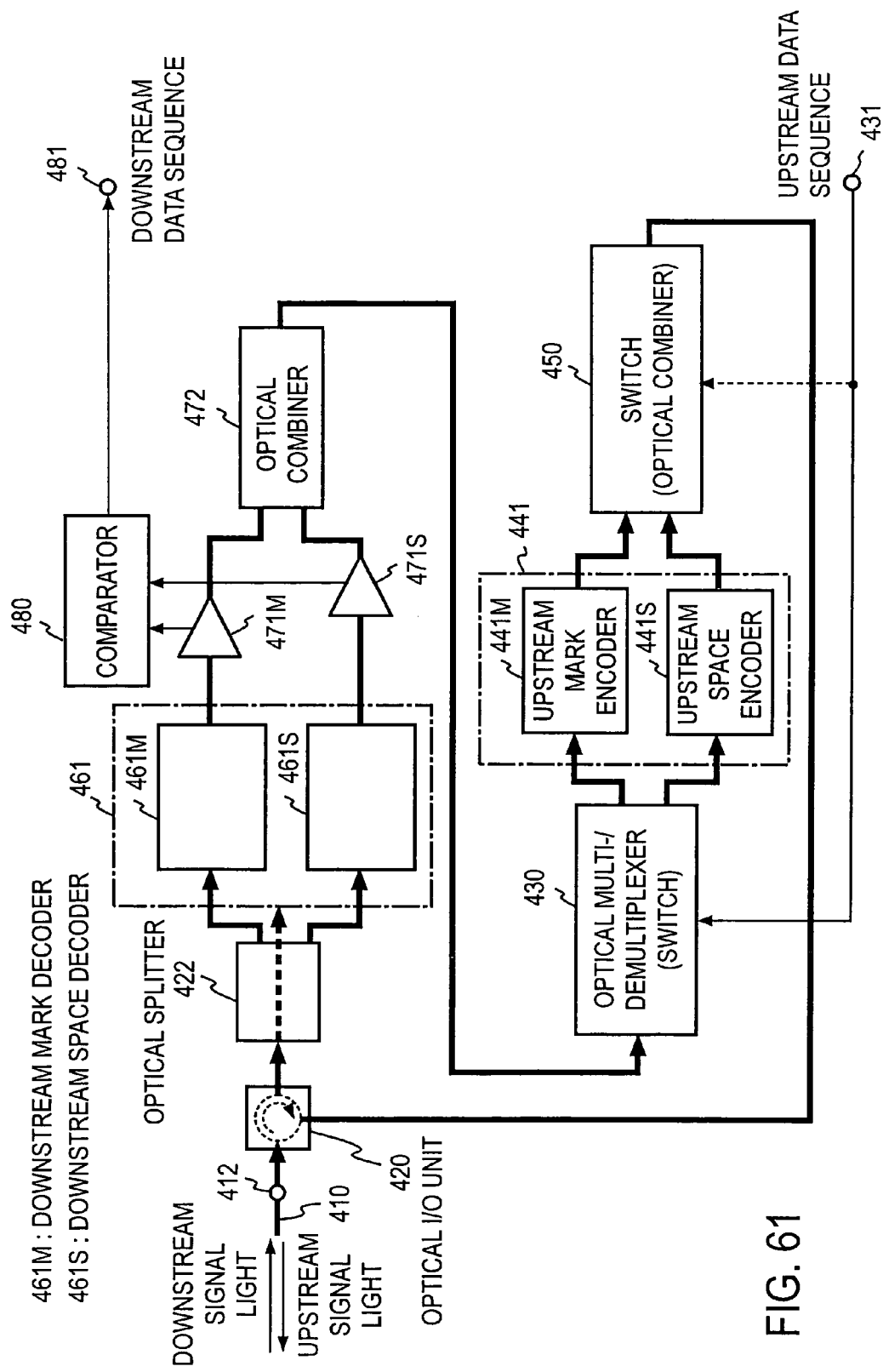
FIG. 61 is a diagram illustrating the function configuration of an example in which the transmitter circuit is connected in cascade to the output of the receiver circuit in Embodiment 3-5.

In this embodiment a transmitter circuit is connected in cascade to the output side of a receiver circuit. As the optical detectors 470M and 470S in the receiver circuit, optical detectors 471M and 471S are used which are formed by optical amplifiers capable of taking out electrical signals proportional to the input optical intensity, as shown in FIG. 61. For example, SOAs can be used as the optical detectors 471M and 471S, and the electrical signal from the optical detectors 471M and 471S, which are proportional to the optical intensities of the respective optical outputs from the mark decoder 461M and the space decoder 461S, are input to the comparator 480. On the other hand, the amplified optical signals from the optical detector 471M and 471S are combined by an optical combiner/splitter 472, and the combined output is input to the switch 430. The other configurations and operations are the same as those in FIG. 53. In this instance, too, since the optical frequency characteristics of each mark signal light and space signal light are formed as described previously, the signal light having passed through the downstream decoder 461 contains optical frequency components corresponding to the half of those of the downstream signal light, and the upstream mark signal light or upstream space signal light can be generated by the upstream encoder 441. With this configuration, the optical splitter 421 for separating the downstream signal light to the receiving side and the transmitting side in the configuration of FIG. 53 becomes unnecessary, and the downstream signal light for input to the encoders 441M and 441S can be amplified by the optical detectors 471M and 471S.

Figure 62:
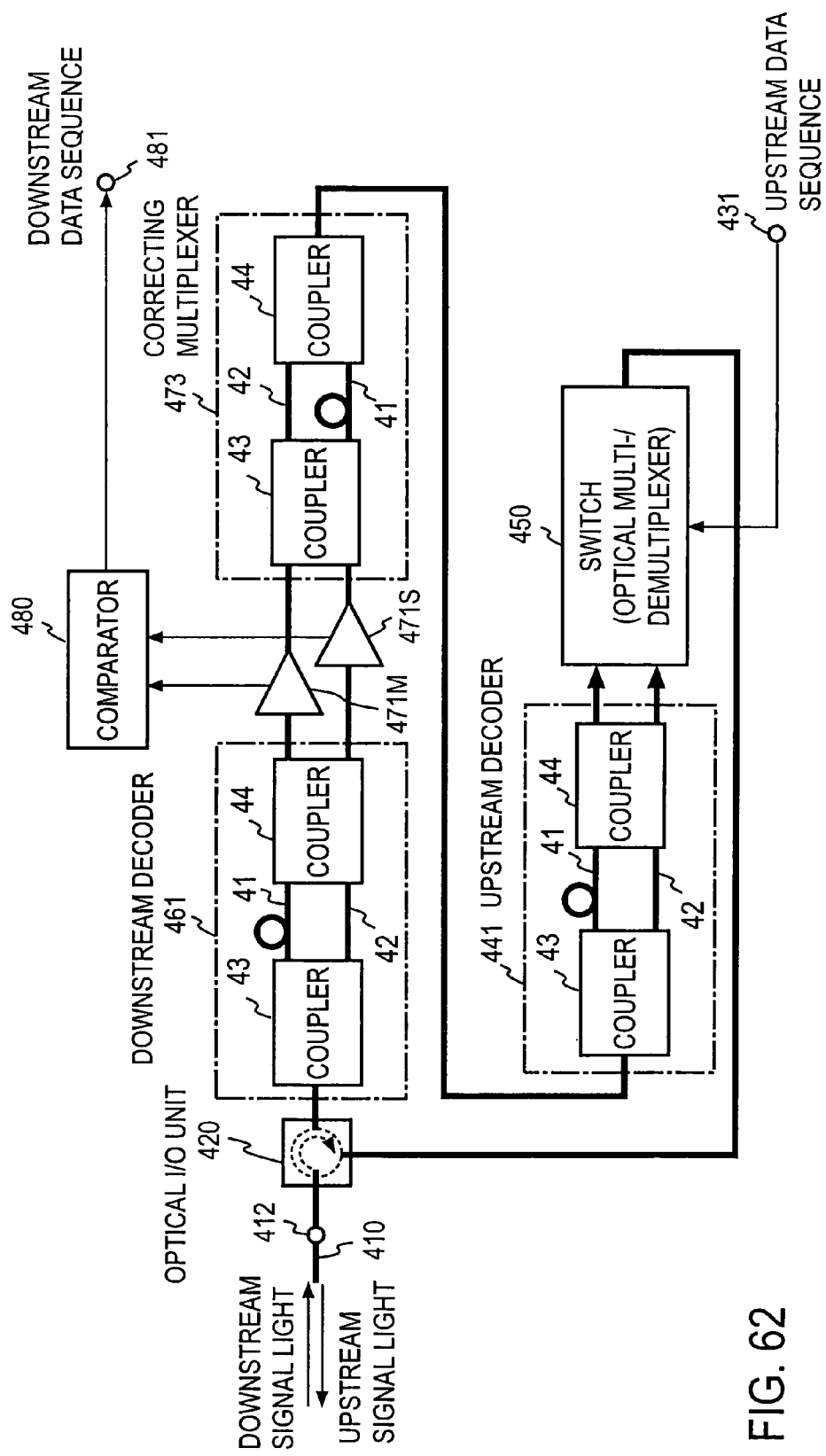
FIG. 62 is a diagram illustrating the function configuration of another example in which the transmitter circuit is connected in cascade to the output of the receiver circuit in Embodiment 3-5.

FIG. 62 illustrates an embodiment which uses the optical amplifiers 471M and 471S as optical detectors in the case of using Mach-Zehnder interferometers as the downstream decoder 461 and the upstream encoder 441 as depicted in FIG. 56. The downstream signal light from the optical input/output unit 420 is input directly to the downstream decoder 461, and the decoded downstream mark signal and downstream space signal from the downstream decoder 461 are input to the optical detectors 471M and 471S formed by optical amplifiers, respectively. The electrical signals proportional to the optical intensities of the inputs to the optical detectors 471M and 471S are input to the comparator 480, and the mark signal light and the space signal light amplified by the optical detectors 471M and 471S are input to a correcting combiner 473 formed by a Mach-Zehnder interferometer having its port exchanged with that of the Mach-Zehnder interferometer forming the downstream decoder 461. The difference in the optical path length between the optical paths 41 and 42 in the downstream decoder 461 is corrected by the difference in the optical path length between the optical paths 41 and 42 in the correcting combiner 471, and the downstream mark signal light and the downstream space signal light are combined by the coupler 44 after passing through optical paths of the same length. The combined downstream signal light is input to the encoder 441 formed by the Mach-Zehnder interferometer. The other configurations and operations are the same as shown in FIG. 56. Since the optical outputs from the optical detectors 471M and 471S are combined by the Mach-Zehnder interferometer, the loss can be reduced as compared with that in the case of using the optical multiplexer 47 in FIG. 61.

Given below is a general description of the third mode of working of the invention. This mode of working is predicated on the optical communications system which: transmits the downstream signal light from the optical transmitter; receives the downstream signal light by reflective optical communication equipment; regenerates the downstream data sequence through utilization of part of the received downstream signal light; and modulates part of the received downstream signal light into the upstream signal light and transmits it to the above-mentioned optical transmitter.

In this third mode of working of the invention, functions and their complementary functions need not always to be periodic. Accordingly, the optical intensity-frequency characteristic of the received optical code signal has the function $Ci(f)$ or $Ck(f)$ and the filtering frequency characteristic, the upstream encoder 441 is $Cj(f)$ or $Cm(f)$, and these functions satisfy the following equations that express the scalar-product integration values for the interval of the optical frequency width FSR in an arbitrary range from the optical frequency Fst to Fla.

$$\int Ci(f) \cdot Cj(f) df = \int Ci(f) \cdot Cm(f) df$$

$$\int Ck(f) \cdot Ci(f) df = \int Ck(f) \cdot Cm(f) df$$

But it is not always required that $Ck(f)=(1-Ci(f))$ and $Cm(f)=(1-Cj(f))$. In the case were $Ck(f)\neq(1-Ci(f))$, however, $(1-Ci(f))$ and $(1-Ck(f))$ are not used in the same system. Similarly, when $Cm(f)\neq(1-Cj(f))$, $(1-Cj(f))$ and $(1-Cm(f))$ are not used in the same system.

Furthermore, at least one of the scalar-product integration values $\int Ci(f) \cdot Cj(f) df$ and $\int Ck(f) \cdot Ci(f) df$ is not zero. That is, either $Ci(f)>0$ or $Ck(f)>0$ holds.

When the functions $Ci(f)$ and $Cj(f)$ are periodic, it becomes as follows.

Letting a common multiple of the repletion period FSRi of the function of each code in the optical frequency range from the optical frequency Fst to Fla be represented by the optical frequency width FSR and a value obtained by dividing the optical frequency width FSR by a common multiple of the function repetition period FSRi be represented by the optical frequency width FSRi, $$Ci(f)=Ci(f+FSRi), \text{ and}$$

$$\int Ci(f) \cdot Ci(f) df > \int Ci(f) \cdot (1-Cj(f)) df;$$

for the j-th optical frequency characteristic function $Cj(f)$ other than the i-th one, $$\int Ci(f) \cdot Cj(f) df = \int Ci(f) \cdot (1-Cj(f)) df.$$

Based on the optical frequency characteristic functions bearing such relationships, for each piece of data of the binary data sequence the optical frequency characteristic function of the received downstream signal light is made $Ci(f)$ or $(1-Ci(f))$, depending on whether said piece of data is mark or space. One portion of this downstream signal light is allowed to pass through the decoders whose filtering characteristic functions are $Ci(f)$ and $(1-Ci(f))$, and the optical intensities of the transmitted optical outputs are detected, and the received downstream signal light is regenerated as the mark or space in accordance with the difference between the detected optical intensities.

And, for each piece of data of the upstream data sequence, the optical frequency characteristic of one portion of the downstream signal light is modulated by an encoder to $Cj(f)$ or $(1-Cj(f))$, or $(1-Cj(f))$ or $Cj(f)$, depending on whether said each piece of data is mark or space, and the downstream signal light is transmitted as an upstream signal light.

The invention claimed is:

1. An optical communications system using optical codes, characterized by:
   an optical transmitter which:
   emits from a light source an optical signal having an optical frequency width FSR contained in an optical frequency range from a predetermined optical frequency Fst to a predetermined optical frequency Fla; and provides said optical signal to an encoder formed by at least one of filter means whose optical filtering characteristic is a function $Ci(f)$ or its complementary function $(1-Ci(f))$ both corresponding to an i-th code at least in said optical frequency range from the predetermined optical frequency Fst to the predetermined optical frequency Fla; and generates by and transmits from said encoder an optical code signal whose optical intensity-frequency characteristic is at least one of said function $Ci(f)$ and its complementary function $(1-Ci(f))$ of said i-th code corresponding to the value of each piece of data of said i-th binary data sequence, at least in the optical frequency width FSR constained in said optical frequency range from the predetermined optical frequency Fst to the predetermined optical frequency Fla;
   wherein:
   said function $Ci(f)$ is a periodic function with an optical frequency f as a variable, expressed as $Ci(f)=Ci(f+PFRi)$;
   the optical frequency width FSR is an optical frequency width which is a common multiple of a repetition period PFRi of a function forming each code in an optical frequency range from a predetermined optical frequency Fst to a predetermined optical frequency Fla;
   the complementary function of said function $Ci(f)$ is a function obtained by subtracting the function $Ci(f)$ from 1;
   said function $Ci(f)$ and said complementary function $(1-Ci(f))$ bear the following relation:

$$\int Ci(f) \cdot Ci(f) df > \int Ci(f) \cdot (1-Ci(f)) df$$

where $\int df$ is a definite integral with respect to f for an arbitrary interval corresponding to said optical frequency width FSR constained in said optical frequency range from the optical frequency Fst to the optical frequency Fla; and
   the function $Ci(f)$, a function $Cj(f)$ of an arbitrary j-th code other than the i-th code and the complementary function $(1-Cj(f))$ of said function $Cj(f)$ bear the following relation:

$$\int Ci(f) \cdot Cj(f) df = \int Ci(f) \cdot (1-Cj(f)) df; \text{ and}$$

an optical receiver which includes:
at least optical filter means and an intensity detector for detecting the optical intensity of a received optical signal; and which:
generates from said received optical signal a first difference signal corresponding to the difference between a first intensity signal corresponding to the optical intensity of an optical signal whose optical intensity-frequency characteristic is Ci(f) based on said function Ci(f) and a second intensity signal corresponding to the optical intensity of an optical signal whose optical intensity-frequency characteristic is (1−Ci(f)) based on the complementary function (1−Ci(f)); and
regenerates said data sequence from said first difference signal.

2. The optical communications system of claim 1, characterized in that:
said repetition period PFRi is an optical frequency width obtained by dividing said optical frequency width FSR by an integer Ni corresponding to said function Ci(f); and
let Δf represent the remainder of the division of an arbitrary optical frequency width equal to or narrower than said optical frequency width FSR by the repetition period PFRi of said function Ci(f), let 2π(Δf/PFRi) represent a phase difference from said function Ci(f), and let Ci'(f) (=Ci(f+Δf)) represent a function with an optical frequency (f+Δf) different by said remainder Δf from the optical frequency of said function Ci(f) of the i-th code;
said functions Ci'(f), Cj(f) and (1−Cj(f)) bear the following relation:

$$\int Ci'(f) \cdot Cj(f)df = \int Ci'(f) \cdot (1 - Cj(f))df;$$

said encoder is formed by filter means whose optical filtering frequency characteristic is said function Ci'(f) corresponding to each value of said remainder Δf transmittable in said optical frequency range from the predetermined optical frequency Fst to the predetermined optical frequency Fla;
said optical transmitter is a device which transmits as the optical code signal, an optical signal whose optical intensity-frequency characteristic is the function Ci'(f) of each value of said remainder Δf corresponding to the value of each piece of a binary data sequence, at least in the optical frequency width FSR; and
said optical receiver is a device which regenerates said binary data sequence from said first difference signal corresponding to each value of the remainder Δf which corresponds to the difference between: said first intensity signal generated from said received optical signal and corresponding to the optical intensity of said optical signal whose optical intensity-frequency characteristic is Ci'(f) based on each function Ci'(f) which corresponds to each value of the remainder Δf transmittable from said by the optical transmitter; and said second intensity signal generated from the received optical signal and corresponding to the optical intensity of the optical signal whose optical intensity-frequency characteristic is (1−Ci'(f)) based on the complementary function (1−Ci'(f)) corresponding to said function Ci'(f) which corresponds to each value of the remainder Δf.

3. The optical communications system of claim 1, characterized in that:
said repetition period PFRi is an optical frequency width obtained by dividing said optical frequency width FSFR by an integer Ni corresponding to said function Ci(f); and let Δf represent the remainder of the division of an optical frequency width equal to or narrower than said optical frequency width FSR by said period PFRi, let 2π(Δf/PFRi) represent a phase difference from the function Ci(f), let said phase difference be set at π/2, and let Ci'(f) (=Ci(f+Δf)) represent a function with an optical frequency (f+Δf) different by said remainder Δf from the optical frequency of said function Ci(f) of said i-th code;
said functions Ci'(f), Cj(f) and (1−Cj(f)) bear the following relation:

$$\int Ci'(f) \cdot Cj(f)df = \int Ci'(f) \cdot (1 - Cj'(f))df;$$

said encoder is composed of: at least one of filter means whose optical filtering frequency characteristic is said function Ci(f) or its complementary function (1−Ci(f)) both corresponding to said i-th code in said optical frequency range from the predetermined optical frequency Fst to the predetermined optical frequency Fla; and additional filter means whose optical filtering characteristic is either at least one of said functions Ci'(f) and (1−Ci'(f)), or at least one of said functions Cj(f) and (1−Cj(f));
said optical transmitter is a device which: separates said binary data sequence by sequence converting means into a first separate data sequence and a second separate data sequence; generates and outputs, as the optical code signal from said encoder, an optical signal obtained by combining: a first optical signal whose optical intensity-frequency characteristic is either said function Ci(f) or (1−Ci(f)) set by said first separate data sequence; and a second optical signal whose optical intensity-frequency characteristic is either at least one of said functions Ci'(f) and (1−Ci'(f)), or at least one of said functions Cj(f) and (1−Cj(f)) which correspond to the value of each piece of data of said second separate data sequence; and
said optical receiver is a device which: detects from said received optical signal a second difference signal corresponding to the difference between a third intensity signal corresponding to the optical intensity of said optical signal whose optical intensity-frequency characteristic is Ci'(f) or Cj(f) based on said function Ci'(f) or Cj(f) and a fourth intensity signal corresponding to the optical intensity of said optical signal whose optical intensity-frequency characteristic is (1−Ci'(f)) or (1−Cj(f)) based on the function Ci'(f) or Cj(f), respectively; and regenerates said first separate data sequence and said second separate data sequence from said second difference signal and said first difference signal.

4. The optical communications system of claim 3, characterized in that:
said optical transmitter has means for separating the input binary data sequence by said sequence converting means into a third separate data sequence and a fourth separate data sequence, in addition to said first and second separate data sequences, and includes:
amplitude changing means by which said first optical signal, which has its optical intensity-frequency characteristic set to be the function Ci(f) or (1−Ci(f)) according to the value of each piece of data of said first separate data sequence, and said second optical signal, which has its optical intensity-frequency characteristic set to be the function Ci'(f) or (1−Ci'(f)), or the function Cj(f) or (1−Cj(f)) according to the value of each piece of data of said second separated data sequence, are controlled to have optical intensities corresponding to the value of each piece of data of said third separate sequence and the value of each piece of data of said fourth separate data sequence, respectively; and said optical receiver is a device which converts said first difference signal and said second difference signal into digital values, respectively, and regenerates said first, second, third and fourth separate data sequences from said digital values, respectively.

5. The optical communications system of claim 1, characterized in that:
said optical transmitter is a device which: receives an optical code signal whose optical frequency width is at least FSR and whose optical intensity-frequency characteristic is Cj(f) or (1−Cj(f)); and multiplies said received optical code signal by at least one of said optical intensity-frequency characteristics Ci(f), (1−Ci(f)), and zero in accordance with the value of each piece of data of said binary data sequence, and outputs the multiplied received optical code signal.

6. The optical communications system of any one of claims 1 to 5, characterized in that:
said period PFRi is an optical frequency width obtained by dividing said optical frequency width FSR by an integer Ni corresponding to said function Ci(f); said functions Ci(f) and Cj(f) have either the periods PFRi and PFRj different from each other, or periods PFRi and PFRj equal to each other, in which case let Δf represent the remainder of the division of an optical frequency width equal to or narrower than said optical frequency width FSR by the repetition period PFRi of said function Ci(f), said function Cj(f) is Ci'whose phase difference $2\pi(\Delta f/PFRi)$ from the function Ci(f) is $\pi/2$ and said function Ci(f) is a function containing a sine or cosine function.

7. The optical communications system of any one of claims 1 to 5, characterized in that:
said optical frequency width FSR is divided into chips by a value V=2Si·Qi obtained by multiplying arbitrary integers Si and Qi both corresponding to said function Ci(f) by an integer 2; and said function Ci(f) is a function that repeats Qi times making consecutive Si chips have an optical intensity 1 and the succeeding Si chips have an optical intensity 0, or sequentially shifts the optical frequency positions of said consecutive Si chips of the optical intensity 1 by a predetermined value.

8. The optical communications system of any one of claims 1 to 5, characterized in that:
said optical communications system is a two-way communication system;
an optical transmitter of at least one side of said system is a device which generates an optical code signal by making an optical signal have an optical intensity-frequency characteristic by an encoder formed by at least one encoding optical filter whose optical filtering frequency characteristics are said optical filtering frequency function Ci(f) and its complementary function (1−Ci(f)); and
an optical receiver is a device which separates optical code signals whose optical intensity-frequency characteristics are Ci'(f) and (1−Ci(f)) from a received optical signal by two decoding optical filters whose optical filtering characteristics are Ci'(f) and (1−Ci'(f)), or Cj(f) and (1−Cj(f)), where Ci'(f) is a function displaced a quarter period apart from Ci(f);
said at least one encoding optical filter and said two decoding optical filter are integrated on a monolithic planar lightwave circuit substrate; and
said optical communications system is provided with:
intensity detecting means for detecting the optical intensity of a transmitted optical signal from said at least one encoding optical filter or said two decoding optical filters; and controlling means for controlling the temperature of said monolithic planar lightwave circuit substrate to maximize the optical intensity to be detected.

9. The optical communications system of any one of claims 1 to 5, characterized in that:
said optical receiver is a device which:
divides said received optical signal by filter means for each optical chip forming the code of the optical code signal;
detects, as a chip intensity signal, the optical intensity of each divided optical chip by an intensity detector; and
delays, by delay means, such detected chip intensity signals of said received optical signal corresponding to optical chips different in the time of arrival from transmission lines so that said optical chips arrive at the same time; and obtains the first difference signal by subtracting, by means of an intensity difference detector, the summation of those of said delayed chip intensity signals whose function (1−Ci(f)) corresponds to 1 from the summation of those of said delayed chip intensity signals whose function Ci(f) corresponds to 1.

10. An optical transmitter, which:
emits from a light source an optical signal having an optical frequency width FSR contained in an optical frequency range from a predetermined optical frequency Fst to a predetermined optical frequency Fla; and
provides said optical signal to an encoder formed by at least one of filter means whose optical filtering characteristic is a function Ci(f) or its complementary function (1−Ci(f)) both corresponding to an i-th code at least in said optical frequency range from the predetermined optical frequency Fst to the predetermined optical frequency Fla; and generates by and transmits from said encoder an optical code signal whose optical intensity-frequency characteristic is at least one of said functions Ci(f) and (1−Ci(f)) of said i-th code corresponding to the value of each piece of data of said i-th binary data sequence, at least in said optical frequency width FSR contained in said optical frequency range from the predetermined optical frequency Fst to the predetermined optical frequency Fla;
wherein:
said function Ci(f) is a periodic function with an optical frequency f as a variable, expressed as Ci(f)=Ci(f+PFRi);
the optical frequency width FSR is the optical frequency width which is a common multiple of a repetition period PFRi of a function forming each code in said optical frequency range from the predetermined optical frequency Fst to the predetermined optical frequency Fla;
the complementary function (1−Ci(f) of the function Ci(f) is a function obtained by subtracting said function Ci(f) from 1;
said functions Ci(f) and (1−Ci(f)) bear the following relation:

$$\int Ci(f)\cdot Ci(f)df > \int Ci(f)\cdot(1-Ci(f))df$$

where $\int df$ is a definite integral with respect to f for an arbitrary interval corresponding to said optical frequency width FSR contained in the optical frequency range from the optical frequency Fst to the optical frequency Fla;
said function Ci(f), a function Cj(f) of an arbitrary j-th code other than the i-th code and a complementary function (1−Cj(f)) of said function Cj(f) bear the following relation:

$$\int Ci(f)\cdot Cj(f)df = \int Ci(f)\cdot(1-Cj(f))df.$$

11. The optical transmitter of claim 10, characterized by the provision of:

N encoders for generating and outputting optical code signals whose optical intensity-frequency characteristics are different functions, respectively, said N being an integer equal to or greater than 2; and a combiner for combining and transmitting N sets of optical code signals.

12. The optical transmitter of claim 10 or 11, characterized in that:

letting a represent an integer value from 1 to a value N/2 by dividing the code number N by an integer 2, and letting r represent the remainder of division of 2, said function Ci(f) is as follows:

$(1+\cos(2\cdot\pi\cdot a\cdot f/FSR+r\cdot\pi/2))/2$.

13. The optical transmitter of claim 10 or 11, characterized in that:

said optical frequency width FSR is divided by an arbitrary integer R into chips; and said functions Ci(f) and Cj(f) are composed of "1" and "−1" chips.

14. The optical transmitter of claim 10 or 11, characterized in that:

each encoder is provided with: a first modulation part for generating a first optical code signal whose optical intensity-frequency characteristic is a code function assigned to said encoder; a second modulation part for generating a second optical code signal whose optical intensity-frequency characteristic is the complementary function of the function of said first modulation part; and a switch which outputs therethrough at least one of said first and second optical code signals by use of one of two values for each piece of data of input binary data and outputs at least the other of said first and second optical code signals by use of the other of said two values for each piece of data of said input binary data.

15. The optical transmitter of claim 10, characterized in that:

said repetition period PFRi is an optical frequency obtained by dividing said optical frequency width FSR by an integer Ni corresponding to said function Ci(f); and let Δf represent the remainder of the division of an arbitrary optical frequency width equal to or narrower than said optical frequency width FSR by the repetition period PFRi of said function Ci(f), let 2π(Δf/PFRi) represent a phase difference from said function Ci(f), and let Ci'(f) (=Ci(f+Δf)) represent a function with an optical frequency (f+Δf) different by said remainder Δf from the optical frequency of said function Ci(f) of said i-th code;

said functions Ci'(f), Cj(f) and (1−Cj(f)) bear the following relation:

$\int Ci'(f)\cdot Cj(f)df = \int Ci'(f)\cdot(1-Cj(f))df$;

said encoder is formed by filter means whose optical filtering frequency characteristic is said function Ci'(f) corresponding to each value of said remainder Δf transmittable at least in the range from the predetermined optical frequency Fst to the predetermined optical frequency Fla;

said optical transmitter is a device which transmits, for each piece of data of said binary data sequence, an optical signal whose optical intensity-frequency characteristic is said function Ci'(f) of the value of said remainder Δf corresponding to the value of each piece of data, as said optical code signal at least in said optical frequency width FSR; and said optical transmitter includes:

a code modulation part which generates, for each piece of data of said binary data sequence, an optical code signal whose optical intensity-frequency characteristic is that one of functions satisfying the conditions for the abovesaid relation which differs only in the phase Δf in accordance with the value of each piece of data; and a combiner for combining the optical code signals from said code modulation parts and for outputting them as said output optical code signal.

16. The optical transmitter of claim 10, characterized in that:

said period PFRi is an optical frequency width obtained by dividing said optical frequency width FSR by an integer Ni corresponding to said funtion Ci(f); let Δf represent the remainder of the division of an arbitrary optical frequency width equal to or narrower than said optical frequency width FSR by the repetition period PFRi of said function Ci(f), let 2π(Δf/PFRi) represent a phase difference from the function Ci(f), and let Ci'(f)(=Ci(f+Δf)) represent a function with an optical frequency (f+Δf) different by the remainder Δf from the optical frequency of said function Ci(f) of said i-th code; and said functions Ci'(f), Cj(f) and (1−Cj(f)) bear the following relation:

$\int Ci'(f)\cdot Cj(f)df = \int Ci'(f)\cdot(1-Cj(f))df$;

let the phase difference be set at π/2;

said encoder is composed of: at least one of filter means whose optical filtering frequency characteristic is said functions Ci(f) or (1−Ci(f)) both corresponding to said i-th code in said optical frequency range from the predetermined optical frequency Fst to the predetermined optical frequency Fla; and additional filter means whose optical filtering characteristic is either at least one of said functions Ci'(f) and (1−Ci'(f)), or at least one of said functions Cj(f) and (1−Cj(f)); and said optical transmitter is provided with:

a sequence converting part for separating said input binary data sequence into a first separate data sequence and a second separate data sequence;

a first modulation part for generating a first optical signal whose optical intensity-frequency characteristic is said function Ci(f) or (1−Ci(f)), depending on the value of each piece of data of said first separate data sequence;

a second modulation part for generating a second optical signal whose optical intensity-frequency characteristic is at least one of said functions Ci'(f) and (1−Ci'(f)), or at least one of said functions Cj(f) and (1−Cj(f)), depending on the value of each piece of data of said second separate data sequence;

a combiner for combining said first and the second optical signals for outputting them as optical code signal.

17. The optical transmitter of claim 16, characterized in that:

said sequence converting part is a converting part which converts the input binary data sequence into first, second, third and fourth separate data sequences;

said optical transmitter is provided with third and fourth modulation parts for modulating said first and second optical signals into signals of optical intensities corresponding to the values of respective pieces of data of said third and fourth separate data sequences, respectively; and said combiner combines said first and second optical signals of the light intensities corresponding to said values, respectively.

18. The optical transmitter of any one of claims 15 to 17, characterized in that:

said period PFRi is an optical frequency width obtained by dividing said optical frequency width FSR by an integer Ni corresponding to said function Ci(f); the periods of said functions Ci(f) and Cj(f) are the periods PFRi and PFRj different from each other, or periods PFRi and PFRj equal to each other, in which case let $\Delta f$ represent the remainder of the division of an optical frequency width equal to or narrower than said optical frequency width FSR by the repetition period PFRi of said function Ci(f), said function Cj(f) is Ci'(f) whose phase difference $2\pi(\Delta f/FSRi)$ from said function Ci(f) is $\pi/2$, and said function Ci(f) is a function containing a sine or cosine function.

19. The optical transmitter of any one of claims 15 to 17, characterized in that:

said optical frequency width FSR is divided into chips by a value $V=2Si \cdot Qi$ obtained by multiplying arbitrary integers Si and Qi both corresponding to the function Ci(f) by an integer 2; and said function Ci(f) is a function that repeats Qi times making consecutive Si chips have an optical intensity 1 and the succeeding Si chips have an optical intensity 0, or sequentially shifts the optical frequency positions of said consecutive Si chips of the optical intensity 1 by a predetermined value.

20. The optical transmitter of any one of claims 15 to 17, characterized in that there are provided for each data sequence:

said light source;

an optical splitter for splitting an output optical signal from said light source into multiple optical signals;

optical filters of optical filtering characteristics having different code functions, for receiving said split optical signals;

an optical combiner for combining said optical signals transmitted through said optical filters and transmitting said combined output as an optical code signal; and code modulating means which is inserted between said multiple optical filters and said optical splitter or optical combiner and controlled by one of said multiple separate data sequences, respectively.

21. An optical receiver characterized by:

filter means which permits the passage therethrough of an optical signal having an optical intensity-frequency characteristic based on a function at least in an optical frequency range from a predetermined optical frequency Fst to a predetermined optical frequency Fla;

intensity detecting means for detecting the optical intensity of said optical signal; and means for adding together or subtracting the intensity signals from each other; and which is supplied with the received optical signal and regenerates data corresponding to the difference between: a first intensity signal corresponding to the optical intensity of an optical signal having an optical intensity-frequency characteristic Ci(f) based on a Ci(f); and a second intensity signal corresponding to the optical intensity of an optical signal having an optical intensity-frequency characteristic (1−Ci(f)) based on the complementary function (1−Ci(f)) of said function Ci(f);

wherein:

said function Ci(f) is a periodic function expressed as Ci(f)=Ci(f+PFRi), the value of the function Ci(f) being in the range of 0 to 1;

an optical frequency width FSR is an optical frequency width which is a common multiple of a repetition period PFRi of a function forming each code in said optical frequency range from the predetermined optical frequency Fst to the predetermined optical frequency Fla;

said complementary function of the function Ci(f) is a function obtained by subtracting said function Ci(f) from 1;

said functions Ci(f) and (1−Ci(f)) bear the following relation:

$$\int Ci(f) \cdot Ci(f) df > \int Ci(f) \cdot (1-Ci(f)) df$$

where $\int df$ is a definite integral with respect to f for an arbitrary interval corresponding to said optical frequency width FSR contained in said optical frequency range from the optical frequency Fst to the optical frequency Fla; and said function Ci(f), a function Cj(f) of an arbitrary j-th code other than said i-th code and the complementary function (1−Cj(f)) of said function Cj(f) bear the following relation:

$$\int Ci(f) \cdot Cj(f) df = \int Ci(f) \cdot (1-Cj(f)) df.$$

22. The optical receiver of claim 21, wherein:

said received optical signal is multiple optical code signals encoded to have optical intensity-frequency characteristics that satisfy orthogonality relations; and said optical transmitter further comprising multiple decoders, each provided with:

a splitter which is supplied with and splits said received optical signal into multiple optical signals;

a first filter which is supplied with one of said received optical signals split by said splitter and whose optical filtering characteristic is Ci(f);

a first intensity detector which is supplied with the output from said first filter and detects its optical intensity as a first intensity signal;

a second filter which is supplied with one of said received optical signal and whose optical filtering characteristic is (1−Ci(f));

a second intensity detector which is supplied with the output from said second filter and detects its optical intensity as a second intensity signal; and an intensity difference detector which is supplied with said first and second intensity signals and regenerates binary data based on the intensity difference obtained by subtracting the one from the other intensity signal, respectively;

wherein said functions Ci(f) and (1−Ci(f)) differ between said multiple decoders.

23. The optical receiver of claim 21 or 22, characterized in that:

letting a represent an integer value in the range from 1 to N/2 obtained by dividing the code number N by an integer 2 and letting r represent the remainder of the division of 2, the function Ci(f) is as follows:

$$(1+\cos(2 \cdot \pi \cdot a \cdot f/FSR + r \cdot \pi/2))/2.$$

24. The optical receiver of claim 21 or 22, wherein:

said optical frequency width FSR is divided by an arbitrary integer R into chips; and said function Ci(f) and the function Cj(f) are composed of "1" and "−1" chips;

said optical receiver further comprising:

a filter which is supplied with said received optical signal and divides and outputs said received input signal for each chip;

multiple chip intensity detectors each of which is supplied with the output from said filter for each chip and detects the chip intensity signal corresponding to the optical intensity of said optical signal for each chip; and an intensity difference detector which is supplied with the chip intensity signals from said multiple chip intensity detectors, and outputs binary data based on the summation of all the input chip intensity signals with that signal corresponding to each "1" chip of said function Ci(f) held positive and that signal corresponding to each "1" chip of said function (1−Ci(f))held negative.

25. The optical signal receiver of claim 21, wherein:

said PFRi is an optical frequency width obtained by dividing said optical frequency width FSR by an integer Ni corresponding to said function Ci(f); and let $\Delta f$ represent the remainder of the division of an optical frequency width equal to or narrower than said optical frequency width FSR by said repetition period PFRi, let $2\pi(\Delta f/PFRi)$ represent a phase difference from the function Ci(f), and let Ci'(f)(=Ci(f+$\Delta f$)) represent a function with an optical frequency (f+$\Delta f$) different by said remainder $\Delta f$ from the optical frequency of said function Ci(f) od said i-th code;

said functions Ci'(f), Cj(f) and (1−Cj(f)) bear the following relation:

$$\int Ci'(f) \cdot Cj(f) df = \int Ci'(f) \cdot (1-Cj(f)) df;$$

said optical signal receiver further comprising:

a first filter which is supplied with said received optical signal and whose optical filtering frequency characteristic is said function Ci'(f) corresponding to each value of said remainder $\Delta f$ transmittable from an optical transmitter of the communicating partner;

a second filter which is supplied with said received optical signal and whose optical filtering frequency characteristic is said function (1−Ci'(f)) corresponding to the function Ci'(f) which corresponds to said each value of said remainder $\Delta f$;

a first intensity detectors which are supplied with the output from said first filters and detect a first intensity signals corresponding to the optical intensities of the output from said first filters;

a second intensity detectors which are supplied with the output from said second filters and detect a second intensity signals corresponding to the optical intensities of the output from said second filters; and means which are supplied with said first and second intensity signals, detect the difference therebetween, and regenerates and outputs the binary data sequence.

26. The optical receiver of claim 21, wherein:

said PFRi is an optical frequency width obtained by dividing said optical frequency width FSR by an integer Ni corresponding to said function Ci(f); and let $\Delta f$ represent the remainder of the division of an optical frequency width equal to or narrower than said optical frequency width FSR by the repetition period PFRi of said function Ci(f), let $2\pi(\Delta f/PFRi)$ represent a phase difference from said function Ci(f), let Ci'(f)(=Ci(f=$\Delta f$)) represent a function with an optical frequency (f=$\Delta f$) different by said remainder $\Delta f$ from the optical frequency of said function Ci(f) of said i-th code, and let said phase difference be set at $\pi/2$;

said functions Ci'(f), Cj(f) and (1−Cj(f)) bear the following relation:

$$\int Ci'(f) \cdot Cj(f) df = \int Ci'(f) \cdot (1-Cj(f)) df;$$

said optical receiver further comprising:

a first filter which is supplied with said received optical signal and whose optical filtering frequency characteristic is said function Ci(f);

a second filter which is supplied with said received optical signal and whose optical filtering frequency characteristic is said function (1−Ci(f));

a first intensity detector which is supplied with the output from said first filter and detects a first intensity signal corresponding to the optical intensity of the output from said first filter;

a second intensity detectors which are supplied with the output from said second filter and detects a second intensity signal corresponding to the optical intensity of the output from said second filter;

a third filter which is supplied with the received optical signal and whose optical filtering frequency characteristic is said function Ci'(f) or Cj(f);

a fourth filter which is supplied with said received optical signal and whose optical filtering frequency characteristic is said function (1−Ci'(f)) or (1−Cj(f));

a third intensity detector which is supplied with the output from said third filter and detects a third intensity signal corresponding to the optical intensity of the output from said third filter;

a fourth intensity detector which is supplied with the output from said fourth filter and detects a fourth intensity signal corresponding to the optical intensity of the output from said fourth filter;

a first subtractor which is supplied with said first and second intensity signals and outputs the difference therebetween as a first difference signal;

a second subtractor which is supplied with said third and fourth intensity signals and outputs the difference therebetween as a second difference signal; and data generating means which is supplied with said first and second difference signals and outputs said binary data sequence.

27. The optical receiver of claim 26, characterized in that:

said data generating means is means which renders said first difference signal into first binary data and said second difference signal into second binary data, and arranges said first binary data and said second binary data in a sequential order to form said binary data sequence.

28. The optical receiver of claim 26, characterized in that:

said data generating means is provided with:

a first A/D converter for converting said first difference signal to a first digital;

a second A/D converter for converting said second difference signal to a second digital; and binary sequencing means which is supplied with said first and second digital signals, and outputs that one of predetermined combinations of four or more pieces of data 0 or 1 for a combination of the values of said input digital signals.

29. The optical receiver of any one of claims 25 to 28, characterized in that:

said functions Ci(f) and Cj(f) have either the periods PFRi and PFRj different from each other, or periods PFRi and PFRj equal to each other, in which case let $\Delta f$ represent the remainder of the division of an optical frequency width equal to or narrower than said optical frequency width FSR by the repetition period PFRi of said function Ci(f), and said function Cj(f) is Ci'(f)(=Ci(f±π/2) whose phase difference 2π(Δf/PFRi) from said function Ci(f) is π/2.

30. The optical receiver of any one of claims 25 to 28, wherein:
said optical frequency width FSR is divided into chips by a value V=2Si·Qi obtained by multiplying arbitrary integers Si and Qi both corresponding to said function Ci(f) by an integer 2; and
said functions Ci(f) and Cj(f) are composed of "1" and "−1" chips;
said optical receiver further comprising:
a filter which is supplied with said received optical signal and divides and outputs said received input signal for each chip;
multiple chip intensity detectors each of which is supplied with the filter output for each chip and detects the chip intensity signal corresponding to the optical intensity of said optical signal for each chip; and
an intensity difference detector which is supplied with the chip intensity signals from said multiple chip intensity detectors, and outputs binary data based on the summation of all the input chip intensity signals with that signal corresponding to each "1" chip of said function Ci(f) held positive and that signal corresponding to each "1" chip of said function (1−Ci(f)) held negative.

31. Reflective optical communication equipment which is supplied with a received optical signal and a binary data sequence, modulates the received optical signal to an optical signal whose optical intensity-frequency characteristic is a function with an optical frequency f as a variable, and transmits the modulated optical signal, and which is characterized by:
an encoder which is supplied with said received optical signal of at least an optical frequency width FSR contained in an optical frequency range from a predetermined optical frequency Fst to a predetermined optical frequency Fla and outputs an optical signal filtered by optical filter means whose optical filtering frequency characteristic is a first function Ci(f) in said optical frequency range;
a complementary encoder which is supplied with said received optical signal and outputs a complementary optical signal filtered by optical filter means whose optical frequency characteristic is the complementary function (1−Ci(f)) in said optical frequency range; and
selective combining means which selectively combines, according to the value of each piece of data, the output optical signal from said encoder and the complementary optical signal from said complementary encoder, and transmits them as an optical code signal;
wherein:
said function Ci(f) is a periodic function expressed as Ci(f)=Ci(f+PFRi), the value of said function Ci(f) being in the range of 0 to 1;
said optical frequency width FSR is an optical frequency width which is a common multiple of a repetition period PFRi of a function forming each code in said optical frequency range from the predetermined optical frequency Fst to the predetermined optical frequency Fla;
the complementary function of said function Ci(f) is a function obtained by subtracting said function Ci(f) from 1;
said functions Ci(f) and (1−Ci(f)) bear the following relation:

$$\int Ci(f) \cdot Ci(f) df > \int Ci(f) \cdot (1-Ci(f)) df$$

where $\int df$ is a definite integral with respect to f for an arbitrary interval corresponding to said optical frequency width FSR contained in said optical frequency range from the optical frequency Fst to the optical frequency Fla; and
said function Ci(f), a function Cj(f) of an arbitrary j-th code other than said i-th code and the complementary function (1−Cj(f)) of said function Cj(f) bear the following relation:

$$\int Ci(f) \cdot Cj(f) df = \int Ci(f) \cdot (1-Cj(f)) df.$$

32. The reflective optical communication equipment of claim 31, which is characterized by:
a decoder which is supplied with said received optical signal and whose optical filtering frequency characteristic is said function Cj(f));
a complementary decoder which is supplied with said received optical signal and whose optical filtering frequency characteristic is said function (1−Cj(f));
a first optical detector which is supplied with the output light from said decoder and outputs an intensity signal corresponding to the optical intensity of the output light from said decoder;
a complementary optical detector which is supplied with the output light from said complementary decoder and outputs a complementary intensity signal corresponding to the optical intensity of the output light from said complementary decoder; and
a comparator which is supplied with said intensity signal and said complementary intensity signal and outputs one of two pieces of data in accordance with the level difference between said intensity signals when the difference exceeds a predetermined value.

33. The reflective optical communication equipment of claim 32, characterized in that said selective combining means is provided with: a total reflector and a complementary total reflector for totally reflecting said received optical signal, respectively; and selectors and complementary selectors disposed between said encoder and and said total reflector and between said complementary encoder and said complementary total reflector, respectively, for selecting either one of said optical signal and an optical signal complementary thereto in accordance with the value of input data.

34. The reflective optical transmission equipment of claim 33, which is characterized by:
optical amplifiers for use as said optical detector and said complementary optical detector for optically amplifying the input optical signals thereto and outputting the amplified optical signals and intensity signals corresponding to the optical intensities of said input optical signals; and
an optical combiner for combining the amplified optical signals from said optical detector and said complementary optical detector and inputting the combiner optical signal as said received optical signal to said encoder and said complementary encoder.

35. The reflective optical communication equipment of claim 33, which is characterized by:
a switch for selecting said optical signal or complementary optical signal in accordance with the value of input data;
an optical combiner/splitter which is supplied with the output from said switch, splits said output into two, and inputs one of them to said decoder and said complementary decoder; and
a total reflector which is supplied with the other split light from said optical combiner/splitter and totally reflects the input light.

36. The reflective optical communication equipment of claim 32, characterized by:
- a switch for selecting said optical signal or said complementary optical signal in accordance with the value of input data; and
- a partial reflector which is supplied with the output light from said switch, reflects a portion of the output light and inputs the remaining portion of said output light to said decoder and said complementary decoder.

37. The reflective optical communication equipment of any one of claims 32 to 36, characterized in that:
- said period PFRi is an optical frequency width obtained by dividing said optical frequency width FSR by an integer Qi corresponding to said function Ci(f); let $\Delta f$ represent the remainder of the division of an optical frequency width equal to or narrower than said optical frequency width FSR by the repetition period PFRi of the function Ci(f); said functions Ci(f) and Cj(f) have either the periods PFRi and PFRj different from each other or periods PFRi and PFRj equal to each other; said function Cj(f) is Ci'(f) whose phase difference $2\pi(\Delta f/\text{PFRi})$ from said function Ci(f) is $\pi/2$; and said function Ci(f) is a trigonometric function;
- said encoder and said complementary encoder are integrated as an output encoder; and said decoder and said complementary decoder are integrated as an input decoder.

38. The reflective optical communication equipment of any one of claims 32 to 36, characterized in that:
- said optical frequency width FSR is divided into chips by a value V=2Si·Qi obtained by multiplying arbitrary integers Si and Qi both corresponding to said function Ci(f) by an integer 2; and said function Ci(f) is a function that repeats Qi times making consecutive Si chips have an optical intensity 1 and the succeeding Si chips have an optical intensity 0, or sequentially shifts the optical frequency positions of said consecutive Si chips of the optical intensity 1 by a predetermined value;
- said encoder and said complementary encoder are integrated as an output encoder; and said decoder and said complementary decoder are integrated as an input decoder.

39. An optical communications system using optical codes, characterized by:
- an optical transmitter provided with:
- multiple light sources for emitting optical signals of optical frequencies corresponding to MU =V chips each having a chip width that is a unit optical frequency width into which an optical frequency width FSR contained in an optical frequency range from a predetermined optical frequency Fst to a predetermined optical frequency Fla is divided by a natural number M and an integer U equal to or greater than 3;
- drive signal generators for generating drive signals for said multiple light sources;
- an optical combiner for combining the output lights from said multiple light sources and outputting the combined light as an optical code signal; and
- code modulating means which is inserted between said multiple light sources and said drive signal generators or said optical combiner and controlled by each piece of data of an i-th binary data sequence to make said optical code signal have an optical intensity-frequency characteristic based on at least one of said i-th code function Ci(f) and its complementary function (1−Ci(f));

wherein:
- said optical frequency width FSR is an optical frequency width which is a common multiple of a repetition period PFRi of a function forming each code in said optical frequency range from the predetermined optical frequency Fst to the predetermined optical frequency Fla;
- said complementary function of the function Ci(f) is a function obtained by subtracting said function Ci(f) from 1;
- said functions Ci(f) and (1−Ci(f)) bear the following relation:

$$\int Ci(f)\cdot Ci(f)df > \int Ci(f)\cdot (1-Ci(f))df$$

where $\int df$ is a definite integral with respect to f for an arbitrary interval corresponding to said optical frequency width FSR contained in said optical frequency range from the optical frequency Fst to the optical frequency Fla; and
- said function Ci(f), a function Cj(f) of an arbitrary j-th code other than said i-th code and the complementary function (1−Ci(f)) of said function Cj(f) bear the following relation:

$$\int Ci(f)\cdot Cj(f)df = \int Ci(f)\cdot (1-Cj(f))df; \text{ and}$$

an optical receiver which includes:
- at least optical filter means and an intensity detector for detecting the optical intensity of the optical signal received by said optical receiver; and which:
- generates from said received optical signal a first difference signal corresponding to the difference between a first intensity signal corresponding to the optical intensity of an optical signal whose optical intensity-frequency characteristic is Ci(f) and a second intensity signal corresponding to the optical intensity of an optical signal whose optical intensity-frequency characteristic is (1−Ci(f)); and regenerates said data sequence from said first difference signal.

40. The optical communications system of claim 39, characterized in that:
- the chip number Pi of the period PFRi of said function Ci(f) is the number of chips forming the optical frequency width obtained by dividing the chip number V of said optical frequency width FSR by an integer Ni corresponding to said function Ci(f);
- let $\Delta f$ represent the remainder of the division of an arbitrary chip number equal to or smaller than V by said chip number Pi of the repetition period PFRi of said function Ci(f), let $2\pi(\Delta f/Pi)$ represent a phase difference from said function Ci(f), and let Ci'(f) (=Ci(f=$\Delta$)) represent a function with an optical frequency different by said remainder $\Delta f$ from the optical frequency of said function Ci(f) of said i-th code;
- said functions Ci'(f), Cj(f) and (1−Cj(f)) bear the following relation:

$$\int Ci'(f)\cdot Cj(f)df = \int Ci'(f)\cdot (1-Cj(f))df;$$

- the control by said code modulating means is to make the optical intensity-frequency characteristic of said optical code signal have the function Ci'(f) corresponding to each value of said remainder $\Delta f$ that can be transmitted;
- said optical transmitter is a device which transmits as said optical code signal, an optical signal whose optical intensity-frequency characteristic is the function Ci'(f) of the value of said remainder $\Delta f$ corresponding to the value of each piece of binary data sequence, at least in the optical frequency width FSR; and said optical receiver is a device which regenerates said data sequence from each first difference signal corresponding to each value of said remainder $\Delta f$ which corresponds to the difference between: said first intensity signal generated from said received optical signal and corresponding to the optical intensity of the optical signal whose optical intensity-frequency characteristic is Ci'(f) based on each function Ci'(f) which corresponds to each value of said remainder $\Delta f$ transmittable by said optical transmitter; and said second intensity signal generated from said received optical signal and corresponding to the optical intensity of the optical signal whose optical intensity-frequency characteristic is (1−Ci(f)) based on the complementary function (1−Ci'(f)) corresponding to said function Ci'(f) which corresponds to the value of said remainder $\Delta f$.

41. The optical communications system of claim 39, characterized in that:

the chip number Pi of the period PFRi of said function Ci(f) is the number of chips forming the optical frequency width obtained by dividing the chip number V of said optical frequency width FSR by an integer Ni corresponding to said function Ci(f);

let $\Delta f$ represent the remainder of the division of a chip number equal to or smaller than V by said chip number Pi of the repetition period PFRi of said function Ci(f), let $2\pi(\Delta f/Pi)$ represent a phase difference from said function Ci(f), let the phase difference be set at $\pi/2$, and let Ci'(f) (=Ci(f+$\Delta f$)) represent a function with an optical frequency (f+$\Delta f$) different by said remainder $\Delta f$ from the optical frequency of said function Ci(f) of said i-th code;

said functions Ci'(f), Cj(f) and (1−Ci(f)) bear the following relation:

$$\int Ci'(f)\cdot Cj(f)df = \int Ci'(f)\cdot(1-Cj(f))df;$$

said code modulating means is means which selectively controls each chip to have the 1 or 0 level in accordance with a function;

said code modulating means is means which generates a first optical signal whose optical intensity-frequency characteristic is at least one of said function Ci(f) and its complementary function (1−Ci(f)) both corresponding to said i-th code and a second optical signal whose optical intensity-frequency characteristic is at least one of said function Ci'(f) and said complementary function (1−Ci'(f)), or at least one of said functions Cj(f) and (1−Cj'(f));

said optical transmitter is a device which: separates said binary data sequence by sequence converting means into a first separate data sequence and a second separate data sequence; combines the first optical signal whose optical intensity-frequency characteristic is said function Ci(f) or (1−Ci(f)) set by said first separate data sequence and the second optical signal whose optical intensity-frequency characteristic is at least one of said functions Ci'(f) and (1−Ci'(f)), or at least one of said functions Cj(f) and (1−Cj(f)) corresponding to the value of each piece of data of said second separate data sequence; and outputs the combined optical signal as said optical code signal; and said optical receiver is a device which: detects from its received optical signal, a second difference signal corresponding to the difference between a third intensity signal corresponding to the optical intensity of the optical signal whose optical intensity-frequency characteristic is Ci'(f) or Cj(f) based on said function Ci'(f) or Cj(f) and a fourth intensity signal corresponding to the optical signal whose optical intensity-frequency characteristic is (1−Ci'(f)) or (1−Cj(f)) based on said complementary function (1−Ci'(f)) or (1−Cj(f)), respectively; and regenerates said first separate data sequence and said second separate data sequence from said first difference signal and said second difference signal, respectively.

42. The optical communications system of claim 41, characterized in that:

said optical transmitter has means for separating the input binary data sequence by said sequence converting means into a third separate data sequence and a fourth data sequence, in addition to said first and second separate data sequences, and includes:

amplitude changing means by which said first optical signal which has its optical intensity-frequency characteristic set to be the function Ci(f) or (1−Ci(f) according to the value of each piece of data of said first separate data sequence and said second optical signal which has its optical intensity-frequency characteristic set to be the function Ci'(f) or (1−Ci'(f)), or the function Cj(f) or (1−Cj(f)) according to the value of each piece of data of said second separate data sequence, are controlled to have optical intensities corresponding to the value of each piece of data of said third separate data sequence and the value of each piece of data of said fourth separate data sequence, respectively; and said optical receiver is a device which converts said first and second difference signals into digital values, respectively, and regenerates said first, second, third and fourth separate data sequences from said digital values, respectively.

43. The optical communications system of any one of claims 39 to 42, characterized in that:

the chip number V for dividing said optical frequency width FSR is a value 2Si·Qi obtained by multiplying arbitrary integers Si and Qi both corresponding to said function Ci(f) by an integer 2; and said function Ci(f) is a function that repeats Qi times making consecutive Si chips have an optical intensity 1 and the succeeding Si chips have an optical intensity 0, or sequentially shifts the optical frequency positions of said consecutive Si chips of optical intensity 1 by a predetermined value.

44. The optical communications system of any one claims 39 to 42, characterized in that:

said optical receiver is a device which:

divides said received optical signal by filter means for each optical chip forming the code of the optical code signal;

detects, as a chip intensity signal, the optical intensity of each divided optical chip by an intensity detector; and delays, by delay means, such detected chip intensity signals of said received optical signal corresponding to optical chips different in the time of arrival from transmission lines so that said optical chips arrive at the same time; and obtains the first difference signal by subtracting, by means of an intensity difference detector, the summation of those of said delayed chip intensity signals whose function (1−Ci(f)) corresponds to 1 from the summation of those of said delayed chip intensity signals whose function Ci(f) corresponds to 1.

45. An optical transmitter, comprising:

multiple light sources for emitting optical signals of optical frequencies corresponding to MU =V chips each having a chip width that is a unit optical frequency width into which an optical frequency width FSR contained in an optical frequency range from a predetermined optical frequency Fst to a predetermined optical frequency Fla is divided by a natural number M and an integer U equal to or greater than 3;

drive signal generators for generating drive signals for said multiple light sources;

an optical combiner for combining the output light from said multiple light sources and outputting it as an optical code signal; and code modulating means which is inserted between said multiple light sources and said drive signal generators or said optical combiner and controlled by each piece of data of an i-th binary data sequence to make said optical code signal have an optical intensity-frequency characteristic based on at least one of said i-th code function $Ci(f)$ and its complementary function $(1-Ci(f))$;

wherein:

said optical frequency width FSR is an optical frequency width which is a common multiple of a repetition period PFRI of a function forming each code in said optical frequency range from the predetermined optical frequency Fst to the predetermined optical frequency Fla;

the complementary function of said function $Ci(f)$ is a function obtained by subtracting said function $Ci(f)$ from 1;

said functions $Ci(f)$ and $(1-Ci(f))$ bear the following relation:

$$\int Ci(f) \cdot Ci(f) df > \int Ci(f) \cdot (1-Ci(f)) df$$

where $\int df$ is a definite integral with respect to f for an arbitrary interval corresponding to said optical frequency width FSR contained in said optical frequency range from the optical frequency Fst to the optical frequency Fla; and said function $Ci(f)$, a function $Cj(f)$ of an arbitrary j-th code other than said i-th code and the complementary function $(1-Cj(f))$ of the said function $Cj(f)$ bear the following relation:

$$\int Ci(f) \cdot Cj(f) df = \int Ci(f) \cdot (1-Cj(f)) df.$$

46. The optical transmitter of claim 45, characterized by the provision of:

N sets of light sources and drive signal generators for generating and outputting optical code signals having optical intensity-frequency characteristics of different functions, respectively, said N being an integer equal to or greater than 2; and a combiner for combining and transmitting N sets of optical code signals.

47. The optical transmitter of claim 45 or 46, characterized in that:

said functions $Ci(f)$ and $Cj(f)$ are each composed of "1" and "1" chips.

48. The optical transmitter of claim 45 or 46, characterized in that:

each code modulating means is provided with: a first modulation part for generating a first optical code signal whose optical intensity-frequency characteristic is a code function assigned to said encoder; a second modulation part for generating a second optical code signal whose optical intensity-frequency characteristic is the complementary function of said function of said first modulation part; and a switch which outputs therethrough at least one of said first and second optical code signals by use of one of two values for each piece of data of input binary data and outputs at least the other of said first and second optical code signals by use of the other of said two values for each piece of data of said input binary data.

49. The optical transmitter of claim 45, characterized in that:

the chip number Pi of the period PFRi of said function $Ci(f)$ is the number of chips forming the optical frequency width obtained by dividing the chip number V of said optical frequency width FSR by an integer Ni corresponding to said function $Ci(f)$;

let $\Delta f$ represent the remainder of the division of an arbitrary chip number equal to or smaller than V by the chip number Pi of the repetition period PFRi of said function $Ci(f)$, let $2\pi(\Delta f/Pi)$ represent a phase difference from said function $Ci(f)$, and let $Ci'(f)$ $(=Ci(f+\Delta f))$ represent a function with an optical frequency $(f+\Delta)$ different by said remainder $\Delta f$ from the optical frequency of said function $Ci(f)$ of said i-th code;

said functions $Ci'(f)$, $Cj(f)$ and $(1-Cj(f))$ bear the following relation:

$$\int Ci'(f) \cdot Cj(f) df = \int Ci'(f) \cdot (1-Cj(f)) df;$$

the control by said code modulating means is to make the optical intensity-frequency characteristic of said optical code signal have said function $Ci'(f)$ corresponding to each value of said remainder $\Delta f$ that can be transmitted;

said optical transmitter is a device which transmits, for each piece of data of said binary data sequence, as said optical code signal, an optical signal whose optical intensity-frequency characteristic is said function $Ci'(f)$ of the value of said remainder $\Delta f$ corresponding to the value of each piece of data, at least in said optical frequency width FSR, and which includes:

a code modulation part which generates, for each piece of data of said binary data sequence, an optical code signal whose optical intensity-frequency characteristic is that one of functions satisfying the conditions for the abovesaid relation which differs only in the phase $\Delta f$ in accordance with the value of each piece of data; and a combiner for combining the optical code signals from said code modulation parts and outputting the combined signal as the output optical code signal.

50. The optical transmitter of claim 45, characterized in that:

the chip number Pi of the period PFRi of said function $Ci(f)$ is the number of chips forming the optical frequency width obtained by dividing the chip number V of said optical frequency width FSR by an integer Ni corresponding to the function $Ci(f)$;

let $\Delta f$ represent the remainder of the division of a chip number equal to or smaller than V by the chip number Pi of the repetition period PFRi of said function $Ci(f)$, let $2\pi(\Delta f/Pi)$ represent a phase difference from said function $Ci(f)$, and let $Ci'(f)$ $(=Ci'(f+\Delta f))$ represent a function with an optical frequency $(f+\Delta)$ different by said remainder $\Delta f$ from the optical frequency of said function $Ci(f)$ of said i-th code;

said functions $Ci'(f)$, $Cj(f)$ and $(1-Ci(f))$ bear the following relation:

$$\int Ci'(f) \cdot Cj(f) df = \int Ci'(f) \cdot (1-Cj(f)) df;$$

let the phase difference be set at $\pi/2$;

said code modulating means is means which generates a first optical signal whose optical frequency characteristic is said function $Ci(f)$ or $(1-Ci(f))$ both corresponding to said i-th code and a second optical signal whose optical frequency characteristic is at least one of said functions $C_i'(f)$ and $(1-C_i'(f))$, or at least one of said functions $C_j(f)$ and $(1-C_j(f))$; and said optical transmitter is provided with:
- a sequence converting part which separates said input binary data sequence into a first separate data sequence and a second separate data sequence;
- a first modulation part which generates a first optical signal whose optical intensity-frequency characteristic is said function $C_i(f)$ or $(1-C_i(f))$, depending on the value of each piece of data of said first separate data sequence;
- a second modulation part which generates a second optical signal whose optical intensity-frequency characteristic is at least one of said functions $C_i'(f)$ and $(1-C_i'(f))$, or at least one of said functions $C_j(f)$ and $(1-C_j'(f))$, depending on the value of each piece of data of said second separate data sequence; and
- a combiner for combining said first and second optical signals and outputs the combined signal as the optical code signal.

51. The optical transmitter of claim 50, characterized in that:
said sequence converting part is a converting part which converts said input binary data sequence into, first, second, third and fourth separate data sequences;

said optical transmitter is provided with third and fourth modulation parts for modulating said first and second optical signals into signals of optical intensities corresponding to the values of respective pieces of data of said third and fourth separate data sequences; and said combiner is a combiner for combining said first and second optical signals of the light intensities corresponding to said values, respectively.

52. The optical transmitter of any one of claims 49 to 51, characterized in that the chip number V for dividing said optical frequency width FSR is a value $2S_i \cdot Q_i$ obtained by multiplying arbitrary integers $S_i$ and $Q_i$ both corresponding to said function $C_i(f)$ by an integer 2; and said function $C_i(f)$ is a function that repeats $Q_i$ times making consecutive $S_i$ chips have an optical intensity 1 and makes the succeeding $S_i$ chips have an optical intensity 0, or sequentially shifts the optical frequency positions of said consecutive $S_i$ chips of the optical intensity 1 by a predetermined value.

* * * * *